US011124121B2

(12) United States Patent
Weller et al.

(10) Patent No.: US 11,124,121 B2
(45) Date of Patent: Sep. 21, 2021

(54) VEHICULAR VISION SYSTEM

(71) Applicant: MAGNA ELECTRONICS INC., Auburn Hills, MI (US)

(72) Inventors: Andrew D. Weller, Holland, MI (US); Mark L. Larson, Grand Haven, MI (US); Ian A. McCabe, Holland, MI (US); Niall R. Lynam, Holland, MI (US); Rodney K. Blank, Zeeland, MI (US); Joseph P. McCaw, Lawrence, MI (US); John T. Uken, Jenison, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 142 days.

(21) Appl. No.: 16/362,995

(22) Filed: Mar. 25, 2019

(65) Prior Publication Data
US 2019/0217782 A1 Jul. 18, 2019

Related U.S. Application Data

(63) Continuation of application No. 16/105,246, filed on Aug. 20, 2018, now Pat. No. 10,239,457, which is a (Continued)

(51) Int. Cl.
*B60R 1/10* (2006.01)
*G02F 1/1333* (2006.01)
(Continued)

(52) U.S. Cl.
CPC .................. *B60R 1/10* (2013.01); *B60R 1/02* (2013.01); *B60R 1/12* (2013.01);
(Continued)

(58) Field of Classification Search
CPC .... B60R 1/10; B60R 1/02; B60R 1/12; B60R 2001/1215; B60R 2001/1223;
(Continued)

(56) References Cited

U.S. PATENT DOCUMENTS 1,096,452 A 5/1914 Perrin
1,563,258 A 11/1925 Cunningham
(Continued)

FOREIGN PATENT DOCUMENTS

AU A-40317/95 2/1995
CN 1189224 7/1998
(Continued)

OTHER PUBLICATIONS

Stewart, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.
(Continued)

*Primary Examiner* — Nay Tun
(74) *Attorney, Agent, or Firm* — Honigman LLP

(57) ABSTRACT

A vision system for a vehicle includes a forward-viewing camera located behind and viewing through a vehicle windshield, a rearward-viewing camera located at a rear of the vehicle, and a common image processor operable for processing captured image data. A video display screen is located within the interior cabin of the vehicle viewable by a driver of the vehicle. The common image processor utilizes object detection software at least during processing of first image data captured by the forward-viewing camera to detect at least one vehicle present exterior the equipped vehicle. Responsive to the vehicle being shifted into a reverse gear and while the driver is executing a reversing maneuver, video images derived from image data captured by at least the rearward-viewing camera are displayed on the video display screen.

49 Claims, 38 Drawing Sheets

Related U.S. Application Data continuation of application No. 15/803,947, filed on Nov. 6, 2017, now Pat. No. 10,053,013, which is a continuation of application No. 14/694,225, filed on Apr. 23, 2015, now Pat. No. 9,809,171, which is a continuation of application No. 12/405,558, filed on Mar. 17, 2009, now Pat. No. 9,019,090, which is a continuation of application No. 12/091,525, filed as application No. PCT/US2006/042718 on Oct. 31, 2006, now Pat. No. 7,855,755.

(60) Provisional application No. 60/732,245, filed on Nov. 1, 2005, provisional application No. 60/759,992, filed on Jan. 18, 2006, provisional application No. 60/836,219, filed on Aug. 8, 2006.

(51) Int. Cl.
  *G02F 1/157* (2006.01)
  *B60R 1/12* (2006.01)
  *B60R 1/02* (2006.01)

(52) U.S. Cl.
  CPC .. *G02F 1/133308* (2013.01); *G02F 1/133385* (2013.01); *G02F 1/157* (2013.01); *B60R 2001/1215* (2013.01); *B60R 2001/1223* (2013.01); *B60R 2001/1253* (2013.01); *G02F 2201/44* (2013.01); *G02F 2203/09* (2013.01)

(58) Field of Classification Search
  CPC ....... B60R 2001/1253; G02F 1/133308; G02F 1/133385; G02F 1/157; G02F 2201/44; G02F 2203/09
  See application file for complete search history.

(56) References Cited

U.S. PATENT DOCUMENTS

| | | |
|---|---|---|
| 2,069,368 A | 2/1937 | Horinstein |
| 2,166,303 A | 7/1939 | Hodny et al. |
| 2,263,382 A | 11/1941 | Gotzinger |
| 2,414,223 A | 1/1947 | DeVirgilis |
| 2,457,348 A | 12/1948 | Chambers |
| 2,561,582 A | 7/1951 | Marbel |
| 2,580,014 A | 12/1951 | Gazda |
| 3,004,473 A | 10/1961 | Arthur et al. |
| 3,075,430 A | 1/1963 | Woodward et al. |
| 3,141,393 A | 7/1964 | Platt |
| 3,152,216 A | 10/1964 | Woodward |
| 3,162,008 A | 12/1964 | Berger et al. |
| 3,185,020 A | 5/1965 | Thelen |
| 3,266,016 A | 8/1966 | Maruyama et al. |
| 3,280,701 A | 10/1966 | Donnelly et al. |
| 3,432,225 A | 3/1969 | Rock |
| 3,451,741 A | 6/1969 | Manos |
| 3,453,038 A | 7/1969 | Kissa et al. |
| 3,467,465 A | 9/1969 | Van Noord |
| 3,473,867 A | 10/1969 | Byrnes |
| 3,480,781 A | 11/1969 | Mandalakas |
| 3,499,112 A | 3/1970 | Heilmeier et al. |
| 3,499,702 A | 3/1970 | Goldmacher et al. |
| 3,521,941 A | 7/1970 | Deb et al. |
| 3,543,018 A | 11/1970 | Barcus et al. |
| 3,557,265 A | 1/1971 | Chisholm et al. |
| 3,565,985 A | 2/1971 | Schrenk et al. |
| 3,612,654 A | 10/1971 | Klein |
| 3,614,210 A | 10/1971 | Caplan |
| 3,628,851 A | 12/1971 | Robertson |
| 3,648,229 A | 3/1972 | Burrows et al. |
| 3,650,603 A | 3/1972 | Heilmeier et al. |
| 3,676,668 A | 7/1972 | Collins et al. |
| 3,680,951 A | 8/1972 | Jordan et al. |
| 3,689,695 A | 9/1972 | Rosenfield et al. |
| 3,711,176 A | 1/1973 | Alfrey, Jr. et al. |
| 3,712,710 A | 1/1973 | Castellion et al. |
| 3,748,017 A | 7/1973 | Yamamura et al. |
| 3,781,090 A | 12/1973 | Sumita |
| 3,806,229 A | 4/1974 | Schoot et al. |
| 3,807,832 A | 4/1974 | Castellion |
| 3,807,833 A | 4/1974 | Graham et al. |
| 3,821,590 A | 6/1974 | Kosman et al. |
| 3,837,129 A | 9/1974 | Losell |
| 3,860,847 A | 1/1975 | Carley |
| 3,862,798 A | 1/1975 | Hopkins |
| 3,870,404 A | 3/1975 | Wilson et al. |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 3,978,190 A | 8/1976 | Kurz, Jr. et al. |
| 3,985,424 A | 10/1976 | Steinacher |
| 4,006,546 A | 2/1977 | Anderson et al. |
| 4,035,681 A | 7/1977 | Savage |
| 4,040,727 A | 8/1977 | Ketchpel |
| 4,052,712 A | 10/1977 | Ohama et al. |
| 4,075,468 A | 2/1978 | Marcus |
| 4,088,400 A | 5/1978 | Assouline et al. |
| 4,093,364 A | 6/1978 | Miller |
| 4,097,131 A | 6/1978 | Nishiyama |
| 4,109,235 A | 8/1978 | Bouthors |
| 4,139,234 A | 2/1979 | Morgan |
| 4,159,866 A | 7/1979 | Wunsch et al. |
| 4,161,653 A | 7/1979 | Bedini et al. |
| 4,171,875 A | 10/1979 | Taylor et al. |
| 4,174,152 A | 11/1979 | Gilia et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,219,760 A | 8/1980 | Ferro |
| 4,221,955 A | 9/1980 | Joslyn |
| 4,228,490 A | 10/1980 | Thillays |
| 4,247,870 A | 1/1981 | Gabel et al. |
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,288,814 A | 9/1981 | Talley et al. |
| 4,297,401 A | 10/1981 | Chern et al. |
| RE30,835 E | 12/1981 | Giglia |
| 4,306,768 A | 12/1981 | Egging |
| 4,310,851 A | 1/1982 | Pierrat |
| 4,331,382 A | 5/1982 | Graff |
| 4,338,000 A | 7/1982 | Kamimori et al. |
| 4,377,613 A | 3/1983 | Gordon |
| 4,398,805 A | 8/1983 | Cole |
| 4,419,386 A | 12/1983 | Gordon |
| 4,420,238 A | 12/1983 | Felix |
| 4,425,717 A | 1/1984 | Marcus |
| 4,435,042 A | 3/1984 | Wood et al. |
| 4,435,048 A | 3/1984 | Kamimori et al. |
| 4,436,371 A | 3/1984 | Wood et al. |
| 4,438,348 A | 3/1984 | Casper et al. |
| 4,443,057 A | 4/1984 | Bauer et al. |
| 4,446,171 A | 5/1984 | Thomas |
| 4,465,339 A | 8/1984 | Baucke et al. |
| 4,473,695 A | 9/1984 | Wrighton et al. |
| 4,490,227 A | 12/1984 | Bitter |
| 4,491,390 A | 1/1985 | Tong-Shen |
| 4,499,451 A | 2/1985 | Suzuki et al. |
| 4,521,079 A | 6/1985 | Leenhouts et al. |
| 4,524,941 A | 6/1985 | Wood et al. |
| 4,538,063 A | 8/1985 | Bulat |
| 4,546,551 A | 10/1985 | Franks |
| 4,555,694 A | 11/1985 | Yanagishima et al. |
| 4,561,625 A | 12/1985 | Weaver |
| 4,572,619 A | 2/1986 | Reininger et al. |
| 4,580,196 A | 4/1986 | Task |
| 4,580,875 A | 4/1986 | Bechtel et al. |
| 4,581,827 A | 4/1986 | Higashi |
| 4,588,267 A | 5/1986 | Pastore |
| 4,603,946 A | 8/1986 | Kato et al. |
| 4,623,222 A | 11/1986 | Itoh et al. |

(56) References Cited

U.S. PATENT DOCUMENTS

| | | |
|---|---|---|
| 4,625,210 A | 11/1986 | Sagl |
| 4,626,850 A | 12/1986 | Chey |
| 4,630,040 A | 12/1986 | Haertling |
| 4,630,109 A | 12/1986 | Barton |
| 4,630,904 A | 12/1986 | Pastore |
| 4,634,835 A | 1/1987 | Suzuki |
| 4,635,033 A | 1/1987 | Inukai et al. |
| 4,636,782 A | 1/1987 | Nakamura et al. |
| 4,638,287 A | 1/1987 | Umebayashi et al. |
| 4,646,210 A | 2/1987 | Skogler et al. |
| 4,652,090 A | 3/1987 | Uchikawa et al. |
| 4,655,549 A | 4/1987 | Suzuki et al. |
| 4,657,348 A | 4/1987 | Ziegler |
| 4,664,479 A | 5/1987 | Hiroshi |
| 4,665,311 A | 5/1987 | Cole |
| 4,665,430 A | 5/1987 | Hiroyasu |
| 4,669,827 A | 6/1987 | Fukada et al. |
| 4,671,615 A | 6/1987 | Fukada et al. |
| 4,671,619 A | 6/1987 | Kamimori et al. |
| 4,678,281 A | 7/1987 | Bauer |
| 4,679,906 A | 7/1987 | Brandenburg |
| 4,682,083 A | 7/1987 | Alley |
| 4,692,798 A | 9/1987 | Seko et al. |
| 4,694,295 A | 9/1987 | Miller et al. |
| 4,697,883 A | 10/1987 | Suzuki et al. |
| 4,701,022 A | 10/1987 | Jacob |
| 4,702,566 A | 10/1987 | Tukude et al. |
| 4,704,740 A | 11/1987 | McKee et al. |
| 4,711,544 A | 12/1987 | Iino et al. |
| 4,712,879 A | 12/1987 | Lynam et al. |
| 4,713,685 A | 12/1987 | Nishimura et al. |
| RE32,576 E | 1/1988 | Pastore |
| 4,718,756 A | 1/1988 | Lancaster |
| 4,721,364 A | 1/1988 | Itoh et al. |
| 4,729,068 A | 3/1988 | Ohe |
| 4,729,076 A | 3/1988 | Masami et al. |
| 4,731,669 A | 3/1988 | Hayashi et al. |
| 4,733,335 A | 3/1988 | Serizawa et al. |
| 4,733,336 A | 3/1988 | Skogler et al. |
| 4,740,838 A | 4/1988 | Mase et al. |
| 4,758,040 A | 7/1988 | Kingsley et al. |
| 4,761,061 A | 8/1988 | Nishiyama et al. |
| 4,773,740 A | 9/1988 | Kawakami et al. |
| 4,780,752 A | 10/1988 | Angerstein et al. |
| 4,781,436 A | 11/1988 | Armbruster |
| 4,789,774 A | 12/1988 | Koch et al. |
| 4,789,904 A | 12/1988 | Peterson |
| 4,793,690 A | 12/1988 | Gahan et al. |
| 4,793,695 A | 12/1988 | Wada et al. |
| 4,794,261 A | 12/1988 | Rosen |
| D299,491 S | 1/1989 | Masuda |
| 4,799,768 A | 1/1989 | Gahan |
| 4,803,599 A | 2/1989 | Trine et al. |
| 4,807,096 A | 2/1989 | Skogler et al. |
| 4,820,933 A | 4/1989 | Hong et al. |
| 4,825,232 A | 4/1989 | Howdle |
| 4,826,289 A | 5/1989 | Vandenbrink et al. |
| 4,827,086 A | 5/1989 | Rockwell |
| 4,837,551 A | 6/1989 | Iino |
| 4,842,378 A | 6/1989 | Flasck et al. |
| 4,845,402 A | 7/1989 | Smith |
| 4,847,772 A | 7/1989 | Michalopoulos et al. |
| 4,855,161 A | 8/1989 | Moser et al. |
| 4,855,550 A | 8/1989 | Schultz, Jr. |
| 4,859,813 A | 8/1989 | Rockwell |
| 4,859,867 A | 8/1989 | Larson et al. |
| 4,860,171 A | 8/1989 | Kojima |
| 4,862,594 A | 9/1989 | Schierbeek et al. |
| 4,871,917 A | 10/1989 | O'Farrell et al. |
| 4,872,051 A | 10/1989 | Dye |
| 4,882,466 A | 11/1989 | Friel |
| 4,882,565 A | 11/1989 | Gallmeyer |
| 4,883,349 A | 11/1989 | Mittelhäuser |
| 4,884,135 A | 11/1989 | Schiffman |
| 4,886,960 A | 12/1989 | Molyneux et al. |
| 4,889,412 A | 12/1989 | Clerc et al. |
| 4,891,828 A | 1/1990 | Kawazoe |
| 4,892,345 A | 1/1990 | Rachael, III |
| 4,902,103 A | 2/1990 | Miyake et al. |
| 4,902,108 A | 2/1990 | Byker |
| 4,906,085 A | 3/1990 | Sugihara et al. |
| 4,909,606 A | 3/1990 | Wada et al. |
| 4,910,591 A | 3/1990 | Petrossian et al. |
| 4,916,374 A | 4/1990 | Schierbeek et al. |
| 4,917,477 A | 4/1990 | Bechtel et al. |
| 4,926,170 A | 5/1990 | Beggs et al. |
| 4,930,742 A | 6/1990 | Schofield et al. |
| 4,933,814 A | 6/1990 | Sanai |
| 4,935,665 A | 6/1990 | Murata |
| 4,936,533 A | 6/1990 | Adams et al. |
| 4,937,796 A | 6/1990 | Tendler |
| 4,937,945 A | 7/1990 | Schofield et al. |
| 4,943,796 A | 7/1990 | Lee |
| 4,948,242 A | 8/1990 | Desmond et al. |
| 4,953,305 A | 9/1990 | Van Lente et al. |
| 4,956,591 A | 9/1990 | Schierbeek et al. |
| 4,957,349 A | 9/1990 | Clerc et al. |
| 4,959,247 A | 9/1990 | Moser et al. |
| 4,959,865 A | 9/1990 | Stettiner et al. |
| 4,970,653 A | 11/1990 | Kenue |
| 4,973,844 A | 11/1990 | O'Farrell et al. |
| 4,974,122 A | 11/1990 | Shaw |
| 4,978,196 A | 12/1990 | Suzuki et al. |
| 4,983,951 A | 1/1991 | Igarashi et al. |
| 4,985,809 A | 1/1991 | Matsui et al. |
| 4,987,357 A | 1/1991 | Masaki |
| 4,989,956 A | 2/1991 | Wu et al. |
| 4,996,083 A | 2/1991 | Moser et al. |
| 5,001,386 A | 3/1991 | Sullivan et al. |
| 5,001,558 A | 3/1991 | Burley et al. |
| 5,005,213 A | 4/1991 | Hanson et al. |
| 5,006,971 A | 4/1991 | Jerkins |
| 5,014,167 A | 5/1991 | Roberts |
| 5,016,988 A | 5/1991 | Iimura |
| 5,016,996 A | 5/1991 | Ueno |
| 5,017,903 A | 5/1991 | Krippelz, Sr. |
| 5,018,839 A | 5/1991 | Yamamoto et al. |
| 5,027,200 A | 6/1991 | Petrossian et al. |
| 5,037,182 A | 8/1991 | Groves et al. |
| 5,038,255 A | 8/1991 | Nashihashi et al. |
| 5,052,163 A | 10/1991 | Czekala |
| 5,056,899 A | 10/1991 | Warszawski |
| 5,057,974 A | 10/1991 | Mizobe |
| 5,058,851 A | 10/1991 | Lawlor et al. |
| 5,059,015 A | 10/1991 | Tran |
| 5,066,108 A | 11/1991 | McDonald |
| 5,066,112 A | 11/1991 | Lynam et al. |
| 5,069,535 A | 12/1991 | Baucke et al. |
| 5,070,323 A | 12/1991 | Iino et al. |
| 5,073,012 A | 12/1991 | Lynam |
| 5,076,673 A | 12/1991 | Lynam et al. |
| 5,076,674 A | 12/1991 | Lynam |
| 5,078,480 A | 1/1992 | Warszawski |
| 5,096,287 A | 3/1992 | Kakinami et al. |
| 5,100,095 A | 3/1992 | Haan et al. |
| 5,101,139 A | 3/1992 | Lechter |
| 5,105,127 A | 4/1992 | Lavaud et al. |
| 5,115,346 A | 5/1992 | Lynam |
| 5,119,220 A | 6/1992 | Narita et al. |
| 5,121,200 A | 6/1992 | Choi |
| 5,122,619 A | 6/1992 | Dlubak |
| 5,123,077 A | 6/1992 | Endo et al. |
| 5,124,845 A | 6/1992 | Shimojo |
| 5,124,890 A | 6/1992 | Choi et al. |
| 5,128,799 A | 7/1992 | Byker |
| 5,130,898 A | 7/1992 | Akahane |
| 5,131,154 A | 7/1992 | Schierbeek et al. |
| 5,134,507 A | 7/1992 | Ishii |
| 5,134,549 A | 7/1992 | Yokoyama |
| 5,135,298 A | 8/1992 | Feltman |
| 5,136,483 A | 8/1992 | Schöniger et al. |
| 5,140,455 A | 8/1992 | Varaprasad et al. |
| 5,140,465 A | 8/1992 | Yasui et al. |
| 5,142,407 A | 8/1992 | Varaprasad et al. |

(56) References Cited

U.S. PATENT DOCUMENTS

| | | |
|---|---|---|
| 5,145,609 A | 9/1992 | Varaprasad et al. |
| 5,148,306 A | 9/1992 | Yamada et al. |
| 5,150,232 A | 9/1992 | Gunkima et al. |
| 5,151,816 A | 9/1992 | Varaprasad et al. |
| 5,151,824 A | 9/1992 | O'Farrell |
| 5,154,617 A | 10/1992 | Suman et al. |
| 5,158,638 A | 10/1992 | Osanami et al. |
| 5,160,200 A | 11/1992 | Cheselske |
| 5,160,201 A | 11/1992 | Wrobel |
| 5,166,815 A | 11/1992 | Elderfield |
| 5,168,378 A | 12/1992 | Black et al. |
| 5,173,881 A | 12/1992 | Sindle |
| 5,177,031 A | 1/1993 | Buchmann et al. |
| 5,178,448 A | 1/1993 | Adams et al. |
| 5,179,471 A | 1/1993 | Caskey et al. |
| 5,183,099 A | 2/1993 | Bechu |
| 5,184,956 A | 2/1993 | Langlarais et al. |
| 5,189,537 A | 2/1993 | O'Farrell |
| 5,193,029 A | 3/1993 | Schofield et al. |
| 5,197,562 A | 3/1993 | Kakinama et al. |
| 5,202,950 A | 4/1993 | Arego et al. |
| 5,207,492 A | 5/1993 | Roberts |
| 5,210,967 A | 5/1993 | Brown |
| 5,212,819 A | 5/1993 | Wada |
| 5,214,408 A | 5/1993 | Asayama |
| 5,217,794 A | 6/1993 | Schrenk |
| 5,223,814 A | 6/1993 | Suman |
| 5,223,844 A | 6/1993 | Mansell et al. |
| 5,229,975 A | 7/1993 | Truesdell et al. |
| 5,230,400 A | 7/1993 | Kakinami et al. |
| 5,233,461 A | 8/1993 | Dornan et al. |
| 5,235,316 A | 8/1993 | Qualizza |
| 5,239,405 A | 8/1993 | Varaprasad et al. |
| 5,239,406 A | 8/1993 | Lynam |
| 5,243,417 A | 9/1993 | Pollard |
| 5,245,422 A | 9/1993 | Borcherts et al. |
| 5,252,354 A | 10/1993 | Cronin et al. |
| 5,253,109 A | 10/1993 | O'Farrell et al. |
| 5,255,442 A | 10/1993 | Schierbeek et al. |
| 5,260,626 A | 11/1993 | Takase et al. |
| 5,277,986 A | 1/1994 | Cronin et al. |
| 5,280,555 A | 1/1994 | Ainsburg |
| 5,285,060 A | 2/1994 | Larson et al. |
| 5,289,321 A | 2/1994 | Secor |
| 5,296,924 A | 3/1994 | de Saint Blancard et al. |
| 5,303,075 A | 4/1994 | Wada et al. |
| 5,303,205 A | 4/1994 | Gauthier et al. |
| 5,304,980 A | 4/1994 | Maekawa |
| 5,305,012 A | 4/1994 | Faris |
| 5,307,136 A | 4/1994 | Saneyoshi |
| 5,313,335 A | 5/1994 | Gray et al. |
| 5,325,096 A | 6/1994 | Pakett |
| 5,325,386 A | 6/1994 | Jewell et al. |
| 5,327,288 A | 7/1994 | Wellington et al. |
| 5,330,149 A | 7/1994 | Haan et al. |
| 5,331,312 A | 7/1994 | Kudoh |
| 5,331,358 A | 7/1994 | Schurle et al. |
| 5,339,075 A | 8/1994 | Abst et al. |
| 5,339,529 A | 8/1994 | Lindberg |
| 5,341,437 A | 8/1994 | Nakayama |
| D351,370 S | 10/1994 | Lawlor et al. |
| 5,354,965 A | 10/1994 | Lee |
| 5,355,118 A | 10/1994 | Fukuhara |
| 5,355,245 A | 10/1994 | Am |
| 5,355,284 A | 10/1994 | Roberts |
| 5,361,190 A | 11/1994 | Roberts et al. |
| 5,363,294 A | 11/1994 | Yamamoto et al. |
| 5,371,659 A | 12/1994 | Pastrick et al. |
| 5,373,482 A | 12/1994 | Gauthier |
| 5,379,146 A | 1/1995 | Defendini |
| 5,386,285 A | 1/1995 | Asayama |
| 5,386,306 A | 1/1995 | Gunjima et al. |
| 5,398,134 A | 3/1995 | Ikegaya |
| 5,400,158 A | 3/1995 | Ohnishi et al. |
| 5,402,103 A | 3/1995 | Tashiro |
| 5,406,395 A | 4/1995 | Wilson et al. |
| 5,406,414 A | 4/1995 | O'Farrell et al. |
| 5,408,353 A | 4/1995 | Nichols et al. |
| 5,408,357 A | 4/1995 | Beukema |
| 5,410,346 A | 4/1995 | Saneyoshi et al. |
| 5,414,439 A | 5/1995 | Groves et al. |
| 5,414,461 A | 5/1995 | Kishi et al. |
| 5,416,313 A | 5/1995 | Larson et al. |
| 5,416,478 A | 5/1995 | Morinaga |
| 5,418,610 A | 5/1995 | Fischer |
| 5,422,756 A | 6/1995 | Weber |
| 5,424,726 A | 6/1995 | Beymer |
| 5,424,865 A | 6/1995 | Lynam |
| 5,424,952 A | 6/1995 | Asayama |
| 5,426,524 A | 6/1995 | Wada et al. |
| 5,426,723 A | 6/1995 | Horsley |
| 5,430,431 A | 7/1995 | Nelson |
| 5,432,496 A | 7/1995 | Lin |
| 5,432,626 A | 7/1995 | Sasuga et al. |
| 5,434,690 A * | 7/1995 | Hisatake ........... G02F 1/134336 349/8 |
| 5,436,741 A | 7/1995 | Crandall |
| 5,437,931 A | 8/1995 | Tsai et al. |
| 5,439,305 A | 8/1995 | Santo |
| 5,444,478 A | 8/1995 | Lelong et al. |
| 5,446,576 A | 8/1995 | Lynam et al. |
| 5,455,716 A | 10/1995 | Suman et al. |
| 5,461,361 A | 10/1995 | Moore |
| D363,920 S | 11/1995 | Roberts et al. |
| 5,469,187 A | 11/1995 | Yaniv |
| 5,469,298 A | 11/1995 | Suman et al. |
| 5,473,702 A | 12/1995 | Yoshida et al. |
| 5,475,366 A | 12/1995 | Van Lente et al. |
| 5,475,494 A | 12/1995 | Nishida et al. |
| 5,481,409 A | 1/1996 | Roberts |
| 5,483,453 A | 1/1996 | Uemura et al. |
| 5,485,161 A | 1/1996 | Vaughn |
| 5,485,378 A | 1/1996 | Franke et al. |
| 5,487,522 A | 1/1996 | Hook |
| 5,488,496 A | 1/1996 | Pine |
| 5,497,305 A | 3/1996 | Pastrick et al. |
| 5,497,306 A | 3/1996 | Pastrick |
| 5,500,760 A | 3/1996 | Varaprasad et al. |
| 5,506,701 A | 4/1996 | Ichikawa |
| 5,509,606 A | 4/1996 | Breithaupt et al. |
| 5,510,983 A | 4/1996 | Iino |
| 5,515,448 A | 5/1996 | Nishitani |
| 5,517,853 A | 5/1996 | Chamussy |
| 5,519,621 A | 5/1996 | Wortham |
| 5,521,744 A | 5/1996 | Mazurek |
| 5,521,760 A | 5/1996 | DeYoung et al. |
| 5,523,811 A | 6/1996 | Wada et al. |
| 5,523,877 A | 6/1996 | Lynam |
| 5,525,264 A | 6/1996 | Cronin et al. |
| 5,525,977 A | 6/1996 | Suman |
| 5,528,422 A | 6/1996 | Roberts |
| 5,528,474 A | 6/1996 | Roney et al. |
| 5,529,138 A | 6/1996 | Shaw et al. |
| 5,530,240 A | 6/1996 | Larson et al. |
| 5,530,420 A | 6/1996 | Tsuchiya et al. |
| 5,530,421 A | 6/1996 | Marshall et al. |
| 5,535,056 A | 7/1996 | Caskey et al. |
| 5,535,144 A | 7/1996 | Kise |
| 5,539,397 A | 7/1996 | Asanuma et al. |
| 5,541,590 A | 7/1996 | Nishio |
| 5,550,677 A | 8/1996 | Schofield et al. |
| 5,555,172 A | 9/1996 | Potter |
| 5,561,333 A | 10/1996 | Darius |
| 5,566,224 A | 10/1996 | ul Azam et al. |
| 5,567,360 A | 10/1996 | Varaprasad et al. |
| 5,568,316 A | 10/1996 | Schrenck et al. |
| 5,570,127 A | 10/1996 | Schmidt |
| 5,572,354 A | 11/1996 | Desmond et al. |
| 5,574,426 A | 11/1996 | Shisgal et al. |
| 5,574,443 A | 11/1996 | Hsieh |
| 5,575,552 A | 11/1996 | Faloon et al. |
| 5,576,687 A | 11/1996 | Blank et al. |
| 5,576,854 A | 11/1996 | Schmidt et al. |
| 5,576,975 A | 11/1996 | Sasaki et al. |

(56) References Cited

U.S. PATENT DOCUMENTS

| | | |
|---|---|---|
| 5,578,404 A | 11/1996 | Kliem |
| 5,587,236 A | 12/1996 | Agrawal et al. |
| 5,587,699 A | 12/1996 | Faloon et al. |
| 5,593,221 A | 1/1997 | Evanicky et al. |
| 5,594,222 A | 1/1997 | Caldwell |
| 5,594,560 A | 1/1997 | Jelley et al. |
| 5,594,615 A | 1/1997 | Spijkerman et al. |
| 5,602,542 A | 2/1997 | Widmann et al. |
| 5,602,670 A | 2/1997 | Keegan |
| 5,603,104 A | 2/1997 | Phelps, III et al. |
| 5,608,550 A | 3/1997 | Epstein et al. |
| 5,609,652 A | 3/1997 | Yamada et al. |
| 5,610,380 A | 3/1997 | Nicolaisen |
| 5,610,756 A | 3/1997 | Lynam et al. |
| 5,611,966 A | 3/1997 | Varaprasad et al. |
| 5,614,885 A | 3/1997 | Van Lente et al. |
| 5,615,023 A | 3/1997 | Yang |
| 5,615,857 A | 4/1997 | Hook |
| 5,617,085 A | 4/1997 | Tsutsumi et al. |
| 5,619,374 A | 4/1997 | Roberts |
| 5,619,375 A | 4/1997 | Roberts |
| 5,621,571 A | 4/1997 | Bantli et al. |
| 5,626,800 A | 5/1997 | Williams et al. |
| 5,631,089 A | 5/1997 | Center, Jr. et al. |
| 5,631,638 A | 5/1997 | Kaspar et al. |
| 5,631,639 A | 5/1997 | Hibino et al. |
| 5,632,092 A | 5/1997 | Blank et al. |
| 5,632,551 A | 5/1997 | Roney et al. |
| 5,634,709 A | 6/1997 | Iwama |
| 5,640,216 A | 6/1997 | Hasegawa et al. |
| 5,642,238 A | 6/1997 | Sala |
| 5,644,851 A | 7/1997 | Blank et al. |
| 5,646,614 A | 7/1997 | Abersfelder et al. |
| 5,649,756 A | 7/1997 | Adams et al. |
| 5,649,758 A | 7/1997 | Dion |
| 5,650,765 A | 7/1997 | Park |
| 5,650,929 A | 7/1997 | Potter et al. |
| 5,661,455 A | 8/1997 | Van Lente et al. |
| 5,661,651 A | 8/1997 | Geschke et al. |
| 5,661,804 A | 8/1997 | Dykema et al. |
| 5,662,375 A | 9/1997 | Adams et al. |
| 5,666,157 A | 9/1997 | Aviv |
| 5,667,289 A | 9/1997 | Akahane et al. |
| 5,668,663 A | 9/1997 | Varaprasad et al. |
| 5,668,675 A | 9/1997 | Fredricks |
| 5,669,698 A | 9/1997 | Veldman et al. |
| 5,669,699 A | 9/1997 | Pastrick et al. |
| 5,669,704 A | 9/1997 | Pastrick |
| 5,669,705 A | 9/1997 | Pastrick et al. |
| 5,670,935 A | 9/1997 | Schofield et al. |
| 5,671,996 A | 9/1997 | Bos et al. |
| 5,673,994 A | 10/1997 | Fant, Jr. et al. |
| 5,673,999 A | 10/1997 | Koenck |
| 5,677,598 A | 10/1997 | De Hair et al. |
| 5,679,283 A | 10/1997 | Tonar et al. |
| 5,680,123 A | 10/1997 | Lee |
| 5,680,245 A | 10/1997 | Lynam |
| 5,680,263 A | 10/1997 | Zimmermann et al. |
| 5,686,975 A | 11/1997 | Lipton |
| 5,686,979 A | 11/1997 | Weber et al. |
| 5,689,241 A | 11/1997 | Clark, Sr. et al. |
| 5,689,370 A | 11/1997 | Tonar et al. |
| 5,691,848 A | 11/1997 | Van Lente et al. |
| 5,692,819 A | 12/1997 | Mitsutake et al. |
| 5,694,474 A | 12/1997 | Ngo et al. |
| 5,696,529 A | 12/1997 | Evanicky et al. |
| 5,696,567 A | 12/1997 | Wada et al. |
| 5,699,044 A | 12/1997 | Van Lente et al. |
| 5,699,188 A | 12/1997 | Gilbert et al. |
| 5,703,568 A | 12/1997 | Hegyi |
| 5,708,410 A | 1/1998 | Blank et al. |
| 5,708,415 A | 1/1998 | Van Lente et al. |
| 5,708,857 A | 1/1998 | Ishibashi |
| 5,715,093 A | 2/1998 | Schierbeek et al. |
| 5,724,187 A | 3/1998 | Varaprasad et al. |
| 5,724,316 A | 3/1998 | Brunts |
| 5,729,194 A | 3/1998 | Spears et al. |
| 5,731,886 A | 3/1998 | Taber et al. |
| 5,737,226 A | 4/1998 | Olson et al. |
| 5,741,966 A | 4/1998 | Handfield et al. |
| 5,744,227 A | 4/1998 | Bright et al. |
| 5,745,050 A | 4/1998 | Nakagawa |
| 5,745,266 A | 4/1998 | Smith |
| 5,748,172 A | 5/1998 | Song et al. |
| 5,748,287 A | 5/1998 | Takahashi et al. |
| 5,751,211 A | 5/1998 | Shirai et al. |
| 5,751,246 A | 5/1998 | Hertel |
| 5,751,390 A | 5/1998 | Crawford et al. |
| 5,751,489 A | 5/1998 | Caskey et al. |
| 5,754,099 A | 5/1998 | Nishimura et al. |
| 5,754,665 A | 5/1998 | Hosoi |
| D394,833 S | 6/1998 | Muth |
| 5,760,242 A | 6/1998 | Igrashi et al. |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,762,823 A | 6/1998 | Hikmet |
| 5,764,139 A | 6/1998 | Nojima et al. |
| 5,765,940 A | 6/1998 | Levy et al. |
| 5,767,793 A | 6/1998 | Agravante et al. |
| 5,768,020 A | 6/1998 | Nagao |
| 5,775,762 A | 7/1998 | Vitito |
| 5,777,779 A | 7/1998 | Hashimoto et al. |
| 5,780,160 A | 7/1998 | Allemand et al. |
| 5,786,772 A | 7/1998 | Schofield et al. |
| 5,788,357 A | 8/1998 | Muth et al. |
| 5,790,298 A | 8/1998 | Tonar |
| 5,790,502 A | 8/1998 | Horinouchi et al. |
| 5,790,973 A | 8/1998 | Blaker et al. |
| 5,793,308 A | 8/1998 | Rosinski et al. |
| 5,793,420 A | 8/1998 | Schmidt |
| 5,796,094 A * | 8/1998 | Schofield ............... B60N 2/002 250/208.1 |
| 5,796,176 A | 8/1998 | Kramer et al. |
| 5,798,057 A | 8/1998 | Hikmet |
| 5,798,575 A | 8/1998 | O'Farrell et al. |
| 5,798,688 A | 8/1998 | Schofield |
| 5,800,918 A | 9/1998 | Chartier et al. |
| 5,802,727 A | 9/1998 | Blank et al. |
| 5,803,579 A | 9/1998 | Turnbull et al. |
| 5,805,330 A | 9/1998 | Byker et al. |
| 5,805,367 A | 9/1998 | Kanazawa |
| 5,806,879 A | 9/1998 | Hamada et al. |
| 5,806,965 A | 9/1998 | Deese |
| 5,808,197 A | 9/1998 | Dao |
| 5,808,566 A | 9/1998 | Behr et al. |
| 5,808,589 A | 9/1998 | Fergason |
| 5,808,713 A | 9/1998 | Broer et al. |
| 5,808,777 A | 9/1998 | Lynam et al. |
| 5,808,778 A | 9/1998 | Bauer et al. |
| 5,812,321 A | 9/1998 | Schierbeek et al. |
| 5,813,745 A | 9/1998 | Fant, Jr. et al. |
| 5,818,625 A | 10/1998 | Forgette et al. |
| 5,820,097 A | 10/1998 | Spooner |
| 5,820,245 A | 10/1998 | Desmond et al. |
| 5,822,023 A | 10/1998 | Suman et al. |
| 5,823,654 A | 10/1998 | Pastrick et al. |
| 5,825,527 A | 10/1998 | Forgette et al. |
| 5,835,166 A | 11/1998 | Hall et al. |
| 5,837,994 A | 11/1998 | Stam et al. |
| 5,844,505 A | 12/1998 | Van Ryzin |
| 5,848,373 A | 12/1998 | DeLorme et al. |
| 5,850,176 A | 12/1998 | Kinoshita et al. |
| 5,850,205 A | 12/1998 | Blouin |
| 5,863,116 A | 1/1999 | Pastrick et al. |
| 5,864,419 A | 1/1999 | Lynam |
| 5,867,801 A | 2/1999 | Denny |
| 5,871,275 A | 2/1999 | O'Farrell et al. |
| 5,871,843 A | 2/1999 | Yoneda et al. |
| 5,877,707 A | 3/1999 | Kowalick |
| 5,877,897 A | 3/1999 | Schofield et al. |
| 5,878,353 A | 3/1999 | ul Azam et al. |
| 5,878,370 A | 3/1999 | Olson |

(56) References Cited

U.S. PATENT DOCUMENTS

| | | |
|---|---|---|
| 5,879,074 A | 3/1999 | Pastrick |
| 5,883,605 A | 3/1999 | Knapp |
| 5,883,739 A | 3/1999 | Ashihara et al. |
| 5,888,431 A | 3/1999 | Tonar et al. |
| 5,894,196 A | 4/1999 | McDermott |
| D409,540 S | 5/1999 | Muth |
| 5,899,551 A | 5/1999 | Neijzen et al. |
| 5,899,956 A | 5/1999 | Chan |
| 5,904,729 A | 5/1999 | Ruzicka |
| 5,910,854 A | 6/1999 | Varaprasad et al. |
| 5,914,815 A | 6/1999 | Bos |
| 5,917,664 A | 6/1999 | O'Neill et al. |
| 5,917,994 A | 6/1999 | Wakisaka et al. |
| 5,918,180 A | 6/1999 | Dimino |
| 5,922,176 A | 7/1999 | Caskey |
| 5,923,027 A | 7/1999 | Stam et al. |
| 5,923,457 A | 7/1999 | Byker et al. |
| 5,924,212 A | 7/1999 | Domanski |
| 5,926,087 A | 7/1999 | Busch et al. |
| 5,927,792 A | 7/1999 | Welling et al. |
| 5,928,572 A | 7/1999 | Tonar et al. |
| 5,929,786 A | 7/1999 | Schofield et al. |
| 5,935,702 A | 8/1999 | Macquart et al. |
| 5,936,774 A | 8/1999 | Street |
| 5,938,320 A | 8/1999 | Crandall |
| 5,938,321 A | 8/1999 | Bos et al. |
| 5,938,721 A | 8/1999 | Dussell et al. |
| 5,940,011 A | 8/1999 | Agravante et al. |
| 5,940,120 A | 8/1999 | Frankhouse et al. |
| 5,940,201 A | 8/1999 | Ash et al. |
| 5,942,895 A | 8/1999 | Popovic et al. |
| 5,947,586 A | 9/1999 | Weber |
| 5,949,331 A | 9/1999 | Schofield et al. |
| 5,949,345 A | 9/1999 | Beckert et al. |
| 5,949,506 A | 9/1999 | Jones et al. |
| 5,956,079 A | 9/1999 | Ridgley |
| 5,956,181 A | 9/1999 | Lin |
| 5,959,367 A | 9/1999 | O'Farrell et al. |
| 5,959,555 A | 9/1999 | Furuta |
| 5,959,577 A | 9/1999 | Fan et al. |
| 5,963,247 A | 10/1999 | Banitt |
| 5,963,284 A | 10/1999 | Jones et al. |
| 5,965,247 A | 10/1999 | Jonza et al. |
| 5,968,538 A | 10/1999 | Snyder, Jr. |
| 5,971,552 A | 10/1999 | O'Farrell et al. |
| 5,973,760 A | 10/1999 | Dehmlow |
| 5,973,922 A | 10/1999 | Kamphuis |
| 5,975,715 A | 11/1999 | Bauder |
| 5,978,017 A | 11/1999 | Tino |
| 5,984,482 A | 11/1999 | Rumsey et al. |
| 5,986,730 A | 11/1999 | Hansen et al. |
| 5,990,469 A | 11/1999 | Bechtel et al. |
| 5,990,625 A | 11/1999 | Meissner et al. |
| 5,995,180 A | 11/1999 | Moriwaki et al. |
| 5,998,617 A | 12/1999 | Srinivasa et al. |
| 5,998,929 A | 12/1999 | Bechtel et al. |
| 6,000,823 A | 12/1999 | Desmond et al. |
| 6,001,486 A | 12/1999 | Varaprasad et al. |
| 6,002,511 A | 12/1999 | Varaprasad et al. |
| 6,002,983 A | 12/1999 | Alland et al. |
| 6,005,724 A | 12/1999 | Todd |
| 6,007,222 A | 12/1999 | Thau |
| 6,008,486 A | 12/1999 | Stam et al. |
| 6,008,871 A | 12/1999 | Okumura |
| 6,009,359 A | 12/1999 | El-Hakim et al. |
| 6,016,035 A | 1/2000 | Eberspächer et al. |
| 6,016,215 A | 1/2000 | Byker |
| 6,019,411 A | 2/2000 | Carter et al. |
| 6,019,475 A | 2/2000 | Lynam et al. |
| 6,020,987 A | 2/2000 | Baumann et al. |
| 6,021,371 A | 2/2000 | Fultz |
| 6,023,229 A | 2/2000 | Bugno et al. |
| 6,025,872 A | 2/2000 | Ozaki et al. |
| 6,028,537 A | 2/2000 | Suman et al. |
| 6,037,689 A | 3/2000 | Bingle et al. |
| 6,040,939 A | 3/2000 | Demiryont et al. |
| 6,042,253 A | 3/2000 | Fant, Jr. et al. |
| 6,042,934 A | 3/2000 | Guiselin et al. |
| 6,045,243 A | 4/2000 | Muth et al. |
| 6,045,643 A | 4/2000 | Byker et al. |
| 6,046,766 A | 4/2000 | Sakata |
| 6,046,837 A | 4/2000 | Yamamoto |
| 6,049,171 A | 4/2000 | Stam et al. |
| D425,466 S | 5/2000 | Todd et al. |
| 6,060,989 A | 5/2000 | Gehlot |
| 6,061,002 A | 5/2000 | Weber et al. |
| 6,062,920 A | 5/2000 | Jordan et al. |
| 6,064,508 A | 5/2000 | Forgette et al. |
| 6,065,840 A | 5/2000 | Caskey et al. |
| 6,066,920 A | 5/2000 | Torihara et al. |
| 6,067,111 A | 5/2000 | Hahn et al. |
| 6,067,500 A | 5/2000 | Morimoto et al. |
| 6,068,380 A | 5/2000 | Lynn et al. |
| D426,506 S | 6/2000 | Todd et al. |
| D426,507 S | 6/2000 | Todd et al. |
| D427,128 S | 6/2000 | Mathieu |
| 6,072,391 A | 6/2000 | Suzukie et al. |
| 6,074,077 A | 6/2000 | Pastrick et al. |
| 6,074,777 A | 6/2000 | Reimers et al. |
| 6,076,948 A | 6/2000 | Bukosky et al. |
| 6,078,355 A | 6/2000 | Zengel |
| 6,078,865 A | 6/2000 | Koyanagi |
| D428,372 S | 7/2000 | Todd et al. |
| D428,373 S | 7/2000 | Todd et al. |
| 6,082,881 A | 7/2000 | Hicks |
| 6,084,700 A | 7/2000 | Knapp et al. |
| 6,086,131 A | 7/2000 | Bingle et al. |
| 6,086,229 A | 7/2000 | Pastrick |
| 6,087,012 A | 7/2000 | Varaprasad et al. |
| 6,087,953 A | 7/2000 | DeLine et al. |
| 6,091,343 A | 7/2000 | Dykema et al. |
| 6,093,976 A | 7/2000 | Kramer et al. |
| 6,094,618 A | 7/2000 | Harada |
| D428,842 S | 8/2000 | Todd et al. |
| D429,202 S | 8/2000 | Todd et al. |
| D430,088 S | 8/2000 | Todd et al. |
| 6,097,023 A | 8/2000 | Schofield et al. |
| 6,097,316 A | 8/2000 | Liaw et al. |
| 6,099,131 A | 8/2000 | Fletcher et al. |
| 6,099,155 A | 8/2000 | Pastrick et al. |
| 6,102,546 A | 8/2000 | Carter |
| 6,102,559 A | 8/2000 | Nold et al. |
| 6,104,552 A | 8/2000 | Thau et al. |
| 6,106,121 A | 8/2000 | Buckley et al. |
| 6,111,498 A | 8/2000 | Jobes, I et al. |
| 6,111,683 A | 8/2000 | Cammenga et al. |
| 6,111,684 A | 8/2000 | Forgette et al. |
| 6,111,685 A | 8/2000 | Tench et al. |
| 6,111,696 A | 8/2000 | Allen et al. |
| 6,115,086 A | 9/2000 | Rosen |
| 6,115,651 A | 9/2000 | Cruz |
| 6,116,743 A | 9/2000 | Hoek |
| 6,118,219 A | 9/2000 | Okigami et al. |
| 6,122,597 A | 9/2000 | Saneyoshi et al. |
| 6,122,921 A | 9/2000 | Brezoczky et al. |
| 6,124,647 A | 9/2000 | Marcus et al. |
| 6,124,886 A | 9/2000 | DeLine et al. |
| 6,127,919 A | 10/2000 | Wylin |
| 6,127,945 A | 10/2000 | Mura-Smith |
| 6,128,576 A | 10/2000 | Nishimoto et al. |
| 6,130,421 A | 10/2000 | Bechtel et al. |
| 6,130,448 A | 10/2000 | Bauer et al. |
| 6,132,072 A | 10/2000 | Turnbull et al. |
| 6,137,620 A | 10/2000 | Guarr et al. |
| 6,139,171 A | 10/2000 | Waldmann |
| 6,139,172 A | 10/2000 | Bos et al. |
| 6,140,933 A | 10/2000 | Bugno et al. |
| 6,142,656 A | 11/2000 | Kurth |
| 6,146,003 A | 11/2000 | Thau |
| 6,147,934 A | 11/2000 | Arikawa et al. |
| 6,148,261 A | 11/2000 | Obradovich et al. |
| 6,149,287 A | 11/2000 | Pastrick et al. |
| 6,150,014 A | 11/2000 | Chu et al. |
| 6,151,065 A | 11/2000 | Steed et al. |

(56) References Cited

U.S. PATENT DOCUMENTS

| | | |
|---|---|---|
| 6,151,539 A | 11/2000 | Bergholz et al. |
| 6,152,551 A | 11/2000 | Annas |
| 6,152,590 A | 11/2000 | Fürst et al. |
| 6,154,149 A | 11/2000 | Tyckowski et al. |
| 6,154,306 A | 11/2000 | Varaprasad et al. |
| 6,157,294 A | 12/2000 | Urai et al. |
| 6,157,418 A | 12/2000 | Rosen |
| 6,157,424 A | 12/2000 | Eichenlaub |
| 6,157,480 A | 12/2000 | Anderson et al. |
| 6,158,655 A | 12/2000 | DeVries, Jr. et al. |
| 6,161,071 A | 12/2000 | Shuman et al. |
| 6,161,865 A | 12/2000 | Rose et al. |
| 6,164,564 A | 12/2000 | Franco et al. |
| 6,166,625 A | 12/2000 | Teowee et al. |
| 6,166,629 A | 12/2000 | Hamma et al. |
| 6,166,834 A | 12/2000 | Taketomi et al. |
| 6,166,847 A | 12/2000 | Tench et al. |
| 6,166,848 A | 12/2000 | Cammenga et al. |
| 6,167,255 A | 12/2000 | Kennedy, III et al. |
| 6,167,755 B1 | 1/2001 | Damson et al. |
| 6,169,955 B1 | 1/2001 | Fultz |
| 6,170,956 B1 | 1/2001 | Rumsey et al. |
| 6,172,600 B1 | 1/2001 | Kakinama et al. |
| 6,172,601 B1 | 1/2001 | Wada et al. |
| 6,172,613 B1 | 1/2001 | DeLine et al. |
| 6,173,501 B1 | 1/2001 | Blank et al. |
| 6,175,164 B1 | 1/2001 | O'Farrell et al. |
| 6,175,300 B1 | 1/2001 | Kendrick |
| 6,176,602 B1 | 1/2001 | Pastrick et al. |
| 6,178,034 B1 | 1/2001 | Allemand et al. |
| 6,178,377 B1 | 1/2001 | Ishihara et al. |
| 6,181,387 B1 | 1/2001 | Rosen |
| 6,182,006 B1 | 1/2001 | Meek |
| 6,183,119 B1 | 2/2001 | Desmond et al. |
| 6,184,679 B1 | 2/2001 | Popovic et al. |
| 6,184,781 B1 | 2/2001 | Ramakesavan |
| 6,185,492 B1 | 2/2001 | Kagawa et al. |
| 6,185,501 B1 | 2/2001 | Smith et al. |
| 6,188,505 B1 | 2/2001 | Lomprey et al. |
| 6,191,704 B1 | 2/2001 | Takenaga et al. |
| 6,193,379 B1 | 2/2001 | Tonar et al. |
| 6,193,912 B1 | 2/2001 | Thieste et al. |
| 6,195,194 B1 | 2/2001 | Roberts et al. |
| 6,196,688 B1 | 3/2001 | Caskey et al. |
| 6,198,409 B1 | 3/2001 | Schofield et al. |
| 6,199,014 B1 | 3/2001 | Walker et al. |
| 6,199,810 B1 | 3/2001 | Wu et al. |
| 6,200,010 B1 | 3/2001 | Anders |
| 6,201,642 B1 | 3/2001 | Bos |
| 6,206,553 B1 | 3/2001 | Boddy et al. |
| 6,207,083 B1 | 3/2001 | Varaprasad et al. |
| 6,210,008 B1 | 4/2001 | Hoekstra et al. |
| 6,210,012 B1 | 4/2001 | Broer |
| 6,212,470 B1 | 4/2001 | Seymour et al. |
| 6,217,181 B1 | 4/2001 | Lynam et al. |
| 6,218,934 B1 | 4/2001 | Regan |
| 6,222,447 B1 | 4/2001 | Schofield et al. |
| 6,222,460 B1 | 4/2001 | DeLine et al. |
| 6,222,689 B1 | 4/2001 | Higuchi et al. |
| 6,227,689 B1 | 5/2001 | Miller |
| 6,232,937 B1 | 5/2001 | Jacobsen et al. |
| 6,236,514 B1 | 5/2001 | Sato |
| 6,239,851 B1 | 5/2001 | Hatazawa et al. |
| 6,239,898 B1 | 5/2001 | Byker et al. |
| 6,239,899 B1 | 5/2001 | DeVries et al. |
| 6,243,003 B1 | 6/2001 | DeLine et al. |
| 6,244,716 B1 | 6/2001 | Steenwyk et al. |
| 6,245,262 B1 | 6/2001 | Varaprasad et al. |
| 6,246,933 B1 | 6/2001 | Bague |
| 6,247,820 B1 | 6/2001 | Van Order |
| 6,249,214 B1 | 6/2001 | Kashiwazaki |
| 6,249,310 B1 | 6/2001 | Lefkowitz |
| 6,249,369 B1 | 6/2001 | Theiste et al. |
| 6,250,148 B1 | 6/2001 | Lynam |
| 6,250,766 B1 | 6/2001 | Strumolo et al. |
| 6,250,783 B1 | 6/2001 | Stidham et al. |
| 6,255,639 B1 | 7/2001 | Stam et al. |
| 6,257,746 B1 | 7/2001 | Todd et al. |
| 6,259,412 B1 | 7/2001 | Duroux |
| 6,259,475 B1 | 7/2001 | Ramachandran et al. |
| 6,260,608 B1 | 7/2001 | Kim |
| 6,262,842 B1 | 7/2001 | Ouderkirk et al. |
| 6,264,353 B1 | 7/2001 | Caraher et al. |
| 6,265,968 B1 | 7/2001 | Betzitza et al. |
| 6,268,803 B1 | 7/2001 | Gunderson et al. |
| 6,268,837 B1 | 7/2001 | Kobayashi et al. |
| 6,269,308 B1 | 7/2001 | Kodaka et al. |
| 6,271,901 B1 | 8/2001 | Ide et al. |
| 6,274,221 B2 | 8/2001 | Smith et al. |
| 6,275,231 B1 | 8/2001 | Obradovich |
| 6,276,821 B1 | 8/2001 | Pastrick et al. |
| 6,276,822 B1 | 8/2001 | Bedrosian et al. |
| 6,277,471 B1 | 8/2001 | Tang |
| 6,278,271 B1 | 8/2001 | Schott |
| 6,278,377 B1 | 8/2001 | DeLine et al. |
| 6,278,941 B1 | 8/2001 | Yokoyama |
| 6,280,068 B1 | 8/2001 | Mertens et al. |
| 6,280,069 B1 | 8/2001 | Pastrick et al. |
| 6,281,804 B1 | 8/2001 | Haller et al. |
| 6,286,965 B1 | 9/2001 | Caskey et al. |
| 6,286,984 B1 | 9/2001 | Berg |
| 6,289,332 B2 | 9/2001 | Menig et al. |
| 6,290,378 B1 | 9/2001 | Buchalla et al. |
| 6,291,905 B1 | 9/2001 | Drummond et al. |
| 6,291,906 B1 | 9/2001 | Marcus et al. |
| 6,294,989 B1 | 9/2001 | Schofield et al. |
| 6,296,379 B1 | 10/2001 | Pastrick |
| 6,297,781 B1 | 10/2001 | Turnbull et al. |
| 6,299,333 B1 | 10/2001 | Pastrick et al. |
| 6,300,879 B1 | 10/2001 | Ragan et al. |
| 6,301,039 B1 | 10/2001 | Tench |
| 6,304,173 B2 | 10/2001 | Pala et al. |
| 6,305,807 B1 | 10/2001 | Schierbeek |
| 6,310,611 B1 | 10/2001 | Caldwell |
| 6,310,714 B1 | 10/2001 | Lomprey et al. |
| 6,310,738 B1 | 10/2001 | Chu |
| 6,313,454 B1 | 11/2001 | Bos et al. |
| 6,314,295 B1 | 11/2001 | Kawamoto |
| 6,315,440 B1 | 11/2001 | Satoh |
| 6,317,057 B1 | 11/2001 | Lee |
| 6,317,180 B1 | 11/2001 | Kuroiwa et al. |
| 6,317,248 B1 | 11/2001 | Agrawal et al. |
| 6,318,870 B1 | 11/2001 | Spooner et al. |
| 6,320,176 B1 | 11/2001 | Schofield et al. |
| 6,320,282 B1 | 11/2001 | Caldwell |
| 6,320,612 B1 | 11/2001 | Young |
| 6,324,295 B1 | 11/2001 | Valery et al. |
| 6,326,613 B1 | 12/2001 | Heslin et al. |
| 6,326,900 B2 | 12/2001 | DeLine et al. |
| 6,327,925 B1 | 12/2001 | Gombert et al. |
| 6,329,925 B1 | 12/2001 | Skiver et al. |
| 6,330,511 B2 | 12/2001 | Ogura et al. |
| 6,331,066 B1 | 12/2001 | Desmond et al. |
| 6,333,759 B1 | 12/2001 | Mazzilli |
| 6,335,680 B1 | 1/2002 | Matsuoka |
| 6,336,737 B1 | 1/2002 | Thau |
| 6,340,850 B2 | 1/2002 | O'Farrell et al. |
| 6,341,523 B2 | 1/2002 | Lynam |
| 6,344,805 B1 | 2/2002 | Yasui et al. |
| 6,346,698 B1 | 2/2002 | Turnbull |
| 6,347,880 B1 | 2/2002 | Fürst et al. |
| 6,348,858 B2 | 2/2002 | Weis et al. |
| 6,351,708 B1 | 2/2002 | Takagi et al. |
| 6,353,392 B1 | 3/2002 | Schofield et al. |
| 6,356,206 B1 | 3/2002 | Takenaga et al. |
| 6,356,376 B1 | 3/2002 | Tonar et al. |
| 6,356,389 B1 | 3/2002 | Nilsen et al. |
| 6,357,883 B1 | 3/2002 | Strumolo et al. |
| 6,362,121 B1 | 3/2002 | Chopin et al. |
| 6,362,548 B1 | 3/2002 | Bingle et al. |
| 6,363,326 B1 | 3/2002 | Scully |
| 6,366,013 B1 | 4/2002 | Leenders et al. |
| 6,366,213 B2 | 4/2002 | DeLine et al. |
| 6,369,701 B1 | 4/2002 | Yoshida et al. |

(56) References Cited

U.S. PATENT DOCUMENTS

| | | |
|---|---|---|
| 6,370,329 B1 | 4/2002 | Teuchert |
| 6,371,636 B1 | 4/2002 | Wesson |
| 6,379,013 B1 | 4/2002 | Bechtel et al. |
| 6,379,788 B2 | 4/2002 | Choi et al. |
| 6,382,805 B1 | 5/2002 | Miyabukuro |
| 6,385,139 B1 | 5/2002 | Arikawa et al. |
| 6,386,742 B1 | 5/2002 | DeLine et al. |
| 6,390,529 B1 | 5/2002 | Bingle et al. |
| 6,390,626 B2 | 5/2002 | Knox |
| 6,390,635 B2 | 5/2002 | Whitehead et al. |
| 6,396,397 B1 | 5/2002 | Bos et al. |
| 6,396,408 B2 | 5/2002 | Drummond et al. |
| 6,396,637 B2 | 5/2002 | Roest et al. |
| 6,407,468 B1 | 6/2002 | LeVesque et al. |
| 6,407,847 B1 | 6/2002 | Poll et al. |
| 6,408,247 B1 | 6/2002 | Ichikawa et al. |
| 6,411,204 B1 | 6/2002 | Bloomfield et al. |
| 6,412,959 B1 | 7/2002 | Tseng |
| 6,412,973 B1 | 7/2002 | Bos et al. |
| 6,414,910 B1 | 7/2002 | Kaneko et al. |
| 6,415,230 B1 | 7/2002 | Maruko et al. |
| 6,416,208 B2 | 7/2002 | Pastrick et al. |
| 6,417,786 B2 | 7/2002 | Learman et al. |
| 6,418,376 B1 | 7/2002 | Olson |
| 6,419,300 B1 | 7/2002 | Pavao et al. |
| 6,420,036 B1 | 7/2002 | Varaprasad et al. |
| 6,420,800 B1 | 7/2002 | LeVesque et al. |
| 6,420,975 B1 | 7/2002 | DeLine et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,786 B1 | 7/2002 | Beeson et al. |
| 6,424,892 B1 | 7/2002 | Matsuoka |
| 6,426,492 B1 | 7/2002 | Bos et al. |
| 6,426,568 B2 | 7/2002 | Turnbull et al. |
| 6,427,349 B1 | 8/2002 | Blank et al. |
| 6,428,172 B1 | 8/2002 | Hutzel et al. |
| 6,433,676 B2 | 8/2002 | DeLine et al. |
| 6,433,680 B1 | 8/2002 | Ho |
| 6,433,914 B1 | 8/2002 | Lomprey et al. |
| 6,437,688 B1 | 8/2002 | Kobayashi |
| 6,438,491 B1 | 8/2002 | Farmer |
| 6,439,755 B1 | 8/2002 | Fant, Jr. et al. |
| 6,441,872 B1 | 8/2002 | Ho |
| 6,441,943 B1 | 8/2002 | Roberts et al. |
| 6,441,963 B2 | 8/2002 | Murakami et al. |
| 6,441,964 B1 | 8/2002 | Chu et al. |
| 6,445,287 B1 | 9/2002 | Schofield et al. |
| 6,447,128 B1 | 9/2002 | Lang et al. |
| 6,449,082 B1 | 9/2002 | Agrawal et al. |
| 6,452,533 B1 | 9/2002 | Yamabuchi et al. |
| 6,452,572 B1 | 9/2002 | Fan et al. |
| 6,456,438 B1 | 9/2002 | Lee et al. |
| 6,462,795 B1 | 10/2002 | Clarke |
| 6,463,369 B2 | 10/2002 | Sadano et al. |
| 6,466,701 B1 | 10/2002 | Ejiri et al. |
| 6,471,362 B1 | 10/2002 | Carter et al. |
| 6,472,977 B1 | 10/2002 | Pöchmüller |
| 6,472,979 B2 | 10/2002 | Schofield et al. |
| 6,473,001 B1 | 10/2002 | Blum |
| 6,474,853 B2 | 11/2002 | Pastrick et al. |
| 6,476,731 B1 | 11/2002 | Miki et al. |
| 6,476,855 B1 | 11/2002 | Yamamoto |
| 6,477,460 B2 | 11/2002 | Kepler |
| 6,477,464 B2 | 11/2002 | McCarthy et al. |
| 6,483,429 B1 | 11/2002 | Yasui et al. |
| 6,483,438 B2 | 11/2002 | DeLine et al. |
| 6,483,613 B1 | 11/2002 | Woodgate et al. |
| 6,487,500 B2 | 11/2002 | Lemelson et al. |
| 6,494,602 B2 | 12/2002 | Pastrick et al. |
| 6,498,620 B2 | 12/2002 | Schofield et al. |
| 6,501,387 B2 | 12/2002 | Skiver et al. |
| 6,512,203 B2 | 1/2003 | Jones et al. |
| 6,512,624 B2 | 1/2003 | Tonar et al. |
| 6,513,252 B1 | 2/2003 | Schierbeek et al. |
| 6,515,378 B2 | 2/2003 | Drummond et al. |
| 6,515,581 B1 | 2/2003 | Ho |
| 6,515,582 B1 | 2/2003 | Teowee |
| 6,515,597 B1 | 2/2003 | Wada et al. |
| 6,516,664 B2 | 2/2003 | Lynam |
| 6,518,691 B1 | 2/2003 | Baba |
| 6,519,209 B1 | 2/2003 | Arikawa et al. |
| 6,520,667 B1 | 2/2003 | Mousseau |
| 6,522,451 B1 | 2/2003 | Lynam |
| 6,522,969 B2 | 2/2003 | Kannonji |
| 6,525,707 B1 | 2/2003 | Kaneko et al. |
| 6,534,884 B2 | 3/2003 | Marcus et al. |
| 6,538,709 B1 | 3/2003 | Kurihara et al. |
| 6,539,306 B2 | 3/2003 | Turnbull et al. |
| 6,542,085 B1 | 4/2003 | Yang |
| 6,542,182 B1 | 4/2003 | Chautorash |
| 6,543,163 B1 | 4/2003 | Ginsberg |
| 6,545,598 B1 | 4/2003 | de Villeroche |
| 6,549,253 B1 | 4/2003 | Robbie et al. |
| 6,549,335 B1 | 4/2003 | Trapani et al. |
| 6,550,949 B1 | 4/2003 | Bauer et al. |
| 6,552,326 B2 | 4/2003 | Turnbull |
| 6,552,653 B2 | 4/2003 | Nakaho et al. |
| 6,553,308 B1 | 4/2003 | Uhlmann et al. |
| 6,559,761 B1 | 5/2003 | Miller et al. |
| 6,559,902 B1 | 5/2003 | Kusuda et al. |
| 6,560,004 B2 | 5/2003 | Theiste et al. |
| 6,560,027 B2 | 5/2003 | Meine |
| 6,566,821 B2 | 5/2003 | Nakatsuka et al. |
| 6,567,060 B1 | 5/2003 | Sekiguchi |
| 6,567,708 B1 | 5/2003 | Bechtel et al. |
| 6,568,839 B1 | 5/2003 | Pastrick et al. |
| 6,572,233 B1 | 6/2003 | Northman et al. |
| 6,573,957 B1 | 6/2003 | Suzuki |
| 6,573,963 B2 | 6/2003 | Ouderkirk et al. |
| 6,575,582 B2 | 6/2003 | Tenmyo |
| 6,575,643 B2 | 6/2003 | Takashashi |
| 6,578,989 B2 | 6/2003 | Osumi et al. |
| 6,580,373 B1 | 6/2003 | Ohashi |
| 6,580,479 B1 | 6/2003 | Sekiguchi et al. |
| 6,580,562 B2 | 6/2003 | Aoki et al. |
| 6,581,007 B2 | 6/2003 | Hasegawa et al. |
| 6,583,730 B2 | 6/2003 | Lang et al. |
| 6,591,192 B2 | 7/2003 | Okamura et al. |
| 6,592,230 B2 | 7/2003 | Dupay |
| 6,593,565 B2 | 7/2003 | Heslin et al. |
| 6,593,984 B2 | 7/2003 | Arakawa et al. |
| 6,594,065 B2 | 7/2003 | Byker et al. |
| 6,594,067 B2 | 7/2003 | Poll et al. |
| 6,594,090 B2 | 7/2003 | Kruschwitz et al. |
| 6,594,583 B2 | 7/2003 | Ogura et al. |
| 6,594,614 B2 | 7/2003 | Studt et al. |
| 6,595,649 B2 | 7/2003 | Hoekstra et al. |
| 6,597,489 B1 | 7/2003 | Guarr et al. |
| 6,606,183 B2 | 8/2003 | Ikai et al. |
| 6,611,202 B2 | 8/2003 | Schofield et al. |
| 6,611,227 B1 | 8/2003 | Nebiyeloul-Kifle et al. |
| 6,611,759 B2 | 8/2003 | Brosche |
| 6,612,723 B2 | 9/2003 | Futhey et al. |
| 6,614,387 B1 | 9/2003 | Deadman |
| 6,614,419 B1 | 9/2003 | May |
| 6,614,579 B2 | 9/2003 | Roberts et al. |
| 6,615,438 B1 | 9/2003 | Franco et al. |
| 6,616,288 B2 | 9/2003 | Duroux et al. |
| 6,616,313 B2 | 9/2003 | Fürst et al. |
| 6,616,764 B2 | 9/2003 | Krämer et al. |
| 6,618,672 B2 | 9/2003 | Sasaki et al. |
| 6,621,616 B1 | 9/2003 | Bauer et al. |
| 6,624,936 B2 | 9/2003 | Kotchick et al. |
| 6,627,918 B2 | 9/2003 | Getz et al. |
| 6,630,888 B2 | 10/2003 | Lang et al. |
| 6,636,190 B2 | 10/2003 | Hirakata et al. |
| 6,636,258 B2 | 10/2003 | Strumolo |
| 6,638,582 B1 | 10/2003 | Uchiyama et al. |
| 6,639,360 B2 | 10/2003 | Roberts et al. |
| 6,642,840 B2 | 11/2003 | Lang et al. |
| 6,642,851 B2 | 11/2003 | DeLine et al. |
| 6,646,697 B1 | 11/2003 | Sekiguchi et al. |
| 6,648,477 B2 | 11/2003 | Hutzel et al. |

(56) References Cited

U.S. PATENT DOCUMENTS

| | | |
|---|---|---|
| 6,650,457 B2 | 11/2003 | Busscher et al. |
| 6,657,607 B1 | 12/2003 | Evanicky et al. |
| 6,661,482 B2 | 12/2003 | Hara |
| 6,661,830 B1 | 12/2003 | Reed et al. |
| 6,663,262 B2 | 12/2003 | Boyd et al. |
| 6,665,592 B2 | 12/2003 | Kodama |
| 6,667,726 B1 | 12/2003 | Damiani et al. |
| 6,669,109 B2 | 12/2003 | Ivanov et al. |
| 6,669,285 B1 | 12/2003 | Park et al. |
| 6,670,207 B1 | 12/2003 | Roberts |
| 6,670,910 B2 | 12/2003 | Delcheccolo et al. |
| 6,670,935 B2 | 12/2003 | Yeon et al. |
| 6,670,941 B2 | 12/2003 | Albu et al. |
| 6,671,080 B2 | 12/2003 | Poll et al. |
| 6,672,731 B2 | 1/2004 | Schnell et al. |
| 6,672,734 B2 | 1/2004 | Lammers |
| 6,672,744 B2 | 1/2004 | DeLine et al. |
| 6,672,745 B1 | 1/2004 | Bauer et al. |
| 6,674,370 B2 | 1/2004 | Rodewald et al. |
| 6,675,075 B1 | 1/2004 | Engelsburg et al. |
| 6,678,083 B1 | 1/2004 | Anstee |
| 6,678,614 B2 | 1/2004 | McCarthy et al. |
| 6,679,608 B2 | 1/2004 | Bechtel et al. |
| 6,683,539 B2 | 1/2004 | Trajkovic et al. |
| 6,683,969 B1 | 1/2004 | Nishigaki et al. |
| 6,685,348 B2 | 2/2004 | Pastrick et al. |
| 6,690,262 B1 | 2/2004 | Winnett |
| 6,690,268 B2 | 2/2004 | Schofield et al. |
| 6,690,413 B1 | 2/2004 | Moore |
| 6,690,438 B2 | 2/2004 | Sekiguchi |
| 6,693,517 B2 | 2/2004 | McCarthy et al. |
| 6,693,518 B2 | 2/2004 | Kumata et al. |
| 6,693,519 B2 | 2/2004 | Keirstead |
| 6,693,524 B1 | 2/2004 | Payne |
| 6,700,692 B2 | 3/2004 | Tonar et al. |
| 6,704,434 B1 | 3/2004 | Sakoh et al. |
| 6,709,136 B2 | 3/2004 | Pastrick et al. |
| 6,713,783 B1 | 3/2004 | Mase et al. |
| 6,717,109 B1 | 4/2004 | Macher et al. |
| 6,717,610 B1 | 4/2004 | Bos et al. |
| 6,717,712 B2 | 4/2004 | Lynam et al. |
| 6,719,215 B2 | 4/2004 | Droulliard |
| 6,724,446 B2 | 4/2004 | Motomura et al. |
| 6,726,337 B2 | 4/2004 | Whitehead et al. |
| 6,727,807 B2 | 4/2004 | Trajkovic et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,736,526 B2 | 5/2004 | Matsuba et al. |
| 6,737,629 B2 | 5/2004 | Nixon et al. |
| 6,737,630 B2 | 5/2004 | Turnbull |
| 6,737,964 B2 | 5/2004 | Samman et al. |
| 6,738,088 B1 | 5/2004 | Uskolovsky et al. |
| 6,742,904 B2 | 6/2004 | Bechtel et al. |
| 6,744,353 B2 | 6/2004 | Sjönell |
| 6,746,775 B1 | 6/2004 | Boire et al. |
| 6,747,716 B2 | 6/2004 | Kuroiwa et al. |
| 6,748,211 B1 | 6/2004 | Isaac et al. |
| 6,749,308 B1 | 6/2004 | Niendorf et al. |
| 6,755,542 B2 | 6/2004 | Bechtel et al. |
| 6,756,912 B2 | 6/2004 | Skiver et al. |
| 6,757,039 B2 | 6/2004 | Ma |
| 6,757,109 B2 | 6/2004 | Bos |
| D493,131 S | 7/2004 | Lawlor et al. |
| D493,394 S | 7/2004 | Lawlor et al. |
| 6,759,113 B1 | 7/2004 | Tang |
| 6,759,945 B2 | 7/2004 | Richard |
| 6,760,157 B1 | 7/2004 | Allen et al. |
| 6,765,480 B2 | 7/2004 | Tseng |
| 6,773,116 B2 | 8/2004 | De Vaan et al. |
| 6,774,356 B2 | 8/2004 | Heslin et al. |
| 6,774,810 B2 | 8/2004 | DeLine et al. |
| 6,778,904 B2 | 8/2004 | Iwami et al. |
| 6,779,900 B1 | 8/2004 | Nolan-Brown |
| 6,781,738 B2 | 8/2004 | Kikuchi et al. |
| 6,782,718 B2 | 8/2004 | Lingle et al. |
| 6,784,129 B2 | 8/2004 | Seto et al. |
| 6,784,936 B1 | 8/2004 | Fukushima |
| 6,797,396 B1 | 9/2004 | Liu et al. |
| 6,800,871 B2 | 10/2004 | Matsuda et al. |
| 6,801,127 B2 | 10/2004 | Mizusawa et al. |
| 6,801,244 B2 | 10/2004 | Takeda et al. |
| 6,801,283 B2 | 10/2004 | Koyama et al. |
| 6,805,474 B2 | 10/2004 | Walser et al. |
| 6,806,452 B2 | 10/2004 | Bos et al. |
| 6,806,922 B2 | 10/2004 | Ishitaka |
| 6,810,323 B1 | 10/2004 | Bullock et al. |
| 6,812,463 B2 | 11/2004 | Okada |
| 6,812,907 B1 | 11/2004 | Gennetten et al. |
| 6,819,231 B2 | 11/2004 | Berberich et al. |
| 6,823,261 B2 | 11/2004 | Sekiguchi |
| 6,824,281 B2 | 11/2004 | Schofield et al. |
| 6,831,268 B2 | 12/2004 | Bechtel et al. |
| 6,832,848 B2 | 12/2004 | Pastrick |
| 6,834,969 B2 | 12/2004 | Bade et al. |
| 6,836,725 B2 | 12/2004 | Millington et al. |
| 6,838,980 B2 | 1/2005 | Gloger et al. |
| 6,842,189 B2 | 1/2005 | Park |
| 6,842,276 B2 | 1/2005 | Poll et al. |
| 6,845,805 B1 | 1/2005 | Köster |
| 6,846,098 B2 | 1/2005 | Bourdelais et al. |
| 6,847,424 B2 | 1/2005 | Gotoh et al. |
| 6,847,487 B2 | 1/2005 | Burgner |
| 6,847,873 B1 | 1/2005 | Li |
| 6,848,817 B2 | 2/2005 | Bos et al. |
| 6,849,165 B2 | 2/2005 | Klöppel et al. |
| 6,853,491 B1 | 2/2005 | Ruhle et al. |
| 6,859,148 B2 | 2/2005 | Miller et al. |
| 6,861,789 B2 | 3/2005 | Wei |
| 6,870,655 B1 | 3/2005 | Northman et al. |
| 6,870,656 B2 | 3/2005 | Tonar et al. |
| 6,871,982 B2 | 3/2005 | Holman et al. |
| 6,877,888 B2 | 4/2005 | DeLine et al. |
| 6,882,287 B2 | 4/2005 | Schofield |
| 6,889,064 B2 | 5/2005 | Baratono et al. |
| 6,891,563 B2 | 5/2005 | Schofield et al. |
| 6,891,677 B2 | 5/2005 | Nilsen et al. |
| 6,898,518 B2 | 5/2005 | Padmanabhan |
| 6,902,284 B2 | 6/2005 | Hutzel et al. |
| 6,904,348 B2 | 6/2005 | Drummond et al. |
| 6,906,620 B2 | 6/2005 | Nakai et al. |
| 6,906,632 B2 | 6/2005 | DeLine et al. |
| 6,909,486 B2 | 6/2005 | Wang et al. |
| 6,910,779 B2 | 6/2005 | Abel et al. |
| 6,912,001 B2 | 6/2005 | Okamoto et al. |
| 6,912,396 B2 | 6/2005 | Sziraki et al. |
| 6,914,521 B2 | 7/2005 | Rothkop |
| 6,916,099 B2 | 7/2005 | Su et al. |
| 6,917,404 B2 | 7/2005 | Baek |
| 6,918,674 B2 | 7/2005 | Drummond et al. |
| 6,922,902 B2 | 8/2005 | Schierbeek et al. |
| 6,923,080 B1 | 8/2005 | Dobler et al. |
| 6,928,180 B2 | 8/2005 | Stam et al. |
| 6,928,366 B2 | 8/2005 | Ockerse et al. |
| 6,930,737 B2 | 8/2005 | Weindorf et al. |
| 6,933,837 B2 | 8/2005 | Gunderson et al. |
| 6,934,067 B2 | 8/2005 | Ash et al. |
| 6,940,423 B2 | 9/2005 | Takagi et al. |
| 6,946,978 B2 | 9/2005 | Schofield |
| 6,947,576 B2 | 9/2005 | Stam et al. |
| 6,947,577 B2 | 9/2005 | Stam et al. |
| 6,949,772 B2 | 9/2005 | Shimizu et al. |
| 6,950,035 B2 | 9/2005 | Tanaka et al. |
| 6,951,410 B2 | 10/2005 | Parsons |
| 6,951,681 B2 | 10/2005 | Hartley et al. |
| 6,952,312 B2 | 10/2005 | Weber et al. |
| 6,954,300 B2 | 10/2005 | Varaprasad et al. |
| 6,958,495 B2 | 10/2005 | Nishijima et al. |
| 6,958,683 B2 | 10/2005 | Mills et al. |
| 6,959,994 B2 | 11/2005 | Fujikawa et al. |
| 6,961,178 B2 | 11/2005 | Sugino et al. |
| 6,961,661 B2 | 11/2005 | Sekiguchi |
| 6,963,438 B2 | 11/2005 | Busscher et al. |

(56) References Cited

U.S. PATENT DOCUMENTS

| | | |
|---|---|---|
| 6,967,569 B2 | 11/2005 | Weber et al. |
| 6,968,273 B2 | 11/2005 | Ockerse et al. |
| 6,971,181 B2 | 12/2005 | Ohm et al. |
| 6,972,888 B2 | 12/2005 | Poll et al. |
| 6,974,236 B2 | 12/2005 | Tenmyo |
| 6,975,215 B2 | 12/2005 | Schofield et al. |
| 6,977,702 B2 | 12/2005 | Wu |
| 6,980,092 B2 | 12/2005 | Turnbull et al. |
| 6,985,291 B2 | 1/2006 | Watson et al. |
| 6,989,736 B2 | 1/2006 | Berberich et al. |
| 6,992,573 B2 | 1/2006 | Blank et al. |
| 6,992,718 B1 | 1/2006 | Takahara |
| 6,992,826 B2 | 1/2006 | Wong |
| 6,995,687 B2 | 2/2006 | Lang et al. |
| 6,997,571 B2 | 2/2006 | Tenmyo |
| 7,001,058 B2 | 2/2006 | Inditsky |
| 7,004,592 B2 | 2/2006 | Varaprasad et al. |
| 7,004,593 B2 | 2/2006 | Weller et al. |
| 7,005,974 B2 | 2/2006 | McMahon et al. |
| 7,006,173 B1 | 2/2006 | Hiyama et al. |
| 7,008,090 B2 | 3/2006 | Blank |
| 7,009,751 B2 | 3/2006 | Tonar et al. |
| 7,012,543 B2 | 3/2006 | DeLine et al. |
| 7,012,727 B2 | 3/2006 | Hutzel et al. |
| 7,023,331 B2 | 4/2006 | Kodama |
| 7,029,156 B2 | 4/2006 | Suehiro et al. |
| 7,030,738 B2 | 4/2006 | Ishii |
| 7,030,775 B2 | 4/2006 | Sekiguchi |
| 7,038,577 B2 | 5/2006 | Pawlicki et al. |
| 7,041,965 B2 | 5/2006 | Heslin et al. |
| 7,042,616 B2 | 5/2006 | Tonar et al. |
| 7,046,418 B2 | 5/2006 | Lin et al. |
| 7,046,448 B2 | 5/2006 | Burgner |
| 7,050,908 B1 | 5/2006 | Schwartz et al. |
| 7,057,505 B2 | 6/2006 | Iwamoto |
| 7,057,681 B2 | 6/2006 | Hinata et al. |
| 7,063,893 B2 | 6/2006 | Hoffman |
| 7,064,882 B2 | 6/2006 | Tonar et al. |
| 7,068,289 B2 | 6/2006 | Satoh et al. |
| 7,074,486 B2 | 7/2006 | Boire et al. |
| 7,081,810 B2 | 7/2006 | Henderson et al. |
| 7,085,633 B2 | 8/2006 | Nishira et al. |
| 7,092,052 B2 | 8/2006 | Okamoto et al. |
| 7,095,432 B2 | 8/2006 | Nakayama et al. |
| 7,095,567 B2 | 8/2006 | Troxell et al. |
| 7,106,213 B2 | 9/2006 | White |
| 7,106,392 B2 | 9/2006 | You |
| 7,108,409 B2 | 9/2006 | DeLine et al. |
| 7,110,021 B2 | 9/2006 | Nobori et al. |
| 7,114,554 B2 | 10/2006 | Bergman et al. |
| 7,121,028 B2 | 10/2006 | Shoen et al. |
| 7,125,131 B2 | 10/2006 | Olczak |
| 7,130,727 B2 | 10/2006 | Liu et al. |
| 7,132,064 B2 | 11/2006 | Li et al. |
| 7,136,091 B2 | 11/2006 | Ichikawa et al. |
| 7,138,974 B2 | 11/2006 | Hirakata et al. |
| 7,149,613 B2 | 12/2006 | Stam et al. |
| 7,150,552 B2 | 12/2006 | Weidel |
| 7,151,515 B2 | 12/2006 | Kim et al. |
| 7,151,997 B2 | 12/2006 | Uhlmann et al. |
| 7,153,588 B2 | 12/2006 | McMan et al. |
| 7,154,657 B2 | 12/2006 | Poll et al. |
| 7,158,881 B2 | 1/2007 | McCarthy et al. |
| 7,160,017 B2 | 1/2007 | Lee et al. |
| 7,161,567 B2 | 1/2007 | Homma et al. |
| 7,167,796 B2 | 1/2007 | Taylor et al. |
| 7,168,830 B2 | 1/2007 | Pastrick et al. |
| 7,175,291 B1 | 2/2007 | Li |
| 7,176,790 B2 | 2/2007 | Yamazaki |
| 7,184,190 B2 | 2/2007 | McCabe et al. |
| 7,185,995 B2 | 3/2007 | Hatanaka et al. |
| 7,187,498 B2 | 3/2007 | Bengoechea et al. |
| 7,188,963 B2 | 3/2007 | Schofield et al. |
| 7,193,764 B2 | 3/2007 | Lin et al. |
| 7,195,381 B2 | 3/2007 | Lynam et al. |
| 7,199,767 B2 | 4/2007 | Spero |
| 7,202,987 B2 | 4/2007 | Varaprasad et al. |
| 7,206,697 B2 | 4/2007 | Olney et al. |
| 7,209,277 B2 | 4/2007 | Tonar et al. |
| 7,215,238 B2 | 5/2007 | Buck et al. |
| 7,215,473 B2 | 5/2007 | Fleming |
| 7,221,363 B2 | 5/2007 | Roberts et al. |
| 7,221,365 B1 | 5/2007 | Lévesque et al. |
| 7,224,324 B2 | 5/2007 | Quist et al. |
| 7,227,472 B1 | 6/2007 | Roe |
| 7,230,523 B2 | 6/2007 | Harter, Jr. et al. |
| 7,232,231 B2 | 6/2007 | Shih |
| 7,232,594 B2 | 6/2007 | Miroshin et al. |
| 7,233,304 B1 | 6/2007 | Aratani et al. |
| 7,235,918 B2 | 6/2007 | McCullough et al. |
| 7,241,030 B2 | 7/2007 | Mok et al. |
| 7,241,037 B2 | 7/2007 | Mathieu et al. |
| 7,245,207 B1 | 7/2007 | Dayan et al. |
| 7,245,231 B2 | 7/2007 | Kiefer et al. |
| 7,245,336 B2 | 7/2007 | Hiyama et al. |
| 7,248,283 B2 | 7/2007 | Takagi et al. |
| 7,248,305 B2 | 7/2007 | Ootsuta et al. |
| 7,249,860 B2 | 7/2007 | Kulas et al. |
| 7,251,079 B2 | 7/2007 | Capaldo et al. |
| 7,253,723 B2 | 8/2007 | Lindahl et al. |
| 7,255,451 B2 | 8/2007 | McCabe et al. |
| 7,255,465 B2 | 8/2007 | DeLine et al. |
| 7,259,036 B2 | 8/2007 | Borland et al. |
| 7,262,406 B2 | 8/2007 | Heslin et al. |
| 7,262,916 B2 | 8/2007 | Kao et al. |
| 7,265,342 B2 | 9/2007 | Heslin et al. |
| 7,268,841 B2 | 9/2007 | Kasajima et al. |
| 7,269,327 B2 | 9/2007 | Tang |
| 7,269,328 B2 | 9/2007 | Tang |
| 7,271,951 B2 | 9/2007 | Weber et al. |
| 7,274,501 B2 | 9/2007 | McCabe et al. |
| 7,281,491 B2 | 10/2007 | Iwamaru |
| 7,286,280 B2 | 10/2007 | Whitehead et al. |
| 7,287,868 B2 | 10/2007 | Carter et al. |
| 7,289,037 B2 | 10/2007 | Uken et al. |
| 7,290,919 B2 | 11/2007 | Pan et al. |
| 7,292,208 B1 | 11/2007 | Park et al. |
| 7,292,918 B2 | 11/2007 | Silvester |
| 7,300,183 B2 | 11/2007 | Kiyomoto et al. |
| 7,302,344 B2 | 11/2007 | Olney et al. |
| 7,304,661 B2 | 12/2007 | Ishikura |
| 7,308,341 B2 | 12/2007 | Schofield et al. |
| 7,310,177 B2 | 12/2007 | McCabe et al. |
| 7,311,428 B2 | 12/2007 | DeLine et al. |
| 7,316,485 B2 | 1/2008 | Roose |
| 7,317,386 B2 | 1/2008 | Lengning et al. |
| 7,318,664 B2 | 1/2008 | Hatanaka et al. |
| 7,323,819 B2 | 1/2008 | Hong et al. |
| 7,324,043 B2 | 1/2008 | Purden et al. |
| 7,324,172 B2 | 1/2008 | Yamazaki et al. |
| 7,324,174 B2 | 1/2008 | Hafuka et al. |
| 7,324,261 B2 | 1/2008 | Tonar et al. |
| 7,327,225 B2 | 2/2008 | Nicholas et al. |
| 7,327,226 B2 | 2/2008 | Turnbull et al. |
| 7,327,855 B1 | 2/2008 | Chen |
| 7,328,103 B2 | 2/2008 | McCarthy et al. |
| 7,329,013 B2 | 2/2008 | Blank et al. |
| 7,329,850 B2 | 2/2008 | Drummond et al. |
| 7,331,415 B2 | 2/2008 | Hawes et al. |
| 7,338,177 B2 | 3/2008 | Lynam |
| 7,342,707 B2 | 3/2008 | Roberts et al. |
| 7,344,284 B2 | 3/2008 | Lynam et al. |
| 7,349,143 B2 | 3/2008 | Tonar et al. |
| 7,349,144 B2 | 3/2008 | Varaprasad et al. |
| 7,349,582 B2 | 3/2008 | Takeda et al. |
| 7,355,524 B2 | 4/2008 | Schofield |
| 7,360,932 B2 | 4/2008 | Uken et al. |
| 7,362,505 B2 | 4/2008 | Hikmet et al. |
| 7,368,714 B2 | 5/2008 | Remillard et al. |
| 7,370,983 B2 | 5/2008 | DeWind et al. |
| 7,372,611 B2 | 5/2008 | Tonar et al. |
| 7,375,895 B2 | 5/2008 | Brynielsson |
| 7,379,224 B2 | 5/2008 | Tonar et al. |
| 7,379,225 B2 | 5/2008 | Tonar et al. |

(56) References Cited

U.S. PATENT DOCUMENTS

| | | |
|---|---|---|
| 7,379,243 B2 | 5/2008 | Horsten et al. |
| 7,379,814 B2 | 5/2008 | Ockerse et al. |
| 7,379,817 B1 | 5/2008 | Tyson et al. |
| 7,380,633 B2 | 6/2008 | Shen et al. |
| 7,389,171 B2 | 6/2008 | Rupp |
| 7,391,563 B2 | 6/2008 | McCabe et al. |
| 7,396,147 B2 | 7/2008 | Munro |
| 7,411,637 B2 | 8/2008 | Weiss |
| 7,411,732 B2 | 8/2008 | Kao et al. |
| 7,412,328 B2 | 8/2008 | Uhlmann et al. |
| 7,417,781 B2 | 8/2008 | Tonar et al. |
| 7,420,159 B2 | 9/2008 | Heslin et al. |
| 7,420,756 B2 | 9/2008 | Lynam |
| 7,429,998 B2 | 9/2008 | Kawauchi et al. |
| 7,446,462 B2 | 11/2008 | Lim et al. |
| 7,446,650 B2 | 11/2008 | Schofield et al. |
| 7,446,924 B2 | 11/2008 | Schofield et al. |
| 7,448,776 B2 | 11/2008 | Tang |
| 7,452,090 B2 | 11/2008 | Weller et al. |
| 7,453,057 B2 | 11/2008 | Drummond et al. |
| 7,455,412 B2 | 11/2008 | Rottcher |
| 7,460,007 B2 | 12/2008 | Schofield et al. |
| 7,467,883 B2 | 12/2008 | DeLine et al. |
| 7,468,651 B2 | 12/2008 | DeLine et al. |
| 7,471,438 B2 | 12/2008 | McCabe et al. |
| 7,474,963 B2 | 1/2009 | Taylor et al. |
| 7,477,439 B2 | 1/2009 | Tonar et al. |
| 7,480,149 B2 | 1/2009 | DeWard et al. |
| 7,488,080 B2 | 2/2009 | Skiver et al. |
| 7,488,099 B2 | 2/2009 | Fogg et al. |
| 7,489,374 B2 | 2/2009 | Utsumi et al. |
| 7,490,007 B2 | 2/2009 | Taylor et al. |
| 7,490,943 B2 | 2/2009 | Kikuchi et al. |
| 7,490,944 B2 | 2/2009 | Blank et al. |
| 7,494,231 B2 | 2/2009 | Varaprasad et al. |
| 7,495,719 B2 | 2/2009 | Adachi et al. |
| 7,496,439 B2 | 2/2009 | McCormick |
| 7,502,156 B2 | 3/2009 | Tonar et al. |
| 7,505,047 B2 | 3/2009 | Yoshimura |
| 7,505,188 B2 | 3/2009 | Niiyama et al. |
| 7,511,607 B2 | 3/2009 | Hubbard et al. |
| 7,511,872 B2 | 3/2009 | Tonar et al. |
| 7,525,604 B2 | 4/2009 | Xue |
| 7,525,715 B2 | 4/2009 | McCabe et al. |
| 7,526,103 B2 | 4/2009 | Schofield et al. |
| 7,533,998 B2 | 5/2009 | Schofield et al. |
| 7,538,316 B2 | 5/2009 | Heslin et al. |
| 7,540,620 B2 | 6/2009 | Weller et al. |
| 7,541,570 B2 | 6/2009 | Drummond et al. |
| 7,542,193 B2 | 6/2009 | McCabe et al. |
| 7,543,946 B2 | 6/2009 | Ockerse et al. |
| 7,543,947 B2 | 6/2009 | Varaprasad et al. |
| 7,545,429 B2 | 6/2009 | Travis |
| 7,547,467 B2 | 6/2009 | Olson et al. |
| 7,548,291 B2 | 6/2009 | Lee et al. |
| 7,551,354 B2 | 6/2009 | Horsten et al. |
| 7,561,181 B2 | 7/2009 | Schofield et al. |
| 7,562,985 B2 | 7/2009 | Cortenraad et al. |
| 7,567,291 B2 | 7/2009 | Bechtel et al. |
| 7,571,038 B2 | 8/2009 | Butler et al. |
| 7,571,042 B2 | 8/2009 | Taylor et al. |
| 7,572,017 B2 | 8/2009 | Varaprasad et al. |
| 7,572,490 B2 | 8/2009 | Park et al. |
| 7,579,939 B2 | 8/2009 | Schofield et al. |
| 7,579,940 B2 | 8/2009 | Schofield et al. |
| 7,580,795 B2 | 8/2009 | McCarthy et al. |
| 7,581,859 B2 | 9/2009 | Lynam |
| 7,581,867 B2 | 9/2009 | Lee et al. |
| 7,583,184 B2 | 9/2009 | Schofield et al. |
| 7,586,566 B2 | 9/2009 | Nelson et al. |
| 7,586,666 B2 | 9/2009 | McCabe et al. |
| 7,589,883 B2 | 9/2009 | Varaprasad et al. |
| 7,589,893 B2 | 9/2009 | Rottcher |
| 7,600,878 B2 | 10/2009 | Blank et al. |
| 7,605,883 B2 | 10/2009 | Yamaki et al. |
| 7,619,508 B2 | 11/2009 | Lynam et al. |
| 7,623,202 B2 | 11/2009 | Araki et al. |
| 7,626,749 B2 | 12/2009 | Baur et al. |
| 7,629,996 B2 | 12/2009 | Rademacher et al. |
| 7,633,567 B2 | 12/2009 | Yamada et al. |
| 7,636,188 B2 | 12/2009 | Baur et al. |
| 7,636,195 B2 | 12/2009 | Nieuwkerk et al. |
| 7,636,930 B2 | 12/2009 | Chang |
| 7,643,200 B2 | 1/2010 | Varaprasad et al. |
| 7,643,927 B2 | 1/2010 | Hils |
| 7,651,228 B2 | 1/2010 | Skiver et al. |
| 7,658,521 B2 | 2/2010 | DeLine et al. |
| 7,663,798 B2 | 2/2010 | Tonar et al. |
| 7,667,579 B2 | 2/2010 | DeLine et al. |
| 7,670,016 B2 | 3/2010 | Weller et al. |
| 7,688,495 B2 | 3/2010 | Tonar et al. |
| 7,695,174 B2 | 4/2010 | Takayanagi et al. |
| 7,696,964 B2 | 4/2010 | Lankhorst et al. |
| 7,706,046 B2 | 4/2010 | Bauer et al. |
| 7,710,631 B2 | 5/2010 | McCabe et al. |
| 7,711,479 B2 | 5/2010 | Taylor et al. |
| 7,724,434 B2 | 5/2010 | Cross et al. |
| 7,726,822 B2 | 6/2010 | Blank et al. |
| 7,728,276 B2 | 6/2010 | Drummond et al. |
| 7,728,721 B2 | 6/2010 | Schofield et al. |
| 7,728,927 B2 | 6/2010 | Nieuwkerk et al. |
| 7,731,403 B2 | 6/2010 | Lynam et al. |
| 7,734,392 B2 | 6/2010 | Schofield et al. |
| 7,742,864 B2 | 6/2010 | Sekiguchi |
| 7,746,534 B2 | 6/2010 | Tonar et al. |
| 7,771,061 B2 | 8/2010 | Varaprasad et al. |
| 7,787,077 B2 | 8/2010 | Kondoh et al. |
| 7,791,694 B2 | 9/2010 | Molsen et al. |
| 7,795,675 B2 | 9/2010 | Darwish et al. |
| 7,815,326 B2 | 10/2010 | Blank et al. |
| 7,821,697 B2 | 10/2010 | Varaprasad et al. |
| 7,822,543 B2 | 10/2010 | Taylor et al. |
| 7,826,123 B2 | 11/2010 | McCabe et al. |
| 7,830,583 B2 | 11/2010 | Neuman et al. |
| 7,832,882 B2 | 11/2010 | Weller et al. |
| 7,842,154 B2 | 11/2010 | Lynam |
| 7,854,514 B2 | 12/2010 | Conner et al. |
| 7,855,755 B2 | 12/2010 | Weller et al. |
| 7,859,565 B2 | 12/2010 | Schofield et al. |
| 7,859,737 B2 | 12/2010 | McCabe et al. |
| 7,864,398 B2 | 1/2011 | Dozeman et al. |
| 7,864,399 B2 | 1/2011 | McCabe et al. |
| 7,871,169 B2 | 1/2011 | Varaprasad et al. |
| 7,873,593 B2 | 1/2011 | Schofield et al. |
| 7,888,629 B2 | 2/2011 | Heslin et al. |
| 7,898,398 B2 | 3/2011 | DeLine et al. |
| 7,898,719 B2 | 3/2011 | Schofield et al. |
| 7,903,324 B2 | 3/2011 | Kobayashi et al. |
| 7,903,335 B2 | 3/2011 | Nieuwkerk et al. |
| 7,906,756 B2 | 3/2011 | Drummond et al. |
| 7,911,547 B2 | 3/2011 | Brott et al. |
| 7,914,188 B2 | 3/2011 | DeLine et al. |
| 7,916,009 B2 | 3/2011 | Schofield et al. |
| 7,916,380 B2 | 3/2011 | Tonar et al. |
| 7,918,570 B2 | 4/2011 | Weller et al. |
| 7,926,960 B2 | 4/2011 | Skiver et al. |
| 7,937,667 B2 | 5/2011 | Kramer et al. |
| 7,965,336 B2 | 6/2011 | Bingle et al. |
| 7,965,357 B2 | 6/2011 | Van De Witte et al. |
| 7,980,711 B2 | 7/2011 | Takayanagi et al. |
| 7,994,471 B2 | 8/2011 | Heslin et al. |
| 8,000,894 B2 | 8/2011 | Taylor et al. |
| 8,004,768 B2 | 8/2011 | Takayanagi et al. |
| 8,019,505 B2 | 9/2011 | Schofield et al. |
| 8,027,691 B2 | 9/2011 | Bernas et al. |
| 8,031,225 B2 | 10/2011 | Watanabe et al. |
| 8,040,376 B2 | 10/2011 | Yamada et al. |
| 8,044,776 B2 | 10/2011 | Schofield et al. |
| 8,047,667 B2 | 11/2011 | Weller et al. |
| 8,049,640 B2 | 11/2011 | Uken et al. |
| 8,063,753 B2 | 11/2011 | DeLine et al. |
| 8,072,318 B2 | 12/2011 | Lynam et al. |
| 8,083,386 B2 | 12/2011 | Lynam |
| 8,094,002 B2 | 1/2012 | Schofield et al. |

(56) References Cited

U.S. PATENT DOCUMENTS

| | | |
|---|---|---|
| 8,095,260 B1 | 1/2012 | Schofield et al. |
| 8,095,310 B2 | 1/2012 | Taylor et al. |
| 8,100,568 B2 | 1/2012 | DeLine et al. |
| 8,106,347 B2 | 1/2012 | Drummond et al. |
| 8,121,787 B2 | 2/2012 | Taylor et al. |
| 8,134,117 B2 | 3/2012 | Heslin et al. |
| 8,144,033 B2 | 3/2012 | Chinomi et al. |
| 8,154,418 B2 | 4/2012 | Hook et al. |
| 8,162,493 B2 | 4/2012 | Skiver et al. |
| 8,164,817 B2 | 4/2012 | Varaprasad et al. |
| 8,169,307 B2 | 5/2012 | Nakamura et al. |
| 8,170,748 B1 | 5/2012 | Schofield et al. |
| 8,177,376 B2 | 5/2012 | Weller et al. |
| 8,179,236 B2 | 5/2012 | Weller et al. |
| 8,179,437 B2 | 5/2012 | Schofield et al. |
| 8,179,586 B2 | 5/2012 | Schofield et al. |
| 8,194,132 B2 | 6/2012 | Dayan et al. |
| 8,194,133 B2 | 6/2012 | De Wind et al. |
| 8,217,887 B2 | 7/2012 | Sangam et al. |
| 8,228,588 B2 | 7/2012 | McCabe et al. |
| 8,237,909 B2 | 8/2012 | Ostreko et al. |
| 8,254,011 B2 | 8/2012 | Baur et al. |
| 8,267,559 B2 | 9/2012 | DeLine et al. |
| 8,271,187 B2 | 9/2012 | Taylor et al. |
| 8,277,059 B2 | 10/2012 | McCabe et al. |
| 8,282,224 B2 | 10/2012 | Anderson et al. |
| 8,282,226 B2 | 10/2012 | Blank et al. |
| 8,282,253 B2 | 10/2012 | Lynam |
| 8,288,711 B2 | 10/2012 | Heslin et al. |
| 8,294,975 B2 | 10/2012 | Varaprasad et al. |
| 8,304,711 B2 | 11/2012 | Drummond et al. |
| 8,308,325 B2 | 11/2012 | Takayanagi et al. |
| 8,309,907 B2 | 11/2012 | Heslin et al. |
| 8,325,028 B2 | 12/2012 | Schofield et al. |
| 8,335,032 B2 | 12/2012 | McCabe et al. |
| 8,339,526 B2 | 12/2012 | Minikey, Jr. et al. |
| 8,355,853 B2 | 1/2013 | Schofield et al. |
| 8,358,262 B2 | 1/2013 | Degwekar et al. |
| 8,379,289 B2 | 2/2013 | Schofield et al. |
| 8,400,704 B2 | 3/2013 | McCabe et al. |
| 8,427,288 B2 | 4/2013 | Schofield et al. |
| 8,432,600 B2 | 4/2013 | Brown et al. |
| 8,462,204 B2 | 6/2013 | Schofield et al. |
| 8,465,162 B2 | 6/2013 | Weller et al. |
| 8,465,163 B2 | 6/2013 | Blank et al. |
| 8,482,683 B2 | 7/2013 | Hwang et al. |
| 8,506,096 B2 | 8/2013 | McCabe et al. |
| 8,508,383 B2 | 8/2013 | Peterson et al. |
| 8,508,384 B2 | 8/2013 | Uken et al. |
| 8,511,841 B2 | 8/2013 | Varaprasad et al. |
| 8,520,069 B2 | 8/2013 | Haler |
| 8,525,703 B2 | 9/2013 | McCarthy et al. |
| 8,543,330 B2 | 9/2013 | Taylor et al. |
| 8,545,030 B2 | 10/2013 | Anderson et al. |
| 8,559,093 B2 | 10/2013 | Varaprasad et al. |
| 8,577,549 B2 | 11/2013 | Schofield et al. |
| 8,582,082 B2 | 11/2013 | Ockerse |
| 8,608,327 B2 | 12/2013 | Blank et al. |
| 8,610,992 B2 | 12/2013 | Varaprasad et al. |
| 8,653,959 B2 | 2/2014 | Lynam et al. |
| 8,705,161 B2 | 4/2014 | Schofield et al. |
| 8,779,910 B2 | 7/2014 | DeLine et al. |
| 8,797,627 B2 | 8/2014 | McCabe et al. |
| 9,019,090 B2 | 4/2015 | Weller et al. |
| 9,809,171 B2 | 11/2017 | Weller et al. |
| 10,053,013 B2 | 8/2018 | Weller et al. |
| 10,239,457 B2 | 3/2019 | Weller et al. |
| 2001/0020202 A1 | 9/2001 | Obradovich |
| 2001/0026316 A1 | 10/2001 | Senatore |
| 2001/0035853 A1 | 11/2001 | Hoelen et al. |
| 2002/0003571 A1* | 1/2002 | Schofield ............ B60R 11/0235 348/148 |
| 2002/0049535 A1 | 4/2002 | Rigo et al. |
| 2002/0085155 A1 | 7/2002 | Arikawa |
| 2002/0092958 A1 | 7/2002 | Lusk |
| 2002/0113921 A1 | 8/2002 | Jiang |
| 2002/0118321 A1 | 8/2002 | Ge |
| 2002/0130953 A1 | 9/2002 | Riconda |
| 2002/0133144 A1 | 9/2002 | Chan et al. |
| 2002/0149727 A1 | 10/2002 | Wang |
| 2002/0154007 A1 | 10/2002 | Yang |
| 2002/0167589 A1* | 11/2002 | Schofield ............... H04N 7/181 348/148 |
| 2002/0167631 A1* | 11/2002 | Ishihara ................ G02F 1/1395 349/123 |
| 2003/0002165 A1 | 1/2003 | Mathias et al. |
| 2003/0007261 A1 | 1/2003 | Hutzel et al. |
| 2003/0030724 A1 | 2/2003 | Okamoto |
| 2003/0069690 A1 | 4/2003 | Correia et al. |
| 2003/0085806 A1 | 5/2003 | Samman |
| 2003/0090568 A1 | 5/2003 | Pico |
| 2003/0090569 A1 | 5/2003 | Poechmueller |
| 2003/0098908 A1 | 5/2003 | Misaiji et al. |
| 2003/0103142 A1 | 6/2003 | Hitomi et al. |
| 2003/0122929 A1 | 7/2003 | Minuado et al. |
| 2003/0133014 A1 | 7/2003 | Mendoza |
| 2003/0137586 A1 | 7/2003 | Lewellen |
| 2003/0156193 A1 | 8/2003 | Nakamura |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0206256 A1 | 11/2003 | Drain et al. |
| 2003/0214576 A1 | 11/2003 | Koga |
| 2003/0214584 A1 | 11/2003 | Ross, Jr. |
| 2003/0227546 A1 | 12/2003 | Hilborn et al. |
| 2004/0004541 A1 | 1/2004 | Hong |
| 2004/0027695 A1 | 2/2004 | Lin |
| 2004/0036768 A1 | 2/2004 | Green |
| 2004/0080404 A1 | 4/2004 | White |
| 2004/0239243 A1 | 12/2004 | Roberts et al. |
| 2004/0239849 A1* | 12/2004 | Wang ................ G02F 1/133555 349/115 |
| 2005/0010342 A1 | 1/2005 | Li |
| 2005/0018738 A1 | 1/2005 | Duan et al. |
| 2005/0024591 A1 | 2/2005 | Lian et al. |
| 2005/0117095 A1 | 6/2005 | Ma |
| 2005/0168995 A1 | 8/2005 | Kittlemann et al. |
| 2005/0237440 A1 | 10/2005 | Sugimura et al. |
| 2005/0264732 A1 | 12/2005 | Matsushima |
| 2005/0270766 A1 | 12/2005 | Kung et al. |
| 2006/0050018 A1 | 3/2006 | Hutzel et al. |
| 2006/0061008 A1 | 3/2006 | Karner et al. |
| 2006/0076860 A1 | 4/2006 | Hoss |
| 2006/0139752 A1 | 6/2006 | Chou et al. |
| 2006/0187378 A1 | 8/2006 | Bong et al. |
| 2006/0197937 A1* | 9/2006 | Bamji ....................... G01C 3/08 356/5.01 |
| 2006/0279522 A1 | 12/2006 | Kurihara |
| 2007/0064108 A1 | 3/2007 | Haler |
| 2007/0080585 A1 | 4/2007 | Lyu |
| 2007/0086097 A1 | 4/2007 | Motomiya et al. |
| 2007/0183037 A1 | 8/2007 | De Boer et al. |
| 2007/0262732 A1 | 11/2007 | Shen |
| 2008/0042938 A1 | 2/2008 | Cok |
| 2009/0052003 A1 | 2/2009 | Schofield et al. |
| 2009/0096937 A1 | 4/2009 | Bauer et al. |
| 2009/0201137 A1 | 8/2009 | Weller et al. |
| 2009/0258221 A1 | 10/2009 | Diehl et al. |
| 2010/0245701 A1 | 9/2010 | Sato et al. |
| 2010/0246017 A1 | 9/2010 | Tonar et al. |
| 2010/0277786 A1 | 11/2010 | Anderson et al. |
| 2011/0166779 A1 | 7/2011 | McCarthy et al. |
| 2011/0273659 A1 | 11/2011 | Sobecki et al. |
| 2012/0203550 A1 | 8/2012 | Skiver et al. |
| 2012/0236152 A1 | 9/2012 | Wind et al. |
| 2013/0027952 A1 | 1/2013 | Lynam et al. |
| 2013/0229522 A1 | 9/2013 | Schofield et al. |

FOREIGN PATENT DOCUMENTS

| | | |
|---|---|---|
| DE | 941408 | 4/1956 |
| DE | 944531 | 7/1956 |
| DE | 7323996 | 11/1973 |

(56) References Cited

FOREIGN PATENT DOCUMENTS

| | | |
|---|---|---|
| DE | 2808260 | 8/1979 |
| DE | 3248511 | 7/1984 |
| DE | 3301945 | 7/1984 |
| DE | 3614882 | 11/1987 |
| DE | 3720848 | 1/1989 |
| DE | 9306989.8 | 7/1993 |
| DE | 4329983 | 8/1995 |
| DE | 4444443 | 6/1996 |
| DE | 29703084 | 6/1997 |
| DE | 29805142 | 5/1998 |
| DE | 19741896 | 4/1999 |
| DE | 19755008 | 7/1999 |
| DE | 29902344 | 7/1999 |
| DE | 19934999 | 2/2001 |
| DE | 19943355 | 3/2001 |
| DE | 20118868 | 3/2002 |
| DE | 10131459 | 1/2003 |
| DE | 102005000650 | 7/2006 |
| EP | 0299509 | 1/1989 |
| EP | 0513476 | 11/1992 |
| EP | 0524766 | 1/1993 |
| EP | 0729864 | 12/1995 |
| EP | 0728618 | 8/1996 |
| EP | 0825477 | 2/1998 |
| EP | 0830985 | 3/1998 |
| EP | 0928723 | 7/1999 |
| EP | 937601 | 8/1999 |
| EP | 1075986 | 2/2001 |
| EP | 1097848 | 5/2001 |
| EP | 1152285 | 11/2001 |
| EP | 1193773 | 3/2002 |
| EP | 1256833 | 11/2002 |
| EP | 0899157 | 10/2004 |
| EP | 1315639 | 2/2006 |
| FR | 1021987 | 2/1953 |
| FR | 1461419 | 12/1966 |
| FR | 2585991 | 2/1987 |
| FR | 2672857 | 8/1992 |
| FR | 2673499 | 9/1992 |
| FR | 2759045 | 8/1998 |
| GB | 810010 | 3/1959 |
| GB | 934037 | 8/1963 |
| GB | 1008411 | 10/1965 |
| GB | 1136134 | 12/1968 |
| GB | 1553376 | 9/1979 |
| GB | 2137573 | 10/1984 |
| GB | 2161440 | 1/1986 |
| GB | 2192370 | 1/1988 |
| GB | 2222991 | 3/1990 |
| GB | 2255539 | 11/1992 |
| GB | 2351055 | 12/2000 |
| GB | 2362494 | 11/2001 |
| JP | 50-000638 | 1/1975 |
| JP | 52-146988 | 11/1977 |
| JP | 55-039843 | 3/1980 |
| JP | 57-30639 | 2/1982 |
| JP | 57-102602 | 6/1982 |
| JP | 57-208530 | 12/1982 |
| JP | 58-02954 | 2/1983 |
| JP | 58-030729 | 2/1983 |
| JP | 58-110334 | 6/1983 |
| JP | 58-180347 | 10/1983 |
| JP | 58-209635 | 12/1983 |
| JP | 59-114139 | 7/1984 |
| JP | 60-212730 | 10/1985 |
| JP | 60-261275 | 12/1985 |
| JP | 61-127186 | 6/1986 |
| JP | 61-260217 | 11/1986 |
| JP | 62-043543 | 2/1987 |
| JP | 62-075619 | 4/1987 |
| JP | 62-122487 | 6/1987 |
| JP | 62-131232 | 6/1987 |
| JP | 63-02753 | 1/1988 |
| JP | 63-085525 | 4/1988 |
| JP | 63-106730 | 5/1988 |
| JP | 63-106731 | 5/1988 |
| JP | 63-274286 | 11/1988 |
| JP | 64-14700 | 1/1989 |
| JP | 01-123587 | 5/1989 |
| JP | 01-130578 | 5/1989 |
| JP | 02-122844 | 10/1990 |
| JP | 03-028947 | 3/1991 |
| JP | 03-28947 | 3/1991 |
| JP | 03-052097 | 3/1991 |
| JP | 30-061192 | 3/1991 |
| JP | 03-110855 | 5/1991 |
| JP | 03-198026 | 8/1991 |
| JP | 03-243914 | 10/1991 |
| JP | 04-114587 | 4/1992 |
| JP | 04-245886 | 9/1992 |
| JP | 05-080716 | 4/1993 |
| JP | 05-183194 | 7/1993 |
| JP | 05-213113 | 8/1993 |
| JP | 05-257142 | 10/1993 |
| JP | 60-80953 | 3/1994 |
| JP | 61-07035 | 4/1994 |
| JP | 62-27318 | 8/1994 |
| JP | 06-318734 | 11/1994 |
| JP | 07-146467 | 6/1995 |
| JP | 07-175035 | 7/1995 |
| JP | 07-191311 | 7/1995 |
| JP | 07-266928 | 10/1995 |
| JP | 07-267002 | 10/1995 |
| JP | 07-277072 | 10/1995 |
| JP | 07-281150 | 10/1995 |
| JP | 07-281185 | 10/1995 |
| JP | 08-008083 | 1/1996 |
| JP | 08-083581 | 3/1996 |
| JP | 08-216789 | 8/1996 |
| JP | 08-227769 | 9/1996 |
| JP | 09-033886 | 2/1997 |
| JP | 09-260074 | 3/1997 |
| JP | 05-077657 | 7/1997 |
| JP | 09-220976 | 8/1997 |
| JP | 09-230827 | 9/1997 |
| JP | 09-266078 | 10/1997 |
| JP | 09-288262 | 11/1997 |
| JP | 10-076880 | 3/1998 |
| JP | 10-190960 | 7/1998 |
| JP | 10-199480 | 7/1998 |
| JP | 10-206643 | 8/1998 |
| JP | 10-221692 | 8/1998 |
| JP | 10-239659 | 9/1998 |
| JP | 10-276298 | 10/1998 |
| JP | 11-038381 | 2/1999 |
| JP | 11-067485 | 3/1999 |
| JP | 11-078693 | 3/1999 |
| JP | 11-109337 | 4/1999 |
| JP | 11-160539 | 6/1999 |
| JP | 11-212073 | 8/1999 |
| JP | 11-283759 | 10/1999 |
| JP | 11-298058 | 10/1999 |
| JP | 11-305197 | 11/1999 |
| JP | 2000-131681 | 5/2000 |
| JP | 2000-153736 | 6/2000 |
| JP | 2000-159014 | 6/2000 |
| JP | 2000-255321 | 9/2000 |
| JP | 2000-330107 | 11/2000 |
| JP | 2001-083509 | 3/2001 |
| JP | 2001-097116 | 4/2001 |
| JP | 2001-222005 | 8/2001 |
| JP | 2002-072901 | 3/2002 |
| JP | 2002-120649 | 4/2002 |
| JP | 2002-122860 | 4/2002 |
| JP | 2002-162626 | 6/2002 |
| JP | 2002-352611 | 12/2002 |
| JP | 2003-182454 | 3/2003 |
| JP | 2003-267129 | 9/2003 |
| JP | 2004-182156 | 7/2004 |
| JP | 2005-148119 | 6/2005 |
| JP | 2005/280526 | 10/2005 |
| JP | 2005-327600 | 11/2005 |
| JP | 38-46073 | 11/2006 |
| JP | 2008/083657 | 4/2008 |

(56) References Cited

FOREIGN PATENT DOCUMENTS

| | | |
|---|---|---|
| KR | 20060038856 | 5/2006 |
| KR | 100663930 | 1/2007 |
| KR | 20090031998 | 3/2009 |
| WO | WO 1982/002448 | 7/1982 |
| WO | WO 1986/006179 | 10/1986 |
| WO | WO 1994/019212 | 9/1994 |
| WO | WO 1996/021581 | 7/1996 |
| WO | WO 1998/014974 | 4/1998 |
| WO | WO 1998/038547 | 9/1998 |
| WO | WO 1999/015360 | 4/1999 |
| WO | WO 2000/023826 | 4/2000 |
| WO | WO 2000/052661 | 9/2000 |
| WO | WO 2000/055685 | 9/2000 |
| WO | WO 2001/001192 | 1/2001 |
| WO | WO 2002/018174 | 3/2002 |
| WO | WO 2002/049881 | 6/2002 |
| WO | WO 2003/021343 | 3/2003 |
| WO | WO 2003/078941 | 9/2003 |

OTHER PUBLICATIONS

Edgar, Julian; Goodbye 12 Volts . . . Hello 42 Volts!; Oct. 5, 1999; Autospeed 50; Issue 50; www.autospeed.co.nz/cms/A_0319/article.html.

Kobe, Gerry; 42 Volts Goes Underhood; Mar. 2000; Automotive Industries; Cahners Publishing Company; www.findarticles.com/p/articles/mi_m3012/is_3_180/ai_61361677.

Jewett, Dale; Aug. 2000; Automotive Industries; Cahners Publishing Company; www.findarticles.com/p/articles/mi_m3012/is_8_180ai_64341779.

National Semiconductor, LM78S40, Universal Switching Regulator Subsystem, National Semiconductor Corporation, Apr. 1996, p. 6.

Dana H. Ballard and Christopher M. Brown, Computer Vision, Prentice-Hall, Englewood Cliffs, New Jersey, 5 pages, 1982.

G. Wang, D. Renshaw, P.B. Denyer and M. Lu, CMOS Video Cameras, article, 1991,4 pages, University of Edinburgh, UK.

N.R. Lynam, "Electrochromic Automotive Day/Night Mirror." *SAE Technical Paper Series*, 870636 (1987).

N.R. Lynam, "Smart Windows for Automobiles," *SAE Technical Paper Series*, 900419 (1990).

N.R. Lynam and A. Agrawal, "Automotive Applications of Chromogenic Materials," from *Large Area Chromogenics: Materials and Devices for Transmittance Control*, C.M. Lampert and C.G. Granquist,. EDS, Optical Engineering Press, Washington (1990).

Kobe, Gerry, "Hypnotic Wizardry! (interior electronics)," *Automotive Industries*, vol. 169, No. 5, p. 60, published May 1989. Relevant section is entitled "Instrumentation."

C.M. Lampert, "Electrochromic Materials and Devices for Energy Efficient Windows", *Solar Energy Mat'ls*, 11, 1-27 (1984).

"Combination of rain sensing, autolamps and telephone antenna in one module," Research Disclosure, Kenneth Mason Publications, Hampshire, GB No. 412, Aug. 1998 (Aug. 1998), p. 1045XP-000824825.

\* cited by examiner

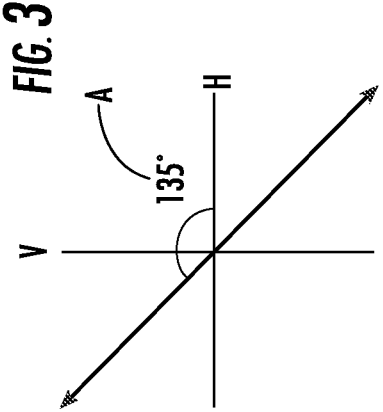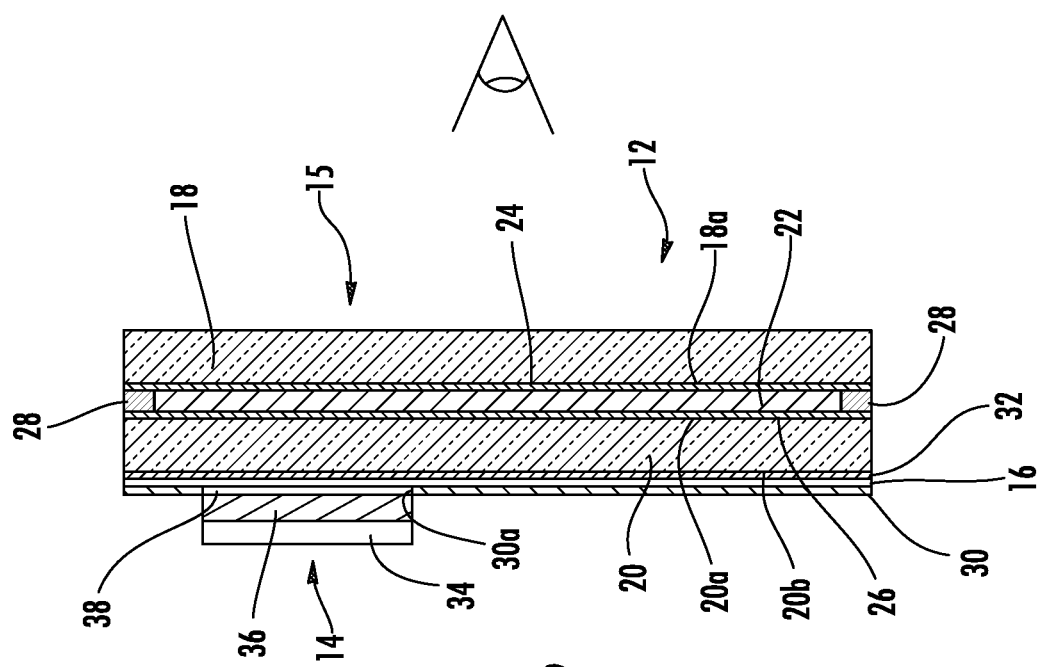

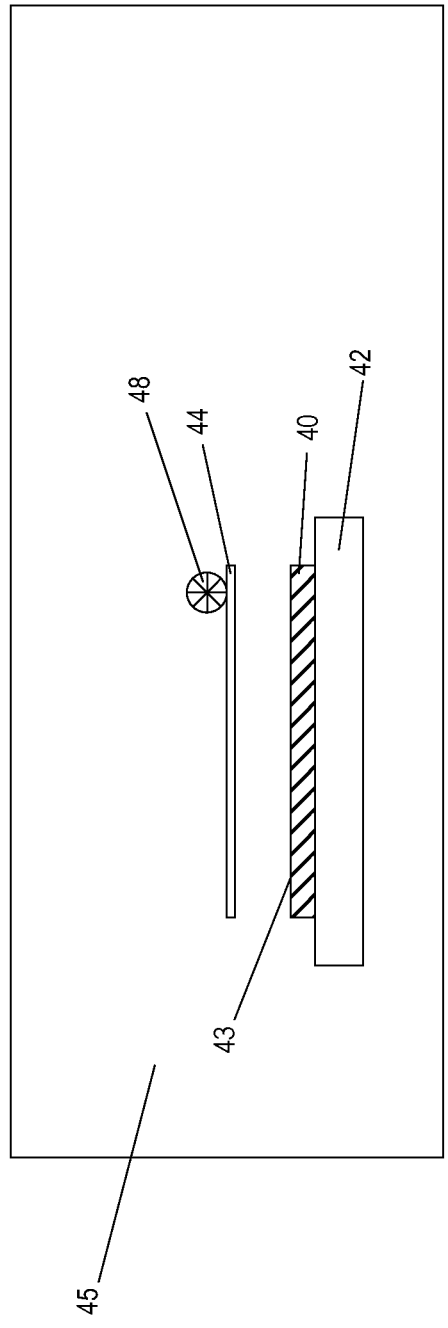 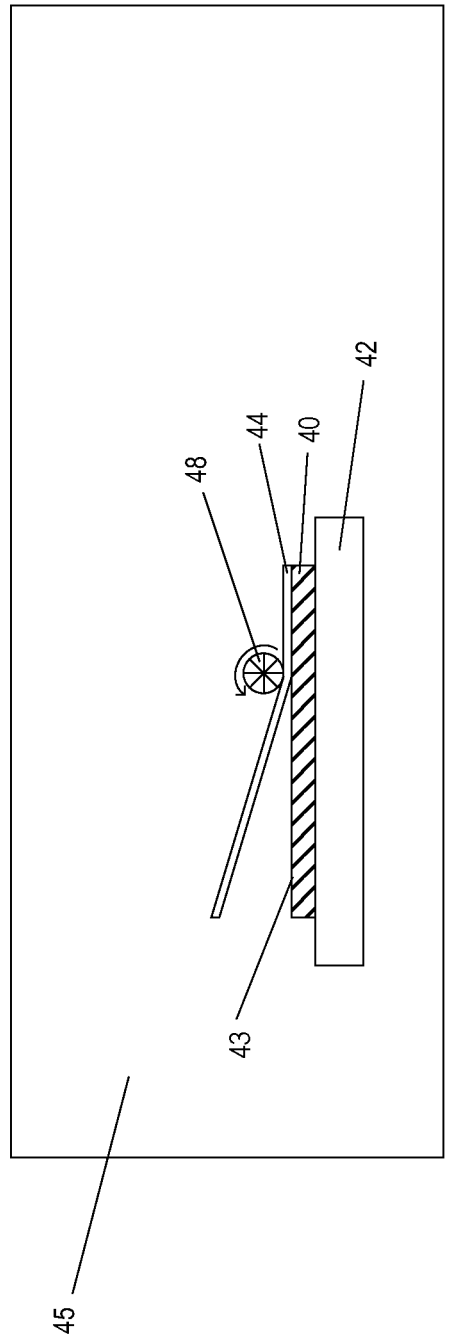
FIG. 5A
FIG. 5B

Tran Data for: EC1 EC cell with Film1

| WL. | 0 | 5 | 10 | 15 | 20 | 25 | 30 | 35 | 40 | 45 |
|---|---|---|---|---|---|---|---|---|---|---|
| 380 | 3.5 | 11.9 | 19.9 | 25.6 | 28.8 | 30.9 | 33.9 | 35.4 | 36.2 | 37.2 |
| 430 | 37.2 | 37.2 | 37.8 | 38.9 | 41.3 | 41.2 | 42.1 | 41.6 | 42.7 | 41.1 |
| 480 | 37.5 | 37.6 | 38.1 | 38.6 | 38.7 | 38.5 | 38.7 | 40.7 | 38.6 | 40.1 |
| 530 | 38.5 | 39.4 | 38.6 | 39.9 | 39.1 | 44.3 | 39.5 | 42.2 | 40.5 | 43.8 |
| 580 | 42.4 | 43.8 | 43.6 | 43.9 | 42.0 | 42.3 | 40.7 | 41.0 | 40.8 | 39.7 |
| 630 | 39.7 | 40.3 | 40.1 | 40.2 | 39.5 | 40.6 | 40.5 | 39.6 | 39.7 | 38.5 |
| 680 | 41.5 | 39.0 | 37.6 | 41.2 | 36.9 | 37.5 | 36.4 | 36.2 | 35.5 | 35.5 |
| 730 | 36.2 | 36.0 | 36.1 | 35.2 | 36.8 | 35.2 | 37.1 | 34.8 | 35.3 | 34.1 |
| 780 | 40.4 | 34.1 | 37.0 | 32.0 | 32.7 | 32.8 | 32.3 | 33.2 | 31.6 | 31.8 |
| 830 | 33.0 | 31.0 | 30.9 | 32.3 | 34.9 | 30.0 | 33.4 | 35.8 | 37.0 | 38.3 |
| 880 | 38.9 | 38.7 | 38.0 | 37.0 | 36.4 | 36.2 | 36.0 | 35.8 | 35.2 | 34.3 |
| 930 | 33.2 | 32.3 | 31.8 | 31.5 | 31.3 | 31.1 | 31.0 | 31.0 | 31.1 | 31.3 |
| 980 | 31.4 | 31.6 | 31.6 | 31.5 | 31.7 | | | | | |

Instrument Settings
Response = 0.5 sec
Slit Wth = 2.0 nm
Speed = 480.0nm/sec

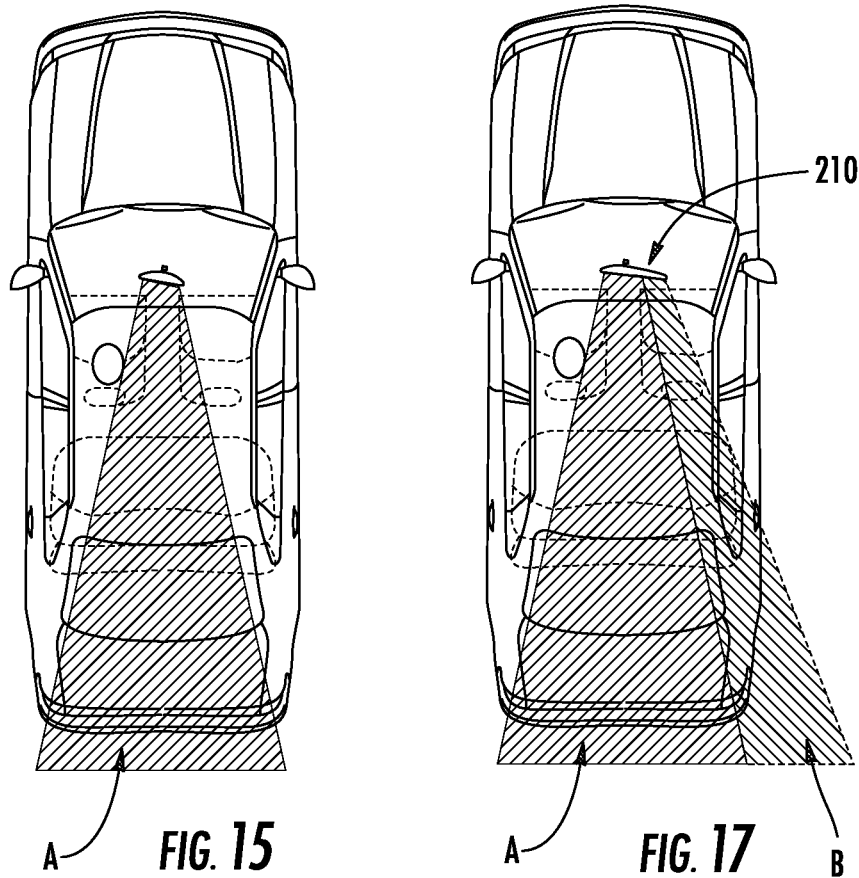
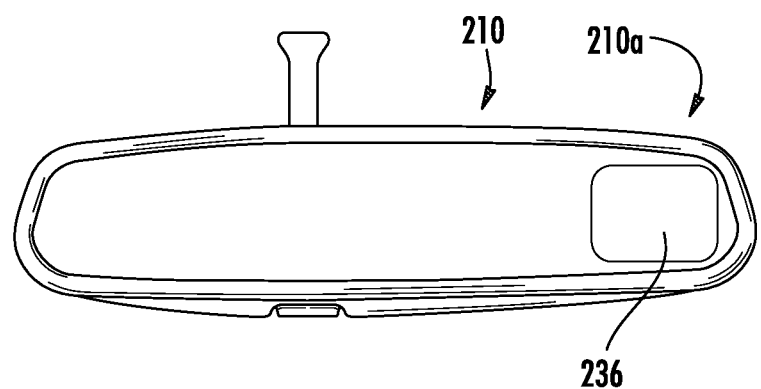

| Outdoor | Illuminance (lux) | Luminance (cd m$^{-2}$) |
|---|---|---|
| Bright sun | 50K - 100K | 3K - 6K |
| Hazy day | 25K - 50K | 1.5K - 3K |
| Cloudy bright | 10K - 25K | 600 - 1.5K |
| Cloudy dull | 2K - 10K | 120 - 600 |
| Very dull | 100 - 2K | 6 - 120 |
| Sunset | 1 - 100 | 0.06 - 6 |
| Full moon | 0.01 - 0.1 | 0.0006 - 0.006 |
| Starlight | 0.001 - 0.001 | 0.000006 - 0.00006 |
| Indoor | Illuminance (lux) | Luminance (cd m$^{-2}$) |
| Operating theatre | 5K - 10K | 300 - 600 |
| Shop windows | 1K - 5K | 60 - 300 |
| Drawing office | 300 - 500 | 18 - 30 |
| Office | 200 - 300 | 12 - 18 |
| Living rooms | 50 - 200 | 3 - 12 |
| Corridors | 50 - 100 | 3 - 6 |
| Good street light | 20 | 1.2 |
| Poor street lighting | 0.1 | .006 |

FIG. 21

Typical field brightness

| Field brightness (cd m$^{-2}$) | Condition |
|---|---|
| 30 | subdued indoor lighting |
| 60 | display only workplaces |
| 120 | typical office |
| 240 | bright indoor office |
| 480 | very bright, precision indoor tasks |
| 960 | usual outdoors |
| 1920 | bright afternoon |

FIG. 22

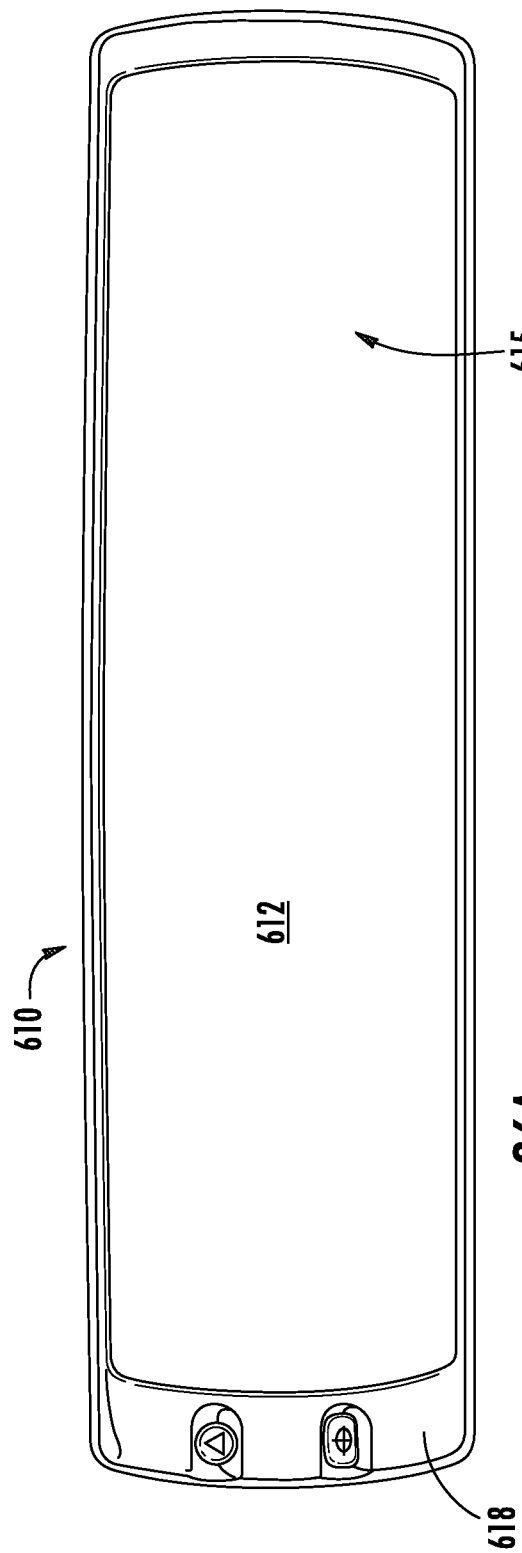
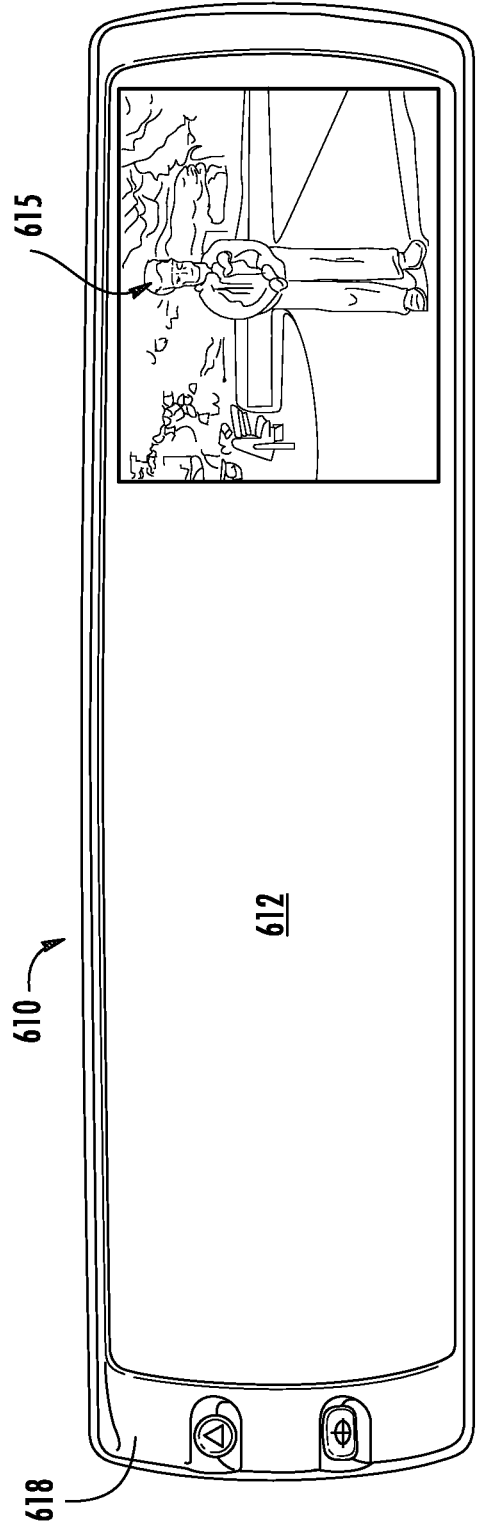
FIG. 26A
FIG. 26B

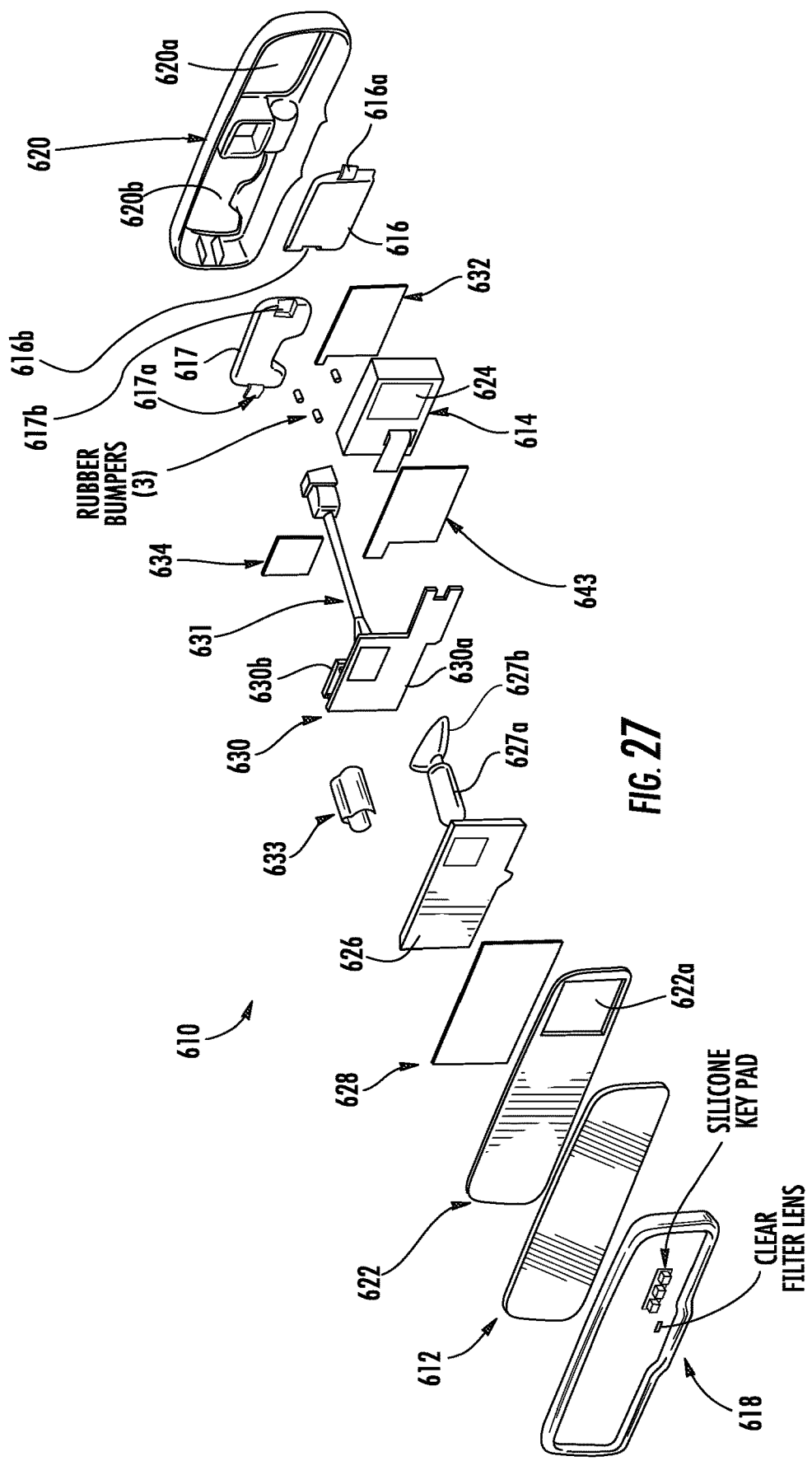

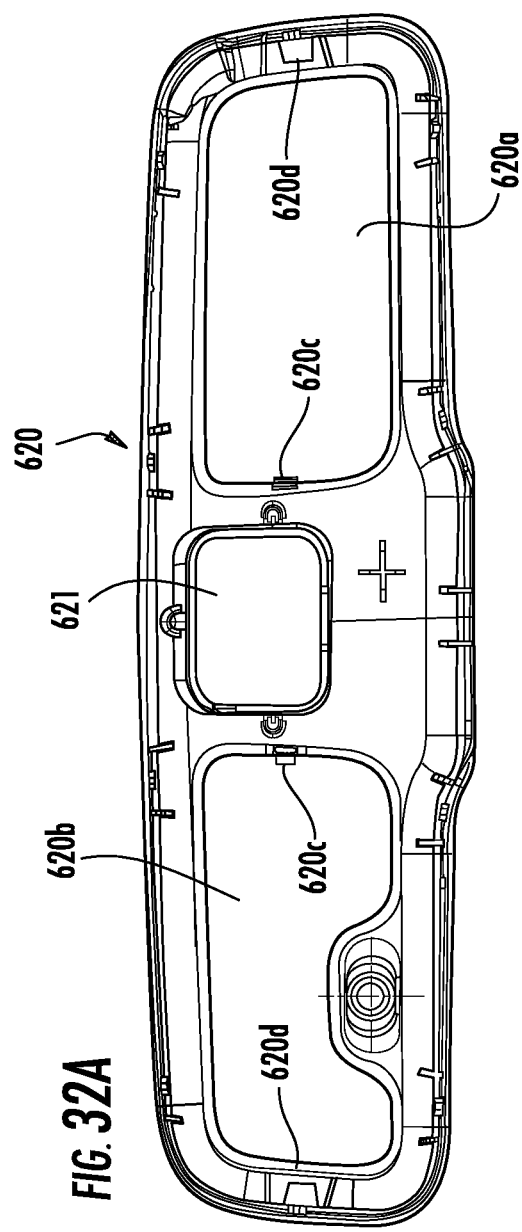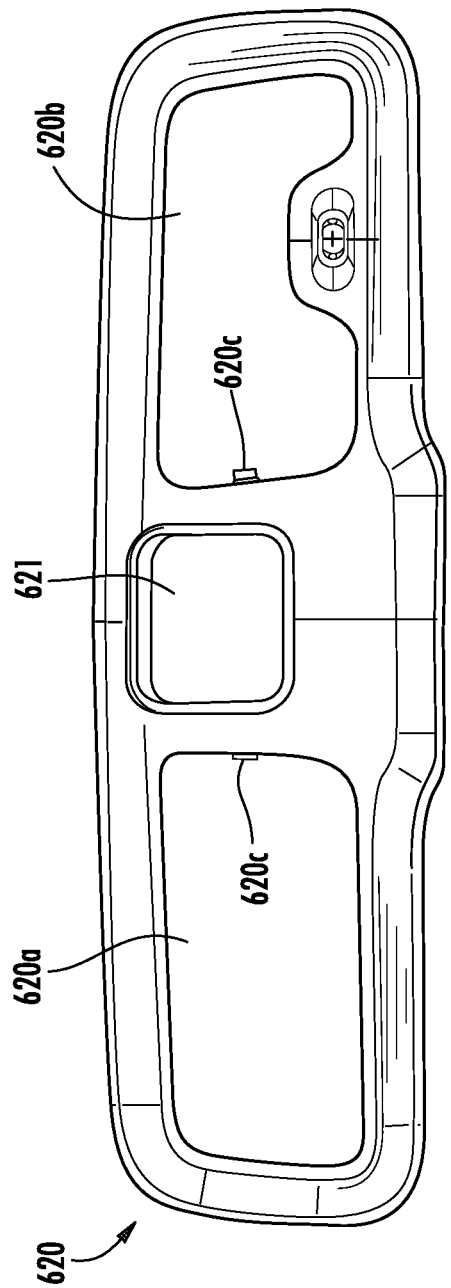
FIG. 32A
FIG. 32B

VEHICULAR VISION SYSTEM

CROSS REFERENCE TO RELATED APPLICATIONS

The present application is a continuation of U.S. patent application Ser. No. 16/105,246, filed Aug. 20, 2018, now U.S. Pat. No. 10,239,457, which is a continuation of U.S. patent application Ser. No. 15/803,947, filed Nov. 6, 2017, now U.S. Pat. No. 10,053,013, which is a continuation of U.S. patent application Ser. No. 14/694,225, filed Apr. 23, 2015, now U.S. Pat. No. 9,809,171, which is a continuation of U.S. patent application Ser. No. 12/405,558, filed Mar. 17, 2009, now U.S. Pat. No. 9,019,090, which is a continuation of U.S. patent application Ser. No. 12/091,525, filed Apr. 25, 2008, now U.S. Pat. No. 7,855,755, which is a 371 national phase application of PCT Application No. PCT/US2006/042718, filed Oct. 31, 2006, which claims the benefit of U.S. provisional applications, Ser. No. 60/732,245, filed Nov. 1, 2005, Ser. No. 60/759,992, filed Jan. 18, 2006, and Ser. No. 60/836,219, filed Aug. 8, 2006, which are hereby incorporated herein by reference in their entireties.

FIELD OF THE INVENTION

The present invention relates to interior rearview mirror assemblies and, more particularly, to an interior rearview mirror assembly having a display device for viewing through the reflective element of the interior rearview mirror assembly.

BACKGROUND OF THE INVENTION

Conventional interior rearview mirrors for vehicles typically include a prismatic substrate having a first surface facing a viewer of the mirror who is seated in the vehicle and a second, reflecting surface (typically silver coated) opposite the first surface. Electrically variable reflectance mirrors may comprise electro-optic reflective element assemblies, which comprise a first or front substrate and a second or rear substrate (typically flat glass substrates) with an electro-optic medium (typically an electrochromic medium) disposed between the front substrate and the rear substrate. Visible light transmission through the electro-optic medium is controllable by applying an electrical voltage thereto. Such a twin substrate electro-optic element has four surfaces; a first surface frontmost on the front or first substrate and a second surface opposing the first surface and also on the first substrate. The rear or second substrate has a third surface and an opposing fourth surface. The second surface of the front substrate is commonly coated with a transparent electrical conductor, such as indium tin oxide. The third surface of the rear substrate is commonly coated with a metallic reflecting/electrical conductor, such as a layer of silver or of a silver alloy or a stack layer of ITO/Ag/ITO or the like, or it may be coated with a transparent electrical conductor, such as indium tin oxide, while the opposing surface of the second or rear substrate (the fourth surface) may be coated with a mirror reflector, such as silver metal layer. To form an electro-optical mirror element, the second surface of the front substrate is arranged opposing the third surface of the rear substrate and the electro-optic medium is disposed between the second surface of the front substrate and the third surface of the rear substrate. It is common to include a display device at the mirror assembly, such as rearward of the second or rear substrate and so behind its fourth surface so that its display image is viewable through the substrates by a person seated within the interior cabin of the vehicle (such as a driver of the vehicle) viewing the interior rearview mirror assembly when it is normally mounted to the windshield or to the header of the vehicle.

It is thus known to have a display device, such as a video display device capable of displaying a video image captured by a video imaging device, such as a video camera, disposed behind and visible through an interior rearview mirror element, such as, for example, displays of the types disclosed in U.S. Pat. Nos. 5,668,663; 5,724,187; 5,956,181 and 6,690,268, which are hereby incorporated herein by reference in their entireties. It is thus known to have a covert display device (a.k.a. a display-on-demand display device), such as a covert video display device, disposed behind and thus visible through a transflective interior rearview mirror element, such as an electrochromic transflective interior rearview mirror element, such as the types described in U.S. Pat. Nos. 5,668,663; 5,724,187 and 6,690,268, which are hereby incorporated herein by reference in their entireties.

It has also been suggested to use a polymeric transflective film or layer or element at the fourth surface of a rearview mirror reflective element. For example, it has been suggested that an all-polymeric film or element that is both significantly reflecting and substantially transmitting, such as PRM material such as described in U.S. Pat. No. 5,724,187, which is hereby incorporated herein by reference in its entirety, or a polymer-based film having reflective properties, such as the multilayer reflective film described in U.S. Pat. No. 6,352,761; and/or U.S. Pat. Pub. No. US 2005/0174645, published Aug. 11, 2005 which are hereby incorporated herein by reference in their entireties, be used as a mirror reflector in an automotive rearview mirror. Such an all-polymeric specular mirror film is available from 3M of Minneapolis, Minn. under the tradename Vikuiti™ Enhanced Specular Reflector Film (ESR), which consists of over 300 polymers layers of different refractive (typically alternating) indexes that create a mirror finish.

However, successful commercialization of covert video displays that are disposed behind and whose presence behind the mirror reflector is principally visible/discernible to the driver or other occupant of the vehicle only when the display image is actuated has hitherto been impaired by display image washout during higher ambient lighting conditions, such as daylight lighting conditions, particularly on a sunny day. Therefore, there is a need in the art for an improved covert video imaging display device for an interior rearview mirror assembly of a vehicle that overcomes shortcomings of the prior art.

SUMMARY OF THE INVENTION

The present invention provides an interior electro-optical rearview mirror assembly with a video display (or other display) at or behind the rearmost or fourth surface of an electro-optical (EO) variable reflectivity element of the mirror assembly, whereby the display is viewable through the electro-optical element by a person viewing the interior rearview mirror assembly.

According to an aspect of the present invention, an electro-optical (EO) variable reflectivity element of the mirror assembly preferably comprises a front (first) and a rear (second) substrate have (counting from the frontmost surface of the front substrate) a first surface, a second surface, a third surface and a fourth surface. The EO medium [preferably an electrochromic (EC) medium] is disposed between the second surface of the front substrate and the third surface of the rear substrate. Preferably, a high transmitting/high electrical conducting transparent conducting coating is coated onto the second surface of the front substrate and onto the third surface of the third surface of the rear substrate so light transmission through the front and rear substrates with the EO medium therebetween but with the EC medium in its high light transmitting or bleached state (commonly its unpowered state) is optimized or maximized. A significantly visible light reflecting and significantly visible light transmitting and significantly visible light polarizing element or film is disposed behind the fourth surface of the EC element and preferably contacts, and most preferably is optically coupled to, the fourth (rearmost) surface (which typically is glass with a refractive index of about 1.52, as measured at the Sodium D line). This visible light transflecting/polarizing element or film (that preferably is an all-polymeric construction comprising hundreds of individual very thin polymer layers one on top of another and with different, often alternating, refractive indexes) polarizes (preferably linearly polarizes) visible light passing therethrough and also substantially reflects visible light incident thereon [preferably having a visible light reflectivity of at least about 50 percent reflectance (as measured in accordance with SAE J964a, which is hereby incorporated herein by reference in its entirety), more preferably having a visible light reflectivity of at least about 60 percent reflectance of light incident thereon and most preferably having a visible light reflectivity of at least about 70 percent reflectance of light incident thereon] and also having at least about 25% T transmission to visible light (as measured in accordance with SAE J964a), more preferably at least about 35% T and most preferably at least about 45% T, but preferably having a transmissivity to visible light of less than about 60% T (as measured in accordance with SAE J964a).

According to another aspect of the present invention, a video display device (or other display device) is disposed behind the visible light transflecting/polarizing element or film. The video display device comprises a video screen element and a backlighting element. The video screen element preferably attaches to (and most preferably optically couples with) the rear of the visible light transflecting/polarizing element (when the visible light transflecting/polarizing element is attached to and/or disposed behind the fourth surface of the EC element). The backlighting element is disposed to the rear of the video screen so that visible (or other) light emitted from the backlighting element (when it is electrically powered) passes through the video screen element. Preferably, the video screen polarizes this light (more preferably linearly polarizes) along a light polarization axis that substantially matches the principal light polarization axis of the visible light transflecting/polarizing element. Also, the video screen element and visible light transflecting/polarizing element are mutually orientated/arranged so that their principal light polarization axes are at least substantially parallel so as to maximize transmission of polarized light through such combination. Thus, light emitted from the backlighting element and passing through the video screen element is substantially transmitted through the visible light transflecting/polarizing element (and thus is substantially viewable to the driver through the electro-optical element), while visible light incident on the mirror assembly from the rear of the vehicle (that passes through the electro-optical element) is significantly reflected back to the driver of the vehicle by the visible light transflecting/polarizing element.

According to another aspect of the present invention, an interior electro-optic rearview mirror assembly for a vehicle includes a reflective element having a rear (fourth) surface having a reflective layer thereat and a display element at the rear surface of the reflective element. The reflective element includes a visible light transflecting/polarizing element at the rear surface of the reflective element at a display opening or window formed in the reflective layer of the reflective element. A backlit video display element is disposed at the window formed at the reflective layer. The visible light transflecting/polarizing element or film is disposed between the display element and the rear (fourth) surface of the reflective element.

The display element preferably comprises a polarizing display element, such as a thin film transistor (TFT) liquid crystal display (LCD) video display element, and includes an illumination source for backlighting or emitting illumination through the TFT LCD video display element. The visible light transflecting/polarizing element is disposed so that the polarizing angle or axis of the visible light transflecting/polarizing element is substantially similar to the polarizing angle or axis of the polarizing display element.

According to another aspect of the present invention, an interior rearview mirror assembly includes a display disposed behind the reflective element so as to display information through the reflective element for viewing by the driver of the vehicle. The mirror assembly includes a thermal conducting element or heat sink or heat dissipating device or element disposed at and in substantial or intimate contact with the display device or element, whereby heat generated by the display device during operation thereof is drawn away from the display device by the thermally conducting element and to an exterior of the mirror assembly, where the heat may be dissipated at or to the rear of the mirror assembly and outside of the mirror assembly. The thermally conducting element may be exposed at the rear mirror casing, and may be exposed in a manner whereby the thermally conducting element is not readily discernible to a person viewing the mirror casing, such as by a person viewing the mirror casing from outside the vehicle and through the vehicle windshield when the mirror assembly is mounted at the vehicle, such as at an interior surface of the vehicle windshield.

Therefore, an aspect of the present invention provides an interior electro-optic (such as an electrochromic) rearview mirror assembly with a backlit display element and may include a visible light transflecting/polarizing element or film disposed at a rear surface or fourth surface of the electro-optical element. The visible light transflecting/polarizing element or film functions to allow substantial transmissivity of at least partially polarized light from the display element to pass through the electro-optical element for viewing by a person (such as a driver of the vehicle) viewing the mirror assembly, while providing a desired degree of reflectance of light incident on the reflective element so that the driver can use the electro-optic mirror to see rearward when driving on a highway. The display information (such as a video display of the area immediately to the rear of the vehicle as captured by a video camera mounted, such as at a rear license plate holder, at the rear of the vehicle so as to display to the driver when he/she may be reversing the vehicle any obstacles or persons immediately to the rear of the vehicle) thus may be readily viewable through and at the reflective element when the display element is activated or energized, but the display element and display area is substantially not readily viewable or not discernible by a person viewing the reflective element when the display element is deactivated or de-energized so as to be substantially covert. The display element may comprise a TFT LCD video display element and may at least partially linearly polarizes light passing therethrough, whereby the visible light transflecting/polarizing element or film is applied or disposed between the display element and the rear surface of the electro-optical element so that the polarization axes of the display element and of the visible light transflecting/polarizing element or film are generally or, preferably, substantially aligned. The reflective element and display of the present invention thus provides enhanced transmission of the illumination by the display element to reduce display image washout, while providing the desired degree of reflectivity of light incident on the reflective element. Optionally, and desirably, the mirror assembly may include a thermal conducting element in contact with the display element or display module and configured to draw heat from the display element or module and to dissipate the heat at an exterior area of the mirror assembly.

These and other objects, advantages, purposes and features of the present invention will become apparent upon review of the following specification in conjunction with the drawings.

BRIEF DESCRIPTION OF THE DRAWINGS

FIG. 2 is a sectional view of an electro-optic element for an interior rearview mirror assembly of the present invention, with a visible light transflecting/polarizing element or film disposed at a polarizing display element of the mirror assembly;

FIG. 3 is a schematic showing an exemplary polarizing angle of the display element and visible light transflecting/polarizing element or film of the present invention;

FIGS. 5A and 5B are schematics showing steps of a process suitable for manufacturing an electro-optic element in accordance with the present invention;

FIG. 15 is a plan view of a vehicle showing a field of view of a typical interior rearview mirror assembly;

FIG. 16 is a front elevation of an enlarged asymmetrical mirror assembly in accordance with the present invention;

FIG. 17 is a plan view of a vehicle showing the field of view of the mirror assembly of FIG. 16;

FIGS. 21 and 22 are charts indicating typical brightness or luminance of different lighting conditions;

FIG. 26A is a front elevation of a mirror assembly in accordance with the present invention, with the video display device deactivated;

FIG. 26B is a front elevation of the mirror assembly of FIG. 26A, with the video display device activated;

FIG. 27 is an exploded perspective view of a mirror assembly of the present invention;

FIG. 32A is an inside plan view of the rear mirror casing of the mirror assembly of FIG. 27;

FIG. 32B is an outside plan view of the rear mirror casing of FIG. 32A;

DESCRIPTION OF THE PREFERRED EMBODIMENTS

Figure 1:
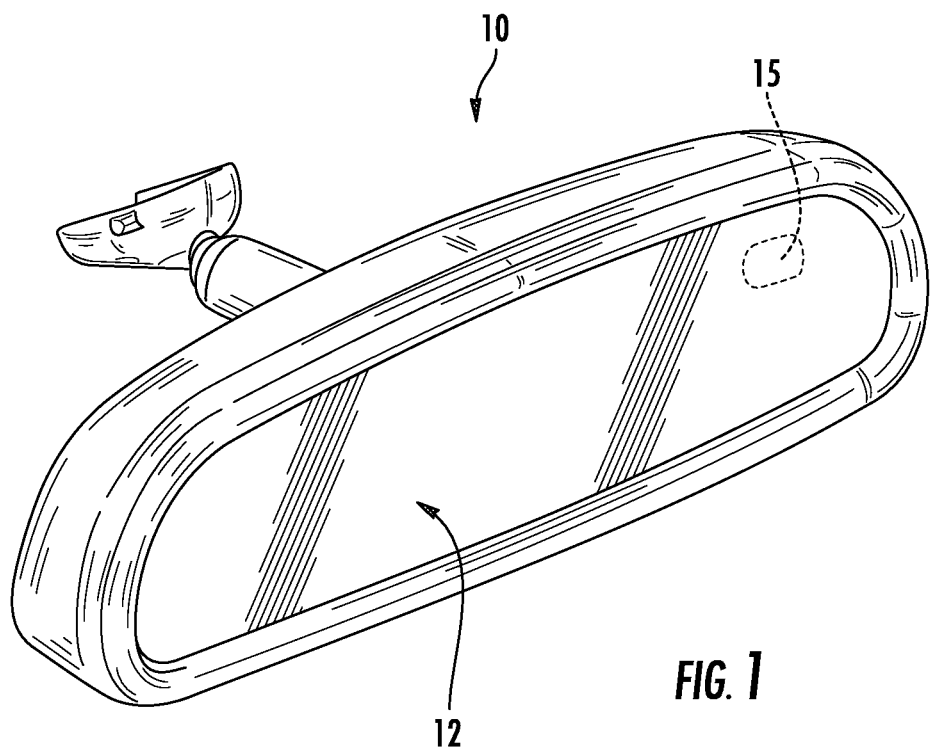
FIG. 1 is a perspective view of an interior rearview mirror assembly incorporating a display in accordance with the present invention.

Referring now to the drawings and the illustrative embodiments depicted therein, an interior rearview mirror assembly 10 for a vehicle includes an electro-optic element assembly or cell 12 and a display device 14 at a rear surface of the electro-optic element 12 for displaying information at a display area 15 of the reflective element (FIGS. 1 and 2). Display device 14 is disposed at the rear surface of the electro-optic element 12, with a visible light transflecting/ polarizing element or film or layer 16 disposed between the display device and the rear surface of the electro-optic element 12. Visible light transflecting/polarizing element or film 16 functions to substantially transmit polarized illumination emitted from the display device 14 that then passes through electro-optic element 12 while reflecting other substantially non-polarized illumination or light (typically sunlight by day or moonlight/vehicle headlamp lighting/street lighting and the like by night) that is incident on electro-optic element 12 from its front (first surface) when interior rearview mirror assembly 10 is mounted within the interior cabin of the vehicle. The visible light transflecting/polarizing element or film 16 thus provides a substantially reflective layer at the display area 15, while being transmissive of light or illumination emitted by display device 14, as discussed below.

In the illustrated embodiment, electro-optic element 12 of interior rearview mirror assembly 10 comprises an electro-optic element assembly or cell, such as an electrochromic element or cell. Electro-optic element assembly 12 includes a front substrate 18 and a rear substrate 20 spaced from front substrate 18 (with the substrates both being substantially light transmitting and fabricated from glass or from an optical plastic, such as acrylic or polycarbonate or CR39 or a COC olefin or the like). The electro-optic element 12 includes an electro-optic medium 22 (such as an electrochromic medium) and transparent conductive or semi-conductive layers 24, 26 (such as described below) sandwiched between the substrates 18, 20 (with the transparent conductive layer 24 disposed at a rear surface 18a of front substrate 18 [the second surface of the laminate electro-optical element] and the transparent conductive layer 26 disposed at the front surface 20a of rear substrate 20 [the third surface of the laminate electro-optical element]). Desirably, the conductive layers 24, 26 may be selected to be substantially transparent and with little or no polarization effect. For example, the conductive layers 24, 26 may comprise an indium tin oxide (ITO) material or a thin metallic layer sandwiched between two transparent conductive layers (a TC/M/TC stack of layers) such as ITO/Metal/ITO (for example, ITO/Ag/ITO) or a doped tin oxide or a doped zinc oxide or the like, so as to provide the desired conductivity and transparency at the second and third surfaces of the fourth surface reflector reflective element or cell. An electrical sheet resistance of less than about 20 ohms/square is preferred for such transparent conductor layers; more preferably less than about 15 ohms/square and most preferably less than about 10 ohms/square, while visible light transmission through such transparent conductive coated substrates is preferably at least about 70% T, more preferable at least about 75% T and most preferably is at least about 80% T. An epoxy seal material 28 or the like is applied between the substrates to define the cavity for the electrochromic medium and to adhere the substrates together.

The electro-optic optic element 12 is configured and constructed so that visible light passing therethrough is substantially to wholly unchanged in its light polarization character. Thus, unpolarized light incident on the front substrate and passing through the front substrate and through the electro-optic medium and through the rear substrate exits the rear substrate still substantially or wholly unpolarized, and does so regardless of whether the electro-optical medium is in its clear or bleached or day high light transmitting state (for automotive mirrors, typically its non-electrically powered state) or whether the electro-optical medium is in its dimmed or anti-glare or darkened, reduced light transmitting state (for automotive mirrors, typically its electrically powered state). And polarized light (such as linearly polarized light or circularly polarized light or elliptically polarized light) incident on the rear substrate and passing through the rear substrate and through the electro-optic medium and through the front substrate exits the front substrate still substantially or wholly polarized, and does so regardless of whether the electro-optical medium is in its clear or bleached or day high light transmitting state (for automotive mirrors, typically its non-electrically powered state) or whether the electro-optical medium is in its dimmed or anti-glare or darkened, reduced light transmitting state (for automotive mirrors, typically its electrically powered state). Thus, electrochromic media and constructions are preferred for electro-optic element 12. Liquid crystal electro-optical media and constructions (such are disclosed in the likes of WO 2005/050267 or U.S. Pat. Publication No. US 2005/0185278, published Aug. 25, 2005, which are hereby incorporated herein by reference in their entireties) that change the state of polarization of light passing therethrough by use of the likes of a cholesteric liquid crystal electro-optic medium 22 are not suited to the present invention.

Electro-optic element 12 has a reflector at its fourth surface (20b) and may include an opaque and/or reflective backing layer or film 30 at its rear or fourth surface. In the illustrated embodiment of FIG. 2, backing layer 30 is disposed at a rear surface of the polarizing transflective polymeric film 16. The backing layer 30 has a window or opening or cut-out or aperture 30a formed therethrough so that display device 14 may be operable to emit illumination or light through the window and through the electro-optical element 12 for viewing by a person viewing the interior rearview mirror assembly. Window 30a through backing layer 30 thus helps define the viewing area or display area 15 at the electro-optic element 12.

Visible light transflecting/polarizing element or film 16 is attached to the rear surface 20b of rear substrate 20, such as via an optical coupling layer 32, such as an optical adhesive, such as an acrylic or an acrylate or an epoxy or a urethane or the like. For example, the visible light transflecting/polarizing element or film 16 may be attached to the rear surface 20b of rear substrate 20 via an optical index matching adhesive, such as an optical epoxy or optical acrylic (such as by utilizing aspects of the reflective element described in U.S. patent application Ser. No. 10/993,302, filed Nov. 19, 2004, now U.S. Pat. No. 7,338,177, which is hereby incorporated herein by reference in its entirety). The visible light transflecting/polarizing element or film may comprise any suitable visible light transflecting/polarizing element or film, such as a polarizing reflective film commercially available from 3M of Minneapolis, Minn. under the brand name Vikuiti™, such as 3M Vikuiti™ Polarizing Reflective Film (BEF-RP or BEF-P) or the like. Such all-polymeric polarizing transflective films comprise hundreds of very thin alternating layers of polymer material of different refractive indexes. For example, the Vikuiti™ Dual Brightness Enhancement Films (DBEF) are a complex film consisting of over 800 polymer layers and are reflecting to visible light, are transmitting to visible light and are polarizing to visible light.

In the illustrated embodiment, display device 14 includes an illumination source(s) 34 that functions as a backlighting element for display element 36. Illumination source(s) 34 may comprise one or more light emitting diodes (LEDs) [such as a plurality of LEDs, such as high intensity LEDs of the types described in U.S. patent application Ser. No. 10/054,633, filed Jan. 22, 2002, now U.S. Pat. No. 7,195,381, which is hereby incorporated herein by reference in its entirety], or may comprise cold-cathode fluorescent sources, laser diode sources, electroluminescent sources, or the like, and may be electrically activatable or operable or energizable to backlight or illuminate the display element 36. Display element 36 may comprise a video display element, such as a thin film transistor (TFT) liquid crystal display (LCD) video screen or the like. The display device 14 is positioned at the rear surface of the reflective element and at the window 30a formed in or through the backing layer 30, so that the image displayed by display device 14 (such as a video image of a reversing event when the driver engages reverse gear) may be visible to the driver by he/she looking through the window 30a in backing layer 30 when he/she is viewing through the substrates 18, 20 while viewing the reflective element of the interior rearview mirror assembly. Preferably, the display element 36 is attached or adhered at the polarizing transflective polymeric film 16, such as by an optical coupling layer 38, such as an optical adhesive, such as the types described above. However, but less preferably, polarizing transflective polymeric film 16 may be spaced from and stood off from fourth surface 20b without any index matching layer or means.

Figure 4:
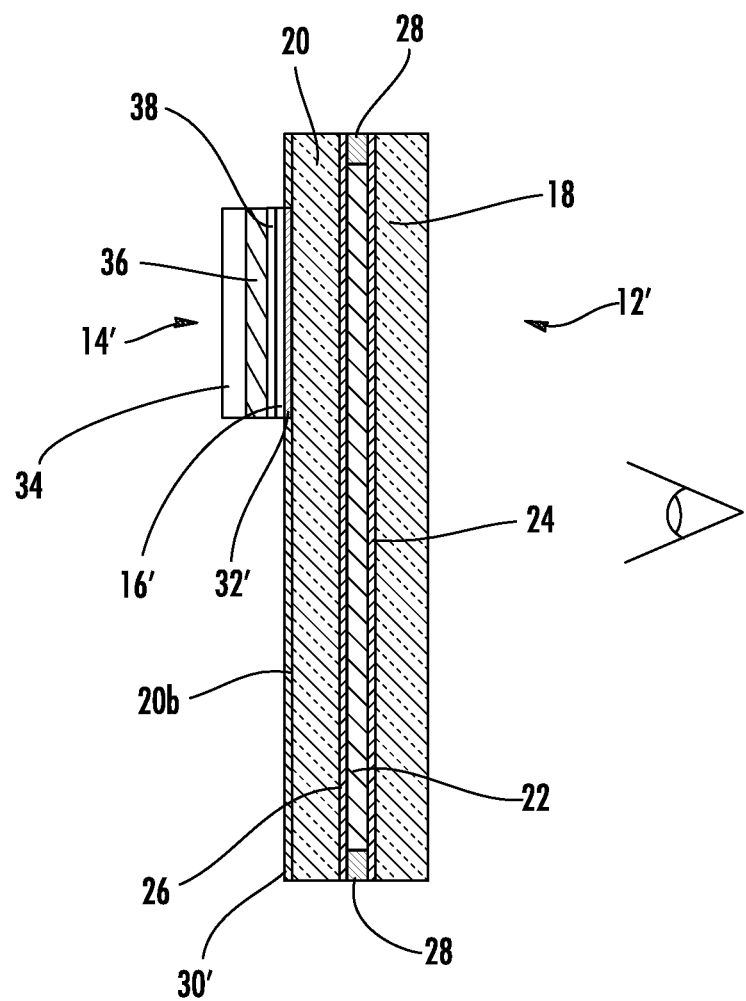
FIG. 4 is a sectional view of another electro-optic element for an interior rearview mirror assembly of the present invention.

Optionally, and as shown in FIG. 4, the backing layer 30' may be disposed at the rear, fourth surface 20b of rear substrate 20 of an electro-optic element 12' and the polarizing transflective polymeric film 16' may be disposed at the window region of the backing layer 30' and adhered to the rear surface 20a of rear substrate 20 via an optical coupling layer 32', such as an optical adhesive, such as acrylic or acrylate or epoxy or urethane or the like, such as described above and that has an refractive index of about 1.48 to about 1.55 and preferably, close to about 1.52. The display device 14' may be adhered or attached at the visible light transflecting/polarizing element or film 16', such as via an optical coupling layer 38', such as an optical adhesive or the like, such as described above. The display device 14' and electro-optic element 12' may be otherwise substantially similar to display device 14 and electro-optic element 12 discussed above, such that a detailed discussion of the display devices and electro-optic elements will not be repeated herein. The common features or elements or components of the display devices and electro-optic elements are shown in FIGS. 2 and 4 with the same reference numbers. The reflectance off the backing layer 30' in the construction as shown in FIG. 4 may be chosen so that the mirror reflectivity at the portion of the electro-optic element 12 where the display element is disposed is matched to that of the surrounding/other portions of the electro-optic element 12 where the display element is not disposed so that the covert presence of display device is best achieved when the display device is in its non-energized (non-light emitting) mode. By matching the reflectance seen by the driver at the display area to that of the surrounding non-display areas, the consumer is least aware of the overt presence of the video screen until it is powered so as to display its video image.

The electro-optic element, display device and polarizing transflective element of the present invention thus provides a transflective covert display (on-demand type of display) that is viewable by a person viewing the interior rearview mirror assembly on a sunny day when the display device is activated or energized, but that is generally non-viewable or non-discernible when viewed when the display device is deactivated or de-energized. Typically, it is desirable to have an electro-optical element/polarizing transflective element combination that has as high a visible light transmissivity as is possible so that the display image being displayed (when the backlighting element is actuated and is light emitting) is readily viewable to the driver, in order to reduce image washout during high ambient lighting conditions, such as typically occur on a sunny day. In this regard, visible light transmission through the electro-optical element (in its high transmission or bleached state) combined with the polarizing transflective element therebehind is preferably at least about 15% T (as measured in accordance with SAE J964a, which is hereby incorporated herein by reference in its entirety), more preferably is at least about 25% T and most preferably is at least about 35% T. However, if this combination is overly light transmitting and with the EC element in its bleached state (typically its unpowered state), then the covert presence of the likes of a video display element therebehind may be compromised and so it is preferable that light transmission through electro-optical element or cell 12 in combination with polarizing transflective polymeric film 16 be less than about 45% T, more preferably be less than about 40% T and most preferably be less than about 35% T. It is also desirable to select electro-optical element or cell 12 in combination with polarizing transflective polymeric film 16 to provide a desired degree of reflectance off the interior electro-rearview mirror of the present invention so that the driver can adequately use the mirror to provide a rearward view when driving on the highway. Thus the EO mirror assembly should deliver a reflectivity of at least 40% R (as measured using SAE J964a) of light incident thereon and more preferably, deliver to the driver a mirror reflectivity at least about 45% R and most preferably, deliver to the driver a mirror reflectivity at least about 55% R of light incident on the mirror reflective element, including at the display area of the reflective element.

There is typically a tension or challenge in optimizing or maximizing reflectance and transmissivity, since the greater the transmissivity of the transflective polarizing element, the more visible the display device may be when it is not activated or energized. By providing a backlit TFT LCD display element and a polarizing transflective layer or film at the rear of the reflective element, the present invention provides enhanced transmission of polarized light through the electro-optical element to be seen by the driver, while enabling enhanced reflectivity of the likes of sunlight or moonlight or urban street lighting incident on the electro-optical reflective mirror element of the interior mirror assembly that the driver relies on for his or her rearward driving task when using the interior mirror while driving.

Display screens of the display device [such as a TFT LCD video display element or the like] act as a polarizer (typically as a linear polarizer) to the light emitted by the illumination source or sources [such as light emitting diodes (LEDs), cold-cathode fluorescent sources, laser diode sources, electroluminescent sources or the like] that are backlighting the display screen. Thus, light emitted by the illumination source, when passed through the TFT LCD video display screen element, is partially or substantially linearly polarized by the TFT LCD video display element so that linearly polarized light (such as light that is substantially polarized along a particular angle or axis) is emitted by the display device. Thus, when the principal polarization axis of the polarizing transflective element is aligned so as to be substantially parallel with that of the light transmitted through the video screen, light transmission through the mirror assembly is optimized. Because the display illumination or light is polarized by the TFT LCD video display element, the display illumination intensity that would pass through polarizing transflective element would be reduced (in accordance with Malus's Law), unless the respective polarization axis are aligned. Correspondingly, daylight incident on the interior mirror during driving on the likes of a sunny day is largely unpolarized and so the use of a polarizing transflective element as the mirror reflector (at least at the portion of the interior mirror where the display element is disposed) helps reduce displayed image wash-out during day-time driving. Thus, by providing a visible light transflecting/polarizing element or film between the display element and the electro-optic element, the visible light transflecting/polarizing element or film (which is aligned or substantially aligned with the TFT LCD video display element such that its polarization axis or angle substantially matches the polarization axis or angle of the TFT LCD video display element, as discussed below) may be substantially transmitting for the polarized light emitted by the display device, yet may provide substantial reflectance to other light incident on the mirror reflective element during daytime driving. The present invention thus may provide a substantial visible light transmission and a significantly visible light reflectance at the display area of the interior mirror assembly. Although described as a linearly polarized device, it is envisioned that a similar approach could be taken for a circularly polarized display device or other forms or polarized light such as elliptically polarized light, while remaining within the spirit and scope of the present invention.

The visible light transflecting/polarizing element or film or layer material may be selected so as to provide a desired degree of reflectance of light incident thereon, such as at least approximately 50 percent reflectance of light incident thereon (as established via SAE J964a), more preferably at least approximately 55 percent reflectance of light incident thereon, more preferably at least approximately 60 percent reflectance of light incident thereon, and more preferably at least approximately 65 percent reflectance of light incident thereon. And visible light transmission through the visible light transflecting/polarizing element or film or layer material is preferably at least about 25% T (as measured in accordance with SAE J964a, which is hereby incorporated herein by reference in its entirety), more preferably is at least about 35% T and most preferably is at least about 45% T, but to help preserve the covert placement of the display device at the display area, visible light transmission through the visible light transflecting/polarizing element or film or layer material is preferably less than about 60% T, more preferably be less than about 55% T and most preferably be less than about 50% T. As in FIG. 2 (where the visible light transflecting/polarizing element is disposed substantially behind the entire fourth surface area of the electro-optic element 12), the visible light transflecting/polarizing element forms the mirror reflector. We find that the reflectance at the display area may be higher than that at the surrounding non-display area, and so the backing layer 30 may be adapted/configured to reflect light to any degree needed to increase reflectivity at the non-display area so as to better blend in the display area to the non-display area in order to enhance the covert placement of the display element at the display area. In the likes of the construction shown in FIG. 4 (where the visible light transflecting/polarizing element is disposed only behind the display area of the fourth surface area of the electro-optic element 12), backing layer 30' is principally light reflecting with its reflectivity chosen to match that at the display area (note that backing layer 30', that is disposed other than at the display area, may be a metallic thin film coating such as of chromium or titanium or ruthenium (or alloys thereof) or may be a thin film of silicon or a silicon alloy or may be a coated plastic film with its reflective properties chosen to achieve a match or substantial match in reflectivity between the display and non-display areas). If there is a desire to only moderately enhance reflectivity, use can be made of a thin reflecting coating (such as of Cr or Ti or Ru or Inconel or Hastelloy or Si) of physical thickness less than about 250 angstroms (i.e., less than about 25 nanometers) or lower (such as in the range of about 75 angstroms to about 150 angstroms) at other than at the display area. Or the likes of an interference reflector can be used [such as a transflective blue mirror multilayer reflector stack such as (from the glass surface) about a 44.78 nm layer of $TiO_2$ overcoated with about a 82.63 nm layer of $SiO_2$ overcoated with about a 48.59 nm layer of $TiO_2$; whereby such a second-surface coated glass substrate has a second-surface reflectivity of about 45 percent to about 50 percent or thereabouts, and a visible light transmission in excess of about 30 percent].

The display area thus may substantially match the reflectivity of the rest of the reflective area of the reflective element so that the display area is not readily discernible by a person viewing the interior rearview mirror assembly when the display element is deactivated or de-energized.

Figure 8:
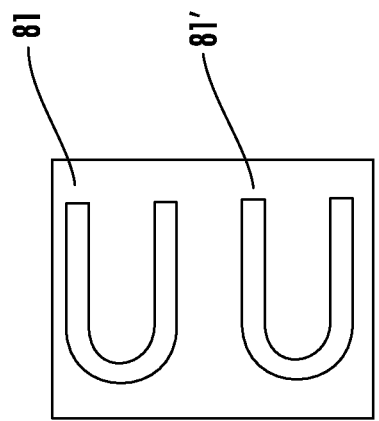
FIG. 8 is a plan view of the backlighting elements of the display device of FIG. 7.
Figure 7:
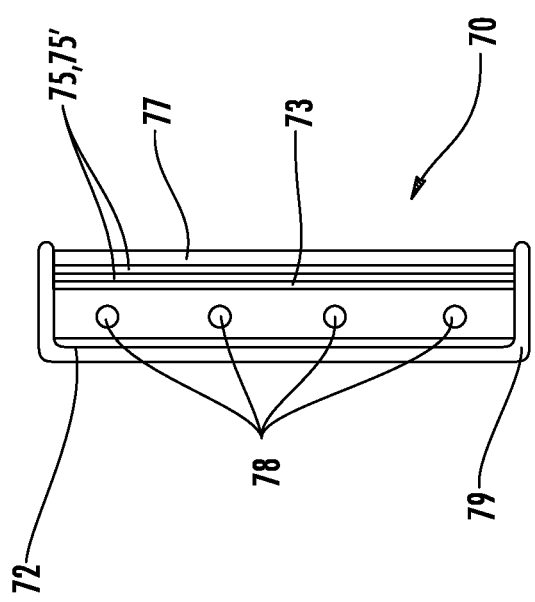
FIG. 7 is a sectional view of a display device useful with the mirror element of the present invention.

An exemplary display device for use with the present invention is shown in FIG. 7. Display device 70 comprises a video screen 77 (such as an Optrex 3.5 inch TFT LCD screen with extended temperature range LC fluid and higher temperature resisting polarizing films such that the LCD video screen can display video images, and resist exposure to, at least over a temperature range where automobiles may operate such as from about −20 degrees Celsius to about 85 degrees Celsius, or thereabouts) and a backlighting element 78 (such as two U-shaped cold cathode fluorescent light (CCFL) devices, as discussed below). Video screen 77 has a visible light transmission in the about 5% T to about 10% T range; more preferably in the about 10% T to about 15% T range, or higher. Brightness enhancement films 75, 75' (such as Vikuiti™ BEF films from 3M) and a light diffuser sheet 73 (such as a hazed or diffuse-light transmitting plastic diffuser or sheet) are provided between video screen 77 and backlighting element 78. As illustrated (and as can be seen with reference to FIG. 8), two cold cathode fluorescent light sources 81, 81' are used as backlighting for video screen 77. When measured by placing the video screen into a reflectometer and measuring in accordance with SAE J964a, the reflectance of the particular video screen 77 used was about 5% R (in general, it is preferable that this reflectance of the video screen be minimized, such as by use of anti-reflecting layers or elements, so that the reflectivity at the display area of the EO mirror transflective element best matches, and is not higher than, the reflectivity of the surrounding non-display area mirror reflector). A reflecting element 72 (such as a metal or metal coated reflector) is disposed behind the two cold cathode fluorescent light sources 81, 81'. A reflector housing or plastic housing 79 protects and houses the video screen and associated backlighting etc.

When combined with a non-polarizing laminate (two-substrate) electrochromic window cell using a solid polymer matrix EC medium and with ITO transparent conductors of about 12 to 15 ohms/square on the second and third surfaces that sandwich the EC medium, and with a Vikuiti™ polarizing transflective film between the video display screen and the fourth surface of the EC cell, a display luminance or brightness of about 907 Candelas/sq. meter was measured at the front (first) surface of the EC transflective mirror assembly [after about 5 minutes warm-up; about 736 Candelas/sq. meter was measured at the front (first) surface of the EC transflective mirror assembly within 30 seconds of powering CCFL sources 81, 81'].

Figure 9:
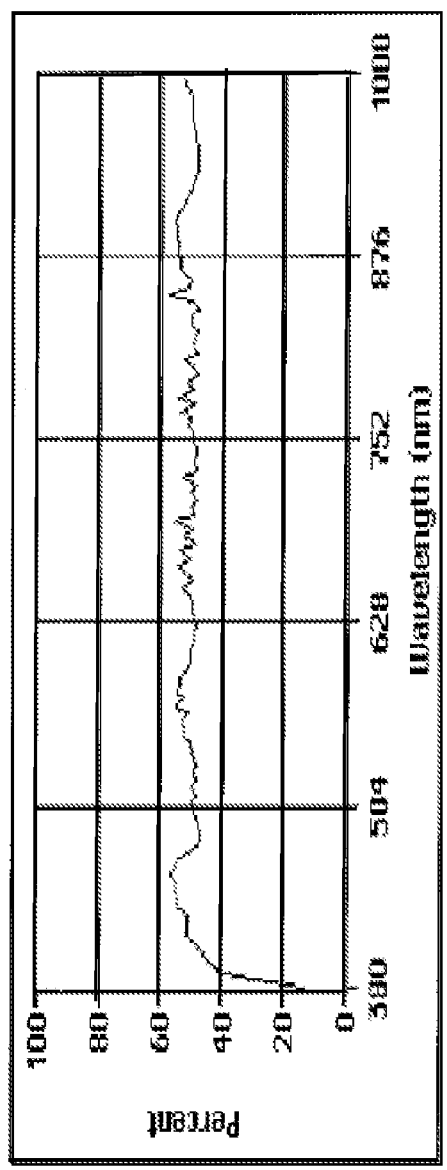
FIG. 9 is a visible light transmission spectral scan of a polarizing transflective film suitable for use with the present invention.
Figure 10:
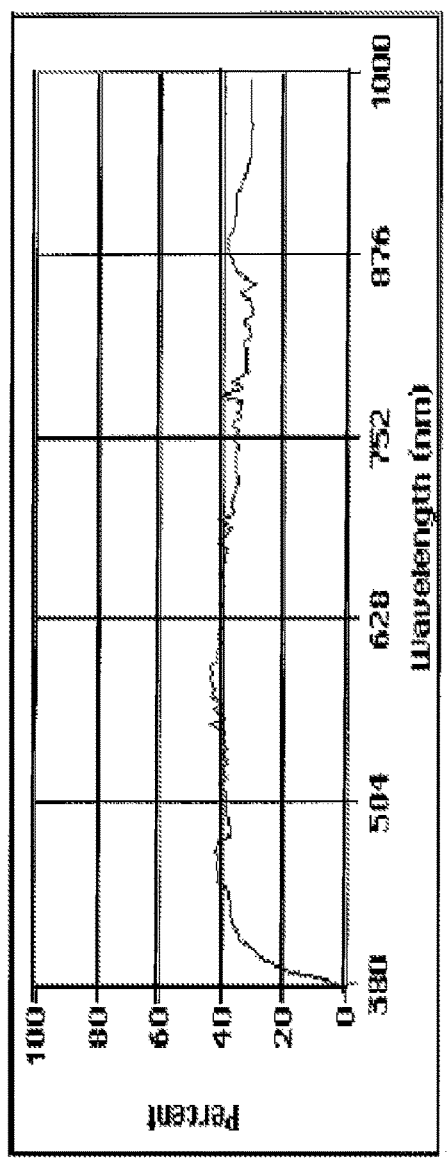
FIG. 10 is a visible light transmission spectral scan of the Vikuiti™ polarizing transflective film of FIG. 9 as combined with an electro-optic mirror element in accordance with the present invention

A visible light transmission spectral scan of the Vikuiti™ polarizing transflective film used is shown in FIG. 9, indicating a visible light transmission of about 50% T. A visible light transmission spectral scan of the Vikuiti™ polarizing transflective film used combined with the EC cell used is shown in FIG. 10, indicating a visible light transmission of about 40% T or thereabouts therethrough for their combination to make the EC transflective mirror element (i.e., about 40% T transmitted through the transflective EC mirror element). The mirror reflectivity (per SAE J964a) at the display area of the EC mirror element (i.e. where and with display device 70 was disposed behind the transflective EC element) was about 46% R, and was about 42% R measured at the non-display area. Another display device comprising a bank of LEDs instead of use of two cold cathodes tubes was also tested.

In a construction otherwise such as shown in FIG. 7, thirty two (32) Nichia NESW008BT white light emitting LEDs were used as backlighting element 78. With these LEDs, and using a similar EC cell and polarizing transflective film as before, a display luminance (brightness) of about 560 Candelas/sq. meter was achieved when viewed through the EC cell and through the polarizing transflective film. The Vikuiti™ and polarizing transflective film used had a reflectivity (per SAE J964a) of about 55% R and, as indicated above, a transmission of about 50% in the visible spectral region. Note that, optionally, the likes of a Vikuiti™ anti-reflecting sheet or film can be used to reduce reflectance at the display area or off the video display screen surface. And Vikuiti™ all-polymeric specular mirror reflecting films (that are also significantly light transmitting) can be used as a fourth surface reflector for transmissive EC cells for use as transflective EC mirror reflective elements for EC vehicular rearview mirrors.

Therefore, the interior mirror assembly of the present invention may consist of an electro-optic or electrochromic mirror utilizing transparent conductors on the two interior surfaces (the second and third surfaces) of the reflective element, with an electrochromic medium [such as a solid polymer matrix (SPM) material or the like] serving as the electrically variable transmission EO medium. On the fourth surface, a reflective visible light transflecting/polarizing element or film may be laminated or adhered or otherwise attached to the rear substrate (typically glass) by means of an optical grade adhesive, such as a film adhesive or a liquid adhesive that cures, upon application, to a solid. Curing may be by UV curing and/or thermal curing and/or chemical curing.

The reflective visible light transflecting/polarizing element or film has a reflectivity that allows the end mirror product to maintain a minimum reflectance of at least about 40 percent, more preferably about 50 percent or greater. The visible light transflecting/polarizing element or film is disposed at the reflective element and display element so that the alignment angle or axis of the visible light transflecting/polarizing element or film corresponds or substantially corresponds with the alignment angle or axis of the Liquid Crystal Display (LCD) video display screen (or other) desired for use. In accordance with Malus's law, the transmission of the polarized light through the visible light transflecting/polarizing element or film is reduced or impaired if the polarizing axes or angles are not aligned or substantially aligned. The two visible light transflecting/polarizing element or films thus preferably align within about +/−10 degrees, more preferably within about +/−5 degrees, more preferably within about +/−3 degrees, and more preferably within about +/−1 degree of one another. As shown in FIG. 3, the alignment angle or axis A of the visible light transflecting/polarizing element or film or films may be, for example, about 135 degrees from horizontal. However, other angles or axes may be utilized without affecting the scope of the present invention.

The reflective visible light transflecting/polarizing element or film may have a backing material that is either absorptive or, more preferably, slightly reflective. An opaque material, such as a black backing tape, may be applied to the rear surface of the reflective element to reduce or substantially eliminate the transparency of the film in the area or region where little or no transparency is desired. The mirror thus may have a greater reflectance in the viewing area or display area directly in front of the display. Optionally, in order to produce a more uniform appearing mirror, an anti-reflective coating or coatings may be disposed at or applied to the front surface of the display element, thus reducing or minimizing the amount of light reflected back through the visible light transflecting/polarizing element or film, or a material (such as a film or coating) may be placed behind the reflective visible light transflecting/polarizing element or film that mimics or approximates the reflectance gain from the display surfaces.

Transparency or transmissivity of the reflective element is desired for a number of reasons, including, but not limited to the following: displaying information, light sensing for control of display luminance levels, light sensing for control of variable reflectance mirror, sensing for vehicle safety features such as air bag active/in-active, and driver drowsiness alert and/or the like. The amount of transparency desired, in the direction of polarization in the final mirror reflector assembly, is preferably greater than about 60 percent, more preferably greater than about 70 percent, and more preferably greater than about 80 percent transmissivity or transparency at the reflective element.

The final display luminance (and especially for a TFT LCD display element showing video or full color video or still images), when measured through the entire EO mirror element (comprising the EO element backed by the transflective reflective polarizing mirror reflector) is preferably greater than about 300 candelas per meters squared ($cd/m^2$), more preferably greater than about 500 $cd/m^2$, and more preferably greater than about 1,000 $cd/m^2$ and most preferably greater than about 2,000 $cd/m^2$. This is to help ensure that the driver can discern any video image being displayed against the sunlight streaming in through the rear window and incident at the display area of the interior mirror reflective element that will tend to wash-out the video image unless the video image is sufficiently bright. For such a TFT LCD display element or other display types, the desired degree of luminance may be achieved by, but is not limited to, cold cathode fluorescent tubes, white LEDs, or white light generated through color mixing of red, green, and blue LEDs, or other suitable illumination sources or elements, located at the TFT LCD display element and rearward of the reflective element.

Because such a TFT LCD display element or screen may enhance the reflectivity of the reflective element at the display area, the display area may have a greater reflectance of light incident thereon as compared to the rest of the viewing area of the reflective element. Thus, it may be desirable to overcoat the backing layer and/or polarizing layer with a reflectance-boosting paint or material such as a thin film metallic coating (in the viewing area of the reflective element around the display area) to help match or substantially match the reflectivity of light incident at the display area of the reflective element with the reflectivity of light incident at the rest of the viewing area of the reflective element.

In order to provide substantially uniform reflectivity and transmissivity at the reflective element, it is important that the films or layers (such as the visible light transflecting/polarizing element or film and/or the backing layer or film) be applied or laid down with no or substantially no dirt or debris or the like between the films and/or between the film and the reflective element. Thus, it may be desirable to apply the film to the rear surface of the reflective element in a clean room environment, such as in preferably better than a class 10,000 clean room environment, more preferably better than a class 1000 clean room environment, and more preferably better than a class 100 clean room environment.

It is also highly desirable to limit or substantially preclude the formation of or entrapment of air bubbles between the film and the reflective element as it is applied to the reflective element. The film thus may be ironed (such by roller-ironing) or pressed to remove or reduce imperfections, preferably applying heat as well as pressure and most preferably, doing so in an evacuated chamber free or atmosphere where air has been at least partially evacuated while laminating. Optionally, and desirably, the film may be applied via a vacuum assisted lamination/application, whereby any air between the film and the reflective element is drawn out or evacuated via a vacuum source as the film is applied to the reflective element.

For example, the EO cell or element and a sheet (or an interior mirror shaped cut-out) of the visible light transflecting/polarizing element or film [such as Vikuiti™ Dual Brightness Enhancement Film—Polarizer (DBEF-P2) film available from 3M that is a multi-layer reflective polarizer designed to be laminated to the to bottom glass of an LCD module; through polarization recycling the Vikuiti™ DBEF-P2 reflects the P2 light back into the backlight where it is scrambled into P1 and P2, and whose product, uses thereof, or its manufacture may be covered by one or more of the following U.S. Pat. Nos. 5,094,788; 5,122,905; 5,122,906; 5,269,995; 5,389,324; 5,594,830; 5,808,794; 5,825,542; 5,828,488; 5,867,316; 5,872,653; 5,882,774; 5,962,114; 5,965,247; 5,976,424; 6,018,419; 6,025,897; 6,057,961; 6,080,467; 6,088,067; 6,088,159; 6,101,032; 6,117,530; 6,124,971; 6,141,149; 6,157,490; 6,296,927; 6,307,676; 6,352,761; 6,449,092; 6,449,093; 6,498,683; 6,574,045; 6,583,930; 6,613,421; 6,630,970; 6,635,337 and 6,641,883, the entire disclosures of which are hereby incorporated herein by reference in their entireties] may be introduced into a chamber, air can be evacuated using a vacuum pump or the like, the EO cell may be placed in the evacuated dust-free chamber and the visible light transflecting/polarizing film may be applied such as is illustrated in FIGS. 5A and 5B. As seen in FIG. 5A, an electro-optic cell 40 is placed in a chamber 45 and is laid onto a heater block 42 with its fourth surface 43 upwards. A sheet (or mirror-shaped cut-out) or film 44 of Vikuiti™ DBEF-P2 or similar visible light transflecting/polarizing element or film is initially spaced from electro-optic cell 40. A roller or roller means 48 (such as a heated roller) is also provided. As an initial step, and preferably, chamber 45 is at least partially evacuated and preferably is substantially evacuated of air (and so obviating entrapment of air bubbles when laminating the transflective polarizing film 44 to glass surface 43) such as by a means of a vacuum pump. This also helps remove any lint or dust that might be present and that could get entrapped during lamination. Next, heater block 42 is heated (by means of, for example, electrically-operated heating rods embedded therein) so as to heat the electro-optic cell 40 to, for example, a temperature in the range from about 60 degrees Celsius to about 150 degrees Celsius, or higher depending on the nature of the electro-optic medium (such as an electrochromic medium) in cell 40 (if such is already established therein). Also, and preferably, roller 48 may also be heated so as to heat the portion of film 44 it is contacting (the temperature chosen depending on the type of film used and on any adhesive layers present).

Next, and beginning at an outer edge of electro-optic cell 40, roller 48 is mechanically moved to intimately press film 44 (under pressure of at least about 2 psi, more preferably at least about 5 psi and most preferably at least about 10 psi) to contact with surface 43 of electro-optic (such as electrochromic) cell 40. While maintaining heat and pressure, roller 48 is mechanically moved from its initial edge contact to cell 40 across the surface of cell 40 to intimately bond/laminate the film 44 to cell 40 (FIG. 5B illustrates this in progress). The temperatures, roller speeds and pressures are chosen to iron out, if necessary, any optical imperfections, distortions or wrinkles or the like and to produce a distortion-free, specularly-reflecting mating of film 44 to surface 43. Once roller-assisted lamination is completed, air or nitrogen or the like is reintroduced into chamber 45 to re-pressurize the chamber back to atmospheric pressure, and the electro-optic or electrochromic mirror reflector element is removed from the chamber, allowed to cool if necessary, and any excess film 44 is trimmed away. Other lamination techniques as known in the liquid crystal cell manufacturing arts can also be used within the scope of the present invention. It may be useful to use a fluid or semi-fluid adhesive that can fill-in and preferably optically match any imperfections (such as imperfections in glass surface 43 and/or in film 44) between film 44 and glass surface 43 during lamination of film 44 thereto (and once film 44 is in place, then allowing this fluid adhesive or optical matching layer to cure, such as by chemical or thermal or radiation-assisted curing, to a solid, non-fluid form), and UV sources and/or thermal radiant heaters such as IR lamps or the like may be provided within chamber 45 to UV and/or thermally cure any ultra violet light or thermally curable adhesives or materials used. Note also that electrostatic charge reduction/mitigation means or methods, such as ionizing sources and the like, can be used during lamination to avoid attracting dust or lint or the like to the surfaces being laminated.

Optionally, the visible light transflecting/polarizing element or film may be applied as a large sheet (i.e. a sheet that is larger than the cross dimensions of the rear surface of the electro-optic element) that is laid over the substrate shape. The sheet or film may be heat shrunk or heat applied around the electro-optic element with vacuum means used to draw or evacuate the air from between the film and the rear surface of the electro-optic element, and then, once conforming to the glass surface and cooled, the excess sheet or film material may be trimmed away from the mirror element so that the film is applied at and over the rear surface of the electro-optical element with substantially no air entrapped between the film and the electro-optic element and making intimate and distortion-free contact thereto. Optionally, the visible light transflecting/polarizing element or film may be applied to the rear surface of the electro-optic element at an elevated temperature so as to make the polymeric film more compliant so as to more readily conform to the substrate shape (depending on the film used, temperatures up to about 150 degrees Celsius or more can be contemplated; and with the electro-optical element and/or the film being applied being heated). Optionally, the film may be applied via an affirmative pressure device, such as a roller or the like, so as to force any air bubbles or pockets out from between the film and the electro-optic element. For example, the film may be heated, such as to about between about 60 degrees Celsius to about 125 degrees Celsius or thereabouts or higher, and then may be rolled or ironed or pressed onto the rear surface of the rear substrate of the electro-optical element, optionally with a vacuum means such as vacuum lamination being used to aid avoidance of entrapped air and/or ensure conformity to the surface, such as described above. Optionally, the film and/or the glass surface to which it is being applied can be provided with an optically-matching (refractive index in the about 1.48 to about 1.55 range) pressure sensitive or liquid adhesive. Preferably, this index matching medium is fluid during the application of the film to the glass surface so as to flow into and thus fill/optically match and imperfections in the glass surface and/or the film being applied thereto.

The rearview mirror assembly may comprise an electro-optic or electrochromic reflective element or cell, such as an electrochromic mirror assembly and electrochromic reflective element utilizing principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; 4,824,221; 5,818,636; 6,166,847; 6,111,685; 6,392,783; 6,710,906; 6,798,556; 6,554,843; 6,420,036 and/or 4,712,879, and/or U.S. patent application Ser. No. 10/054,633, filed Jan. 22, 2002, now U.S. Pat. No. 7,195,381; and/or Ser. No. 11/021,065, filed Dec. 23, 2004, now U.S. Pat. No. 7,255,451, and/or International Pat. Publication Nos. WO 2004/098953, published Nov. 18, 2004; WO 2004/042457, published May 21, 2004; WO 2003/084780, published Oct. 16, 2003; and/or WO 2004/026633, published Apr. 1, 2004, which are all hereby incorporated herein by reference in their entireties, and/or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control,* C. M. Lampert and C. G. Granquist, EDS., Optical Engineering Press, Wash. (1990), which are hereby incorporated herein by reference in their entireties.

Optionally, use of an elemental semiconductor mirror, such as a silicon metal mirror, such as disclosed in U.S. Pat. Nos. 6,286,965; 6,196,688; 5,535,056; 5,751,489; and 6,065,840, and/or in U.S. patent application Ser. No. 10/993,302, filed Nov. 19, 2004, now U.S. Pat. No. 7,338,177, which are all hereby incorporated herein by reference in their entireties, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

The transparent conductive layer or layers at the second and third surfaces of the reflective element may comprise any suitable transparent conductive coatings or layers, such as an indium tin oxide (ITO) or doped (antimony or fluorine doped) tin oxide or doped zinc oxide (such as aluminum-doped zinc oxide) or an ITO/thin Ag/ITO stack or an ITO/thin Al/ITO stack or a thin (preferably, less than about 200 angstroms in physical thickness; more preferably less than about 150 angstroms thick; most preferably less than about 125 angstroms thick; and greater than about 75 angstroms thick, more preferably greater than about 85 angstroms thick and most preferably greater than about 100 angstroms thick) coating of silver (or a silver alloy) sandwiched between ITO or doped zinc oxide layers or a thin coating of aluminum (or an aluminum alloy) sandwiched between ITO or doped zinc oxide layers or a thin coating of platinum or palladium (or an alloy thereof) sandwiched between ITO or doped zinc oxide layers or a thin coating of ruthenium (or a ruthenium alloy) sandwiched between ITO or doped zinc oxide layers, or such as the conductive layers described in U.S. Pat. Nos. 6,690,268; 5,668,663; 5,142,406; 5,442,478 and 5,724,187, and/or in U.S. patent application Ser. No. 10/054,633, filed Jan. 22, 2002, now U.S. Pat. No. 7,195,381; Ser. No. 11/021,065, filed Dec. 23, 2004, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 and published Mar. 9, 2006 as U.S. Publication No. US-2006-0050018; Ser. No. 11/226,628, filed Sep. 14, 2005 and published Mar. 23, 2006 as U.S. Publication No. US-2006-0061008; Ser. No. 10/993,302, filed Nov. 19, 2004, now U.S. Pat. No. 7,338,177; and/or Ser. No. 11/284,543, filed Nov. 22, 2005, now U.S. Pat. No. 7,370,983, and/or in PCT Application No. PCT/US03/29776, filed Sep. 19, 2003 and published Apr. 1, 2004 as International Publication No. WO 2004/026633; and/or PCT Application No. PCT/US03/35381, filed Nov. 5, 2003 and published May 21, 2004 as International Publication No. WO 2004/042457, which are hereby incorporated herein by reference in their entireties. Note that double-silver stacks (as such term is commonly known and used in the heat mirror-coated art) may be used as a transparent conductor layer. Transparent conductor layers useful in the mirror element of the present invention thus may comprise conductive material such as tin oxide ($SnO_2$) doped with antimony or fluorine, indium oxide, indium oxide and tin ($In_2 O_3$ Sn) (preferably 5-15 percent Sn), zinc oxide (ZnO), zinc oxyfluoride, zinc oxide and indium (ZnO:In), zinc oxide and aluminum (ZnO:Al), cadmium stannate ($Cd_2 SnO_4$), cadmium stannite ($CdSnO_3$), cadmium oxide (CdO), copper sulfide ($Cu_2$ S), titanium nitride (TiN), or titanium oxynitride (TiOx N1-x) to provide electrical contact to the electrochromic medium and/or for other layers/elements useful in the mirror element of the present invention.

Although shown and described as an electro-optic or electrochromic electro-optic element assembly or cell, the reflective element may comprise a single substrate (and thus only having a first surface and a second surface) with a reflective coating at its rear (second) surface, without affecting the scope of the present invention. For example, the mirror assembly may comprise a prismatic mirror element or other mirror element having a single substrate reflective element, such as a mirror assembly utilizing aspects described in U.S. Pat. Nos. 6,318,870; 6,598,980; 5,327,288; 4,948,242; 4,826,289; 4,436,371; and 4,435,042; and PCT Application No. PCT/US04/015424, filed May 18, 2004 and published Dec. 2, 2004 as International Publication No. WO 2004/103772; and U.S. patent application Ser. No. 10/933,842, filed Sep. 3, 2004, now U.S. Pat. No. 7,249,860, which are all hereby incorporated herein by reference in their entireties. Optionally, the reflective element may comprise a conventional prismatic or flat reflective element or prism, or may comprise a prismatic or flat reflective element of the types described in PCT Application No. PCT/US03/29776, filed Sep. 19, 2003 and published Apr. 1, 2004 as International Publication No. WO 2004/026633; U.S. patent application Ser. No. 10/709,434, filed May 5, 2004, now U.S. Pat. No. 7,420,756; Ser. No. 10/528,269, filed Mar. 17, 2005, now U.S. Pat. No. 7,274,501; Ser. No. 10/933,842, filed Sep. 3, 2004, now U.S. Pat. No. 7,249,860; Ser. No. 11/021,065, filed Dec. 23, 2004, now U.S. Pat. No. 7,255,451; and/or Ser. No. 10/993,302, filed Nov. 19, 2004, now U.S. Pat. No. 7,338,177, and/or PCT Application No. PCT/US2004/015424, filed May 18, 2004 and published Dec. 2, 2004 as International Publication No. WO 2004/103772, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319 and 6,315,421 (which are all hereby incorporated herein by reference in their entireties), that can benefit from the present invention.

Optionally, the mirror assembly may include one or more displays, such as the types disclosed in U.S. Pat. Nos. 5,530,240 and/or 6,329,925, which are hereby incorporated herein by reference in their entireties, and/or display-on-demand or transflective type displays, such as the types disclosed in U.S. Pat. Nos. 6,690,268; 5,668,663 and/or 5,724,187, and/or in U.S. patent application Ser. No. 10/054,633, filed Jan. 22, 2002, now U.S. Pat. No. 7,195,381; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 and published Mar. 9, 2006 as U.S. Publication No. US-2006-0050018; Ser. No. 11/226,628, filed Sep. 14, 2005 and published Mar. 23, 2006 as U.S. Publication No. US-2006-0061008; Ser. No. 10/993,302, filed Nov. 19, 2004, now U.S. Pat. No. 7,338,177; Ser. No. 11/284,543, filed Nov. 22, 2005, now U.S. Pat. No. 7,370,983; and/or Ser. No. 11/021,065, filed Dec. 23, 2004, now U.S. Pat. No. 7,255,451; and/or PCT Application No. PCT/US03/29776, filed Sep. 9, 2003 and published Apr. 1, 2004 as International Publication No. WO 2004/026633; and/or PCT Application No. PCT/US03/35381, filed Nov. 5, 2003 and published May 21, 2004 as International Publication No. WO 2004/042457; and/or U.S. provisional applications, Ser. No. 60/630,061, filed Nov. 22, 2004; Ser. No. 60/667,048, filed Mar. 31, 2005; Ser. No. 60/629,926, filed Nov. 22, 2004; Ser. No. 60/531,838, filed Dec. 23, 2003; Ser. No. 60/553,842, filed Mar. 17, 2004; Ser. No. 60/563,342, filed Apr. 19, 2004; Ser. No. 60/681,250, filed May 16, 2005; Ser. No. 60/690,400, filed Jun. 14, 2005; Ser. No. 60/695,149, filed Jun. 29, 2005; Ser. No. 60/717,093, filed Sep. 14, 2005; and/or Ser. No. 60/730,334, filed Oct. 26, 2005, and/or PCT Application No. PCT/US03/40611, filed Dec. 19, 2003 and published Jul. 15, 2004 as International Publication No. WO 2004/058540, which are all hereby incorporated herein by reference in their entireties, or may include or incorporate video displays or the like, such as the types described in PCT Application No. PCT/US03/40611, filed Dec. 19, 2003 and published Jul. 15, 2004 as International Publication No. WO 2004/058540, U.S. patent application Ser. No. 11/284,543, filed Nov. 22, 2005, now U.S. Pat. No. 7,370,983; and/or Ser. No. 10/538,724, filed Jun. 13, 2005 and published Mar. 9, 2006 as U.S. Publication No. US-2006-0050018, and/or U.S. provisional applications, Ser. No. 60/630,061, filed Nov. 22, 2004; and Ser. No. 60/667,048, filed Mar. 31, 2005, which are hereby incorporated herein by reference in their entireties.

Optionally, the mirror assembly may support one or more other accessories or features, such as one or more electrical or electronic devices or accessories. For example, illumination sources or lights, such as map reading lights or one or more other lights or illumination sources, such as illumination sources of the types disclosed in U.S. Pat. Nos. 6,690,268; 5,938,321; 5,813,745; 5,820,245; 5,673,994; 5,649, 756; 5,178,448; 5,671,996; 4,646,210; 4,733,336; 4,807,096; 6,042,253; 6,971,775 and/or 5,669,698, and/or U.S. patent application Ser. No. 10/054,633, filed Jan. 22, 2002, now U.S. Pat. No. 7,195,381; and/or Ser. No. 10/933,842, filed Sep. 3, 2004, now U.S. Pat. No. 7,249,860, which are hereby incorporated herein by reference in their entireties, may be included in the mirror assembly. The illumination sources and/or the circuit board may be connected to one or more buttons or inputs for activating and deactivating the illumination sources. Optionally, the mirror assembly may also or otherwise include other accessories, such as microphones, such as analog microphones or digital microphones or the like, such as microphones of the types disclosed in U.S. Pat. Nos. 6,243,003; 6,278,377; and/or 6,420,975, and/or in U.S. patent application Ser. No. 10/529,715, filed Mar. 30, 2005, published on May 25, 2006 as U.S. Pat. Publication No. US-2006-0109996, now U.S. Pat. No. 7,657,052; and/or in PCT Application No. PCT/US03/308877, filed Oct. 1, 2003 and published Apr. 15, 2004 as International Publication No. WO 2004/032568. Optionally, the mirror assembly may also or otherwise include other accessories, such as a telematics system, speakers, antennas, including global positioning system (GPS) or cellular phone antennas, such as an ONSTAR® system as found in General Motors vehicles and such as described in U.S. Pat. Nos. 4,862,594; 4,937,945; 5,131,154; 5,255,442; 5,632,092; 5,798,688; 5,971,552; 5,924,212; 6,243,003; 6,278,377; and 6,420,975; 6,477,464; and/or 6,678,614; and/or U.S. patent application Ser. No. 10/456,599, filed Jun. 6, 2003, now U.S. Pat. No. 7,004,593; Ser. No. 10/645,762, filed Aug. 20, 2003, now U.S. Pat. No. 7,167,796; Ser. No. 10/964,512, filed Oct. 13, 2004, now U.S. Pat. No. 7,308,341; Ser. No. 10/422,378, filed Apr. 24, 2003, now U.S. Pat. No. 6,946,978; and Ser. No. 10/529,715, filed Mar. 30, 2005, published on May 25, 2006 as U.S. Pat. Publication No. US-2006-0109996, now U.S. Pat. No. 7,657,052; and/or PCT Application No. PCT/US03/40611, filed Dec. 19, 2003 and published Jul. 15, 2004 as International Publication No. WO 2004/058540, and/or PCT Application No. PCT/US03/308877, filed Oct. 1, 2003 and published Apr. 15, 2004 as International Publication No. WO 2004/032568, a communication module, such as disclosed in U.S. Pat. No. 5,798,688, a voice recorder, a blind spot detection and/or indication system, such as disclosed in U.S. Pat. Nos. 5,929,786 and/or 5,786,772, and/or U.S. patent application Ser. No. 10/427,051, filed Apr. 30, 2003, now U.S. Pat. No. 7,038,577; Ser. No. 11/315,675, filed Dec. 22, 2005, now U.S. Pat. No. 7,720,580; and Ser. No. 10/209,173, filed Jul. 31, 2002, now U.S. Pat. No. 6,882,287; and/or U.S. provisional applications, Ser. No. 60/638,687, filed Dec. 23, 2004; Ser. No. 60/784,570, filed Mar. 22, 2006; and/or Ser. No. 60/696,953, filed Jul. 6, 2006, and/or PCT Application No. PCT/US2006/026148, filed Jul. 5, 2006 and published Jan. 11, 2007 as International Publication No. WO 2007/005942, transmitters and/or receivers, such as for a garage door opener or a vehicle door unlocking system or the like (such as a remote keyless entry system), a digital network, such as described in U.S. Pat. No. 5,798,575, a compass indicator or display and/or a temperature indicator or display, such as described in U.S. Pat. No. 7,004,593; and/or U.S. patent application Ser. No. 11/305,637, filed Dec. 16, 2005, now U.S. Pat. No. 7,329,013, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 6,690,268 and 6,847,487; and/or U.S. provisional applications, Ser. No. 60/614,644, filed Sep. 30, 2004; Ser. No. 60/618,686, filed Oct. 14, 2004; Ser. No. 60/628,709, filed Nov. 17, 2004; Ser. No. 60/644,903, filed Jan. 11, 2005; Ser. No. 60/667,049, filed Mar. 31, 2005; and/or U.S. patent application Ser. No. 11/105,757, filed Apr. 14, 2005, now U.S. Pat. No. 7,526,103; Ser. No. 11/239,980, filed Sep. 30, 2005, now U.S. Pat. No. 7,881,496; and/or Ser. No. 11/334,139, filed Jan. 18, 2006, now U.S. Pat. No. 7,400,435, a slide out or extendable/retractable video device or module, such as described in U.S. patent application Ser. No. 10/538,724, filed Jun. 13, 2005 and published Mar. 9, 2006 as U.S. Publication No. US-2006-0050018; and/or Ser. No. 11/284,543, filed Nov. 22, 2005, now U.S. Pat. No. 7,370,983, U.S. provisional applications, Ser. No. 60/630,061, filed Nov. 22, 2004; and/or Ser. No. 60/667,048, filed Mar. 31, 2005; and/or PCT Application No. PCT/US03/40611, filed Dec. 19, 2003 and published Jul. 15, 2004 as International Publication No. WO 2004/058540, a video device for internal cabin surveillance (such as for sleep detection or driver drowsiness detection or the like) and/or video telephone function, such as disclosed in U.S. Pat. Nos. 5,760,962 and/or 5,877,897, an occupant detection system (such as the types described in PCT Application No. PCT/US2005/042504, filed Nov. 22, 2005 and published Jun. 1, 2006 as International Publication No. WO 2006/058098, a heating element, particularly for an exterior mirror application, such as the types described in U.S. patent application Ser. No. 11/334,139, filed Jan. 18, 2006, now U.S. Pat. No. 7,400,435, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979 and/or 6,731,205; and/or U.S. patent application Ser. No. 11/232,324, filed Sep. 21, 2005, now U.S. Pat. No. 7,423,522; and/or U.S. provisional application, Ser. No. 60/611,796, filed Sep. 21, 2004), and/or an ONSTAR® system and/or any other accessory or circuitry or the like (with all of the above-referenced patents and PCT and U.S. patent applications being commonly assigned, and with the disclosures of the referenced patents and patent applications being hereby incorporated herein by reference in their entireties).

Optionally, the mirror assembly may accommodate other accessories or circuitry or the like as well, such as a rain sensor or imaging device or the like. For example, the mirror assembly may include a mounting portion (such as the types described in U.S. patent application Ser. No. 11/226,628, filed Sep. 14, 2005 and published Mar. 23, 2006 as U.S. Publication No. US-2006-0061008; and/or U.S. provisional applications, Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004, which are all hereby incorporated herein by reference in their entireties), and may include a rain sensor or the like and may position the rain sensor against the windshield, such as described in U.S. Pat. Nos. 6,250,148; 6,341,523; and 6,824,281, and in U.S. patent application Ser. No. 10/023,162, filed Dec. 17, 2001, now U.S. Pat. No.

6,516,664; Ser. No. 10/348,514, filed Jan. 21, 2003, now U.S. Pat. No. 6,968,736; Ser. No. 10/958,087, filed Oct. 4, 2004, now U.S. Pat. No. 7,188,963; and/or Ser. No. 11/201,661, filed Aug. 11, 2005, now U.S. Pat. No. 7,480,149, which are all hereby incorporated herein by reference in their entireties. Optionally, the mirror assembly may include an imaging device, such as an imaging array sensor for imaging systems of the types described in U.S. Pat. Nos. 6,946,978; 6,757,109; 6,717,610; 6,396,397; 6,201,642; 6,353,392; 6,313,454; 6,396,397; 5,550,677; 5,670,935; 5,796,094; 5,877,897; 6,097,023 and 6,498,620, and U.S. patent application Ser. No. 09/441,341, filed Nov. 16, 1999, now U.S. Pat. No. 7,339,149, and Ser. No. 10/427,051, filed Apr. 30, 2003, now U.S. Pat. No. 7,038,577; and/or PCT application No. PCT/US2006/041709, filed Oct. 27, 2006 and published May 10, 2007 as International Publication No. WO 2007/053404; and/or U.S. provisional applications, Ser. No. 60/731,183, filed Oct. 28, 2005; and/or Ser. No. 60/765,797, filed Feb. 7, 2006, which are all hereby incorporated herein by reference in their entireties.

Optionally, the mirror assembly may be utilized with a video slide-out mirror, such as the types described in U.S. patent application Ser. No. 11/284,543, filed Nov. 22, 2005, now U.S. Pat. No. 7,370,983; and/or Ser. No. 10/538,724, filed Jun. 13, 2005 and published Mar. 9, 2006 as U.S. Publication No. US-2006-0050018; PCT Application No. PCT/US03/40611, filed Dec. 19, 2003 and published Jul. 15, 2004 as International Publication No. WO 2004/058540, and/or U.S. provisional applications, Ser. No. 60/630,061, filed Nov. 22, 2004; and Ser. No. 60/667,048, filed Mar. 31, 2005, which are hereby incorporated herein by reference in their entireties. Further, when such a vehicle equipped with such a video mirror is also equipped with a side viewing or front viewing or rear viewing sensor vision system (such as by utilizing a radar sensor or an ultrasonic sensor or a camera sensor (such as described in U.S. patent application Ser. No. 11/239,980, filed Sep. 30, 2005, now U.S. Pat. No. 7,881,496; and/or Ser. No. 11/315,675, filed Dec. 22, 2005, now U.S. Pat. No. 7,720,580, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; and/or Ser. No. 60/638,687, filed Dec. 23, 2004, which are hereby incorporated herein by reference in their entireties) to monitor an area adjacent the vehicle), the video screen may automatically extend when such a sensor system detects the presence of an obstacle and/or a human adjacent to the vehicle. Also, the video display screen may extend in conjunction with a trailer-hitch monitoring system (such as the types described in U.S. patent application Ser. No. 10/418,486, filed Apr. 18, 2003, now U.S. Pat. No. 7,005,974, which is hereby incorporated herein by reference in its entirety) and icons and/or indicia and/or instructions may be created on the video image displayed on the extended video screen of the video mirror to assist or guide the driver to hitch a trailer to the trailer hitch of the vehicle.

Optionally, the mirror assembly may include one or more user actuatable inputs or input devices or human machine interfaces. For example, the inputs or user interfaces may include buttons, such as are described in U.S. Pat. No. 6,501,387, and/or U.S. patent application Ser. No. 11/451,639, filed Jun. 13, 2006, now U.S. Pat. No. 7,527,403; and/or U.S. provisional applications, Ser. No. 60/690,401, filed Jun. 14, 2005; Ser. No. 60/719,482, filed Sep. 22, 2005; and/or and Ser. No. 60/749,423, filed Dec. 12, 2005, which are hereby incorporated herein by reference in their entireties, or that include touch/proximity sensors such as are disclosed in U.S. Pat. Nos. 6,001,486; 6,310,611; 6,320,282 and 6,627,918, and U.S. patent application Ser. No. 09/817,874, filed Mar. 26, 2001, now U.S. Pat. No. 7,224,324, and PCT Application No. PCT/US03/40611, filed Dec. 19, 2003 and published Jul. 15, 2004 as International Publication No. WO 2004/058540, which are hereby incorporated herein by reference in their entireties, or that include other types of buttons or switches, such as those described in U.S. patent application Ser. No. 11/029,695, filed Jan. 5, 2005, now U.S. Pat. No. 7,253,723; and/or U.S. provisional applications, Ser. No. 60/556,259, filed Mar. 25, 2004; Ser. No. 60/553,517, filed Mar. 16, 2004; and Ser. No. 60/535,559, filed Jan. 9, 2004; and/or PCT Application No. PCT/US2004/015424, filed May 18, 2004 and published Dec. 2, 2004 as International Publication No. WO 2004/103772, which are hereby incorporated herein by reference in their entireties, or that include fabric-made position detectors, such as are disclosed in U.S. Pat. Nos. 6,504,531; 6,501,465; 6,492,980; 6,452,479; 6,437,258 and 6,369,804, which are hereby incorporated herein by reference in their entireties. The manual inputs or user actuatable inputs or actuators may control or adjust or activate/deactivate one or more accessories or elements or features. For touch sensitive inputs or applications or switches, the mirror assembly or accessory module or input may, when activated, provide a positive feedback (such as activation of an illumination source or the like, or such as via an audible signal, such as a chime or the like, or a tactile or haptic signal, or a rumble device or signal or the like) to the user so that the user is made aware that the input was successfully activated.

Although preferably realized using a unitary combined visible light transflecting/polarizing element, the present invention encompasses use of a separate light reflector element and separate polarizing element. Also, while linearly polarization is preferred, use of other polarization forms, such as circular polarization and elliptical polarization, can be envisaged without affecting the scope of the present invention.

Also note that display washout may be mitigated or reduced by use of light control films such as by use of Vikuiti™ Light Control films from 3M of Minneapolis (whose construction is disclosed such as in U.S. Pat. Nos. 4,764,410; 4,766,023 and 5,254,388, which are hereby incorporated herein by reference in their entireties). Since the interior rearview mirror element (and any video screen attached to the rear surface thereof) is typically canted by the driver at an angle of about 22 degrees or so to the longitudinal axis of the vehicle and since sunlight passes through the rear window of the vehicle at an angle generally parallel with the longitudinal axis of the vehicle, a light control film comprising micro louvers (such as at an about 22 degree angle) canted or slanted towards the driver can be used at the display area so that the sunlight and the like passing through a rear window of the vehicle and axial with the longitudinal axis is blocked or reflected away from the driver's eyes, but light emitted from the display device to the rear of the mirror element pass through the micro louvers to be seen by the driver. Also, Vikuiti™ Image Directing Film (IDF II), which is a transparent optical composite that redirects the image created by a display to the optimum viewing angle (such as disclosed in U.S. Pat. No. 5,303,322, which is hereby incorporated herein by reference in its entirety), can be used to assist prevention of video image washout by daylight for through-the-mirror reflector video displays used in interior rearview mirrors. Vikuiti™ Image Directing Film (IDF) is a polymer film comprising an acrylic prismatic structure overlaid on a polyester structure and with the prismatic structure designed so that any optical image passing through will be offset, or redirected, by a determined angle, such as, for example, 20 degrees. Use can also be made of Vikuiti BEF III-10T film that provides about a 37 percent increase in on-axis brightness for direct-light systems and that, when combined with Vikuiti DBEF-D400 (or D550) film, on-axis brightness can be increased by up to 68 percent or thereabouts. Additionally, combining Vikuiti BEF III-10T film with Vikuiti DBEF film may beneficially improve contrast in certain EO mirror constructions. Vikuiti BEF III-10T film also improves uniformity by hiding direct-light system cold cathode fluorescent lighting bulbs. And beneficial use, in certain constructions, may be found for Vikuiti™ Rounded Brightness Enhancement Film (RBEF) that features a microreplicated prismatic structure with rounded peaks that control the exit angle of the light, and that helps maximize the efficiency of backlighting while maintaining a wide viewing angle with a soft cut-off. Also, if a Vikuiti™ BEF-RP multilayered reflective polarizer is used with an EO cell, a second film or sheet of Vikuiti™ Thin BEF film may be used to gain greater display brightness, preferably with its grooves at 90 degrees away the grooves direction of the Vikuiti™ BEF-RP film. Other constructions may be implemented without affecting the scope of the present invention.

Also, the third and/or fourth surface of the electro-optical cell can be coated with a significantly light reflecting/significantly light transmitting multi-layer thin film stack. For example, and starting from a glass surface, the stack of layers may include the following (with the approximate thickness of the layers set forth below in nanometers):

| Glass | Surface |
|---|---|
| $SiO_2$ | 8.63 |
| $TiO_2$ | 22.98 |
| $SiO_2$ | 339.47 |
| $TiO_2$ | 19.59 |
| $SiO_2$ | 54.96 |
| $TiO_2$ | 48.18 |
| $SiO_2$ | 86.19 |
| $TiO_2$ | 51.85 |
| $SiO_2$ | 84.99 |
| $TiO_2$ | 79.75 |
| $SiO_2$ | 174.07 |
| ITO | 21.26 |

Figure 6:
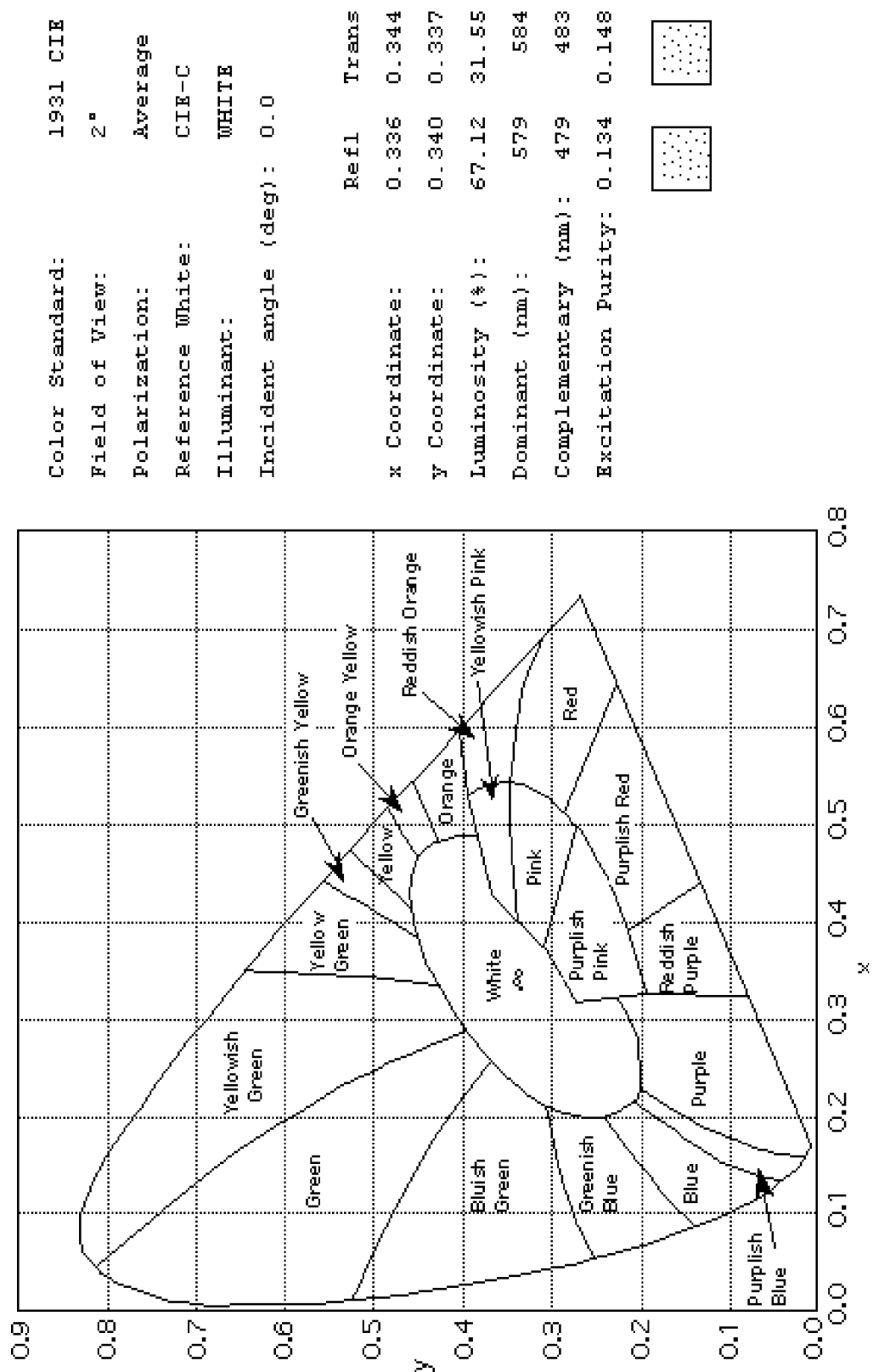
FIG. 6 is a schematic showing the optical characteristics of a broadband transflective substrate in accordance with the present invention.

A glass substrate coated with such a 12-layer stack will have optical performance as shown in FIG. 6 (with air being the exit medium). Visible light transmission of light therethrough is about 32% T and visible light reflectivity of light incident thereon is about 67% R. Note that the outermost layer is ITO, which is a transparent conductor. If such a multi-layer broadband reflector/transmitter transflective stack (having spectral neutrality in both reflectance and in transmission of visible light across the visible light spectrum) is to be used as third surface reflector in an electro-optical (such as an EC cell), it is important that its outermost layer be electrically conducting as this is the layer that contacts the EC medium in the interpane cavity of the EO cell. Other designs for a broadband reflector/transmitter transflective stack will suggest themselves to those skilled in the optical filter design arts; in general, it is desirable to have at least 5 layers, and more preferable to have at least 8 layers and most preferable to have at least 10 layers in the stack design. For economy of coating, it is preferable that these layers be mostly of repeating/alternating materials (such as $SiO_2$ and $TiO_2$). If the outermost layer is not electrically conducting, such a broadband reflector/transmitter transflective stack can be used on the fourth surface of the EO cell with an ITO transparent conducting coating or layer or the like on the third surface of the EO cell (such as an EC cell) or device.

Also, use of a bank or matrix or plurality of high power LEDs can be used for backlighting the video display behind a transflective electrochromic or other EO mirror reflective element. Heat reduction/mitigation methods such as heat sinks, use of DC-to-DC converters and series electrical connection of a string of individual LEDs (so that their combined series voltage drop is close to the 12V nominal of the vehicle battery/ignition system) may be used. Beneficial use can be made of the disclosure and teachings of U.S. patent application Ser. No. 10/054,633, filed Jan. 22, 2002, now U.S. Pat. No. 7,195,381, which is hereby incorporated herein by reference in its entirety. For example, a bank of 4 or 8 or even 12 or more Luxeon® K2 high-power LEDS can be used as the backlighting source. Such are supplied by LumiLeds Lighting U.S. LLC, and are rated to provide greater than about 140 lumens in 6,599 K white. Use of DC-to-DC conversion coupled with heat sinking and/or series electrical connection of multiple individual LEDs can help manage heat loading within the interior mirror assembly when such super-high power LEDS are used. Diffuser films and/or light control/brightness enhancement films, such as the Vikuiti™ films described above, can be used in conjunction with a bank of at least two, and preferably at least four high-power (each of lumens of at least about 15 lumens) LEDs.

Figure 11:
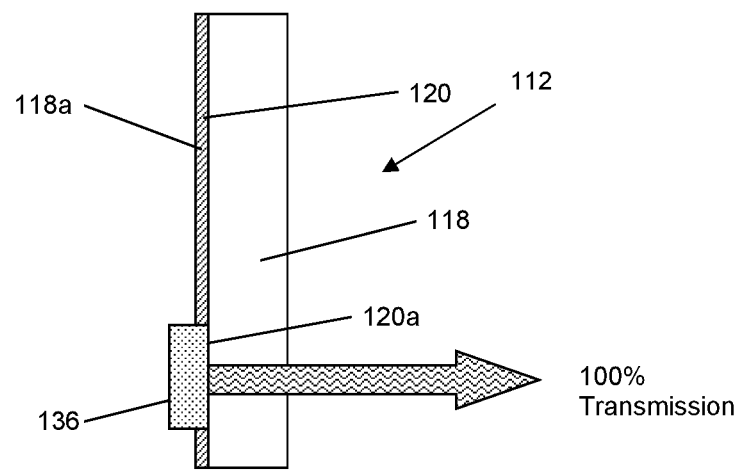
FIG. 11 is a sectional view of another electro-optic element for an interior rearview mirror assembly of the present invention.

Optionally, other configurations and methodologies may be incorporated to provide enhanced viewing of the display at the mirror reflective element, and reducing or substantially limiting washout on bright ambient light conditions, such as encountered on a sunny day. It is known to locate a video screen in a mirror assembly and behind the mirror reflective element so that the display is transmitted through the reflective element for viewing by an occupant of the vehicle. For example, and as shown in FIG. 11, a video screen 136 may be located at the rear surface 118a of a glass substrate 118 of a reflective element 112 (such as at and behind the fourth surface of an electro-optic or electrochromic reflective element or cell, such as described above), such as by utilizing aspects described in U.S. Pat. No. 6,690,268, which is hereby incorporated herein by reference in its entirety. The video screen 136 may be located at a window or aperture 120a formed in a mirror reflector coating (which can be second surface or third surface or fourth surface depending on the particular mirror construction) or layer 120, such as is known in the art, such as formed by locally removing the mirror reflector layer to open up a transmissive window. The display images emitted by the video screen 136 thus are transmitted through the glass substrate or substrates 118 of the reflective element for viewing by an occupant of the vehicle at the local window in the mirror reflector. In such an application, the display images may achieve up to approximately 100 percent transmission through the glass substrate (depending on any light absorbance in its path) for enhanced viewing of the display images. However, the mirror reflector (which may provide about 80 percent or more reflectivity at the reflective element) is removed at the display region, so that the display region is not reflective, except for reflectance off of the front surface of the front glass substrate of the reflective element, and so the rearward field of view of the reflective element is reduced and the presence of the video screen behind the local transmissive window created (such as by masking or laser ablation) in the mirror reflector layer(s) is plainly visible to the driver even when the video screen is not actuated to emit its video image. Although shown in FIG. 11 (and in FIGS. 12-20, discussed below) as having a single glass substrate, the reflective element may comprise a single glass substrate or front and rear glass substrates, such as front and rear substrates with an electrochromic medium disposed therebetween as described above, without affecting the scope of the present invention.

Figure 12:
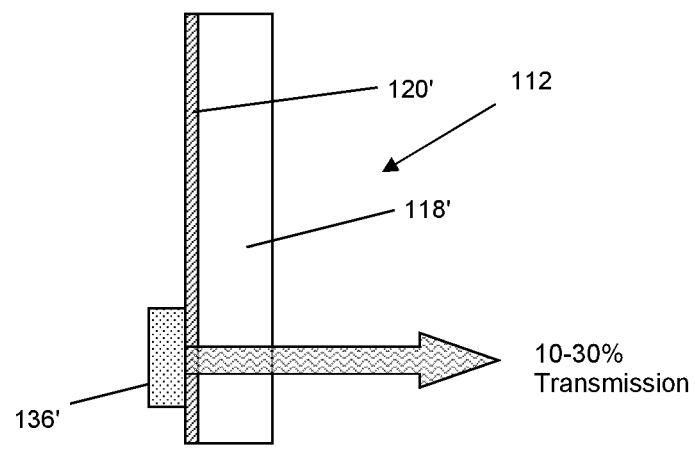
FIG. 12 is a sectional view of another electro-optic element for an interior rearview mirror assembly of the present invention.
Figure 13:
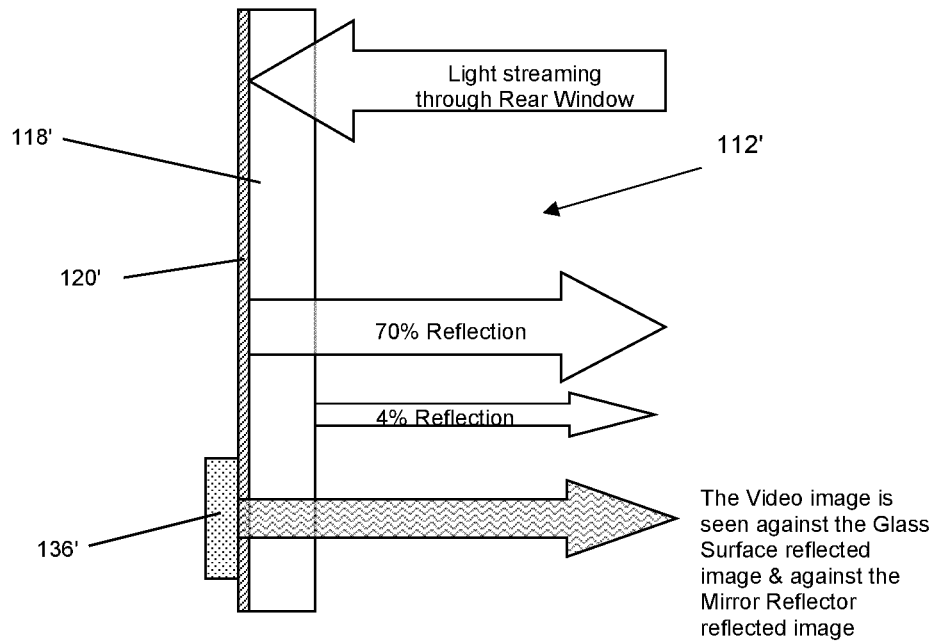
FIG. 13 is a sectional view of another electro-optic element for an interior rearview mirror assembly of the present invention.

In addition, placing a video screen in a mirror assembly (and behind the mirror reflective element so that the display is transmitted through the reflective element for viewing by an occupant of the vehicle) is known, and it is also known to covertly locate the video screens behind the reflective element to provide a transflective DOD (Display-on-Demand) display through the transflective reflective element, such that the presence of the video screen is only noticeable or discernible when the video screen is activated, such as by utilizing aspects described in U.S. Pat. Nos. 6,690,268; 5,668,663 and/or 5,724,187, and/or in U.S. patent application Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 and published Mar. 9, 2006 as U.S. Publication No. US-2006-0050018; Ser. No. 11/226,628, filed Sep. 14, 2005 and published Mar. 23, 2006 as U.S. Publication No. US-2006-0061008; Ser. No. 11/284,543, filed Nov. 22, 2005, now U.S. Pat. No. 7,370,983, which are all hereby incorporated herein by reference in their entireties. As shown in FIGS. 12 and 13, a display screen 136' may be located behind the glass substrate or substrates 118' of a reflective element 112' and behind a transflective mirror reflector 120', so that the display images are transmitted through the transflective mirror reflector and through the glass substrate or substrates 118' of the reflective element. Such an application may provide about 10 to 30 percent transmission or more through the transflective reflector and the reflective element, while the mirror element may be about 50 to 70 percent or so reflective of light incident thereon. However, the intensity of the video display is reduced (relative to the intensity that would be achieved by the reflective element 112 of FIG. 11, discussed above) by the transflective mirror reflector, since the display illumination is transmitted through the transflective mirror reflector. The video image thus may be viewed or seen against the glass surface reflected image (which may reflect about 4 percent or thereabouts of light incident thereon) and against the mirror reflector reflected image. Although shown as having a transflective reflector at the rear of the reflective element, the transflective reflector may be located at the third surface (the front surface of the rear substrate of the reflective element) or at the fourth surface (the rear surface of the rear substrate of the reflective element) of the reflective element.

Such applications as shown in FIGS. 11-13 provide adequate performance for the particular applications at which they are implemented. However, such applications may encounter display washout during high ambient lighting conditions, such as typically encountered on a sunny day. A sunny day can have a brightness or luminance of about 4,000 nits (candelas per meters squared) or more, which is substantially higher than a dull or cloudy day, which may have a brightness or luminance of only about 6 to 120 nits (such that a sunny day may have about 300 times the brightness or luminance than a dull day). FIGS. 21 and 22 show examples of different luminance levels and brightness for typical lighting conditions.

A driver of the vehicle typically aligns the rearward field of view of the interior rearview mirror to fill or at least substantially fill the rear window (such that the mirror's rearward field of view is substantially framed around the rear window of the vehicle through which sunlight streams in). When so aligned, the mirror reflector may reflect about 80 percent or more of the light streaming through the rear window to the driver's eyes. Even if the rear window comprises substantially tinted glass, the driver may still see a mirror reflected image of several hundred nits brightness, such as of about 1,000 nits or more on a bright sunny day. Thus, the display projected or emitted by the video screen will be washed out due to the high intensity of the light from the rear window that is reflecting off of the mirror reflective element.

A typical LCD video screen, such as a TFT backlit LCD video screen may provide a brightness of about 300 to 500 nits, while a typical plasma video screen may provide a brightness of about 700 to 1000 nits or more. Although various contrast enhancements can be used to reduce display washout, as discussed above, such enhancements may not be fully effective in terms of eliminating washout in conventional transflective mirror reflective element applications, since the video screen is located behind the mirror reflector in DOD transflective interior mirror applications, and the intensity of the video display is reduced on passage through the mirror reflector. Because the mirror reflector only partially transmits the video image, the image can be washed out on a sunny day by the brighter reflected image of the mirror itself. As shown in FIG. 13, in order to be viewable, the display image of the video screen 136' must be seen against the glass surface (such as the first surface of the mirror reflective element) reflected image (typically about 4 percent reflectant of light incident thereon) and against the mirror reflector reflected image (typically about 70 to 80 percent reflectant or more of light incident thereon). Thus, the display image from the video screen must be seen in contrast against the brighter reflection off the mirror reflector itself.

Figure 14:
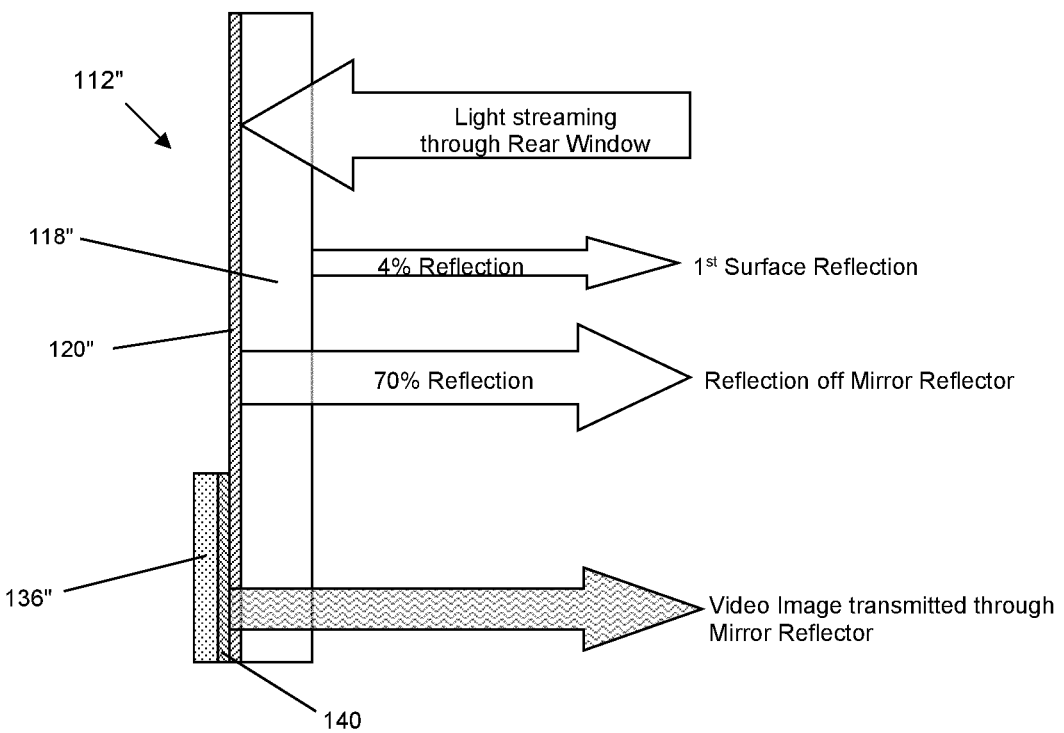
FIG. 14 is a sectional view of another electro-optic element for an interior rearview mirror assembly of the present invention.

Optionally, and as shown in FIG. 14, a contrast enhancement means, such as a local polarizer trap 140 may be disposed between the video display screen 136" and the mirror reflector 120" (such as at the rear surface of the glass substrate 118") of the reflective element assembly 112". The video screen 136" emits polarized light that passes through the polarizer trap 140, such as described above, while the polarizer trap 140 may trap unpolarized sunlight to limit or reduce the amount of display washout. However, because the video screen and polarizer trap are located rearward of the mirror reflector, the polarizer light trap may not fully effectively trap the light reflected directly off of the mirror reflector itself.

Another option to implement to enhance display viewability and reduce display washout is to increase the intensity of the video display screen. For example, Optrex America Inc. offers a 10.4 inch diagonal high brightness TFT transmissive LCD module with high contrast and resolution. With a brightness of about 550 nits, it provides enhanced brightness over other known display screens. The screen resolution is about 800×RGB×600, with a contrast ratio of about 180:1. Also, light emitting diodes (LEDs), cold cathode lighting and organic light emitting diodes (OLEDs) that are selected to be bright and efficient may be used. Heat management and light leakage through a pixel "off" state should be minimized. Optionally, a plasma display (such as an enhanced plasma display utilizing aspects of a bright plasma display, such as used in the Samsung PS42D5S plasma screen, which provides a brightness of about 1500 nits) or an LED display can be used as a video screen.

Another option to enhance viewing of a video display is to locate the display outside of the direct field of view of the interior rearview mirror through the rear window. As can be seen in FIG. 15, the reflective element (typically a prismatic mirror element or an electrochromic mirror element) of a typical interior rearview mirror assembly may be aligned so as to have a rearward field of view A through the rear window of the vehicle. As shown in FIGS. 16 and 17, length of the reflective element of the mirror assembly 210 may be increased in size so that the passenger-side length is increased by about 2½ to 3 inches (relative to where the support arm attaches) so as to accommodate the video screen (such as described in U.S. Pat. No. 6,690,268, which is hereby incorporated herein by reference in its entirety). The video screen 236 may be located at the outer, expanded passenger side region 210a of the asymmetric mirror assembly, and thus may have a field of view B that is outside the field of view A through the rear window (and thus not directly subject to sunlight streaming in through the rear window on a sunny day). By placing the video screen outside the direct field of view through the rear window, the mirror assembly may significantly reduce display washout on sunny days.

Figure 18:
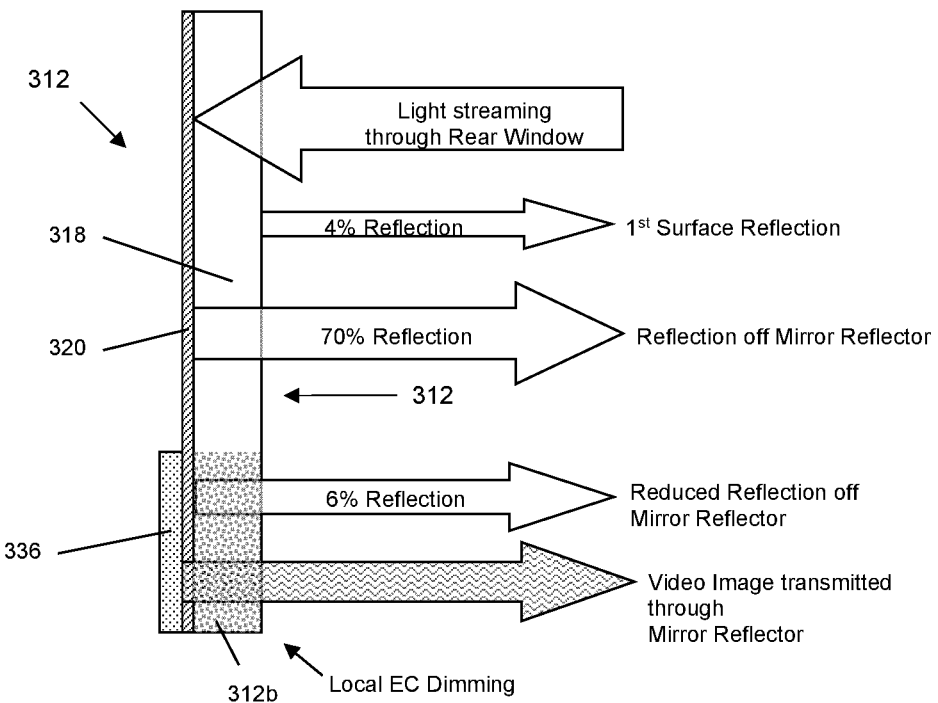
FIG. 18 is a sectional view of another electro-optic element for an interior rearview mirror assembly of the present invention.

Optionally, the reflective element may have a locally dimmed display area so as to provide dimming or darkening of the display area to reduce the reflectivity at the display area and, thus to reduce display washout on sunny days, such as by utilizing aspects of U.S. Pat. No. 6,690,268, which is hereby incorporated herein by reference in its entirety. For example, and as shown in FIG. 18, a reflective element 312 may have a main or principal electrochromic reflective area or portion or region 312a and a display reflective area or portion or region 312b. The separate areas or regions 312a, 312b may be defined and separated by a thin demarcation or deletion line or lines (not shown) formed in either or both of the second and third surface conducting layers at the second and third surfaces, respectively, of the reflective element and at the electrochromic medium (also not shown) disposed between the front and rear substrates 318, so as to electrically isolate different regions of the electrochromic reflective element. Thus, the video display 336 may be located behind the transflective reflector 320 at the display area 312b. When the display area 312b is locally darkened or dimmed, the display area has a reduced reflectance of light incident thereon. For example, the display area may have only about 20 percent (or more or less depending on the degree of dimming of the display area) reflection of light incident thereon when locally dimmed or darkened, as compared to about 70 percent reflection of light incident thereon when bleached or not darkened. Thus, the display image projected through the mirror reflector and through the reflective element at the darkened display area 312b may achieve reduced washout on sunny days, while the principal viewing area or reflecting area 312a of the reflective element provides substantial reflectance of light incident thereon.

Accordingly, when the reflective element locally dims in reflectance due to electrochromic activity local to display area 312b, the intensity of any sunlight incident on transflective reflector 320 at this local display area is twice-attenuated by the electrochromic medium whereas the light emitted by the display is only once attenuated by the electrochromic action local to where it is positioned at the display region. Hence, contrast is enhanced (but since the display zone is electrically isolated from the main mirror area, the rest of the mirror need not dim when the display area locally dims). The electrically-isolating deletion (such as is described in U.S. Pat. Nos. 6,002,511; 5,724,187; 5,668,663 and 5,910,854, which are hereby incorporated herein by reference in their entireties) between the display zone 312b and the main reflector zone 312a may be created such as by the likes of laser ablation of the conductive coating(s) of the electrochromic reflective element at the display region (such as in the third surface metallic reflector layer and/or in the second surface transparent conductor, such as an ITO layer, of a laminate-type electro-optical mirror cell) so as to electrically isolate the display region from the principal viewing/reflecting region of the mirror element, so that when the display region dims to a lower reflectivity (and hence the display intensity of the video display screen is reduced but sunlight is locally doubly-reduced), the region of the mirror reflector outside of the display region (i.e., the main or principal viewing or reflecting region of the mirror element) does not necessarily dim in reflectivity (and so can be used to view rearward when reversing and the like). But at night, both the display region and the principal viewing region of the mirror reflective element may dim in tandem when glare from a following vehicle is detected by the glare sensor of the automatic dimming interior mirror assembly (optionally, when the glare is being detected but there may be a desire also to actuate the video display screen to display a video image or information display or the like, the region of the EC medium local to and in front of the video screen may dim less than the dimming of the principal viewing region of the mirror reflector so that the visibility to the driver of the information being displayed by the video display is preserved).

The video display screen is thus disposed behind the electrochromic mirror reflective element at the display region, with the reflective element divided by a partition into different zones, such as described in U.S. Pat. No. 6,690,268, which is hereby incorporated herein by reference in its entirety. The zones are individually controllable in reflectivity by a control (that preferably includes a photo sensor responsive to ambient light intensity levels local to the mirror assembly). The mirror assembly may comprise an epoxy seal material, such as used in the electrochromic arts and such as disclosed in U.S. Pat. Nos. 6,002,511; 5,680,245; 5,066,112; 5,724,187; 5,668,663 and 5,910,854, which are hereby incorporated herein by reference in their entireties.

Desirably, the display zone is only colored or darkened or dimmed when needed, in order to limit the potential spectral effects (and hence effect on the likes of color rendition or the like) on the display image that may occur when EC medium at the display regions is locally darkened. Thus, the display zone or region may be controlled in response to an ambient light sensor. Optionally, the photosensor or ambient light sensor may be located behind the display zone region so as to receive light through the separately dimmed region at the display screen, or the sensor may be located elsewhere, such as at the principal viewing area of the reflective element (such as behind the transflective reflector itself). The display zone or region of the reflective element may be locally dimmed or darkened when the ambient level of light detected at the mirror assembly reaches or exceeds a threshold level. Optionally, the display zone or region may be controlled in response to the existing light sensor used to control the principal viewing area of the reflective element (such as the ambient sensor common on automatic dimming mirror assemblies or another ambient light sensor of the vehicle).

Optionally, the zones may be controlled in response to engagement of the reverse gear of the vehicle. For example, when the vehicle is shifted into reverse, the display zone may be automatically dimmed or partially dimmed or colored to provide the desired contrast for the display (such as a display that provides images of the rearward field of view for a reverse aid or rear vision system of the vehicle) when the driver is backing up or reversing the vehicle (but the main or principal reflector area remains undimmed and high reflecting). Thus, the rear vision system may automatically activate the display screen and may automatically dim the display region or zone of the mirror reflective element when the vehicle is shifted into reverse for a reversing maneuver while leaving the remainder of the mirror element undimmed.

The two zones or regions of the mirror reflective element thus are individually controllable in reflectivity by a control (not shown), which preferably includes a photo sensor responsive to ambient light intensity levels local to the mirror assembly. During daytime driving, the control may power the display zone alone to reduce light transmission (for example, by dimming to about a 20 percent to 30 percent transmission level in the display zone for the electrochromic medium of the display zone) so that contrast enhancement for the image being displayed by the video display screen is provided. At night, the control may power both of the zones (either in tandem or selectively or locally) to provide glare protection from trailing headlights.

Figure 19:
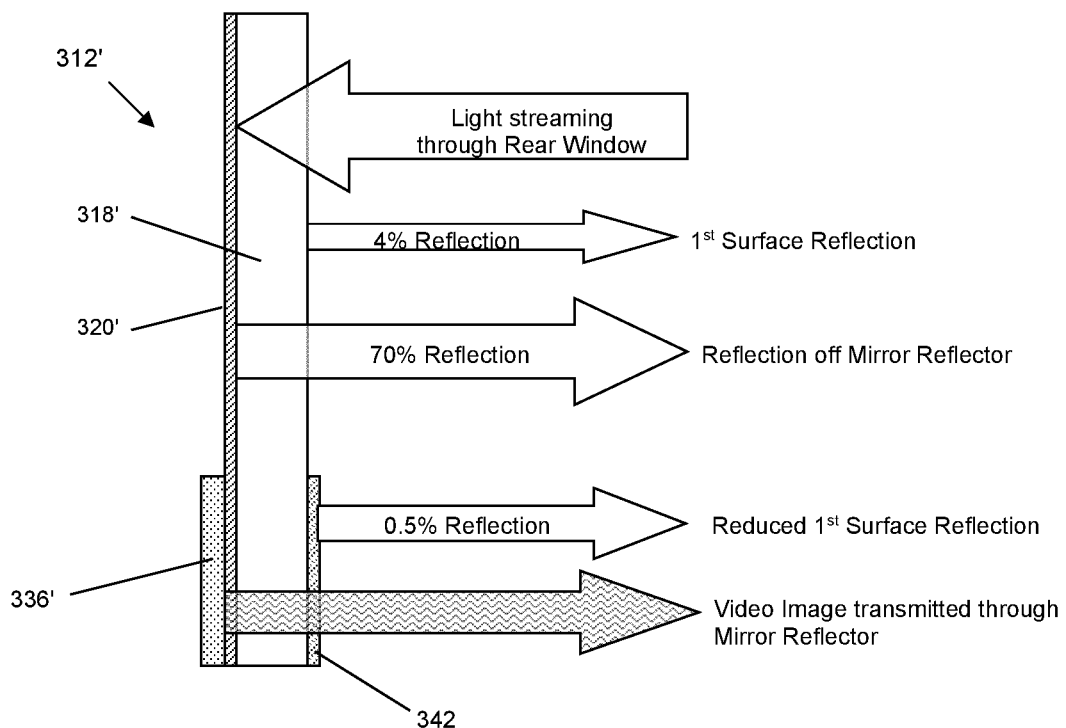
FIG. 19 is a sectional view of another electro-optic element for an interior rearview mirror assembly of the present invention.

Optionally, an anti-reflection coating may be disposed at the front surface of the reflective element and at the display area to reduce the first surface reflection at the display area to reduce display washout, such as by utilizing aspects described in U.S. Pat. No. 5,076,674, which is hereby incorporated herein by reference in its entirety. For example, and as shown in FIG. 19, a reflective element assembly 312' may include an anti-reflection coating or layer or element 342 at the front surface of the reflective element and generally in front of the video display 336' disposed behind the glass substrate or substrates 318' and behind the transflective mirror reflector 320'. The display images emitted or projected by the video display thus are transmitted through the mirror reflector 320', through the substrate/substrates and through the anti-reflection coating 342. The anti-reflection coating 342 functions to reduce the first surface reflection at the mirror first surface, such as from about 4 percent reflectance of light incident thereon to about 0.5 percent reflectance of light incident thereon. The anti-reflection coating 342 thus may provide reduced display washout on a sunny day.

Figure 20:
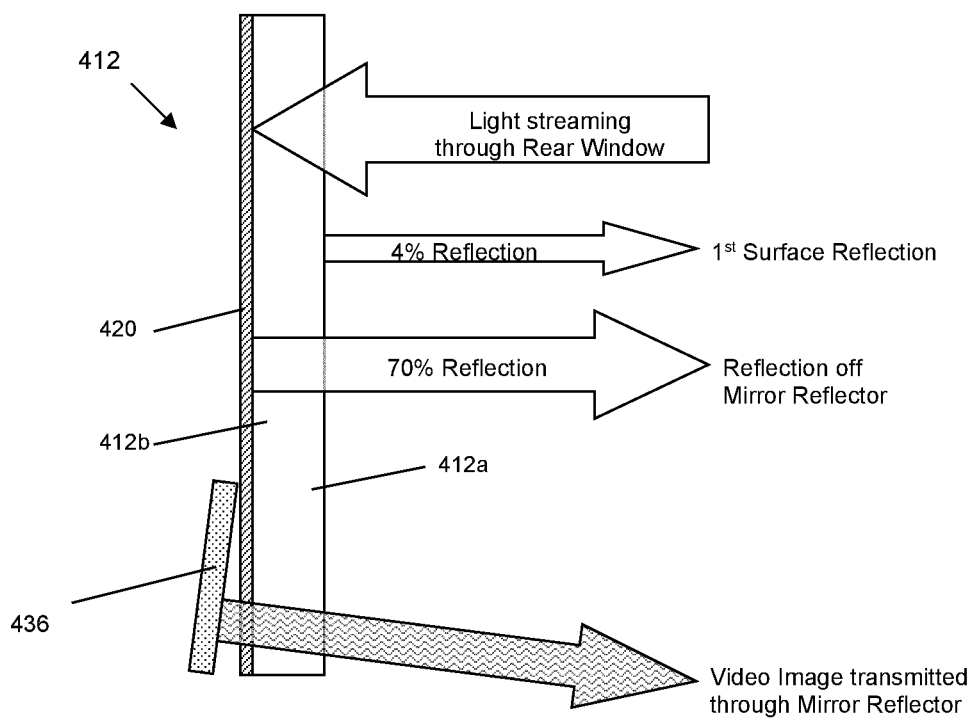
FIG. 20 is a sectional view of another electro-optic element for an interior rearview mirror assembly of the present invention.

Optionally, the video screen may be disposed at the rear of the reflective element and at an angle relative to the substrate or substrates of the reflective element, so that the display image is emitted/projected through the reflective element at an angle relative to the reflective element. For example, and as shown in FIG. 20, a video display screen 436 may be disposed at the rear of a reflective element 412 and may be angled relative to the rear surface 412*b* and mirror reflector 420 of the reflective element. The video display of the video screen 436 thus is transmitted through the reflective element at an angle that is different than the angle of the light reflecting off the mirror reflector 420 and the light reflecting off the front or first surface 412*a* of the reflective element 412.

Optionally, the video display screen may comprise a scanning beam display system that includes a plurality of laser light sources or diodes, a controller and a micro-electromechanical scanner (MEMS), such as the types described in U.S. patent application Ser. No. 11/226,628, filed Sep. 14, 2005 and published Mar. 23, 2006 as U.S. Publication No. US-2006-0061008, which is hereby incorporated herein by reference in its entirety. Such a direct laser-write video can deliver display intensity of about 1500 nits or more. Because of the high intensity illumination provided by such laser diodes, the intensity at the display region of the reflective element will be sufficient to dominate the reflection of the rearward scene off of the front surface of the front substrate of the reflective element, and thus will not appear washed out, even during high ambient lighting conditions, such as typically encountered on a sunny day. Optionally, the intensity of the laser diodes may be adjusted, such as via manual adjustment and/or via automatic adjustment, such as in response to the ambient light levels in the cabin of the vehicle or in the vicinity of the display.

Optionally, and with reference to FIG. 23, a mirror reflector element 512 includes a transmissive element 518, which may comprise a rear substrate for a laminate-type electrochromic (EC) mirror element (whereupon, as indicated below, reflector layer or layers 520 may be on the third or fourth surface of the laminate EC cell construction), or which may comprise a substrate for a conventional (non-EC) mirror element (such a single mirrored glass substrate) having a reflector layer or layers 520 at the rear or back surface of the transmissive element 518. Reflector 520 is divided or separated (or optionally, electrically isolated) into two portions or regions, a highly reflecting main or principal reflector portion (that is highly reflecting but need not be light transmitting) constituting a principal viewing/reflecting region portion 520*a* at the principal viewing region (zone B) of the mirror reflective element and a display region portion 520*b* where there is established a transflective reflector (significantly light transmitting and light reflective) and where a video display or other information display device is disposed. For purposes of electrical isolation (and only needed if it is desired to enable that the EC medium at display zone A be dimmable independent of any dimming of the EC medium at main reflector zone B (and so achieve the video image contrast enhancement/reduced wash-out described above whereby the EC medium can locally dim in front of where the video screen 536 is disposed when, for example, the driver is reversing the vehicle on a sunny day, while the remainder of the EC medium stays undimmed so that driver retains high reflectivity at zone B so he/she can see clearly while backing up the vehicle or the like)), a demarcation or deletion line 519 is established (such as by laser ablating a deletion line through the transflective layer established at the rear of the substrate) close to the interface between the portions 520*a*, 520*b* to electrically isolate the portions from one another. The rear substrate of the EC mirror element thus may include a display region transflective reflector layer or layers 521 disposed at a display region (zone A) of the mirror reflector element 512, and preferably contacting or overlapped by (or overlapping) the reflector 520, such as the display region reflector portion 520*b* or the main reflector portion 520*a* of reflector 520.

Preferably, for an EC laminate-type mirror element that uses a third surface reflector, the partially transmissive and still significantly reflective transflective reflector layer or layers 521 is first deposited onto the interior mirror shaped glass substrate (typically, though a polymeric substrate such as a polycarbonate or an acrylic or a CR39 or a COC can be also be used) at the display region or zone A, such as by sputter deposition in a vacuum chamber and with the "zone B" portion of the substrate masked. Then, in a second deposition step and with the mask removed, a different (less or non-transmissive but highly reflective) main or principal reflector layer or stack of layers [that is highly reflecting (>80% R preferred) but that need not be light transmitting at all since the video display is not disposed therebehind] can be deposited to form the reflector 520 in a manner that overlaps the edge of the already established display zone A transflective reflector layer or layers 521. Thus, there can be perfect register between the two zones. The (optional) thin demarcation line 519 can be then established close to where the respective layer(s) of zone A and zone B overlap. The driver will likely notice a slight difference in reflectivity between the less reflecting transflective reflector at zone A and the more highly reflecting reflector at zone B, but this need not be problematic, and the video screen 536 is still largely covertly hidden by the transflective reflector at zone A, and the greater light transmissivity of zone A (in the range of about 25% T to about 45% T at zone A achievable while still maintaining reflectivity off the EC mirror element at zone A of at least about 50% R) helps ensure that display washout on a sunny day is reduced. The video display screen 536 is disposed to the rear of the display region transflective layer 521 and is operable to emit a video image and through the transmissive mirror element 518 and through the display region transflective layer 521 for viewing by a driver of the vehicle.

Figure 23:
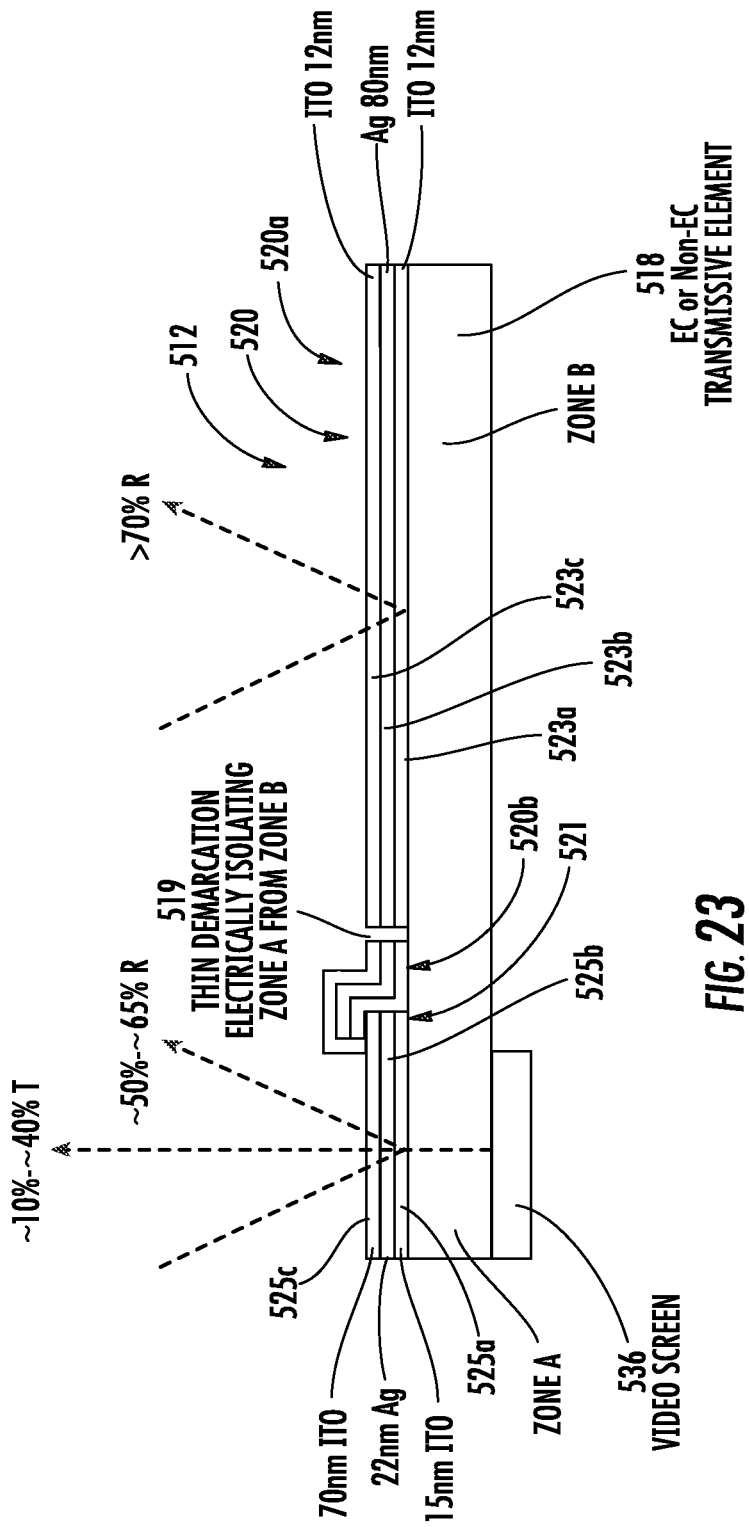
FIG. 23 is a sectional view of another mirror reflector element in accordance with the present invention.

As shown in FIG. 23, layer or layers 520, 521 comprise a thin metallic layer sandwiched between transparent conductive layers (but other embodiments are possible such as use of a single thin silver or sliver alloy layer or uses of a bi-layer). In a preferred illustrated embodiment, reflector 520 comprises a transparent conductive layer 523a, such as ITO, of about 12 nm (120 Angstroms) thick, a metallic layer 523b, such as silver, of about 80 nm thick, and a transparent conductive layer 523c, such as ITO, of about 12 nm thick. Such a reflector or stack of coatings or layers may provide at least about 80 percent reflectivity of light incident thereon (even when viewed as a third-surface in an EC mirror cell element), so that the mirror reflective element is at least about 70 percent reflective (when the EC mirror element is bleached or not dimmed) of light incident on zone B. Transmission through reflector 502 is minimum (typically less than about 2% or so).

Figure 24:
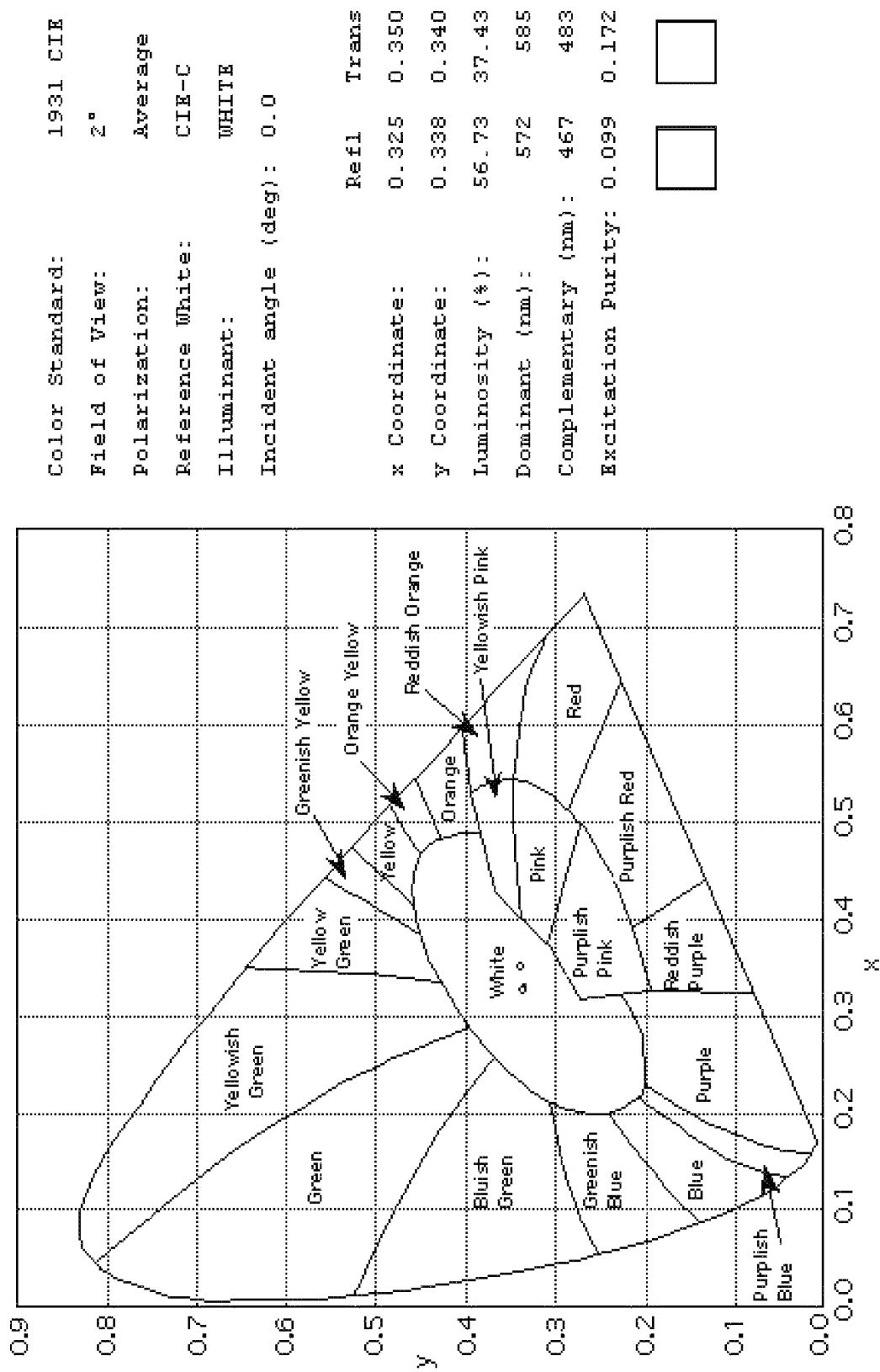
FIG. 24 is a spectral chart showing the luminosity of light through the reflector element of FIG. 23.
Figure 25:
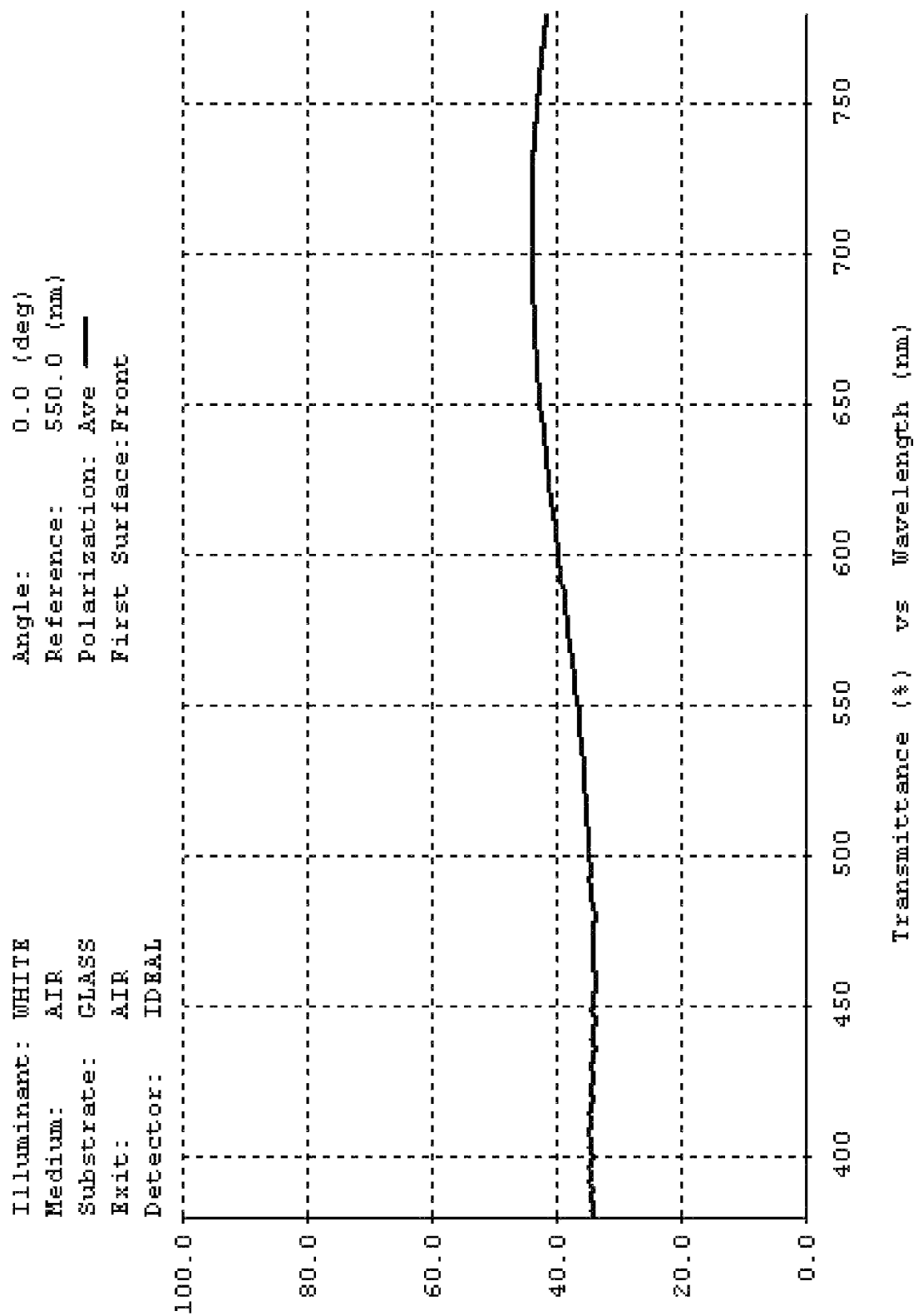
FIG. 25 is a spectral chart showing the transmission of different wavelengths of light through the mirror reflector element of FIG. 23.
Figure 28:
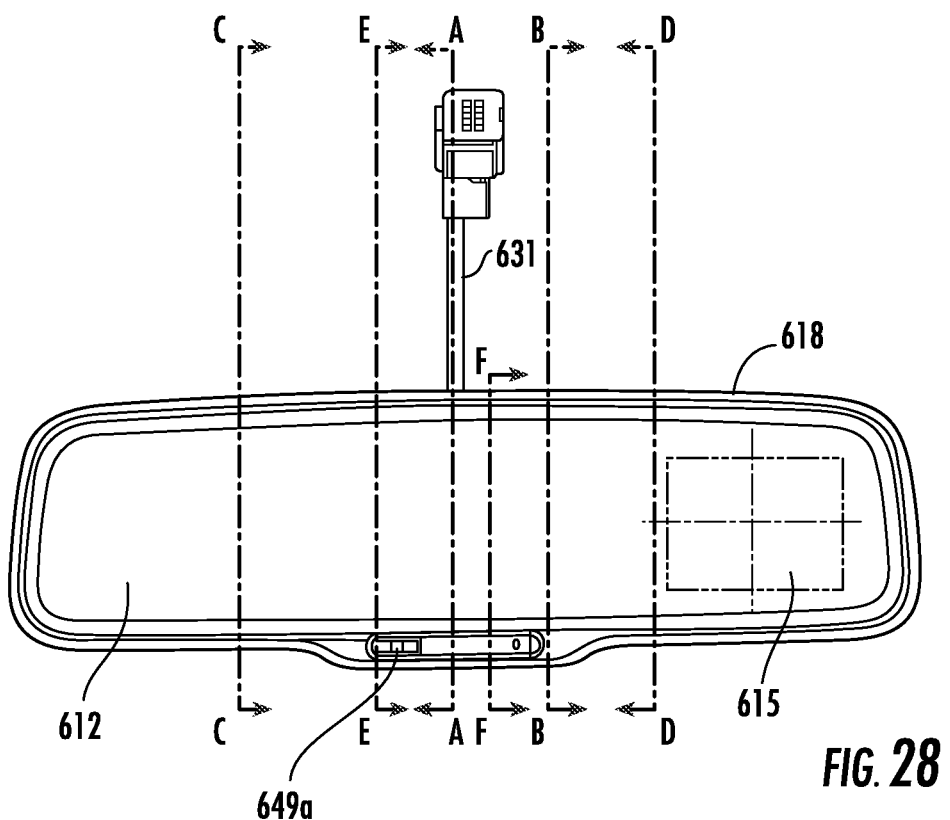
FIG. 28 is a front elevation of the mirror assembly of FIG. 27.
Figure 29:
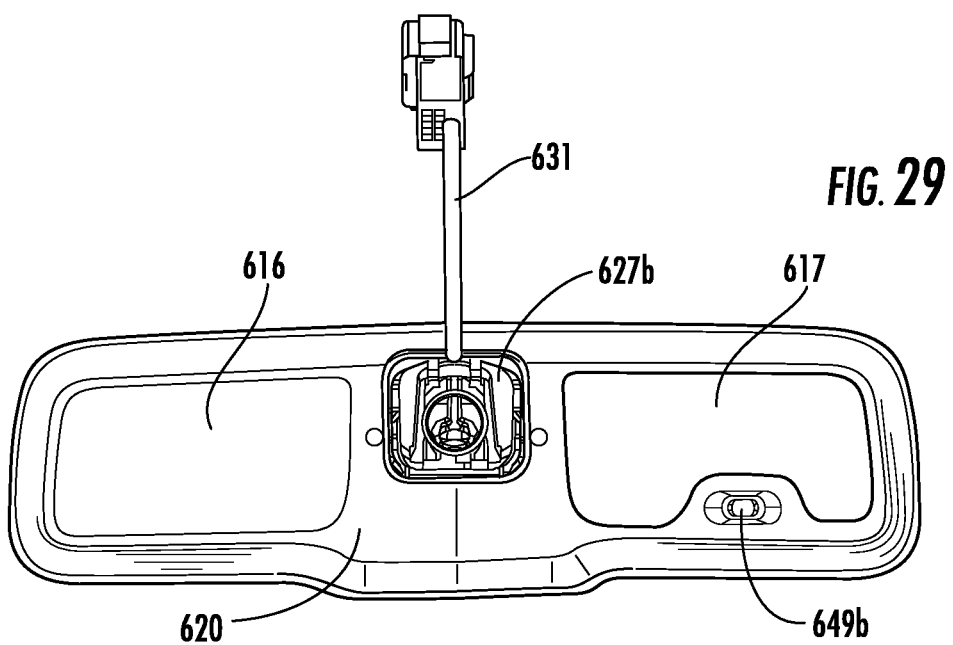
FIG. 29 is a rear elevation of the mirror assembly of FIG. 28.

Similarly, for example, transflective reflector 521 comprises a transparent conductive layer 525a, such as ITO, of about 15 nm (150 Angstroms) thick, a metallic layer 525b, such as silver, of about 22 nm thick, and a transparent conductive layer 525c, such as ITO, of about 70 nm thick (though other variants, such as described above, may be used). Such a transflective reflector may provide about 50 to 60 percent reflectivity of light incident on zone A through the EC mirror element (when the transmissive element is bleached or not dimmed), while allowing about 10 to 40 percent transmission of light through the mirror reflective element (when the transmissive element is bleached or not dimmed). Thus, the mirror reflective element may have enhanced transmissivity at the display region (zone A), while providing a desired degree of reflectivity of light incident thereon. An exemplary transflective mirror reflective element comprising glass/15 nm ITO/22 nm silver metal/70 nm ITO, such as described above, achieves the characteristics of light transmission/reflectance at the mirror reflective element as shown in FIGS. 24 and 25. As shown in FIG. 24, light passing through the mirror reflective element at zone A (and thus through the transflective layer 521 and through the glass substrate 518) has a luminosity percent of about 57 percent reflecting and about 37 percent transmitting, and with the mirror reflectance being substantially spectrally neutral so as to appear "silvery" to the viewer.

Other means may be implemented to provide a display screen at the mirror assembly that achieves reduced display washout on a sunny day. For example, a video slide-out mirror with a video display screen that slides out or otherwise extends to a viewable position when it is activated, such as a video mirror of the types described in U.S. Pat. No. 6,690,268, and/or U.S. patent application Ser. No. 11/284, 543, filed Nov. 22, 2005, now U.S. Pat. No. 7,370,983; and/or Ser. No. 10/538,724, filed Jun. 13, 2005 and published Mar. 9, 2006 as U.S. Publication No. US-2006-0050018; PCT Application No. PCT/US03/40611, filed Dec. 19, 2003 and published Jul. 15, 2004 as International Publication No. WO 2004/058540, and/or U.S. provisional applications, Ser. No. 60/630,061, filed Nov. 22, 2004; and Ser. No. 60/667,048, filed Mar. 31, 2005, which are hereby incorporated herein by reference in their entireties.

Also, in situations at night where a trailing vehicle to the rear of a vehicle equipped with an automatic dimming electrochromic (EC) interior rearview mirror has its high beam head lamps on or in similar high glaring conditions when driving at night, it is advantageous to have the interior electro-optic mirror dim close to 4 percent reflectivity in its anti-glare fully dimmed mode. With the likes of sodalime glass forming the first surface of the front or first substrate that incoming light is incident on, Fresnel's Laws of Reflection ensure that reflectivity will be at least 4% R (measured as per SAE J964a, which is hereby incorporated herein by reference in its entirety) and so compliance with FMVSS 111 is assured. To achieve a reflectivity close to 4% R from a laminate-type electro-optic (such as an electrochromic) interior mirror cell that comprises a front and a rear substrate with an electro-optic medium (such as an electrochromic medium) sandwiched therebetween (and so having a first, a second, a third and a fourth surface, such as are known in the art), it is desirable to have the electrochromic medium dim very darkly so that reflections off the third and fourth surfaces of the laminate-type electrochromic cell are minimized, and also it is desirable to have any reflections off the second surface also be negligible. For conventional laminate-type interior electrochromic mirrors used on vehicles today, transmission through the fully dimmed EC medium is typically about 15% T to about 17% T or so, and reflectivity off the EC mirror element is typically in the about 6% R to about 10% R range. Suppliers of such mirrors typically have to meet a <10% R (sometimes less than 8% R) fully-dimmed reflectivity state specification. Consequently, many of the interior EC mirrors used in vehicles today dim (at about 23 degrees Celsius or so) no lower than 6% R and only a relatively few dim in the 5% to 6% R range. To consistently manufacture and ship interior EC mirrors that consistently (across the annual volume manufactured within, for example, at least about 1 sigma of, more preferably within at least about 2 sigma of and most preferably within at least about 3 sigma of) dim below 5% R and preferably consistently dim to below 4.75% R and more preferably consistently dim to less that about 4.5% R and most preferably consistently dim to close to or lower than 4.25% R (but still be higher than 4% R), we find it advantageous to use a cell interpane gap of at least about 150 microns (more preferably at least about 175 microns and most preferably greater than about 200 microns) to contain the EC medium sandwiched between the front and rear substrate of the laminate-type EC cell construction. We also find it advantageous to use a relatively high concentration of electro-optically active species in the EC medium. For example, a concentration of cathodic organic species (such as viologen or viologens) of at least about 0.055 M is preferred (more preferably at least about 0.065 M and most preferably at least about 0.075 M) as well as a similarly high concentration of anodically coloring species, such as phenazines or ferrocenes (more preferably at least about 0.06 M and most preferably at least about 0.07 M). We find it advantageous to use a silver or silver-alloy third surface reflector (such as a glass/metal oxide/Ag/metal oxide third surface reflector such as glass/ITO/Ag (or Ag alloy)/ITO, or such as a glass/Cr/Ag (or Ag alloy)/Al:ZnO third surface electrode or such as a glass/silver or glass/silver-alloy third surface reflector). We also find it advantageous to use a metal border electrical conductor band (such as disclosed in U.S. patent application Ser. No. 11/226,628, filed Sep. 14, 2005 and published Mar. 23, 2006 as U.S. Publication No. US-2006-0061008, and/or U.S. provisional applications, Ser. No. 60/750,199, filed Dec. 14, 2005; Ser. No. 60/681,250, filed May 16, 2005; Ser. No. 60/690,400, filed Jun. 14, 2005; Ser. No. 60/695,149, filed Jun. 29, 2005; Ser. No. 60/730,334, filed Oct. 26, 2005; Ser. No. 60/750,199, filed Dec. 14, 2005; Ser. No. 60/774,449, filed Feb. 17, 2006; and Ser. No. 60/783,496, filed Mar. 18, 2006; and/or PCT Application No. PCT/US2006/018567, filed May 15, 2006 and published Nov. 23, 2006 as International Publication No. WO 2006/124682, which are hereby incorporated herein by reference in their entireties.) around and preferably fully circumscribing the border perimeter of the second surface of the front substrate so that there is a highly conductive all-around electrically conductive raceway around the ITO (or similar transparent electronic conductor coating or coatings) on the second surface of the front substrate. Flush or near-flush constructions are preferred (such as disclosed in U.S. patent application Ser. No. 11/021,065, filed Dec. 23, 2004, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; and/or Ser. No. 11/226,628, filed Sep. 14, 2005 and published Mar. 23, 2006 as U.S. Publication No. US-2006-0061008, which are hereby incorporated herein by reference in their entireties), and use of a maximum powering voltage of at least about 1.3 volts is preferred, more preferred at least about 1.35 V and most preferred at least about 1.4 V. Also, the composition and optical thickness and optical constants (including refractive index) of the transparent conductor (such as ITO) used on the second surface of the front substrate is selected and adapted to minimize any visible light reflectance off this second surface interface (and if beneficial, additional anti-reflection layers and means, as known in the optical arts, can be used to reduce or eliminate such second surface reflections). Transmission through the EC medium for such very dark dimming interior mirror EC cells is preferably less than about 13% T, more preferably less than about 8% T and most preferably is less than about 3% T when fully dimmed under the maximum applied voltage delivered by the EC mirror element powering circuitry of the automatic dimming interior mirror assembly. Note that aspects of such improvements in delivery of darker dimming electrically variable reflectivity interior automotive mirrors may also be applied to electrically variable reflectance automotive exterior mirrors.

Referring now to FIGS. 26-30, an interior rearview mirror assembly 610 for a vehicle (such as part of a video mirror system of the vehicle) includes an electro-optic element assembly or cell 612 and a display device 614 at a rear surface of the electro-optic element 612 for displaying information at a display area 615 of the reflective element. Display device 614 comprises a liquid crystal display module or LCM and is located behind the reflective element so as to be viewable by a driver of the vehicle when activated (such as shown in FIG. 26B), yet substantially non-viewable by or non-visible to the driver when deactivated (such as shown in FIG. 26A). Mirror assembly 610 may utilize aspects of the mirror assemblies described in U.S. patent application Ser. No. 11/284,543, filed Nov. 22, 2005, now U.S. Pat. No. 7,370,983; and/or Ser. No. 11/021,065, filed Dec. 23, 2004, now U.S. Pat. No. 7,255,451; and/or PCT Application No. PCT/US2006/018567, filed May 15, 2006 and published Nov. 23, 2006 as International Publication No. WO 2006/124682, which are all hereby incorporated herein by reference in their entireties.

It is desirable that the display device provides enhanced or substantial backlighting of the display screen to enhance the viewability of the display screen during high ambient lighting conditions. However, enhanced illumination typically results in increased operating temperatures of the display device due to the heat dissipation by the light sources of the rear backlighting, and, thus, is often challenging for applications within an enclosed structure such as a mirror casing. In the illustrated embodiment, the display device or video display module 614 includes sixty-four white light emitting diodes (LEDs) that are operable to backlight an LCD display screen 624, as discussed below. In order to reduce the operating temperature at the display device or module, mirror assembly 610 includes one or more thermally conductive elements or heat dissipating elements or heat slugs 616, 617 to conduct/dissipate heat generated by the LCM display device 614, as also discussed below.

As shown in FIG. 27, mirror assembly 610 includes a bezel portion 618 and a rear casing or housing 620 that support the reflective element 612 at the vehicle. Mirror assembly 610 includes a light mask or masking element 622 disposed at a rear surface of the reflective element 612 (which comprises a transflective or transreflective display on demand reflective element, such as the types described above). Light mask 622 comprises a dark or opaque material and substantially covers the rear of the reflective element and defines a window or aperture 622a at the rear of reflective element at which the video screen 624 of the display device 614 is located when the mirror is assembled. Optionally, the mirror assembly may include various masking configurations or the like to reduce viewability of the video screen at the mirror when the video screen is deactivated or not backlit or not illuminated. For example, the mirror assembly may include a masking element that includes or substantially matches the appearance of the deactivated or not illuminated video screen or the polarizer at the forward surface of the video screen, or the mirror assembly may include a video display framing element or pocket, such as a piece of metal shim stock (such as described in PCT Application No. PCT/US2006/018567, filed May 15, 2006 and published Nov. 23, 2006 as International Publication No. WO 2006/124682, which is hereby incorporated herein by reference in its entirety) that has a window formed or laser cut therefrom that matches or substantially matches the size and shape of the active area of the display screen. Desirably, the color, reflectance and gloss of the shim stock substrate is selected to substantially match the OFF condition of the video display screen. The presence and location of the video display is thus substantially camouflaged or hidden or non-discernible so that it may be difficult to identify or discern the location of the video display when viewing the reflective element. The display assembly (including the masking element or shim stock plate and display element attached thereto) may be attached or adhered to or disposed at the rear of the reflective element. Optionally, the mask element or material may not include a window for the display screen, but may comprise a polarizing material so that the video screen is located at the polarizing material and operable to emit light therethrough when activated, yet is substantially non-viewable behind the polarizing material when the display module and video screen are deactivated or not illuminated. The video display module may be attached to or adhered to the masking element and/or the rear surface of the reflective element, such as via a double-sided adhesive or tape 643.

An attachment plate 626 is attached at the rear of the reflective element 612, such as at a rear surface of the light mask 622, such as via a double sided adhesive tape 628 or the like. Similarly, the liquid crystal display module 614 is attached at the rear of the reflective element, such as via a double sided adhesive tape, such as via a transparent tape or adhesive material. A printed circuit board 630 is attached to the attachment plate 626 and includes circuitry disposed thereon with a wire harness 631 extending therefrom for connection to a vehicle wire harness or power source or control.

The attachment plate 626 includes a mounting ball member 626a (which may be insert molded at the attachment plate or otherwise attached or mounted thereto or established thereat, such as by using aspects of the attachment elements described in U.S. patent application Ser. No. 11/226,628, filed Sep. 14, 2005 and published Mar. 23, 2006 as U.S. Publication No. US-2006-0061008; and/or Ser. No. 10/933, 842, filed Sep. 3, 2004, now U.S. Pat. No. 7,249,860, and/or PCT Application No. PCT/US04/015424, filed May 18, 2004 and published Dec. 2, 2004 as International Publication No. WO 2004/103772, which are hereby incorporated herein by reference in their entireties) for pivotally mounting the mirror to a mounting structure or mounting arm 627a and mounting button or channel mount 627b for attaching the mirror to an interior surface of a vehicle, such as to an interior surface of the vehicle windshield or to an overhead console or headliner or the like. The mounting arm 627a extends through an aperture 621 established through a central region of the mirror casing 620 when the mounting configuration and mirror assembly is assembled. The wiring harness 631 may be along the mounting arm 627a and may be contained or routed within a wire clip 633 (which may snap or otherwise attach to the mounting arm to route and contain the wiring harness along the mounting arm, such as by utilizing aspects of the mounting arrangements described in U.S. provisional application, Ser. No. 60/729,430, filed Oct. 21, 2005, and/or U.S. patent application Ser. No. 11/584,697, filed Oct. 20, 2006, now U.S. Pat. No. 7,510, 287, which are hereby incorporated herein by reference in their entireties). Optionally, the attachment plate may include a plurality of strengthening ribs 626b to enhance the structural rigidity of the attachment plate to enhance the support of the mirror assembly in the vehicle. Optionally, the attachment plate may comprise an ABS material or may comprise a glass filled NYLON® material or the like to provide enhanced structural rigidity and strength over known plates made of an ABS material or the like.

Because either or both of the video display device or module 614 and/or the circuitry of the circuit board 630 may generate heat during use, it is desirable to reduce or minimize the heat build-up within the mirror assembly. For example, the illumination source 640 of the display module may comprise a plurality of individual low powered LEDs (such as white Nichia NESW064 LEDs or the like), each operating at up to about 50 mA (and typically at about 20 mA), and typically with a forward voltage of about 2 volts to about 5 volts (typically about 3.5-4 V). Thus, each LED may generate up to about 0.1 watts, and the array of sixty-four LEDs may dissipate up to about 6 watts (typically 3-6 watts and typically about 4 watts). Desirably, the sixty-four LEDs of the display module are powered as two banks of LEDs, with each bank having thirty-two LEDs, and with thirty-two sets or pairs of two LEDs being powered in series, with 8.5 volts across each series and a current regulator in series with each pair of LEDs. When so powered, the sixty-four white LEDs generate a light intensity of about 30,000 candelas/m$^2$ (thus, one or two or more banks of at least about 30 white LEDs (or more or less banks and/or LEDs depending on the particular application) is used, generating a backlighting intensity of at least about 10,000 candelas/m$^2$, more preferably at least about 20,000 candelas/m$^2$, and more preferably at least about 30,000 candelas/m$^2$), which provides a super high intensity backlight for a video screen and is achieved in a substantially square or rectangular array or package that is only about 2.5-3.5 inches diagonal or thereabouts. Although shown and described as sixty-four LEDs comprising two banks of thirty-two LEDs, more or less LEDs and/or more or less banks may be implemented, and each bank may include more or less than thirty-two LEDs, depending on the particular application of the LEDs and backlighting device and LCD video display screen and display module.

In the illustrated embodiment, the super high intensity backlight or illumination source 640 is positioned behind the display screen 624, which comprises a thin film transistor (TFT) LCD video screen with a polarizer or polarizing element, and emits the light through the video screen and through the transflective mirror reflective element for viewing by the driver of the vehicle. Such an LCD screen with polarizer may transmit about 5-10 percent of light incident thereon and typically about 6-7 percent of light incident thereon. When positioned in front of the LEDs (with an intensity of about 30,000 candelas/m$^2$), the light transmitted by the LCD may have an intensity of about 3,000 candelas/m$^2$, which provides a super bright LCD video screen.

The LCD screen is positioned behind the transreflective or transflective electro-optic (such as electrochromic) mirror reflective element 612, which may have at least about 10 percent transmissivity of light incident thereon, preferably at least about 15 percent transmissivity of light incident thereon, and more preferably about 20 percent transmissivity of light incident thereon, and less than about 30 percent transmissivity. Such a transflective reflective element may provide at least about 60 percent reflectivity of light incident thereon and more preferably at least about 65 percent reflectivity of light incident thereon. Thus, the intensity of the light from the display screen that is transmitted through the reflective element is about 400-600 candelas/m$^2$, which is highly visible to the driver of the vehicle.

Thus, the display module of the present invention provides a super high intensity backlight for a video screen so as to enhance the viewability of the video screen. However, such a super high intensity backlight generates heat at the display module and it is desirable to dissipate the heat and draw the heat away from the display module to avoid burning out of the LEDs or other electrical components and circuitry. In the illustrated embodiment, the LEDs are powered via a 12 volt feed from the vehicle, which is stepped down or reduced to (such as via a voltage regulator or converter or resistor or the like) the 8.5 volts applied to each pair of LEDs, such as via a converter or resistor or voltage regulator. The pairs of LEDs are powered at 20 mA and at 8.5 volts. Thus, with 32 pairs of LEDs powered at 20 mA and with a voltage reduction of about 3.5 volts (12 volts–8.5 volts), the powering of the LEDs generates about 2 watts. It is thus also desirable to dissipate the heat generated by the circuitry in powering the LEDs as well as to dissipate the heat generated by the LEDs themselves when so powered.

Typically, it is desired that the display provide about 1000 nits as a minimum intensity for daytime viewability, such as is typically desired for laptops, digital cameras, and/or the like. With respect to video mirrors for vehicles, the intensity is targeted to provide an intensity of at least 500 nits and preferably 1000 nits or more. However, the intensity provided by the display is often limited due to the system capabilities and thermal concerns of the mirror assembly.

Optionally, it is envisioned that the mirror assembly display may incorporate a "super-boost" intensity for daytime viewability, such as an increase in output intensity for a short period of time, such as for less than one minute or thereabouts. For example, the display may operate in the "super-boost" mode for up to about one minute when the on board photo-sensors determine that a maximum day time intensity is required (and when the display is activated, such as when the vehicle is shifted into a reverse gear). Such a super-boost mode may be achieved by pushing an increased or maximum current through the back light LEDs or by providing a parallel drive line that can drive the display at a higher current during the super-boost mode, and then switch over to another drive line with reduced current drive on the back light LEDs for normal operation of the display (such as for when the ambient light is below a threshold level as detected by one or more sensors). Optionally, and desirably, the intensity of the back light LEDs may be further controlled via a pulse width modulation (PWM) signal from a control or microprocessor of the mirror assembly or display device, so as to provide additional dimming capability to the display.

Optionally, for example, the control may drive the current through the back light LEDs at about 20 mA or less (such as just under 20 mA or thereabouts) with a PWM signal to achieve a display intensity of up to about 800 nits. The LEDs may be able to handle up to about 30 mA continuous current, and if such a current were pushed through the LEDs, the LEDs would give the back light a boost above 1000 nits. It is envisioned that if such a boost were provided for about 30 to 60 seconds, the display should be at the high intensity or boosted display intensity for a sufficient time to accommodate most backing up situations under maximum intensity requirements. By limiting the boosted or super high intensity time to about 30 or 60 seconds, the display operation will reduce or minimize the thermal impact to the system while providing a better potential for achieving the initial goal of viewability in high ambient lighting conditions, such as during high sunlight conditions or the like.

Optionally, the viewability of the display may be enhanced by tinting the vehicle windows to reduce the washout affect that may occur on sunny days. Also, it is envisioned that the viewability of the display may be enhanced by enhancing the contrast at the display. Optionally, for example, the mirror reflective element may be colored (such as slightly colored or tinted) at the area in front of the display, in order to enhance or improve the contrast ratio of the display.

Because of the substantial power and heat generated by the super high intensity illumination source or LED array of the display module of the present invention, it is highly desirable to draw the heat away from the circuitry and the LEDs to limit or avoid damage to the circuitry and/or LEDs due to the heat. Thus, one or more thermally conductive elements or heat sink slugs are placed in substantial and/or intimate thermal contact with the display module and/or circuit board and are exposed at the rear casing of the mirror so as to draw the heat away from the display module and/or circuit board and to the exterior of the mirror assembly, so as to dissipate and/or radiate the heat at the exterior of the mirror assembly.

In the illustrated embodiment, a thermally conductive element 616 is located at and is in intimate contact with the display module 614 and a thermally conductive element 617 is located at and is in intimate contact with a portion of the circuit board 630, so as to conduct and/or dissipate heat generated by the display module 614 and the circuitry of circuit board 630, respectively. The thermally conductive elements 616, 617 may comprise any suitable thermally conductive material, such as a metallic material or thermally conductive plastics or the like. Optionally, the thermally conductive material comprises a thermally conductive polyphenylene sulfide (PPS), such as a COOLPOLY® E5101 Thermally Conductive Polyphenylene Sulfide commercially available from Cool Polymers, Inc. of Warwick, R.I. The thermally conductive elements 616, 617 are formed, such as via molding or the like, and positioned at the rear of the mirror casing 620, such as at or within apertures or openings 620a, 620b formed or established at the rear of the mirror casing 620. Although two separate thermally conductive elements are shown and described herein, it is envisioned that a single thermally conductive element may be in intimate contact with both the display module and the circuit board to dissipate the heat therefrom, or two or more thermally conductive elements may be intimate contact with the display module and/or the circuit board to dissipate the heat therefrom, while remaining within the spirit and scope of the present invention.

Preferably, the thermally conductive elements are molded, such as via injection molding or the like, to the desired form so that a rear or exterior surface of the thermally conductive elements match or substantially match the exterior surface of the mirror casing at the area where the thermally conductive elements are located. The thermally conductive elements thus may be injection molded, and may be molded with selected or different pigments and/or materials to provide different colors and/or textures to substantially match the exterior surface of the mirror casing so as to be substantially not visible or discernible to the consumer. Preferably, the thermally conductive material is loaded with the likes of graphite or other suitable conductive materials for enhanced conductivity.

Optionally, the thermally conductive element or elements may comprise a metallic material, such as a magnesium material or other suitable heat sink material. For example, a magnesium alloy material such as Magnesium AM40A-F or other suitable metallic material or metal alloy material may be implemented to achieve the desired heat transfer and dissipation. The metallic thermally conductive element or elements may be die cast (or otherwise formed) to the desired form and may be formed and contoured to substantially match the exterior surface of the mirror casing so as to reduce the discernibility of the thermally conductive element at the mirror casing. Optionally, and desirably, the metallic thermally conductive element may be painted or coated at its outside surface to color match the plastic of the mirror casing and thus at least partially or substantially covertly camouflage the presence of the thermally conductive element at the exterior mirror casing. Optionally, the metallic thermally conductive element may be powder coated for durability. Any exterior coating or paint layer or skin layer at the outer surface of the thermally conductive element preferably comprises a thermally conductive material or paint as well so as to enhance the heat transfer and dissipation of the heat through the thermally conductive element and to the exterior of the mirror casing. Optionally, and desirably, a plastic grating or vent-like structure or grill may at least partially cover the outer surface of the heat sink or thermally conductive element so that it is difficult for a person's hand to come in contact with the actual surface of the thermally conductive element in order to reduce the possibility of a person experiencing discomfort if the person touches the thermally conductive element after the display has been activated and in use for a prolonged period of time. Such a grating or vent or grill allows for air flow and heat dissipation at the heat sink and also may shield or shadow the heat sink at or near the windshield to reduce solar loading at the heat sink, such as may otherwise occur on a sunny day.

The thermally conductive element or elements may be positioned at an aperture or apertures of the mirror casing, and may be snapped into the mirror casing, whereby the exterior surface of the thermally conductive element/elements match or substantially match the contour and/or texture and/or color of the mirror casing so that the thermally conductive elements are not readily discernible by a person viewing the rear of the mirror assembly. Optionally, the thermally conductive elements may be insert molded at the mirror casing or otherwise attached at the mirror casing. The thermally conductive elements thus provide a heat conductivity function at the mirror casing, without being readily discernible at the rear of the mirror casing. Thus, the thermally conductive elements may be located at an exterior surface or region of the mirror casing, yet are covertly camouflaged so that the thermally conductive elements are not readily visible or discernible at the rear of the mirror casing. Optionally, a thin layer or skin may be molded over the thermally conductive layer to provide an exterior surface layer that substantially matches the Class A finish of the mirror casing. The thin layer or skin may comprise a thermally conductive material to enhance heat transfer therethrough, while providing a thin, aesthetically pleasing outer layer or surface at the mirror casing. Thus, the exposure of the thermally conductive element at the rear casing portion of the interior rearview mirror assembly is substantially not discernible to a viewer viewing the rear casing portion of the interior rearview mirror assembly from outside of the vehicle and through the windshield of the vehicle when the interior rearview mirror assembly is mounted at the vehicle, such as at a mounting button or the like at the interior surface of the vehicle windshield. The presence of the thermally conductive elements is thus substantially or entirely camouflaged and not readily discernible to a person viewing the mirror casing.

In applications where only one thermally conductive element is used or where no thermally conductive elements are used, one or more "blanks" or filling elements may be used to fill in and cover/conceal the apertures for the thermally conductive elements. For example, a blank or filling element may be attached (such as via a snap attachment or the like) at the aperture formed at the mirror casing if a thermally conductive element is not necessary (such as if a video display option was not selected for that mirror assembly). Thus, a common mirror casing may be used for mirrors with and without the video display feature or function, whereby either a thermally conductive element or a blank element is attached or located (or insert molded) at the casing depending on the particular application.

As shown in FIGS. 32A, 32B, mirror casing 620 may include tab or clip elements 620c that functions to snap and retain the thermally conductive elements 616, 617 at the apertures 620a, 620b, respectively. The thermally conductive elements 616, 617 may be formed with tabs 616a, 617a extending therefrom and recesses 616b, 617b formed or established thereon. Thus, the thermally conductive elements 616, 617 may be positioned at the apertures 620a, 620b with the tabs 616a, 617a located at corresponding recesses or portions 620d of casing 620, and then pressed into the apertures, whereby the tabs 620c snap or clasp the thermally conductive elements 616, 617 at the recesses 616b, 617b to retain the thermally conductive elements at the rear of the mirror casing 620. Optionally, the mirror casing may utilize aspects of the mirror casings and casing portions described in U.S. patent application Ser. No. 10/933,842, filed Sep. 3, 2004, now U.S. Pat. No. 7,249,860, which is hereby incorporated herein by reference in its entirety. Optionally, the casing or a portion thereof may comprise a thermally conductive material to conduct and dissipate heat from the display module and/or circuit board to the exterior of the mirror assembly.

Figure 30A:
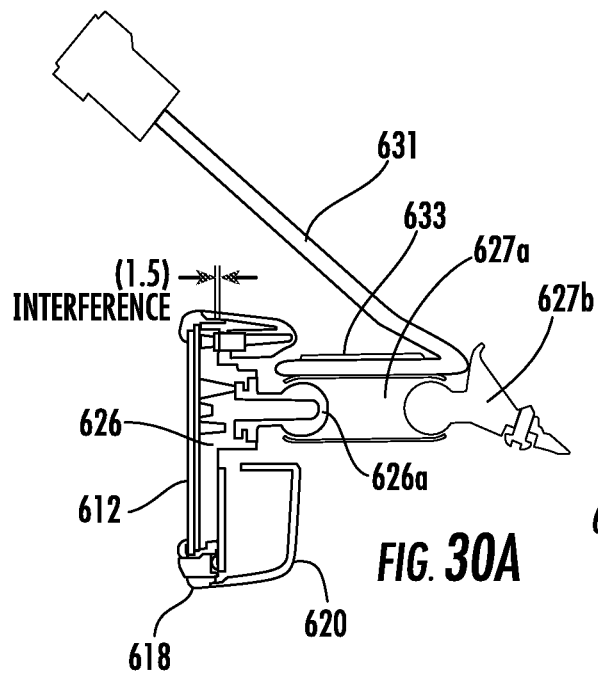
FIG. 30A is a sectional view of the mirror assembly taken along the line A-A in FIG. 28.
Figure 30D:
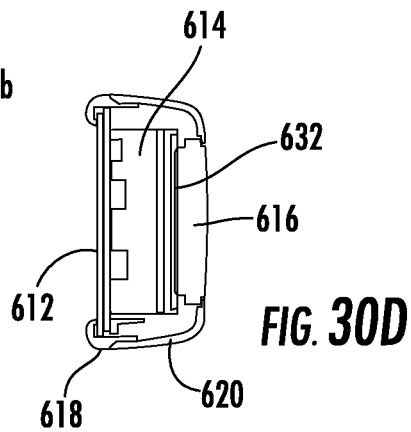
FIG. 30D is a sectional view of the mirror assembly taken along the line D-D in FIG. 28.

In order to facilitate and provide substantial heat transfer from the display module 614 and/or the circuit board 630, the module and circuit board should be in intimate contact with the respective thermally conductive elements 616, 617, and with minimal air pockets between the display module and circuit board and the respective thermally conductive elements. Thus, it is desirable to press the thermally conductive elements to the display module and circuit board and to adhere the elements in position at the display module and/or circuit board. For example, and as shown in FIGS. 27 and 30D, thermally conductive element 616 is adhered to a rear surface of display module 614 via a double-sided adhesive thermal tape 632, which provides an intimate connection between the display module and the thermally conductive element. The thermal tape (such as, for example, a thermal adhesive tape of the type commercially available from 3M, such as a 3M 8820 tape or a 3M 8810 tape or a 3M 8805 tape or other suitable adhesives or tapes) is preferably substantially thermally conductive so that heat generated by the display module 614 is conducted through the tape 632 and to the thermally conductive element 616, where the heat is dissipated at the rear of the mirror casing and outside of the mirror to substantially reduce the operating temperature at the display module. Optionally, and desirably, a compressible, resilient heat transfer pad 634 may be provided between the thermally conductive element 616 and the display module 614 to allow the components to be compressed together during assembly, whereby they would remain in intimate contact with one another. The heat transfer pad may comprise any suitable thermally conductive, compressible/resilient material, such as a solid or substantially solid or dense thermally conductive or filled silicone material or the like. Preferably, the tape and pad may comprise a suitable heat sink compound or the like to enhance the thermal conductivity between the display module and the thermally conductive element. The display module 614 may also or otherwise be compressible to accommodate tolerances and to allow the thermally conductive element 616 to be pressed firmly against the rear surface of the display module to ensure intimate contact therewith, as discussed below.

In the illustrated embodiment, circuit board 630 comprises a multi-layer circuit board, such as a four layer PCB or the like. The circuit board 630 thus has a primary substrate 630a that supports circuitry and a secondary or tiered substrate 630b that supports heat generating circuitry or the like at a location remote from the circuitry at the primary substrate 630a. The substrates may comprise a glass filled epoxy substrate or an aluminum substrate (with layer of non-conductive material over the substrate and with the copper traces disposed on the non-conductive material) or other suitable materials or types of substrates.

Figure 30C:
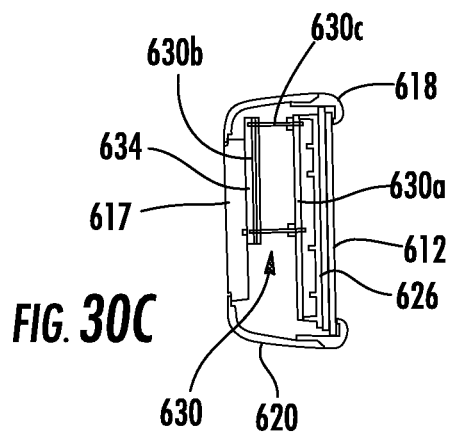
FIG. 30C is a sectional view of the mirror assembly taken along the line C-C in FIG. 28.
Figure 30B:
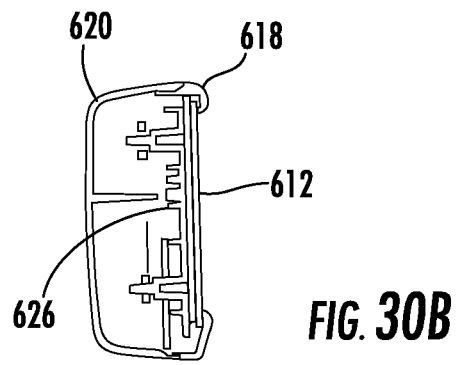
FIG. 30B is a sectional view of the mirror assembly taken along the line B-B in FIG. 28.
Figure 30E:
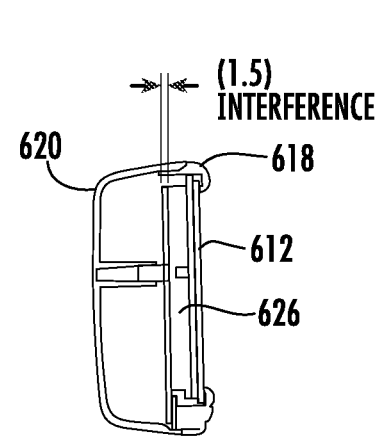
FIG. 30E is a sectional view of the mirror assembly taken along the line E-E in FIG. 28.
Figure 30F:
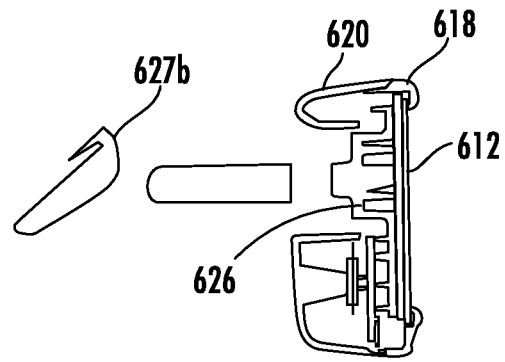
FIG. 30F is a sectional view of the mirror assembly taken along the line F-F in FIG. 28.
Figure 31A:
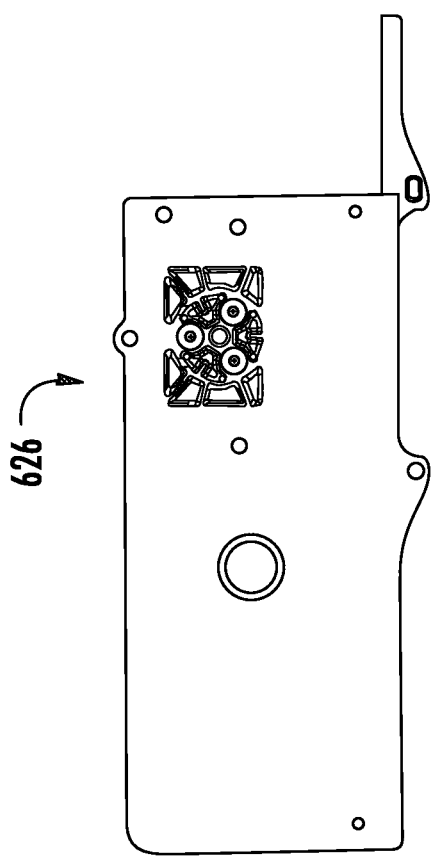
FIG. 31A is a plan view of a backing plate of the mirror assembly of the present invention.
Figure 31B:
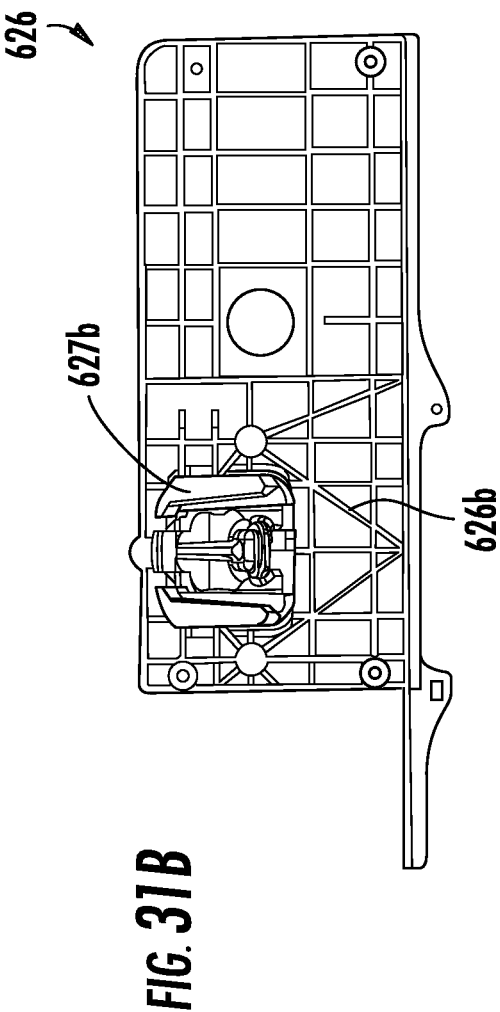
FIG. 31B is an opposite plan view of the backing plate of FIG. 31A.
Figure 33:
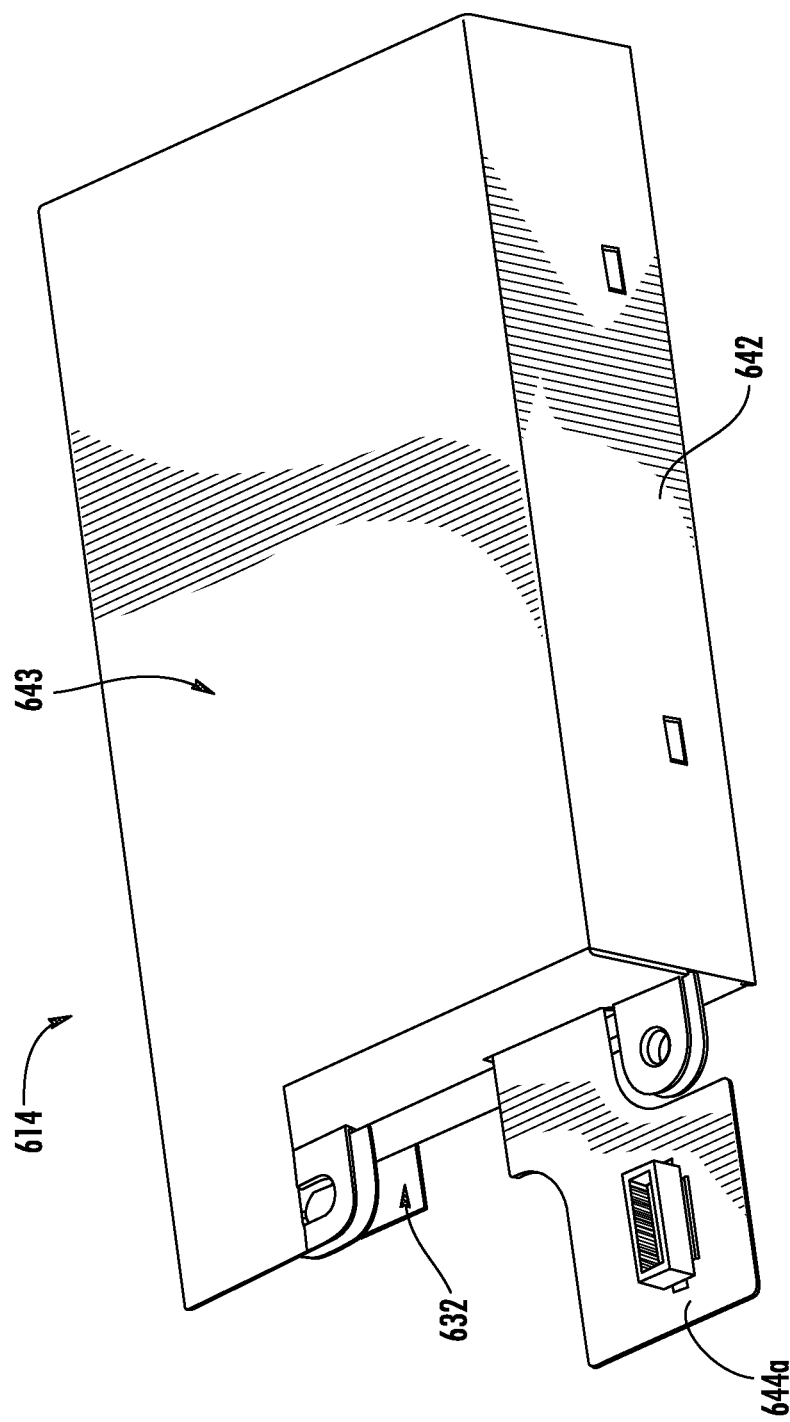
FIG. 33 is a perspective view of a display module in accordance with the present invention.

The secondary substrate 630b is preferably movably attached to the primary substrate 630a to allow for movement of secondary substrate 630b toward from primary substrate 630a as the thermally conductive element 617 is pressed firmly against the secondary substrate 630b to ensure intimate contact between the secondary substrate and the thermally conductive element 617. Similar to the connection between thermally conductive element 616 and display module 614, and as shown in FIGS. 27 and 30C, thermally conductive element 617 is pressed against and held at a rear surface of secondary substrate 630b of circuit board 630 with a compressible, resilient heat transfer pad 634 provided between the thermally conductive element 617 and the secondary substrate 630b to allow the components to be compressed together during assembly, whereby they would remain in intimate contact with one another. The heat transfer pad may comprise any suitable thermally conductive, compressible/resilient material, such as a solid or substantially solid or dense thermally conductive or filled silicone material or the like.

Preferably, the secondary substrate 630b is mounted to primary substrate 630a via posts or legs 630c (FIG. 30C) that allow for movement of secondary substrate 630b toward primary substrate 630a as the thermally conductive element is pressed thereagainst. The substrates or legs may be biased so as to be biased toward an initial spaced apart configuration of the substrates to urge the secondary substrate toward and against the thermally conductive element 617. The circuitry of the substrates are electrically connected together and remain electrically connected during any such movement of the secondary substrate. Such movement of the secondary substrate during compression of the thermally conductive element and circuit board accommodates tolerances and allows the thermally conductive element 617 to be pressed firmly against the compressible heat transfer pad 634 and the rear surface of the secondary substrate 630b to ensure intimate contact therewith.

Thus, the mirror assembly of the present invention provides for enhanced heat conductivity and dissipation from heat generating components within the mirror assembly to reduce the operating temperatures at those components within the mirror casing. The thermally conductive elements comprise a thermally conductive material that conducts the heat generated by the mirror components or devices to draw the heat from those components or devices and to dissipate the heat at the rear of the mirror and outside of the mirror casing. The thermally conductive elements are pressed against the respective mirror components (such as the display module and circuit board and/or the like) and are assured good thermal conductivity between the elements to reduce hot spots and to enhance the heat flow to allow the heat to escape through the mirror casing, such as through the back of the mirror casing. Optionally, the mirror assembly may also or otherwise include a micro-fan or other air moving device, which may be directed so as to move or blow the heated air at the display module or circuit board so as to cool the area surrounding the display module or circuit board, or so as to move or blow the air at the thermally conductive elements to enhance cooling and heat dissipation at the thermally conductive elements.

The thermally conductive elements may be molded or formed or contoured to substantially match or correspond to or be part of the mirror casing, and may be insert molded at the rear (or elsewhere if desired) of the mirror casing. Optionally, the mirror casing may be formed of such materials, but such a configuration is less desirable due to the effects the thermally conductive material may have on the surface finish, weight, cost and functionality of the casing. Optionally, the thermally conductive elements may be painted or textured or coated or otherwise finished at the rear surface thereof in order to substantially match the color or texture or appearance of the mirror casing, so that the thermally conductive elements are not readily discernible by a person viewing the rear of the mirror assembly. Optionally, the mirror casing may be formed with ribs or raised portions or grating or vents or baffles or louvers or vanes across the apertures (such as a plurality of spaced apart ribs over or across the aperture), whereby the ribs cover parts of the outer or rear surface of the thermally conductive elements to limit or reduce the possibility of a person directly touching the thermally conductive elements in the event that they may increase in temperature during operation of the display module or circuitry of the mirror assembly, and/or to shade the thermally conductive elements to reduce solar loading thereof, and/or to further dissipate the heat that is dissipated by the thermally conductive element or elements. Preferably, the thermally conductive element or elements can be insert molded at or snapped to the mirror casing. In applications where the thermally conductive element or elements is/are not used, a blank or filler element may be attached or insert molded at the mirror casing.

Figure 42:
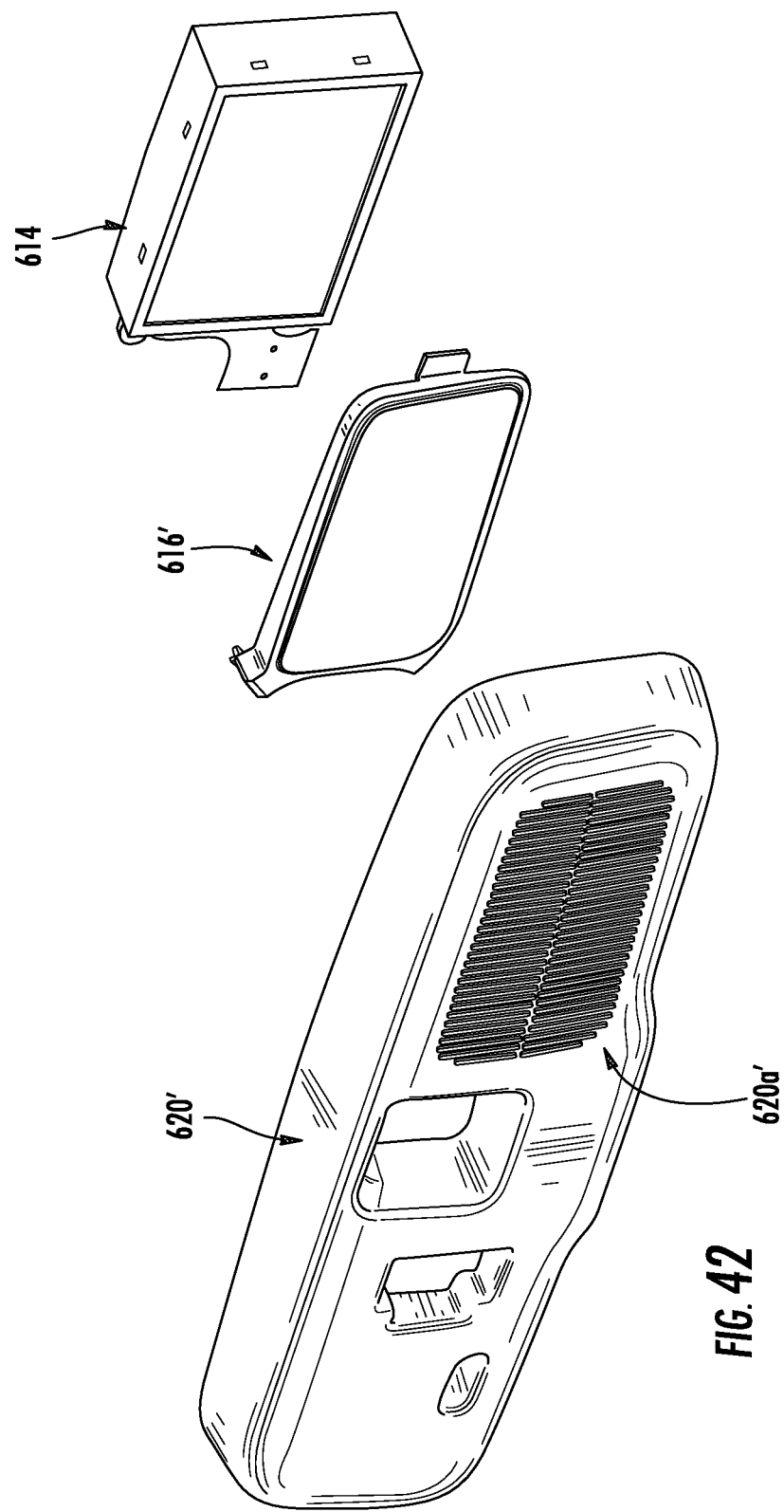
FIG. 42 is a perspective view of another mirror assembly, with a heat dissipating element in accordance with the present invention.

Optionally, the mirror casing may include ribs or grating or vents or baffles at the region of the casing that is generally at the thermally conductive element or elements when the mirror assembly is assembled, in order to substantially conceal the thermally conductive element and/or to limit or substantially preclude a person touching the thermally conductive element and/or to reduce solar loading of the thermally conductive element, such as may otherwise occur on a sunny day. Optionally, for example, and with reference to FIG. 42, a thermally conductive element 616' is disposed between the video display module 614 and the rear mirror casing or housing 620', which has or vents or grating 620a' at the area or region that generally corresponds to thermally conductive element 616' when the mirror is assembled. The thermally conductive element may comprise any suitable thermally conductive element, such as described above. Optionally, and in the illustrated embodiment of FIG. 42, thermally conductive element 616' may comprise a plastic molded heat dissipating element or heat sink, such as a cool polymer heat sink or the like. The molded thermally conductive element is disposed between and in intimate contact with the rear of the display module (such as at an aluminum clad circuit board with LEDs disposed thereat that forms the rear of the display module), and may be adhered at or to the rear of the display module via an adhesive, such as a thermal tape 632 or the like. The mirror casing 620' and/or thermally conductive element 616' may otherwise be substantially similar to the mirror casings and/or thermally conductive elements described above and below, such that a detailed discussion of the mirror casing and thermally conductive elements need not be repeated herein.

Figure 43:
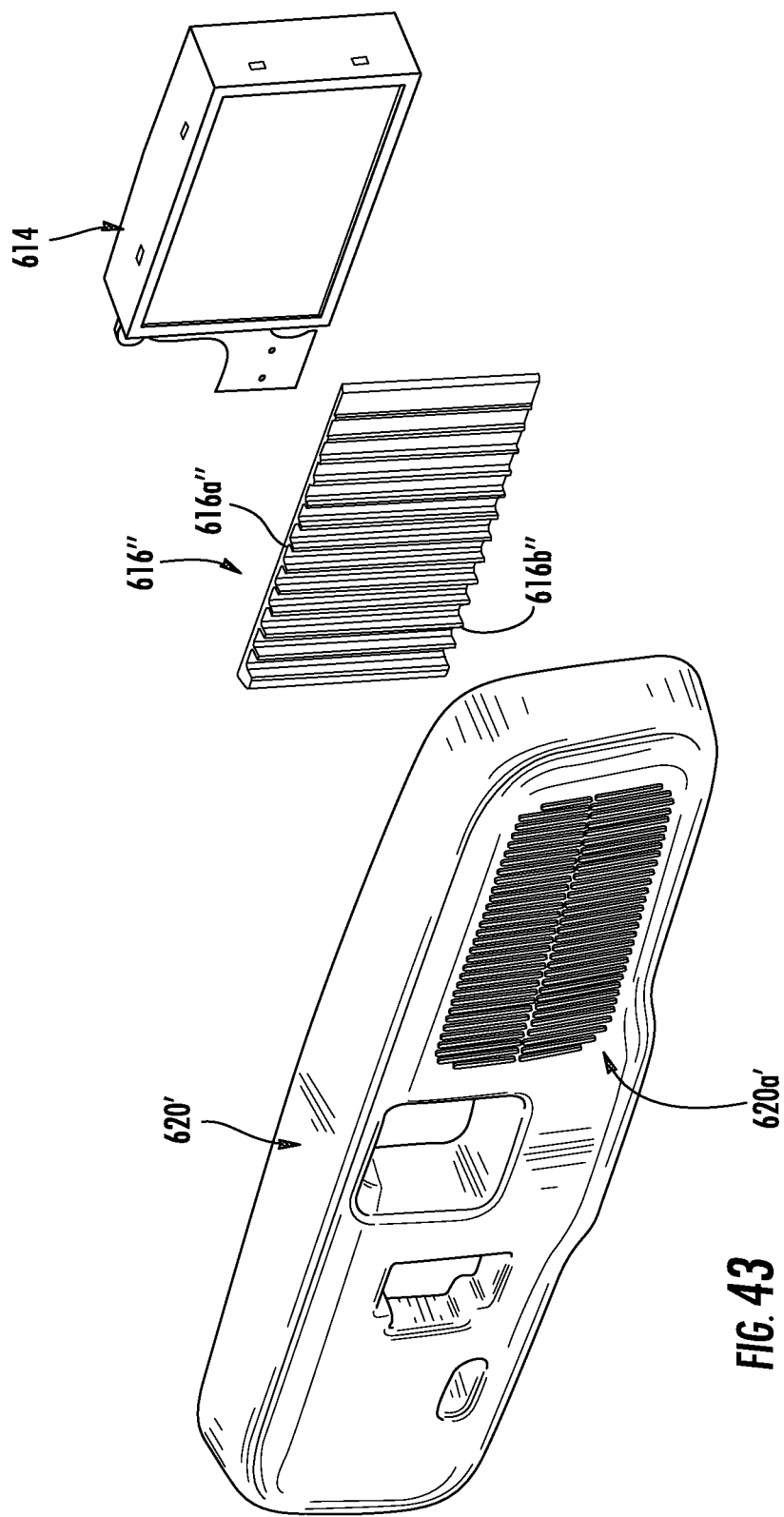
FIG. 43 is a perspective view of another mirror assembly, with a heat dissipating element in accordance with the present invention.

Optionally, for example, and with reference to FIG. 43, the thermally conductive element 616" may be formed to include a body portion 616a" with ribs or protrusions 616b" protruding at its rear surface so as to be toward or against the grating 620a' of mirror casing 620' when the mirror is assembled. The protrusions protrude a desired or appropriate distance from the body of the thermally conductive element so as to be at or in contact with the grating 620a' of mirror casing 620' when the mirror is assembled. As can be seen in FIG. 43, the protrusions 616b" may be different lengths to correspond to a curve or form of the mirror casing. The thermally conductive element 616" may comprise an extruded aluminum heat sink or an extruded anodized heat sink or other suitable material, and is in intimate contact with and/or adhered to the rear of the display module 614, such as via a thermal tape 632 or the like. The thermally conductive element 616" may otherwise be substantially similar to the thermally conductive elements described above and below, such that a detailed discussion of the thermally conductive elements need not be repeated herein.

Figure 44:
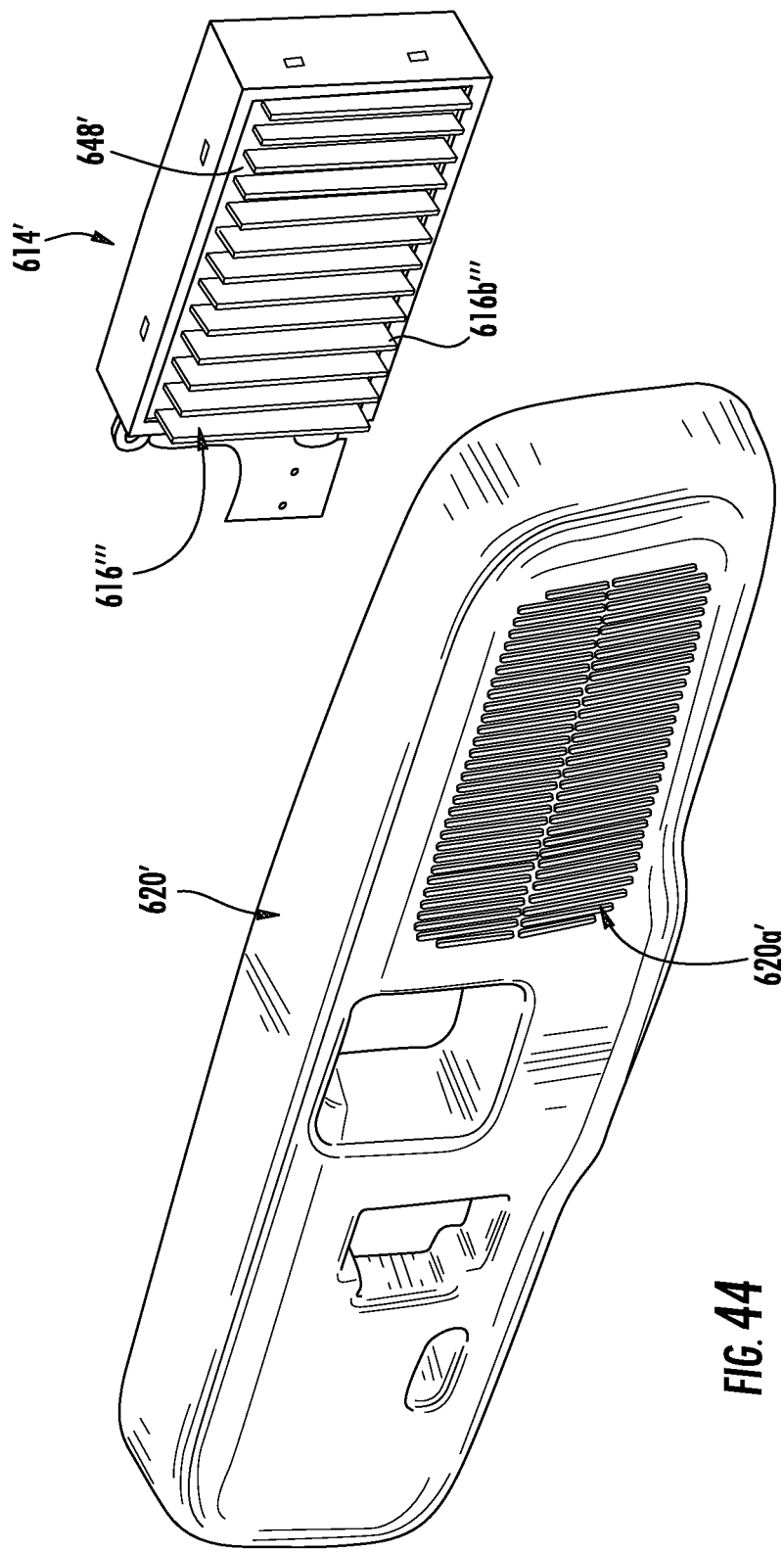
FIG. 44 is a perspective view of another mirror assembly, with a heat dissipating element in accordance with the present invention.

Optionally, for example, and with reference to FIG. 44, the thermally conductive element 616''' may be integrally formed at the rear of the video module 614', so as to be at the grating or vents 620a' of mirror casing 620' when the mirror is assembled. For example, thermally conductive element 616''' may comprise a substrate 648' (such as an extruded substrate, and such as a substrate similar to substrate 648 discussed below) with LEDs and circuitry (not shown in FIG. 44) disposed at or established at one side of the substrate and a plurality of fins or protrusions 616b''' protruding from the opposite side of the substrate so as to protrude/extend toward the vents 620a' of mirror casing 620' when the mirror is assembled. Such an application obviates the need for the thermal tape at the rear of the video module by establishing or integrally forming the heat sink or thermally conductive element at the rear of the video module. The protrusions or fins 616b''' protrude a desired or appropriate distance from the body of the thermally conductive element so as to be at or in contact with the grating 620a' of mirror casing 620' when the mirror is assembled. As can be seen in FIG. 44, the protrusions 616b''' may be different lengths to correspond to a curve or form of the mirror casing. The thermally conductive element 616''' may otherwise be substantially similar to the thermally conductive elements described above and below, such that a detailed discussion of the thermally conductive elements need not be repeated herein.

In the illustrated embodiment, and with reference to FIGS. 33-38, the display module 614 comprises a backlit liquid crystal display module having a liquid crystal display screen 624 (such as a TFT LCD screen or the like, such as described above) and an illumination source 640 disposed behind the display screen 624 and operable to emit or project illumination toward and through the display screen. The display screen 624 and illumination source 640 are disposed within or encased or clad within an outer casing or housing 642 of the module 614. The casing or housing 642 (such as an aluminum housing or housing made of other suitable material such as FR-4 or the like) substantially encases the illumination source 640 and display screen 624 and associated circuitry 644 of the display device so as to provide a self-contained aluminum clad (or other material) video display screen module for use with a mirror assembly. The display module may comprise a known or commercially available display module, which may provide reduced costs due to economies of scale in using an off-the-shelf, commercially available display module.

Optionally, the display module may be developed and constructed particularly for use in a vehicle mirror assembly. For example, the display module casing 642 may support and/or substantially encase the illumination source 640 and video screen 624, and may support or substantially encase circuitry 644 of the display module 614. The circuitry 644 functions to control the display screen and the illumination source (such as in response to or in conjunction with image data and/or a user input or the like), and is electrically connected to a connector or lead 644a that protrudes from the casing 642 for connection to the circuitry of the mirror assembly and/or vehicle. Optionally, the circuitry of the display module may also function to provide dimming control of the electrochromic reflective element, while remaining within the spirit and scope of the present invention. In the illustrated embodiment, the illumination source 640 of the display module comprises a plurality of light emitting diodes 646 (LEDs), such as a plurality of high intensity white LEDs disposed behind the display screen and operable to emit light directly toward the display screen to provide direct back lighting of the display screen.

For example, and as described above, the illumination source 640 may comprise sixty-four white LEDs 646 arranged in a matrix on a substrate 648 at the rear of the housing 642. The LEDs 646 may be electrically operated as two banks of LEDs, with each bank including thirty-two LEDs, and with the LEDs being operated in groups of two or pairs, with the LEDs of each group of two being operated in series. The pairs of LEDs may be operated by applying 8.5 V across the pair at a current of about 20 mA. The current may be applied via a pulse width modulation (PWM) and with the peak currents of each bank of LEDs being staggered so that the currents are applied at slightly different times to reduce or spread out the electromagnetic emissions. It is desirable to apply a substantially constant current to the LEDs to limit or substantially preclude color shifts in the LED outputs. It is envisioned that more than two LEDs could be operated in series, but if a series fails, additional LEDs would be deactivated with such a configuration. Also, additional LEDs in the series of LEDs may require additional power supplies to step the voltage up to provide enough voltage to drive the multiple LEDs in series. Thus, pairs of LEDs are desired to reduce costs and maintain the required current as low as possible. However, other quantities of LEDs or light sources and/or other groups or pairings of more or less LEDs or light sources may be operated or controlled in other manners, while remaining within the spirit and scope of the present invention. Optionally, the intensities of the LEDs or light sources may be adjusted or controlled in response to one or more photosensors (so as to, for example, decrease the intensity of the illumination source at dusk or other low or reduced lighting conditions), such as in response to a forward facing photosensor 649a (FIGS. 28 and 40) and a rearward facing photosensor 649b (FIGS. 29 and 40) at the mirror assembly or such as in response to other photosensors located elsewhere at or in the vehicle.

Optionally, and desirably, and as best shown in FIGS. 34-37, display module 614 may include a reflective layer or reflector 650 at the LEDs 646 (such as LEDs of the types described in U.S. patent application Ser. No. 10/054,633, filed Jan. 22, 2002, now U.S. Pat. No. 7,195,381, which is hereby incorporated herein by reference in its entirety), with apertures formed through the reflector 650 for light emitted by the LEDs to pass therethrough. The LEDs 646 thus emit light through the reflector 650 to and through the video screen 624. However, some of the light emitted by the LEDs will reflect back off of the rear surface of the display screen and back generally toward the LEDs. The reflector 650 preferably comprise a highly reflective (such as specular reflectivity or diffuse reflectivity of at least about 50 percent reflectance of light incident thereon, more preferably at least about 70 percent reflectance of light incident thereon, and more preferably at least about 90 percent reflectance of light incident thereon) surface that reflects the reflected light back toward the video screen 624 so that more of the light emitted by the LEDs is used to back light the video screen. For example, the reflector 650 may comprise an aluminum reflector or other suitable reflective material, and may comprise a stamped metallic sheet or layer (and may function as a heat sink or partial heat sink as well) with the apertures stamped or punched therethrough. The reflector 650 may be located so as to be intimate with or just above the LEDs so that it is generally at the plane of the LEDs at which the light is emitted (to minimize or substantially preclude light emitted by the LEDs from reflecting off the rear surface of the reflector and back toward the substrate 648). Optionally, the inside surfaces of the walls 652, 653 defining the LED cavity may also be highly reflective, and could be coated plastic walls or could be metallic to establish the desired degree of reflectivity at the sidewalls of the LED cavity.

Display module 614 may comprise a compressible display module that is compressible when assembled in the mirror assembly to provide a snug fit and intimate contact with the thermally conductive element 616. For example, and as best shown in FIGS. 34-37, display module 614 may include compressible elements, such as compressible walls 652, 653, that allow for compression of the display module. An upper or forward wall 652 supports the video screen 624 at an upper or outer end 652*a* thereof, while a lower or rearward wall 653 supports the illumination source 640 at a lower or rearward end 653*a* thereof. In the illustrated embodiment, the walls 652, 653 engage one another and overlap at a generally central region, and are correspondingly stepped at their engaging/overlapping surfaces to allow for movement in one direction (such as vertically in FIGS. 34-37, but forwardly and rearwardly when the display module is located at an interior rearview mirror of a vehicle), while substantially precluding lateral movement of the upper wall 652 relative to the lower wall 653. A compressible or resilient element or gasket 654 is disposed between the upper and lower walls 652, 653 and is compressible when the upper wall 652 is moved or compressed toward the lower wall 653. The resilient element 654 may comprise a resilient material, such as a foam or foam rubber or the like.

The upper and lower walls 652, 653 thus may be compressed toward one another during installation of the display module 614 in the mirror assembly 610, and thus may accommodate for variations in dimensions and tolerances of the components while allowing for snug and intimate contact between the rear surface of the display module 614 and the thermally conductive element 616 (and/or the thermally conductive tape and/or thermal pad disposed between the display module and the thermally conductive element). The foam or resilient material may at least initially urge the lower wall 653 away from the upper wall 652 to urge the rear of the display module into intimate contact with the thermally conductive element 616 (but may lose or reduce the biasing over time without affecting the intimate contact, since the thermally conductive element 616 is adhered to the rear of the display module via the thermal tape 632).

Thus, when the display module 614 and thermally conductive element 616 are installed or positioned at and in the mirror during assembly of the mirror, and the bezel and mirror casing and other components are assembled together, the components may be compressed together and biased into efficient thermal contact, with the display module absorbing or accommodating the compression to reduce the pressure at the display module and video screen. The display module and the thermally conductive element thus may be pressed into intimate contact with one another to reduce or substantially preclude any air pockets or gaps therebetween, so as to provide enhanced thermal conductivity from the display module to the thermally conductive element, and without excessive forces at the display screen. The mirror assembly may secured together with the display module in the compressed or partially compressed state and the components may be heat staked together (or otherwise secured, such as via ultrasonic welding or the like) to ensure the compression and thermal conductivity between the components.

Figure 35:
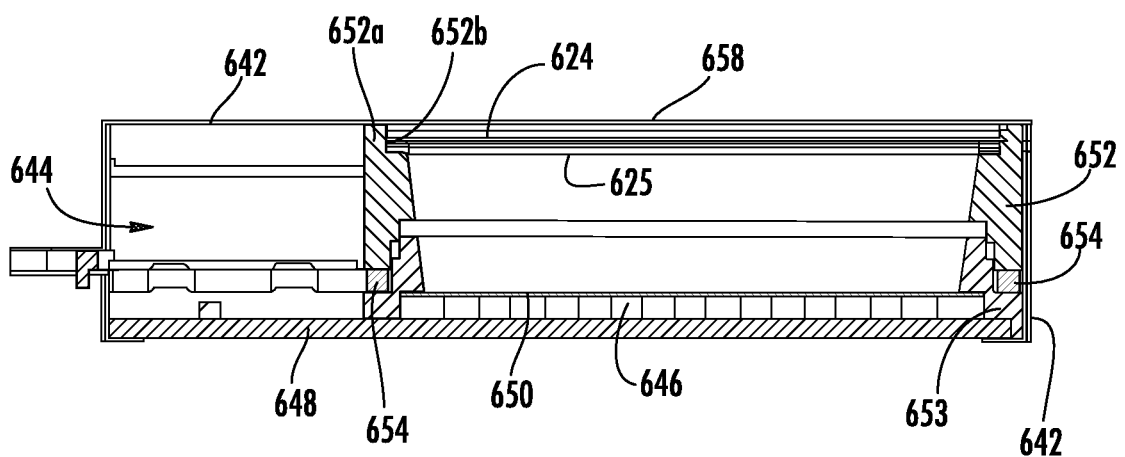
FIG. 35 is a sectional view of the display module of FIG. 33.
Figure 36A:
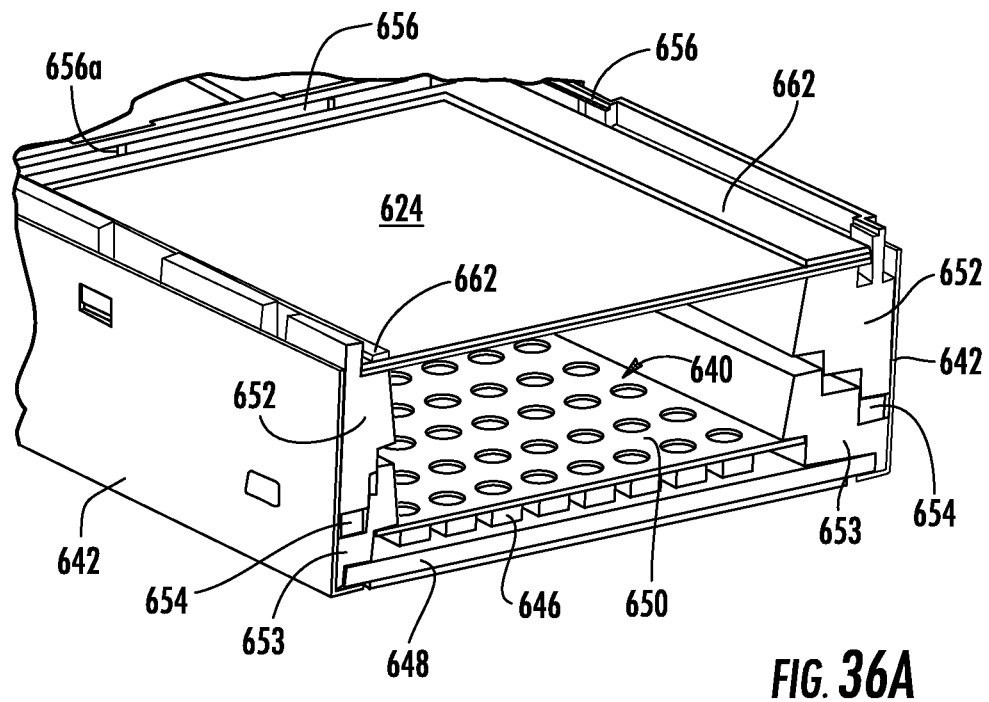
FIG. 36A is a perspective and partial sectional view of the display module of FIG. 33.

In the illustrated embodiment, display screen 624 is supported at a recess 652*b* established or formed at the forward end of wall 652. As shown in FIG. 35, the display screen 624 comprises a liquid crystal display and may include a diffuser 625 adhered or attached or disposed at a rear surface of the liquid crystal display screen 624. Other display enhancing elements or sheets or optical layers or elements, such as a polarizer or polarizing element 658, may be located at the display screen to enhance the appearance of the display screen during operation thereof.

Figure 38A:
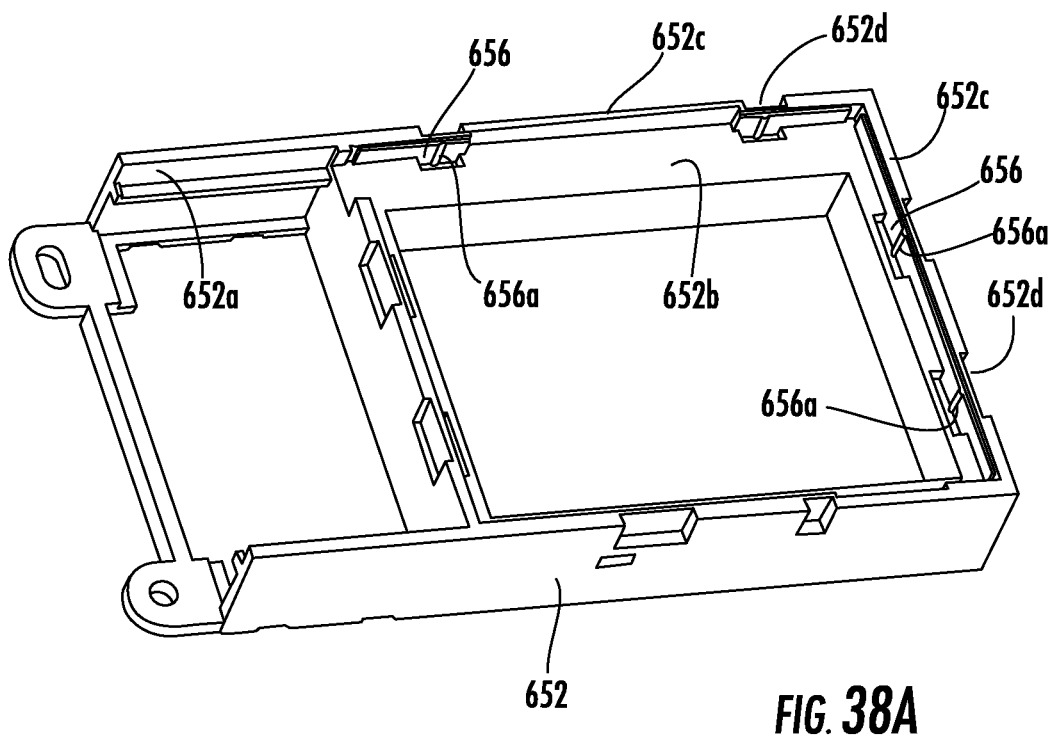
FIG. 38A is a perspective view of a portion of the display module casing, showing flexible retaining beams with retaining projections thereon.
Figure 38B:
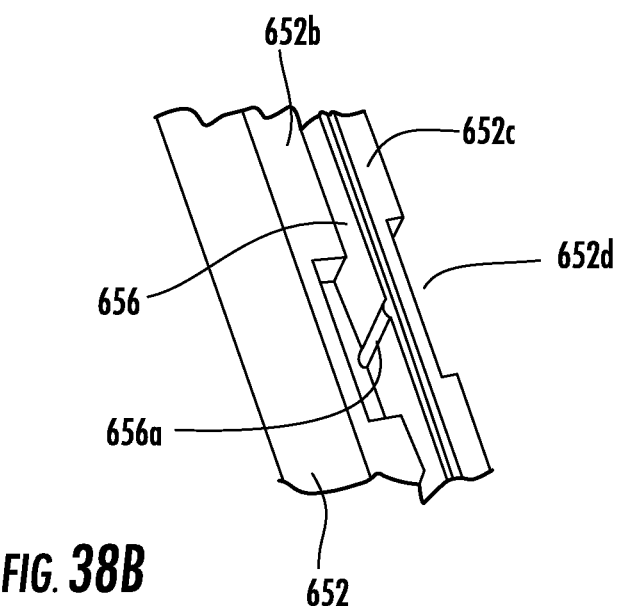
FIG. 38B is an enlarged perspective view of the display module casing portion of FIG. 38A.

As best shown in FIGS. 38A and 38B, display screen 624 may be supported and retained at recess 652*b* of wall 652 via a plurality of flexible support beams or arms or elements 656. In the illustrated embodiment, flexible support elements 656 include a plurality of projections or fingers 656*a* that extend laterally to engage the perimeter edges of the display screen so as to support and locate the display screen at the forward end of the wall 652 and display module 614. Flexible support elements 656 extend at least partially along an outer wall portion 652*c* of recess 652*b* and may flex laterally (such as at recesses or openings or gaps 652*d* at the outer wall portion 652*c* that correspond generally to the location of the fingers 656*a* of flexible support elements 656) to locate the display screen at the appropriate location and to provide support of the display screen at the wall 652 of display module 614.

Thus, the display screen 624 may be located at the forward or outer end of the wall 652 of display module 614 and retained in the desired or appropriate location via the fingers 656*a* of flexible support elements 656. The flexible support elements and spring fingers thus may accurately support and locate the display screen within the plastic wall of the display module. The flexible support elements 656 may flex or deflect during contraction of the plastic wall (such as may occur during temperature changes encountered by the vehicle and/or display module) so as to retain the display screen (and particularly the active area of the display screen) at the appropriate location relative to the mechanics of the display module during such contraction of the wall itself, while limiting or reducing the stresses applied to the display screen during such contraction of the plastic wall. Other forms of spring clips or elements that may flex to allow for contraction of the plastic wall while reducing stresses on the display screen may be implemented while remaining within the spirit and scope of the present invention.

The walls 652, 653, illumination source 640 and display screen 624 and circuitry 644 are substantially encased within housing 642, which may have a thermally conductive adhesive tape 632 applied at its rear surface for attachment/adhesion to thermally conductive element 616. For example, the adhesive tape 632 may be adhered or disposed at the rear surface of the housing 642 and may have a peel away backing membrane that is peeled away from the adhesive to expose the adhesive prior to adhering the thermally conductive element 616 to the display module 614. Likewise, an adhesive tape 643 may be disposed at or adhered to a forward surface of the display module (and may have a peel away backing to selectively expose the tape) for attaching or adhering the display module to the masking element 622 and/or rear surface of the reflective element 612.

Figure 39A:
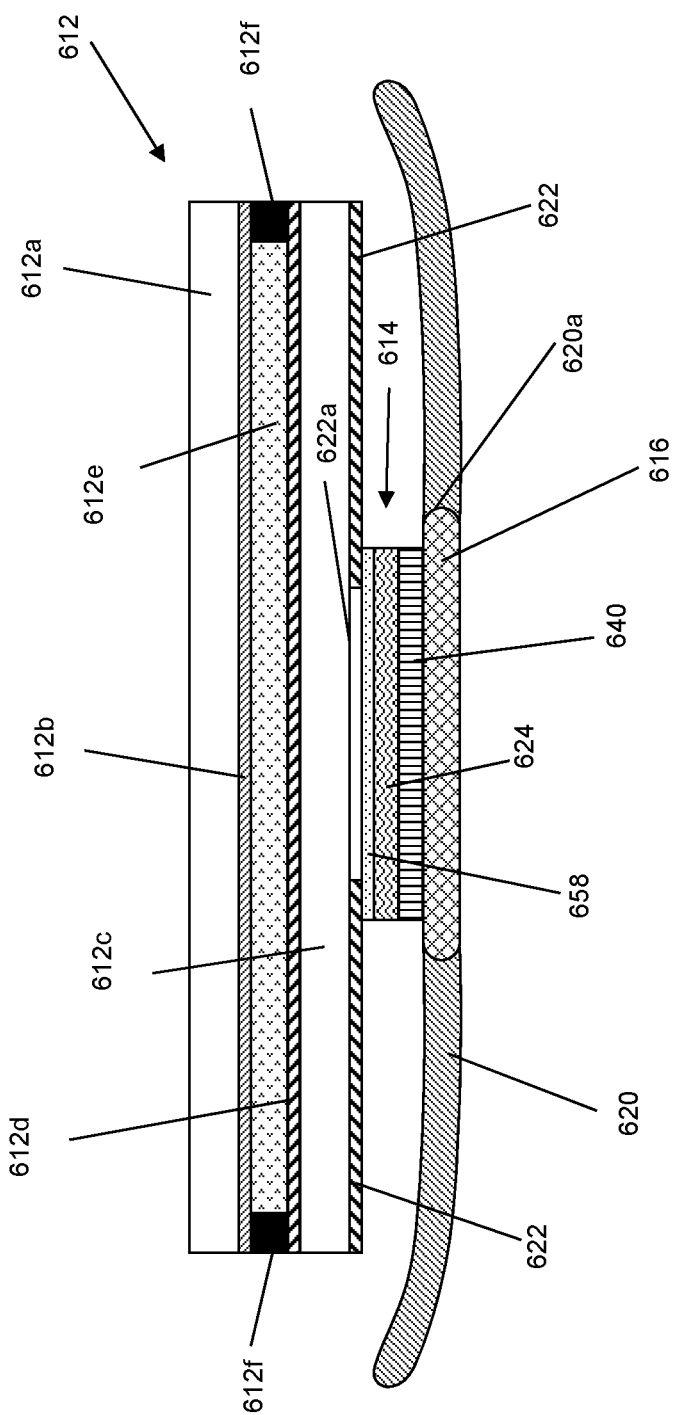
FIG. 39A is a sectional view of a display screen and display module at a mirror reflective element in accordance with the present invention.

The display module and display screen are located at the rear of the reflective element and may be at the window or aperture through the opaque layer or masking element, so that the active area of the display screen is viewable through the reflective element when the display screen and illumination sources are activated, and with the display screen and display module being substantially not visible or discernible when the display screen and illumination sources are deactivated. For example, and with reference to FIG. 39A, the display module 614 (including the display screen 624, backlighting element 640 and forward or front-most polarizer 658) may be disposed at the aperture 622a of masking element 622 and at the rear of the reflective element 612. The polarizer 658 and display screen 624 and backlighting element or illumination source 640 may overlap or extend over the masking element 622 so that the perimeter edge or edges of the display module and/or display screen are not visible to a person viewing the reflective element 612, such that the presence of the display screen and module is covertly camouflaged. The thermally conductive element 616 is disposed at the rear of the display module and in intimate contact therewith (such as via a thermal adhesive and/or thermal pad or the like) and is located at the aperture 620a at the rear of the mirror casing 620, such that the exterior surface of the thermally conductive element 616 is at and preferably substantially matches the contour of the exterior surface of the mirror casing, such as described above.

In the illustrated embodiment, the reflective element 612 comprises a transflective reflective element or cell having a front substrate 612a with a transparent conductor 612b (such as a transparent conductor layer comprising an indium tin oxide (ITO) or an AZO layer or the like) at its rear surface (commonly referred to as the second surface of the reflective element), and a rear substrate 612c with a transflective mirror reflector 612d at its front surface (commonly referred to as the third surface of the reflective element), and with an electro-optic medium 612e (such as an electrochromic medium) disposed therebetween and sealed via a perimeter seal 612f. The reflective element may utilize aspects of the electro-optic or electrochromic mirror assemblies described in U.S. Pat. Nos. 6,690,268; 5,668,663; 5,142,406; 5,442,478 and 5,724,187, and/or in U.S. patent application Ser. No. 10/054,633, filed Jan. 22, 2002, now U.S. Pat. No. 7,195,381; Ser. No. 11/021,065, filed Dec. 23, 2004, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 and published Mar. 9, 2006 as U.S. Publication No. US-2006-0050018; Ser. No. 11/226,628, filed Sep. 14, 2005 and published Mar. 23, 2006 as U.S. Publication No. US-2006-0061008; Ser. No. 10/993,302, filed Nov. 19, 2004, now U.S. Pat. No. 7,338,177; and/or Ser. No. 11/284,543, filed Nov. 22, 2005, now U.S. Pat. No. 7,370,983; and/or PCT Application No. PCT/US2006/018567, filed May 15, 2006 and published Nov. 23, 2006 as International Publication No. WO 2006/124682, which are all hereby incorporated herein by reference in their entireties. Other reflective elements or reflective element configurations or arrangements may be implemented without affecting the scope of the present invention.

Figure 39B:
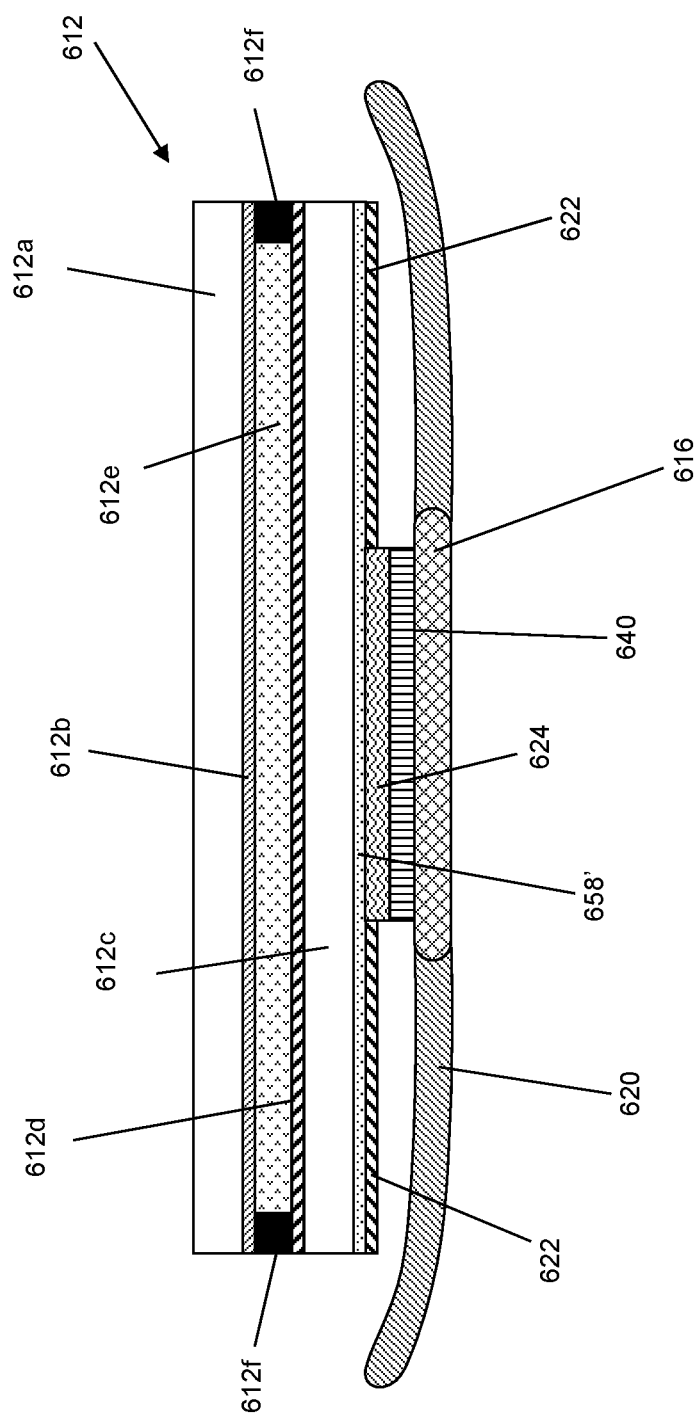
FIG. 39B is a sectional view of a display screen and display module at a mirror reflective element in accordance with the present invention.

Optionally, and with reference to FIG. 39B, the polarizer 658' may be disposed over substantially the entire rear surface of the rear substrate 612c of reflective element 612, with the light absorbing substantially opaque layer or masking element 622 disposed over the polarizer 658' except at the window area 622a. The display screen 624 and backlighting element 640 of display module 612 are located at the window area 622a and at the polarizer 658', whereby the display screen is located behind the polarizer, and the display screen and the perimeter edges thereof are not readily discernible when the display screen and backlighting element are deactivated.

Figure 39C:
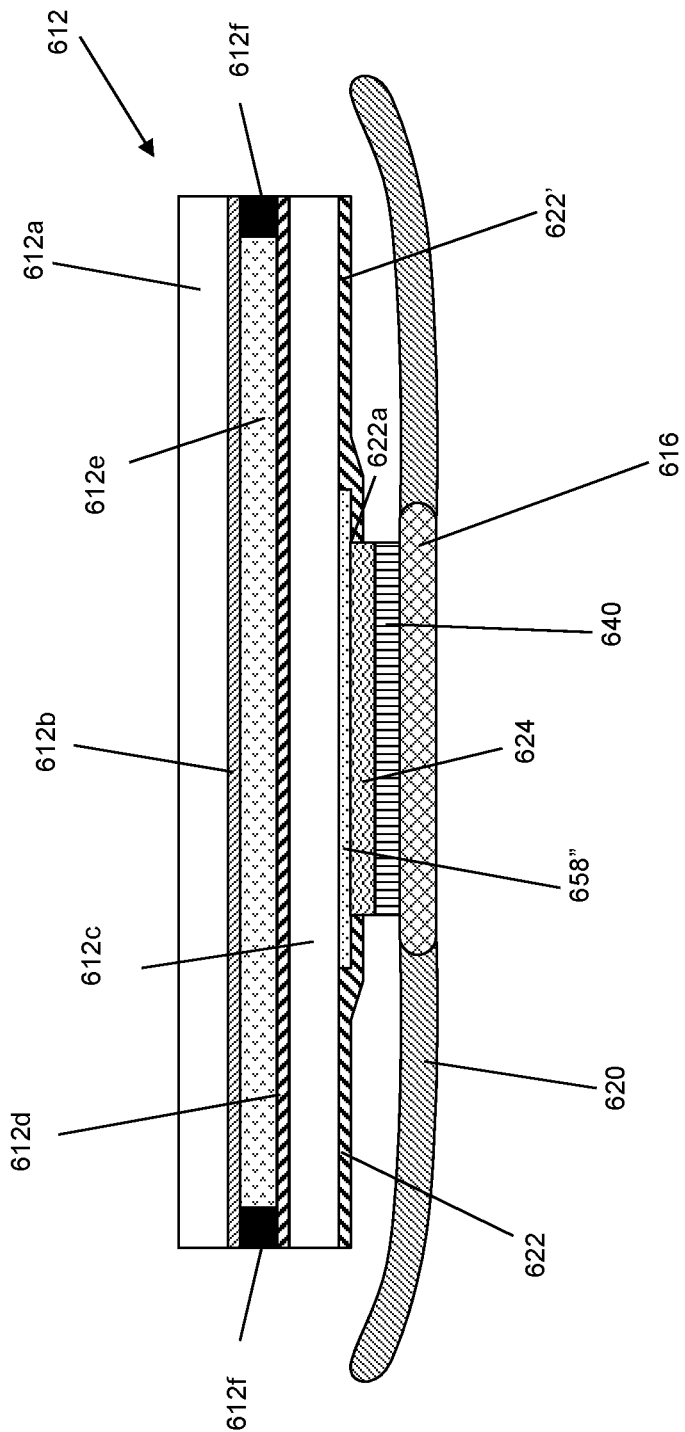
FIG. 39C is a sectional view of a display screen and display module at a mirror reflective element in accordance with the present invention.

Optionally, and with reference to FIG. 39C, the polarizer 658" may be disposed at the display area at rear surface of the reflective element, and the light absorbing substantially opaque layer 622' may be disposed partially over the perimeter regions of the polarizer 658". The display screen 624 and backlighting element 640 of display module 612 are located at the window area 622a' of the opaque layer 622' and at the polarizer 658", whereby the display screen is located behind the polarizer, and the display screen and the perimeter edges thereof are not readily discernible when the display screen and backlighting element are deactivated.

Figure 39D:
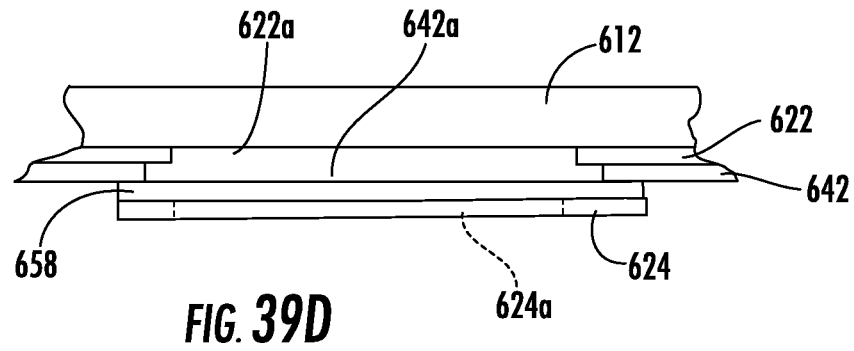
FIG. 39D is a sectional view of a display screen and display module at a mirror reflective element in accordance with the present invention.

Optionally, other configurations or arrangements of the display module and polarizer and opaque layer may be implemented at the rear of the reflective element, depending on the particular application and desired appearance of the mirror assembly. For example, and with reference to FIG. 39D, the housing 642 has an opening or aperture 642a formed or established at its forward surface that is sized so as to frame the active area of the video screen 624. The aperture 642a of housing 642 may be sized so as to be greater than the window 622a established by masking element 622. Polarizing element 658 may be at the forward surface of the display screen or LCD 624 and the polarizing element 658 and display screen 624 are sized so as to be greater than the aperture 642a of housing 642, with an active area 624a of the display screen being smaller than the window 622a of masking element 622. Thus, the active area of the display screen is viewable through the reflective element 612 and at the window 622a and, because the masking element 622 is selected to substantially match the appearance of the polarizer 658, the display screen is substantially non-discernible when the display screen is deactivated or non-illuminated.

Figure 39E:
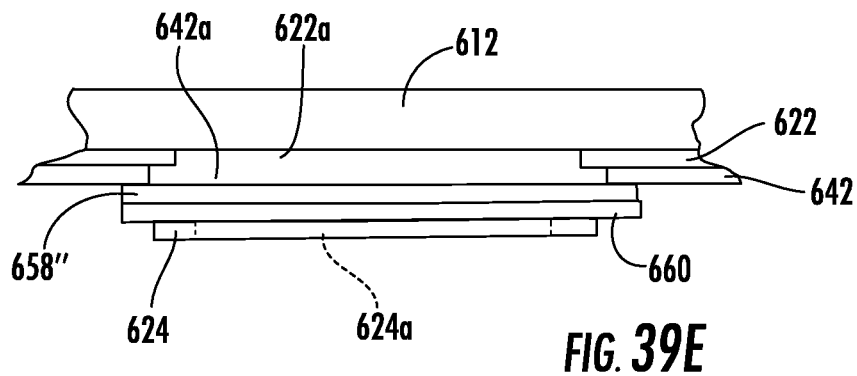
FIG. 39E is a sectional view of a display screen and display module at a mirror reflective element in accordance with the present invention.
Figure 39F:
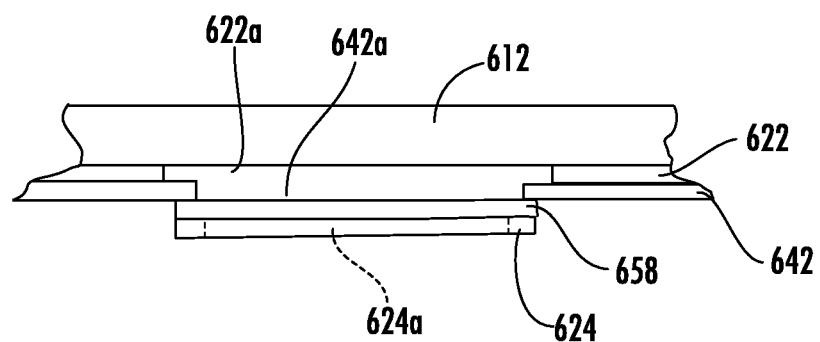
FIG. 39F is a sectional view of a display screen and display module at a mirror reflective element in accordance with the present invention.

Optionally, and with reference to FIG. 39E, the display screen 624 may be attached to a rear or inner surface of a glass substrate 660, with a polarizer 658''' attached at the outer surface of the glass substrate 660. The glass substrate 660 provides a mounting structure to extend the mounting area of the display screen so that the display screen may be mounted or located at a larger sized aperture or window if desired, while still limiting viewability or discernibility of the display screen when it is not illuminated or backlit. Optionally, and with reference to FIG. 39F, aperture 642a in housing 642 may be smaller than the aperture or window 622a of the masking element 622, with the display screen 624 and polarizer 658 attached or located at the aperture 642a so that the active area 624a of the display screen is viewable through the reflective element 612 and windows 622a, 642a. In such an application, the housing 642 preferably has an outer surface that substantially matches the color and/or appearance of the masking element and polarizer so that it is substantially non-discernible by a person viewing the reflective element. For example, the housing may be painted or otherwise colored or coated or treated so as to provide a dark or opaque surface that is substantially non-discernible when positioned at and behind the masking element and partially overlapping the window 622a of the masking element 622. Optionally, the forward portion or surface of the housing may incorporate or comprise a piece of metal shim stock (such as described in PCT Application No. PCT/US2006/018567, filed May 15, 2006 and published Nov. 23, 2006 as International Publication No. WO 2006/124682, which is hereby incorporated herein by reference in its entirety) that has a window formed or laser cut therefrom that matches or substantially matches the size and shape of the active area of the display screen.

Figure 34:
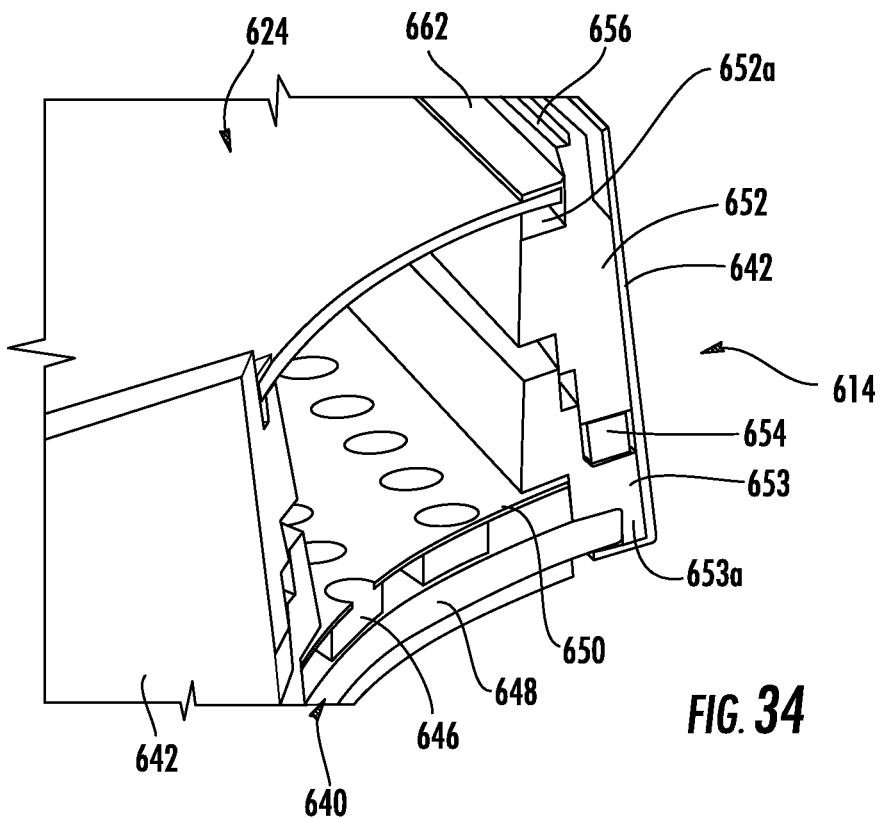
FIG. 34 is a perspective view of a portion of the display module, with a corner portion cut away to show additional details.
Figure 37:
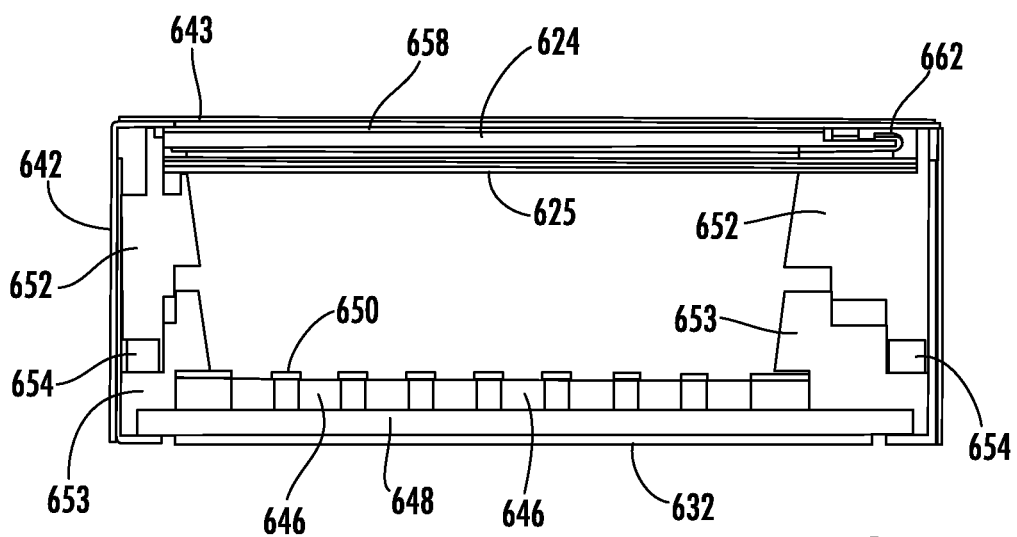
FIG. 37 is a sectional view of the display module of FIG. 33.
Figure 36B:
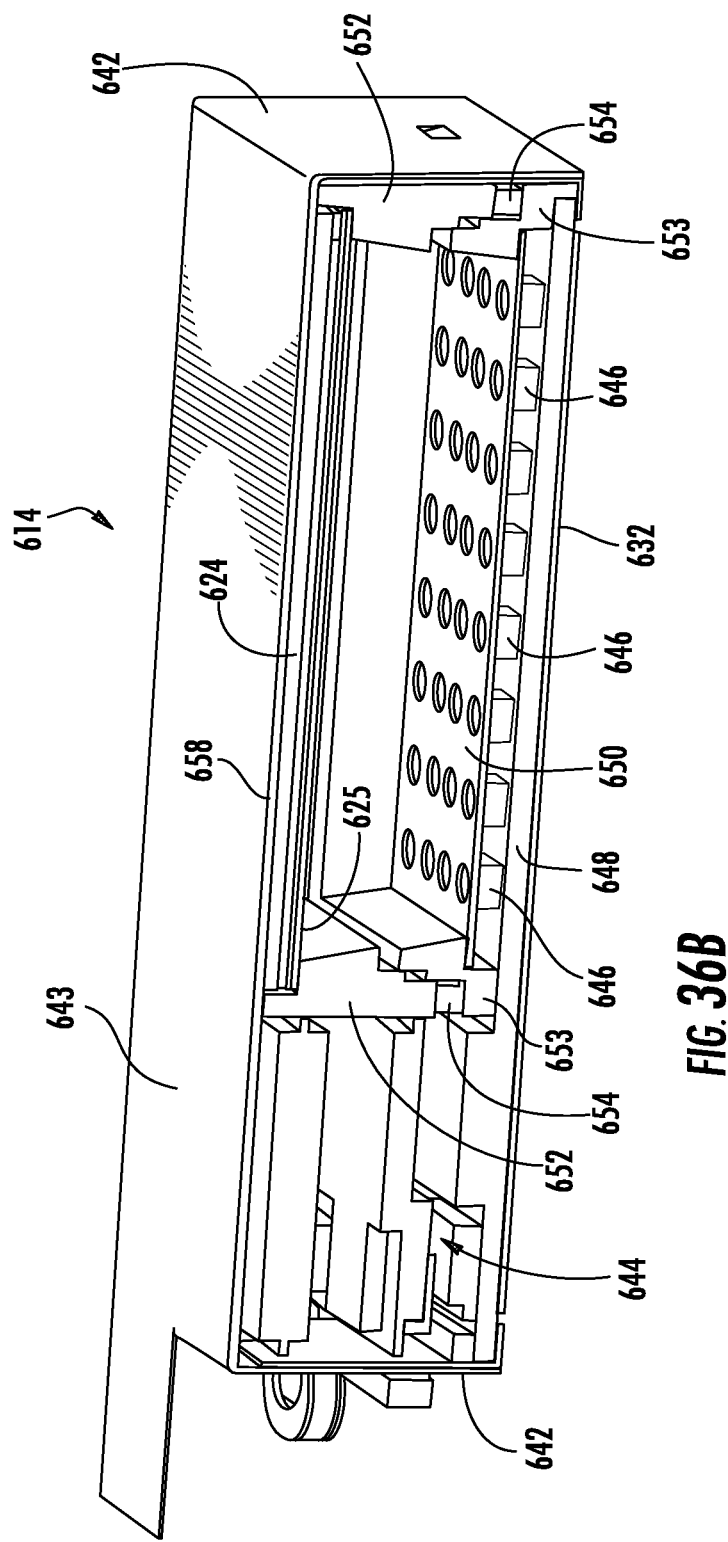
FIG. 36B is another perspective and partial sectional view of the display module of FIG. 33, taken along a line extending longitudinally along the display module.

As shown in FIGS. 34, 35 and 37, the outer housing 642 may trap and contain the display screen 624 and optical films (such as polarizer 658 and diffuser 625) at the forward end portion of the display module. Optionally, and desirably, a thin sponge-like material or element 662 may be located at the perimeter edge of the display screen to hold the edge of the display screen in slight compression at the housing and between the forward portion of the housing and the forward portion of the wall 652 at recess 652b of wall 652.

Figure 40:
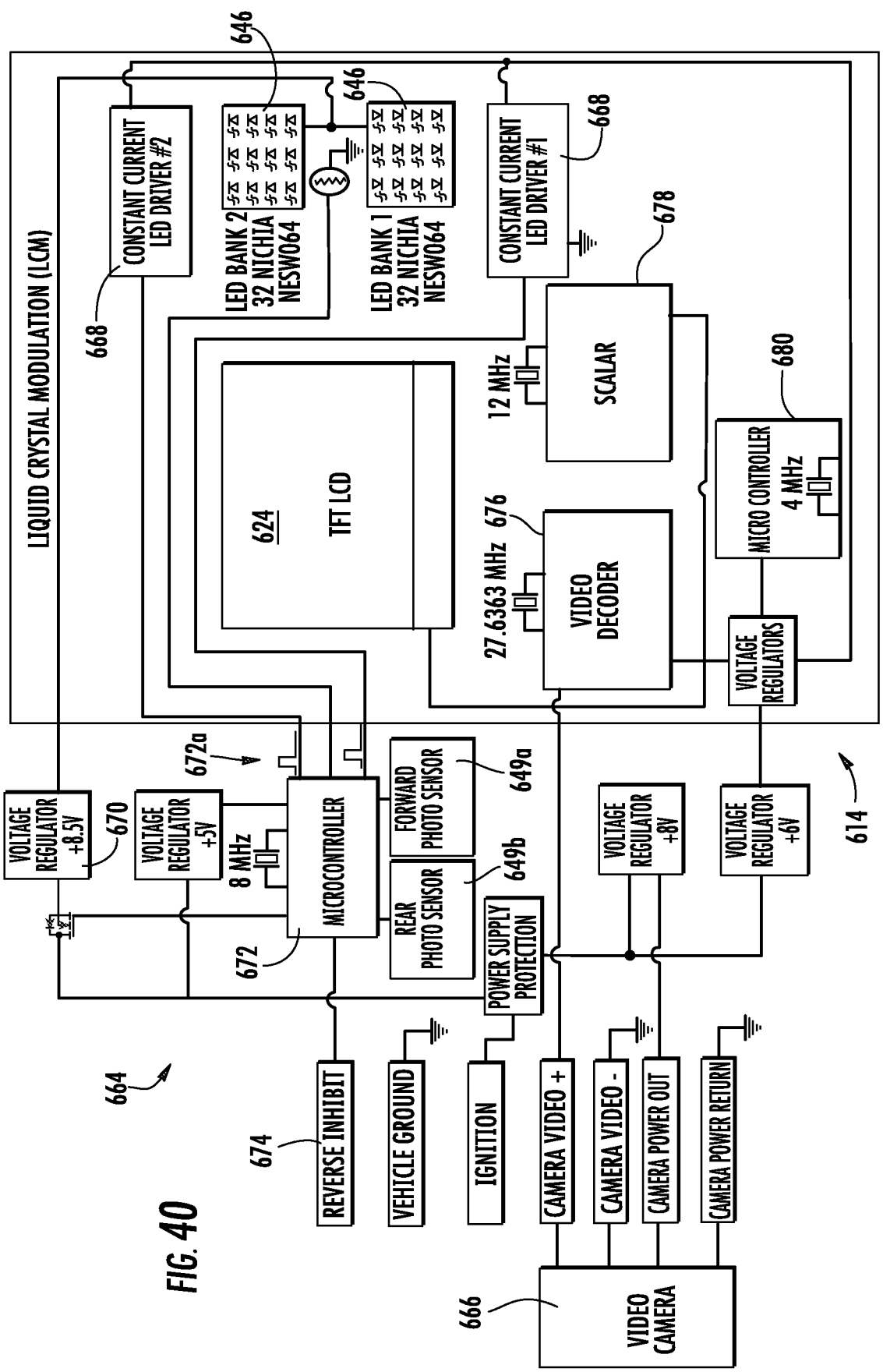
FIG. 40 is a schematic of a video display system of a mirror assembly in accordance with the present invention.

With reference to FIG. 40, a control system 664 may be implemented to control the display module 614. Desirably, the control system 664 may control the display screen to display video images in response to an output of one or more video cameras 666 of the vehicle, such as a rearwardly facing video camera operable to capture images at the rear of the vehicle. Preferably, the display module 614 is operable in conjunction with a reverse imaging system or back up aid, and the control system may operate to activate the display module 614 and the camera or imaging device 666 in response to the vehicle being shifted into a reverse gear or in response to rearward movement of the vehicle or the like. Thus, the display module may be activated to display images of a rearward scene behind the vehicle, and may be viewable when the driver of the vehicle is reversing or backing up the vehicle. Optionally, the display module may be selectively operable and viewable for other applications or systems, such as for episodal or episodic displays or intermittent/selective displays, such as for a navigation system or compass system or telephone system or the like, such as described above, while remaining within the spirit and scope of the present invention.

As shown in FIG. 40, the display module 614 includes two banks of LEDs 646, a constant current LED driver 668 for each bank of LEDs, and a voltage regulator 670 to step down or reduce the supplied voltage to the desired or appropriate level for powering the LCD video screen 624 and the LEDs 646. The control system 664 includes a controller or microcontroller 672 (such as, for example, a Toshiba Microcontroller TMP86CM47 or the like) that is operable to apply the staggered pulse width modulation signals 672a to the constant current LED drivers 668, and that may be operable in response to the forward and rearward facing photosensors 649a, 649b (such as Microsemi LX1973 photosensors or the like, such as described in PCT Application No. PCT/US2006/018567, filed May 15, 2006 and published Nov. 23, 2006 as International Publication No. WO 2006/124682, which is hereby incorporated herein by reference in its entirety) and a reverse inhibit element 674. The control system 664 also includes a video decoder 676 (such as an ADI Video Decoder ADV7180BCPZ or the like) and a scalar 678 (such as a Novatek Scalar NT68521XFG or the like) and a controller or microcontroller 680 (such as a Micro Chip Micro Controller PIC12F629 or the like) for controlling the LCD video screen 624 (which may comprise a Chi Mei TFT LCD F02505-01U video screen or the like), such as in response to a feed from the camera 666 (such as a Sony NTSC video camera or the like). Other components and controllers and circuitry may be suitable for use with the display module and control system while remaining within the spirit and scope of the present invention.

Figure 41A:
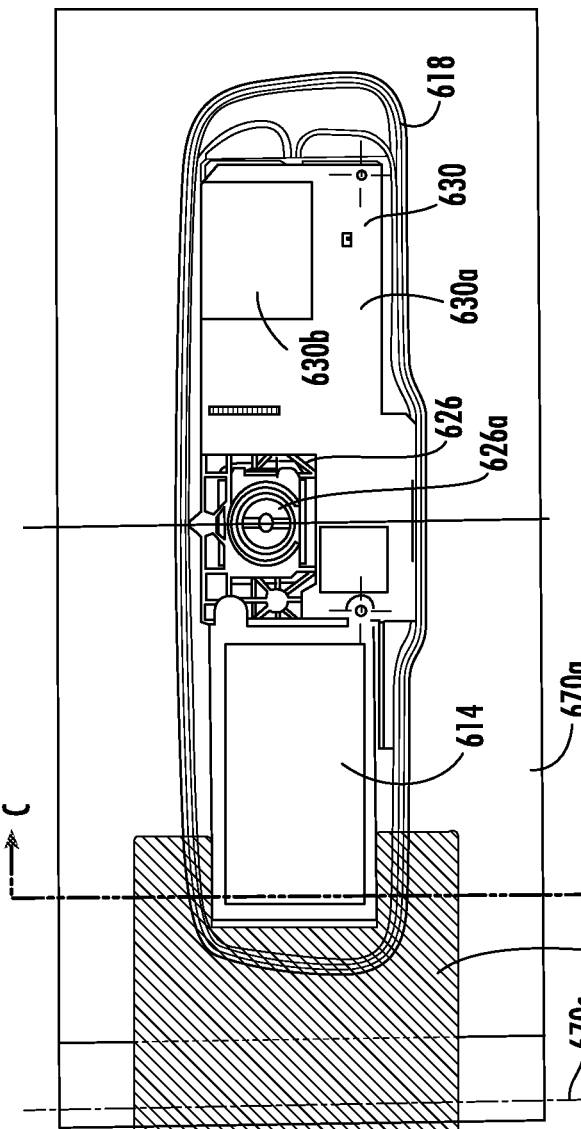
FIG. 41A is a plan view of the mirror assembly and display module of the present invention, showing a display module mounting device for positioning the display module at the rear of the reflective element of the mirror assembly.
Figure 41B:
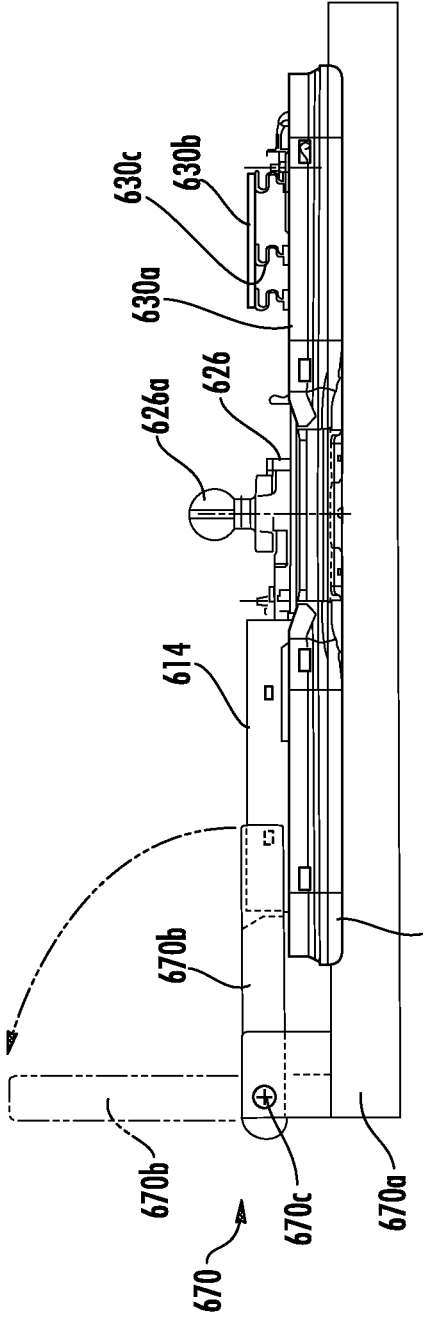
FIG. 41B is a side elevation of the mirror assembly and display module of FIG. 41A.
Figure 41C:
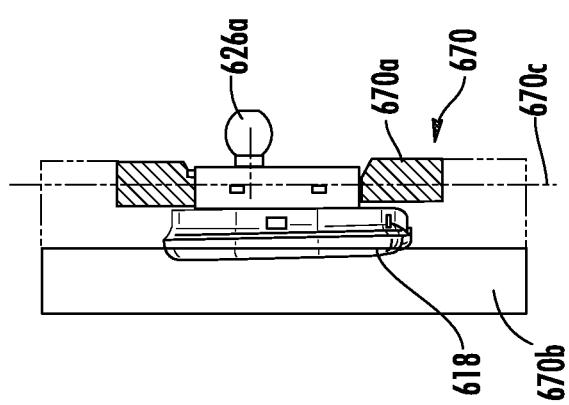
FIG. 41C is a sectional view of the mirror assembly and display module taken along the line C-C in FIG. 41A.

Optionally, the display module may be located at the rear of the reflective element via a locating device that may accurately and repeatedly place the display module at the masking element with the active area of the display screen at the window or aperture of the masking element. For example, and with reference to FIGS. 41A-C, an assembly fixture 670 may have a base portion 670a and a pivotable portion 670b that functions to hold a display module and to pivot about a pivot axis 670c (which is substantially parallel to the plane of the rear surface of the mirror reflective element and/or masking element). The base portion 670a of assembly fixture 670 may receive the reflective element or bezel portion of the mirror assembly so that the display modules held and pivoted/placed by the pivotable portion 670b consistently place the display modules at the desired or appropriate or targeted location at the rear of the reflective element. The assembly fixture 670 thus pivots to locate the display module at the reflective element or masking element and moves the display module generally normal to the masking element when attaching or adhering the display module to the masking element. Thus, the display module or the masking element may have a double-sided adhesive or tape thereon, whereby the substantially vertical or perpendicular movement of the display element at the masking plate attaches the display module to the masking element and at the desired or appropriate location relative to the window or display area of the reflective element.

Therefore, the display module of the present invention is positionable and compressible within a mirror assembly and is in intimate contact with a thermally conductive element so as to allow for heat flow from the display module to the rear and exterior of the mirror assembly. The display module includes a plurality of light sources or light emitting diodes, whereby such heat transfer is highly desirable for such an application. The display screen, and particularly the active area of the display screen, may be readily positioned at the appropriate location for viewing, and may be substantially retained thereat via flexible spring-like fingers that substantially hold the display screen in position during expansion/contraction of the plastic walls of the display module while reducing stress at the perimeter edges of the display screen. Although shown and described as being part of an interior rearview mirror of a vehicle, it is envisioned that the display module and/or thermally conductive elements of the present invention may be equally suitable for use in exterior rearview mirror assemblies, while remaining within the spirit and scope of the present invention.

Optionally, the display module may be operable to display video images indicative of an exterior scene as captured by one or more exteriorly directed imaging sensors or cameras having exterior and/or rearward field of views. It has long been known to use a standard short-range (30 feet or thereabouts) wireless data communication protocol in vehicles (and/or communication protocols of the types described in U.S. Pat. Nos. 7,004,593; 6,690,268 and 6,329, 925, which are hereby incorporated herein by reference in their entireties) for wireless connectivity in vehicles. Prior suggested solutions, such as conventional Bluetooth 2.0 that moves data at only a mere 721 Kbps, work well for text and voice communication, but are overly slow for transmission of video images. Bluetooth 3.0 available from the Bluetooth Special Interest Group uses a wireless protocol to operate at similar distances (around 30 feet or so) as today's Bluetooth 2.0, but transmits and receives data at a much faster rate, being capable of wireless transfers at a rate of 480 Mbps (megabits per second). This equates to about 60 MB per second (60 megabytes per second) which is fast enough for high definition video transfer, such as between a rear-mounted camera and a video control/display in the interior cabin (such as at or in the interior mirror assembly), or between video cameras/devices in either or both of the exterior sideview mirror assemblies.

Thus, a video camera may be mounted or located at a rear portion of a vehicle and may capture video images of a scene occurring exteriorly and rearwardly of the vehicle and the image data may be communicated wirelessly to an image processor located remotely from the rear of the vehicle, such as at an interior rearview mirror assembly of the vehicle. The image processor may process the image data to detect objects in the scene to assist the driver in safely reversing or backing up the vehicle. The image processor may be an existing processor that is located at or near the interior rearview mirror for processing images captured from an existing forward facing imaging sensor or camera with a forward field of view. For example, the image processor and forward facing camera may be part of or operable in conjunction with a headlamp control (IHC) system or a rain sensing system or a lane departure warning (LDW) system or a traffic sign recognition (TSR) system (such as the types described in U.S. Pat. No. 7,004,606) or the like. For example, the image processor may comprise an EYEQ™ image processing chip available from Mobileye Vision Technologies Ltd. of Jerusalem, Israel. Such image processors include object detection software (such as the types described in U.S. patent application Ser. No. 10/427,051, filed Apr. 30, 2003, now U.S. Pat. No. 7,038,577; and/or Ser. No. 11/315,675, filed Dec. 22, 2005 by Higgins-Luthman for OBJECT DETECTION SYSTEM FOR VEHICLE, now U.S. Pat. No. 7,720,580, which is hereby incorporated herein by reference in its entirety), and analyzes image data to detect objects.

As disclosed in U.S. patent application Ser. No. 11/315,675, filed Dec. 22, 2005 by Higgins-Luthman for OBJECT DETECTION SYSTEM FOR VEHICLE (U.S. Pat. No. 7,720,580), incorporated above, the present invention provides an object detection system, such as a blind spot detection system, a lane change assist or aid system or device, a lane departure warning system, a side object detection system, a reverse park aid system, a forward park aid system, a forward, sideward or rearward collision avoidance system, an adaptive cruise control system, a passive steering system or the like, which is operable to detect and/or identify a vehicle or other object of interest at the side, front or rear of the vehicle equipped with the object detection system. The object detection system of the present invention, such as for a lane change assist system, utilizes an edge detection algorithm to detect edges of objects in the captured images and determines if a vehicle is present in a lane adjacent to the equipped or subject vehicle in response to various characteristics of the detected edges, such as the size, location, distance, intensity, relative speed and/or the like. The system processes a subset of the image data captured which is representative of a target zone or area of interest of the scene within the field of view of the imaging system where a vehicle or object of interest is likely to be present. The system processes the detected edges within the image data subset to determine if they correspond with physical characteristics of vehicles and other objects to determine whether the detected edge or edges is/are part of a vehicle or a significant edge or object at or toward the subject vehicle. The system utilizes various filtering mechanisms, such as algorithms executed in software by a system microprocessor, to substantially eliminate or substantially ignore edges or pixels that are not or cannot be indicative of a vehicle or significant object to reduce the processing requirements and to reduce the possibility of false positive signals.

The object detection system of the present invention may capture images at a side of the vehicle and may process various windows of the images to detect a vehicle in the adjacent lane or other object, such as a bicycle, in the adjacent lane. The system may adjust the image processing to account for misalignment of the camera at the side of the vehicle. The system may adjust the area or zone of interest in response to a turning of the vehicle's wheels, such as when the vehicle is turning or curving along a curve in the road. The system may distinguish between vehicles or other objects and shadows of objects/vehicles so that a shadow of a vehicle two lanes over may not be considered a vehicle in the adjacent lane. The system may switch between daytime and nighttime algorithms and may be operable to detect headlamps of vehicles in the adjacent lane.

According to an aspect of the present invention, an imaging system for a vehicle includes an imaging array sensor and a control. The image array sensor comprises a plurality of photo-sensing pixels and is positioned at the vehicle with a field of view exteriorly of the vehicle. The imaging array sensor is operable to capture an image of a scene occurring exteriorly of the vehicle. The captured image comprises an image data set representative of the exterior scene. The control algorithmically processes the image data set to a reduced image data set of the image data set. The control processes the reduced image data set to extract information from the reduced image data set. The control selects the reduced image data set based on a steering angle of the vehicle.

Optionally, the control may process the reduced image data set with an edge detection algorithm to extract information from the reduced image data set. The image sensor may be one of (a) part of an exterior rearview mirror assembly of the vehicle and with a field of view at least partially sideward of the vehicle, and (b) at an upper windshield area and behind the windshield of the vehicle and with a field of view forward and through the windshield (such as at an area that is cleaned by the windshield wiper or wipers of the vehicle when the windshield wipers are activated). Optionally, the image sensor may be part of an exterior rearview mirror assembly of the vehicle and with a field of view at least partially sideward of the vehicle, wherein the imaging system comprises a side object detection system for detecting objects at a side of the vehicle. Optionally, the image sensor may be at an upper windshield area and behind the windshield of the vehicle and with a field of view forward and through the windshield, wherein the imaging system comprises a lane departure warning system.

Therefore, the present invention provides an imaging system for use as or in association with a side object detection system and/or a lane departure warning system. The system is operable to process captured image data occurring exteriorly and along one or both sides of the vehicle to determine if a target vehicle or object of interest is located at or in the lane adjacent to the subject or host vehicle. The imaging system of the present invention may process zones or areas of interest in the captured images and may adjust processing to accommodate any misalignment of the camera that may occur during installation of the camera at the side of the vehicle. The side object detection system may also select or adjust the image processing to select/adjust the areas of interest, such as in response to a steering angle of the vehicle, such as a turning of the wheels of the vehicle, so that the zone or area is adapted for the turning of the subject vehicle. The imaging system of the present invention thus provides enhanced processing of captured images to provide the desired function of the imaging system or associated control or control system or alert system.

When such an image processor and forward facing camera are provided in a vehicle, such as at an interior rearview mirror assembly or windshield electronics module or accessory module or the like, the image processor and forward facing camera may not be utilized when the vehicle is shifted into reverse and/or traveling in reverse. Thus, the image processor can be operable to multi-task and receive and process a video feed from a rearward facing video camera to display the rearward scene and/or to detect objects in the rearward scene. While such a processor may be implemented at the rearward facing camera, it is efficient and less costly to implement a single processor at either the forward or rearward facing camera (and preferably at the forward facing camera at or near the interior rearview mirror assembly or accessory module where the video display may be located) and to thus use only one processor for processing image data from both cameras.

Figure 45:
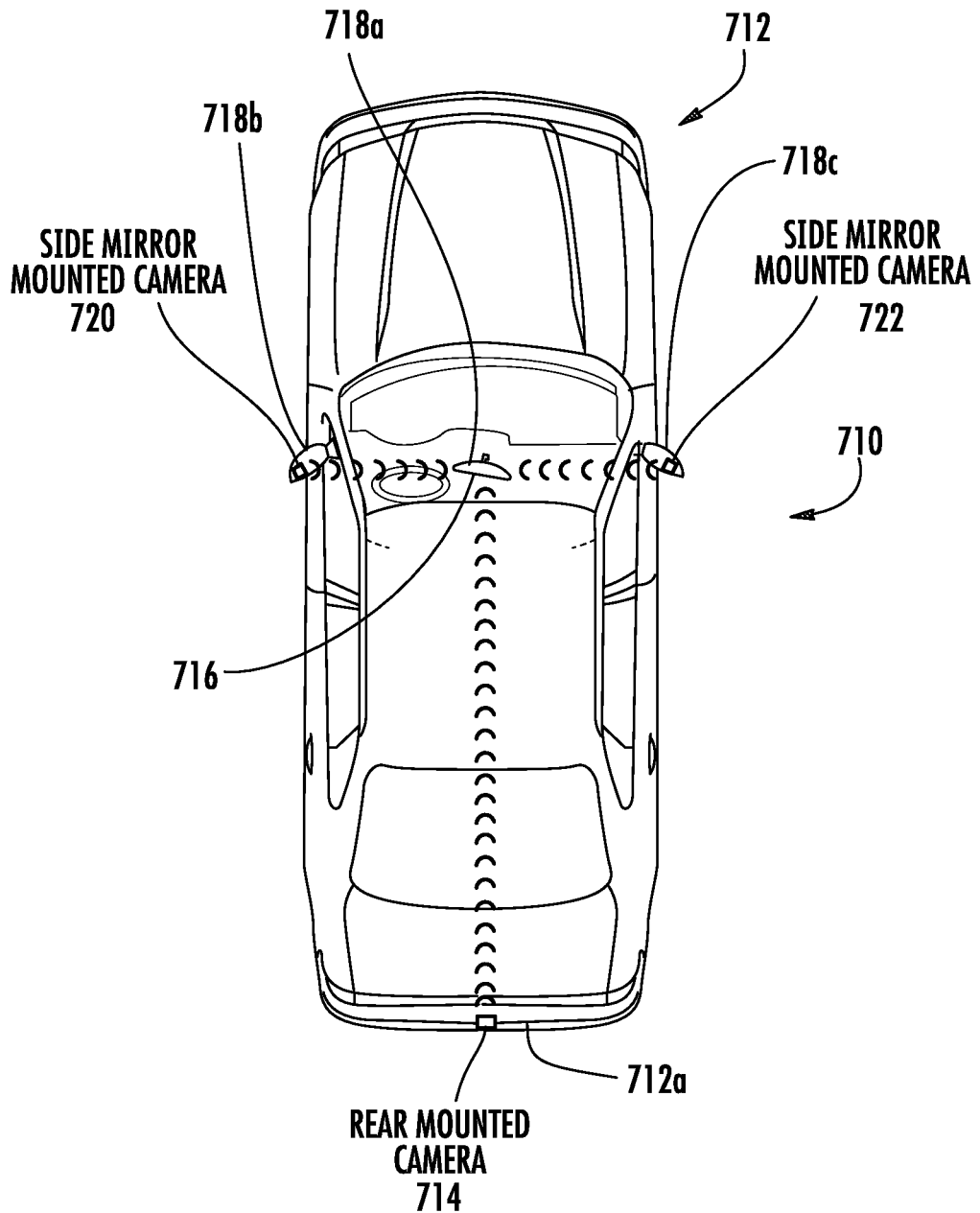
FIG. 45 is a plan view of a vehicle incorporating an image and display system in accordance with the present invention.

For example, and with reference to FIG. 45, a wireless communication system or imaging and display 710 may include an imaging sensor or camera 714 at a rear portion 712a of a vehicle 712 and an image display device 716, such as a control/display device located at an interior rearview mirror 718a of the vehicle, whereby image data captured by the rear camera 714 is communicated to the image display device 716 via a suitable wireless protocol. Optionally, the driver side exterior rearview mirror 718b and/or the passenger side exterior rearview mirror 718c may also or otherwise include or be associated with a respective side mounted imaging sensor or camera 720, 722, which is/are operable to communicate image data to the display device 716 via a suitable wireless protocol.

Preferably, for such wireless intra-vehicle video transfers, an ultra-wideband (UWB) common radio platform that enables high-speed (480 Mbps and beyond), low power consumption multimedia data transfers in a wireless personal area network (WPAN) is utilized (such as is available from the WiMedia™ Alliance). For example, the WiMedia UWB common radio platform that incorporates media access control (MAC) layer and physical (PHY) layer specifications based on multiband orthogonal frequency-division multiplexing (MB-OFDM) can be used for wireless video transmission within the vehicle (or between the vehicle with road signs and the like, or for vehicle-to-vehicle communication). ECMA-368 and ECMA-369 are international ISO-based specifications for the WiMedia UWB common radio platform.

For example, for a rearward facing imaging sensor or camera, the display (which may be located at or in a DoD™ transflective EC video mirror as described above) may display information that may be desirable to a driver during the act of reversing the vehicle. For example, when the vehicle is shifted into a reverse gear, the processor may receive and process image data from the rearward facing camera and a rear video scene with graphic overlays may be displayed on video display screen. Optionally, the distance to an object displayed on the screen may be detected via ultrasonic sensing. Optionally, an alert may be communicated to the driver of the vehicle if a child or object is in the field of view of the camera and is in danger of being hit by the vehicle as the vehicle travels rearward (for example, a visual overlay or prompt may be displayed at the video screen initially, and an audible signal may be communicated if a greater or threshold danger condition is detected. Optionally, a Park Assist™ graphic overlay may be provided at the display screen to assist the driver in parking the vehicle. Automatic braking of the vehicle may be provided for situations where the driver of the vehicle may not react to imminent danger of impact with a detected child or object at the rear of the vehicle.

In situations when the vehicle is not placed in reverse, the processor may receive and process image data from a forward facing video camera and/or the video display module at the mirror may display other information, such as telephone information and/or compass information and/or temperature information and/or navigation information, such as point-to-point navigation or the like, such as described above. Optionally, and for a forward or front facing imaging device or camera, the mirror assembly and/or control system of the vehicle may provide an intelligent headlamp control system (IHC) and/or a lane departure warning system (LDW) or the like. Optionally, the display or control may provide a pedestrian detection alert to alert the driver of the vehicle of a pedestrian at or near the path of the vehicle. The control system and/or vehicle may also provide a night vision system and/or object detection system and/or a smart forward lighting system (such as a system that provides control and/or activation/deactivation of exterior lights and/or interior lights of the vehicle, such as of LED lighting of the vehicle). The control system and/or vehicle may also or otherwise provide a traffic sign recognition (TSR) system and/or a seat occupancy monitoring system, and may provide an appropriate output or display or alert in response to a detection of a seat occupant (or detection of a seat being unoccupied).

Optionally, for systems having exterior mirror-mounted imaging sensors or cameras (such as a camera at each exterior rearview mirror of the vehicle and directed so as to have a field of view generally rearward and/or downward), the vehicle may include suitable cameras, such as JapanVue cameras with a DoD™ video display at the exterior mirror reflector. Optionally, the exterior rearview mirror or mirrors may include a display module or device, such as a video display module of the types described above (and optionally with thermally conductive element or elements at the casing or housing of the exterior rearview mirror and in intimate contact with the display module and/or associated circuitry), and the display module may display video images of the scene captured by the cameras. For example, a display module at a driver side exterior rearview mirror may display images captured by a camera located at the driver side of the vehicle or at the driver side exterior rearview mirror, while a display module at a passenger side exterior rearview mirror may display images captured by a camera located at the passenger side of the vehicle or at the passenger side exterior rearview mirror, so that the person viewing the displayed images at the respective exterior rearview mirror can readily associate the displayed images with the captured scene at the respective side of the vehicle. Such a system may provide a 24 GHz radar side-object detection system for detecting objects at the side of the vehicle and generally at the blind spot at the side of the vehicle. The imaging sensors may be operable to communicate image data to a control or video display module via any suitable communication protocol, and may communicate via a wireless communication protocol, such as Bluetooth or the like. Optionally, the sensors or cameras and associated control may be operable to perform tilt sensing to determine a tilt of the vehicle.

Optionally, the control or image processor of imaging system may be operable to sense or detect precipitation at the vehicle, and may activate/deactivate/control the wipers of the vehicle and/or blower of the HVAC system and/or the like in response to rain sensing or sensing of other precipitation at the vehicle. Optionally, the vehicle may be equipped with a GOOGLE map remote video display or the like for displaying map information to the driver or occupant of the vehicle. The controls and components of the systems described above may be located at or in the interior rearview mirror assembly and/or the exterior rearview mirror assembly or assemblies, or may be located at a windshield electronics module (WEM) or the like, while remaining within the spirit and scope of the present invention.

Optionally, an interior rearview mirror of a vehicle may include a telephone function or other voice interaction system, such as a voice activated and/or voice instructional navigational system or the like. Such voice interaction systems and hands free systems are often desired in vehicles to reduce the distraction to the driver of the vehicle during use of the telephone or navigation system (and may utilize aspects of the mirror systems described in U.S. Pat. Nos. 6,420,975 and 6,906,632, which are hereby incorporated herein by reference in their entireties). Optionally, a voice interaction system may be incorporated into a mirror assembly having a telephone function or navigation system or the like. The voice interaction system may include voice recognition capabilities and, thus, may recognize spoken words or numbers as spoken or vocalized by the driver or occupant of the vehicle, and may include conversational voice recognition capabilities and, thus, may recognize words or phrases or conversations spoken or vocalized by the driver of occupant of the vehicle.

Many vehicles manufactured today include a global positioning system that is operable to determine (via satellite signals) where the vehicle is geographically located at any given time. The vehicle may include a vehicle-based global positioning system that receives satellite signals and determines the geographical location of the vehicle or the vehicle may include a telematics system that receives the geographical location data or information from a remote or central service center or the like.

Technology exists that can digitize a person's voice and can dissect and reassemble portions of words or sounds to create or form or vocalize words. Thus, a digitized audible signal may be generated that sounds like a real person talking and not like a typical recording of individual words or phrases. Optionally, an interior rearview mirror assembly or system of the present invention may include a voice interaction system that provides such a digitized vocal output or artificially generated human voice so that the vocal or audible signal sounds similar to a person talking so that the vocal information is readily heard and understood by the driver or occupant of the vehicle. Thus, different voice messages or information (such as in response to a voice input from the driver or occupant of the vehicle) may be readily provided by reassembling the digitized sounds so that the driver or occupant of the vehicle will experience voice interaction that is similar to a "normal" conversation.

For example, the driver may say "I want to call Jim", and the mirror system may respond "Do you want to call Jim Smith or Jim Johnson?", with the audible output or phrase generated by the system sounds similar to a person talking and not as if each word were independently recorded and assembled in that order. The system thus may provide conversational voice recognition and a conversational interaction system to enhance the experience of the driver or occupant that is using the voice interaction system of the mirror or vehicle.

Optionally, the voice interaction mirror system of the present invention may provide different voice outputs, as may be selected by the user or as may be determined or selected by the system in response to one or more inputs or characteristics, as discussed below. For example, the voice interaction mirror system may provide the voice output as a different accent, which may be regionalized, such as an Eastern United States accent or a Southern United States accent or the like. The system may automatically change the voice output to a different accent, such as in response to the current or actual geographical location of the vehicle (such as in response to an input from a global positioning system, such as a vehicle-based global positioning system and/or navigational system), or the accent may be selected by the user (such as via a user input, such as a button or selection input or vocal input or the like), or the accent may be selected depending on where the vehicle is manufactured or sold or depending on any other suitable or desired characteristic or input. Thus, if the system automatically changes the accent in response to the global positioning system (i.e. the system provides a regionalized accent or output), the vocal output of the mirror may change as the vehicle is driven between different regions, such as from the Midwest to the South or other regional changes. Optionally, the spoken language of the voice output may change from one language (such as English) to another language (such as Spanish or French), such as in response to the current geographical location of the vehicle (such as in response to an input from a global positioning system as the vehicle is driven into Mexico or a French-Canadian province or the like, or into other countries, such as in Europe or elsewhere), or the language may be selected by the user (such as via a user input, such as a button or selection input or vocal input or the like), or the language may be selected depending on where the vehicle is manufactured or sold or depending on any other suitable or desired characteristic or input.

Optionally, the accent or language being output by the mirror system may be based on one or more biometric characteristics of the driver or occupant of the vehicle or user of the mirror system. For example, a person may enter or select their desired accent or language, and the system may store that selection and use that selected accent or language in response to the system recognizing that person in the vehicle or in the driver's seat (such as via recognition of a biometric characteristic of the person, such as a voice recognition or retinal scan or fingerprint or other recognizable or discernible biometric characteristic). For example, the mirror system may generate a male (or female) voice output when it is determined that a male occupant is using the system and a female (or male) voice output when it is determined that a female occupant is using the system.

Optionally, and desirably, any such default output of the system or automatic selection by the system (in response to biometric characteristics or user inputs or vehicle location or the like) may be overridden by the user. Thus, the current user may override the vocal output and select a desired or selected voice output or accent or language irrespective of the other factors such as stored selections, geographical location of the vehicle or the like. Thus, the mirror system avoids the potential that one or more of the different accents or languages provided may become annoying to the driver and may irritate or distract the driver during operation of the mirror system.

Such voice activated/voice interaction telematics systems thus provide a desired or appropriate audio signal to the driver of the vehicle and provide audio feedback to the driver. However, such systems are not suitable for drivers that are hearing impaired or deaf, such that these drivers may not be able to utilize the full safety features of the vehicle. It is thus envisioned that the mirror system of the present invention may include a display at the mirror (such as a display on demand transflective display that is viewable at and through the reflective element of the vehicle, such as by utilizing aspects of the mirror assemblies discussed above). The mirror system may include a text converter that converts the voice output of the system to a text message that is displayed at the mirror display (or optionally at a display located at another location within the vehicle), so that the information being audibly conveyed is also or otherwise textually shown at the display for viewing by the driver or occupant of the vehicle. The text converter feature may be incorporated into the mirror system or into the vehicle or may be provided as an option by the automaker (or as an after-market device) for hearing impaired consumers. Optionally, the text converter and display feature may be provided via a remote service provider or telematics system or the like.

Optionally, the mirror system may be capable of recognizing lip movement by the driver of the vehicle and may convert the detected and recognized lip movement to an audible message or output, such as for a telephone function of the vehicle. For example, the mirror system may include a camera or imaging sensor (which may be located at the interior rearview mirror assembly) having a field of view generally toward or at a head region for a typical vehicle driver, and the system may have an image processor that processes the images to determine and discern lip movement and determine what is being spoken or "mouthed" by the driver. The system may then convert the lip movement interpretation to an audible output and may generate the audible output for a telephone function, such that the driver (such as a deaf or hearing impaired driver) may have a teleconference in the vehicle.

Therefore, the present invention may provide an enhanced video mirror system and/or a hands free or voice acquisition or vocal interaction mirror system for a vehicle. The vocal interaction mirror system may provide a desired or selected artificially generated or digitized voice (with a desired or selected or appropriate accent or language or the like) to enhance the experience to the user of the mirror system. For example, the voice interaction system of the vehicle may include an artificially generated human voice for providing information to the driver of the vehicle, with the artificially generated human voice being selectively generated with a regional accent that is determined by the actual geographic location of the vehicle, such as may be determined by a vehicle-based navigational system. Optionally, the mirror system or vocal interaction system may also provide capabilities that allow the system to be used by hearing impaired or deaf drivers or occupants, and may allow such users to utilize a telephone function of the mirror system or vehicle. Although described herein as being located at an interior rearview mirror assembly of the vehicle, the vocal interaction system and/or display system and/or lip reading system of the present invention may be located elsewhere at the vehicle, and/or may be provided to the vehicle via a remote service provider or station, while remaining within the spirit and scope of the present invention.

Changes and modifications to the specifically described embodiments may be carried out without departing from the principles of the present invention, which is intended to be limited only by the scope of the appended claims as interpreted according to the principles of patent law.

The invention claimed is:

1. A vision system for a vehicle, said vision system comprising:

a plurality of vehicular cameras located at respective portions of a vehicle equipped with said vision system;

said plurality of vehicular cameras comprising a forward-viewing camera located at the equipped vehicle, said forward-viewing camera having a field of view at least forward of the equipped vehicle, said forward-viewing camera operable to capture first image data exterior and forward of the equipped vehicle when the equipped vehicle normally travels forward;

wherein said forward-viewing camera is located within an interior cabin of the equipped vehicle and is disposed behind a windshield of the equipped vehicle at an in-cabin side of the windshield and views to the exterior of the equipped vehicle through the windshield;

said plurality of vehicular cameras further comprising a rearward-viewing camera located at the equipped vehicle, said rearward-viewing camera having a field of view at least rearward of the equipped vehicle, said rearward-viewing camera operable to capture second image data exterior and rearward of the equipped vehicle;

a common image processor for processing first image data captured by said forward-viewing camera and second image data captured by said rearward-viewing camera;

wherein said common image processor utilizes object detection software at least during processing of first image data captured by said forward-viewing camera to detect at least one vehicle present exterior the equipped vehicle;

a video display screen of a video display device located within the interior cabin of the equipped vehicle, wherein said video display screen is viewable by a driver of the equipped vehicle when operating the equipped vehicle;

wherein said video display screen comprises a pixelated video display screen;

wherein said video display device comprises a polarizer and a diffuser;

wherein said video display device comprises at least one brightness enhancement film;

wherein backlighting for said video display screen is provided by at least one white light emitting light-emitting diode;

wherein intensity of light emitted by said at least one white light emitting light-emitting diode is controlled via pulse width modulation (PWM);

wherein light emanating from said video display screen when displaying video images to be viewed by the driver of the equipped vehicle comprises at least one selected from the group consisting of (i) circularly polarized light and (ii) elliptically polarized light;

wherein, responsive to the equipped vehicle being shifted into a reverse gear and while the driver of the equipped vehicle is executing a reversing maneuver, video images derived from second image data captured by said rearward-viewing camera are displayed by said video display screen;

wherein, responsive to the equipped vehicle being shifted into the reverse gear and while the driver of the equipped vehicle is executing the reversing maneuver, video images derived from second image data captured by said rearward-viewing camera are displayed by said video display screen with a contrast ratio of at least 180:1; and wherein, when the equipped vehicle is travelling forward, said common image processor processes first image data captured by said forward-viewing camera for (i) a lane departure warning system of the equipped vehicle, (ii) a headlamp control system of the equipped vehicle and (iii) a traffic sign recognition system of the equipped vehicle.

2. The vision system of claim 1, wherein said at least one white light emitting light-emitting diode comprises a plurality of white light emitting light-emitting diodes.

3. The vision system of claim 2, wherein said video display device comprises a metallic reflector that reflects light toward said video display screen to enhance backlighting of said video display screen when said plurality of white light emitting light emitting diodes is powered.

4. The vision system of claim 3, wherein said metallic reflector has a specular reflectivity of at least 50 percent reflectance of light incident thereon.

5. The vision system of claim 3, wherein said metallic reflector has a specular reflectivity of at least 70 percent reflectance of light incident thereon.

6. The vision system of claim 3, wherein said metallic reflector has a specular reflectivity of at least 90 percent reflectance of light incident thereon.

7. The vision system of claim 2, comprising a thermally conductive element in thermal contact with an element of said video display device, and wherein said thermally conductive element at least partially draws heat generated when backlighting said video display screen to draw heat away from said video display screen.

8. The vision system of claim 7, wherein said thermally conductive element comprises a thermally conductive polymeric material.

9. The vision system of claim 8, wherein said thermally conductive element comprises a polyphenylene sulfide thermally conductive polymeric material.

10. The vision system of claim 7, wherein said thermally conductive element comprises a layer that reduces heat build-up when said plurality of white light emitting light emitting diodes is powered.

11. The vision system of claim 10, wherein said layer of said thermally conductive element comprises at least one selected from the group consisting of (a) a coated layer, (b) a painted layer and (c) a skin layer.

12. The vision system of claim 7, wherein said thermally conductive element comprises metal.

13. The vision system of claim 2, wherein intensity of light emitted by said plurality of white light emitting light-emitting diodes is controlled via pulse width modulation (PWM).

14. The vision system of claim 2, wherein said video display device comprises a metallic reflector that reflects light toward said video display screen to enhance backlighting of said video display screen when said plurality of white light emitting light emitting diodes is powered, and wherein said metallic reflector comprises a metallic sheet with apertures established therethrough.

15. The vision system of claim 2, wherein said video display device comprises a metallic reflector that reflects light toward said video display screen to enhance backlighting of said video display screen when said plurality of white light emitting light emitting diodes is powered, and wherein said metallic reflector comprises a substrate coated with metal.

16. The vision system of claim 2, wherein said video display device comprises a metallic reflector that reflects light toward said video display screen to enhance backlighting of said video display screen when said plurality of white light emitting light emitting diodes is powered, and wherein said metallic reflector functions as a heat sink.

17. The vision system of claim 2, wherein said video display device comprises a metallic reflector that reflects light toward said video display screen to enhance backlighting of said video display screen when said plurality of white light emitting light emitting diodes is powered, and wherein said plurality of white light emitting light emitting diodes, when powered, generates at least six watts of heat.

18. The vision system of claim 1, wherein, responsive at least in part to processing of second image data captured by said rearward-viewing camera by said common image processor, the driver of the equipped vehicle is alerted to presence of an object present exterior the equipped vehicle.

19. The vision system of claim 18, wherein said common image processor is accommodated in an accessory module mounted at the windshield of the equipped vehicle.

20. The vision system of claim 1, wherein said video display device is operated as part of a voice interaction system of the equipped vehicle, said voice interaction system including an artificially generated human voice for providing information to the driver of the equipped vehicle, said artificially generated human voice being selectively generated with a regional accent that is determined by the actual geographic location of the equipped vehicle as determined by a navigational system.

21. The vision system of claim 1, wherein said video display device comprises a reflective polarizer.

22. The vision system of claim 1, wherein display of video images by said video display screen is controlled, at least in part, by at least one of a video decoder and a scalar.

23. The vision system of claim 1, wherein said plurality of vehicular cameras further comprises a driver-side camera located at a driver side of the equipped vehicle, said driver-side camera having a field of view at least sideward and rearward of the equipped vehicle and operable to capture third image data, and wherein said plurality of vehicular cameras comprises a passenger-side camera located at a passenger side of the equipped vehicle, said passenger-side camera having a field of view at least sideward and rearward of the equipped vehicle and operable to capture fourth image data.

24. The vision system of claim 1, comprising a photosensor operable to detect an ambient light level indicative of a daytime condition at the equipped vehicle.

25. A vision system for a vehicle, said vision system comprising:

a plurality of vehicular cameras located at respective portions of a vehicle equipped with said vision system;

said plurality of vehicular cameras comprising a forward-viewing camera located at the equipped vehicle, said forward-viewing camera having a field of view at least forward of the equipped vehicle, said forward-viewing camera operable to capture first image data exterior and forward of the equipped vehicle when the equipped vehicle normally travels forward;

wherein said forward-viewing camera is located within an interior cabin of the equipped vehicle and is disposed behind a windshield of the equipped vehicle at an in-cabin side of the windshield and views to the exterior of the equipped vehicle through the windshield;

said plurality of vehicular cameras further comprising a rearward-viewing camera located at the equipped vehicle, said rearward-viewing camera having a field of view at least rearward of the equipped vehicle, said rearward-viewing camera operable to capture second image data exterior and rearward of the equipped vehicle;

said plurality of vehicular cameras further comprising a driver-side camera located at a driver side of the equipped vehicle, said driver-side camera having a field of view at least sideward and rearward of the equipped vehicle and operable to capture third image data;

said plurality of vehicular cameras further comprising a passenger-side camera located at a passenger side of the equipped vehicle, said passenger-side camera having a field of view at least sideward and rearward of the equipped vehicle and operable to capture fourth image data;

a common image processor for processing first image data captured by said forward-viewing camera and second image data captured by said rearward-viewing camera;

wherein said common image processor utilizes object detection software at least during processing of first image data captured by said forward-viewing camera to detect at least one vehicle present exterior the equipped vehicle;

a central video display screen of a central video display device located at a central region of the interior cabin, wherein said central video display screen is viewable by a driver of the equipped vehicle when operating the equipped vehicle;

a driver-side video display screen of a driver-side video display device located at a driver side region of the equipped vehicle, wherein said driver-side video display screen is viewable by the driver of the equipped vehicle when operating the equipped vehicle;

a passenger-side video display screen of a passenger-side video display device located at a passenger side region of the equipped vehicle, wherein said passenger-side video display screen is viewable by the driver of the equipped vehicle when operating the equipped vehicle;

wherein said central video display screen comprises a pixelated video display screen;

wherein said central video display device comprises a polarizer and a diffuser;

wherein said central video display device comprises at least one brightness enhancement film;

wherein backlighting for said central video display screen is provided by at least one white light emitting light-emitting diode;

wherein intensity of light emitted by said at least one white light emitting light-emitting diode is controlled via pulse width modulation (PWM);

wherein light emanating from said central video display screen when displaying video images to be viewed by the driver of the equipped vehicle comprises at least one selected from the group consisting of (i) circularly polarized light and (ii) elliptically polarized light;

wherein video images derived from image data captured by said driver-side camera located at the driver side region of the equipped vehicle are displayed at said driver-side video display screen so that the driver of the equipped vehicle viewing the displayed video images at said driver-side video display screen can readily associate the displayed video images with the driver side of the equipped vehicle;

wherein video images derived from image data captured by said passenger-side camera located at the passenger side region of the equipped vehicle are displayed at said passenger-side video display screen so that the driver of the equipped vehicle viewing the displayed video images at said passenger-side video display screen can readily associate the displayed video images with the passenger side of the equipped vehicle;

wherein, responsive to the equipped vehicle being shifted into a reverse gear and while the driver of the equipped vehicle is executing a reversing maneuver, video images derived from second image data captured by said rearward-viewing camera are displayed by said central video display screen; and wherein, responsive to the equipped vehicle being shifted into the reverse gear and while the driver of the equipped vehicle is executing the reversing maneuver, video images derived from second image data captured by said rearward-viewing camera are displayed by said central video display screen with a contrast ratio of at least 180:1.

26. The vision system of claim 25, wherein video images derived from third image data captured by said driver-side camera are displayed by said driver-side video display screen with a contrast ratio of at least 180:1.

27. The vision system of claim 25, wherein video images derived from fourth image data captured by said passenger-side camera are displayed by said passenger-side video display screen with a contrast ratio of at least 180:1.

28. The vision system of claim 25, wherein video images derived from second image data captured by said rearward-viewing camera are displayed by said central video display screen with a contrast ratio of at least 180:1.

29. The vision system of claim 28, wherein said central video display device is disposed in an interior rearview mirror assembly of the equipped vehicle, and wherein video images displayed by said central video display screen are viewable through a mirror reflector of a reflective element of said interior rearview mirror assembly by the driver of the equipped vehicle when the driver is operating the equipped vehicle, and wherein said reflective element of said interior rearview mirror assembly comprises an electro-optic reflective element having a front substrate and a rear substrate and an electro-optic medium disposed between said front and rear substrates, and wherein said mirror reflector comprises a transflective mirror reflector disposed at a front surface of said rear substrate that opposes said electro-optic medium.

30. The vision system of claim 25, wherein said driver-side video display screen comprises a pixelated video display screen, and wherein said driver-side video display device comprises a polarizer and a diffuser, and wherein said driver-side video display device comprises at least one brightness enhancement film, and wherein light emanating from said driver-side video display screen when displaying video images to be viewed by the driver of the equipped vehicle comprises at least one selected from the group consisting of (i) circularly polarized light and (ii) elliptically polarized light.

31. The vision system of claim 30, wherein said passenger-side video display screen comprises a pixelated video display screen, and wherein said passenger-side video display device comprises a polarizer and a diffuser, and wherein said passenger-side video display device comprises at least one brightness enhancement film, and wherein light emanating from said passenger-side video display screen when displaying video images to be viewed by the driver of the equipped vehicle comprises at least one selected from the group consisting of (i) circularly polarized light and (ii) elliptically polarized light.

32. The vision system of claim 25, wherein a driver-side exterior rearview mirror of the equipped vehicle comprises said driver-side video display device, and wherein a passenger-side exterior rearview mirror of the equipped vehicle comprises said passenger-side video display device.

33. The vision system of claim 25, wherein, responsive at least in part to processing of second image data captured by said rearward-viewing camera by said common image processor, the driver of the equipped vehicle is alerted to presence of an object present exterior the equipped vehicle.

34. The vision system of claim 33, wherein said at least one white light emitting light-emitting diode comprises a plurality of white light emitting light-emitting diodes.

35. The vision system of claim 34, wherein said central video display device comprises a metallic reflector that reflects light toward said central video display screen to enhance backlighting of said central video display screen when said plurality of white light emitting light emitting diodes is powered.

36. The vision system of claim 34, wherein intensity of light emitted by said plurality of white light emitting light-emitting diodes is controlled via pulse width modulation (PWM).

37. The vision system of claim 25, wherein said central video display device comprises a reflective polarizer.

38. The vision system of claim 25, wherein, when the equipped vehicle is travelling forward, said common image processor processes first image data captured by said forward-viewing camera for (i) a lane departure warning system of the equipped vehicle, (ii) a headlamp control system of the equipped vehicle and (iii) a traffic sign recognition system of the equipped vehicle.

39. A vision system for a vehicle, said vision system comprising:
a plurality of vehicular cameras located at respective portions of a vehicle equipped with said vision system;
said plurality of vehicular cameras comprising a forward-viewing camera located at the equipped vehicle, said forward-viewing camera having a field of view at least forward of the equipped vehicle, said forward-viewing camera operable to capture first image data exterior and forward of the equipped vehicle when the equipped vehicle normally travels forward;
wherein said forward-viewing camera is located within an interior cabin of the equipped vehicle and is disposed behind a windshield of the equipped vehicle at an in-cabin side of the windshield and views to the exterior of the equipped vehicle through the windshield;
said plurality of vehicular cameras further comprising a rearward-viewing camera located at the equipped vehicle, said rearward-viewing camera having a field of view at least rearward of the equipped vehicle, said rearward-viewing camera operable to capture second image data exterior and rearward of the equipped vehicle;
a common image processor for processing first image data captured by said forward-viewing camera and second image data captured by said rearward-viewing camera;
wherein said common image processor utilizes object detection software at least during processing of first image data captured by said forward-viewing camera to detect at least one vehicle present exterior the equipped vehicle;
a central video display screen of a central video display device located at a central region of the interior cabin, wherein said central video display screen is viewable by a driver of the equipped vehicle when operating the equipped vehicle;
wherein said central video display screen comprises a pixelated video display screen;
wherein said central video display device comprises a polarizer and a diffuser;
wherein said central video display device comprises at least one brightness enhancement film;
wherein backlighting for said central video display screen is provided by at least one white light emitting light-emitting diode;
wherein intensity of light emitted by said at least one white light emitting light-emitting diode is controlled via pulse width modulation (PWM);
wherein light emanating from said central video display screen when displaying video images to be viewed by the driver of the equipped vehicle comprises at least one selected from the group consisting of (i) circularly polarized light and (ii) elliptically polarized light;
wherein, responsive to the equipped vehicle being shifted into a reverse gear and while the driver of the equipped vehicle is executing a reversing maneuver, video images derived from second image data captured by said rearward-viewing camera are displayed by said central video display screen;
wherein, responsive to the equipped vehicle being shifted into the reverse gear and while the driver of the equipped vehicle is executing the reversing maneuver, second image data captured by said rearward-viewing camera is processed at said common image processor;
wherein said common image processor utilizes object detection software during processing of second image data captured by said rearward-viewing camera to determine objects present exterior the equipped vehicle in the field of view of said rearward-viewing camera that are in danger of being impacted by the equipped vehicle as the equipped vehicle travels rearward; and
wherein, responsive to determination of an object present exterior the equipped vehicle in the field of view of said rearward-viewing camera that is in danger of being impacted by the equipped vehicle as the equipped vehicle travels rearward, the equipped vehicle automatically brakes.

40. The vision system of claim 39, wherein the determined object present exterior the equipped vehicle in the field of view of said rearward-viewing camera that is in danger of being impacted by the equipped vehicle as the equipped vehicle travels rearward is a child.

41. The vision system of claim 39, wherein a driver-side camera is located at a driver side of the equipped vehicle, said driver-side camera having a field of view at least sideward and rearward of the equipped vehicle and operable to capture third image data, and wherein a passenger-side camera is located at a passenger side of the equipped vehicle, said passenger-side camera having a field of view at least sideward and rearward of the equipped vehicle and operable to capture fourth image data, and wherein a driver-side video display screen of a driver-side video display device is located at a driver side region of the equipped vehicle, said driver-side video display screen viewable by the driver of the equipped vehicle when operating the equipped vehicle, and wherein a passenger-side video display screen of a passenger-side video display device is located at a passenger side region of the equipped vehicle, said passenger-side video display screen viewable by the driver of the equipped vehicle when operating the equipped vehicle, and wherein video images derived from image data captured by said driver-side camera located at the driver side region of the equipped vehicle are displayed at said driver-side video display screen so that the driver of the equipped vehicle viewing the displayed video images at said driver-side video display screen can readily associate the displayed video images with the driver side of the equipped vehicle, and wherein video images derived from image data captured by said passenger-side camera located at the passenger side region of the equipped vehicle are displayed at said passenger-side video display screen so that the driver of the equipped vehicle viewing the displayed video images at said passenger-side video display screen can readily associate the displayed video images with the passenger side of the equipped vehicle.

42. The vision system of claim 41, wherein said driver-side video display screen comprises a pixelated video display screen, and wherein said driver-side video display device comprises a polarizer and a diffuser, and wherein said driver-side video display device comprises at least one brightness enhancement film, and wherein light emanating from said driver-side video display screen when displaying video images to be viewed by the driver of the equipped vehicle comprises at least one selected from the group consisting of (i) circularly polarized light and (ii) elliptically polarized light.

43. The vision system of claim 42, wherein said passenger-side video display screen comprises a pixelated video display screen, and wherein said passenger-side video display device comprises a polarizer and a diffuser, and wherein said passenger-side video display device comprises at least one brightness enhancement film, and wherein light emanating from said passenger-side video display screen when displaying video images to be viewed by the driver of the equipped vehicle comprises at least one selected from the group consisting of (i) circularly polarized light and (ii) elliptically polarized light.

44. The vision system of claim 39, wherein said at least one white light emitting light-emitting diode comprises a plurality of white light emitting light-emitting diodes.

45. The vision system of claim 44, wherein said central video display device comprises a metallic reflector that reflects light toward said central video display screen to enhance backlighting of said central video display screen when said plurality of white light emitting light emitting diodes is powered.

46. The vision system of claim 44, wherein intensity of light emitted by said plurality of white light emitting light-emitting diodes is controlled via pulse width modulation (PWM).

47. The vision system of claim 46, wherein said central video display device comprises a reflective polarizer.

48. The vision system of claim 44, wherein, when the equipped vehicle is travelling forward, said common image processor processes first image data captured by said forward-viewing camera for (i) a lane departure warning system of the equipped vehicle, (ii) a headlamp control system of the equipped vehicle and (iii) a traffic sign recognition system of the equipped vehicle.

49. The vision system of claim 48, wherein, responsive to the equipped vehicle being shifted into a reverse gear and while the driver of the equipped vehicle is executing a reversing maneuver, video images derived from second image data captured by said rearward-viewing camera are displayed by said central video display screen with a contrast ratio of at least 180:1.

* * * * *